(12) United States Patent
Chang et al.

(10) Patent No.: US 12,449,961 B2
(45) Date of Patent: Oct. 21, 2025

(54) ADAPTIVE VIDEO CONFERENCE USER INTERFACES

(71) Applicant: Apple Inc., Cupertino, CA (US)

(72) Inventors: Jae Woo Chang, Cupertino, CA (US); Jarrett A. Ford, Alameda, CA (US); Pani Page, Las Vegas, NV (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 17/745,680

(22) Filed: May 16, 2022

(65) Prior Publication Data

US 2022/0374136 A1 Nov. 24, 2022

Related U.S. Application Data

(60) Provisional application No. 63/230,476, filed on Aug. 6, 2021, provisional application No. 63/197,461, filed on Jun. 6, 2021, provisional application No. 63/190,224, filed on May 18, 2021.

(51) Int. Cl.
| | |
|---|---|
| *G06F 3/04845* | (2022.01) |
| *G06F 3/0485* | (2022.01) |
| *H04L 65/403* | (2022.01) |
| *H04N 5/272* | (2006.01) |
| *G06F 3/04842* | (2022.01) |

(52) U.S. Cl.
CPC ........ *G06F 3/04845* (2013.01); *G06F 3/0485* (2013.01); *H04L 65/403* (2013.01); *H04N 5/272* (2013.01); *G06F 3/04842* (2013.01); *G06F 2203/04803* (2013.01)

(58) Field of Classification Search
CPC ...... G06F 3/0485; H04L 65/403; H04N 5/272
See application file for complete search history.

(56) References Cited

U.S. PATENT DOCUMENTS

| | | |
|---|---|---|
| 102,663 A | 5/1870 | Dillen |
| 4,761,642 A | 8/1988 | Huntzinger et al. |
| 4,885,704 A | 12/1989 | Takagi et al. |
| 4,896,291 A | 1/1990 | Gest et al. |
| 5,140,678 A | 8/1992 | Torres |
| 5,146,556 A | 9/1992 | Hullot et al. |
| 5,202,961 A | 4/1993 | Mills et al. |
| 5,227,771 A | 7/1993 | Kerr et al. |
| 5,229,852 A | 7/1993 | Maietta et al. |

(Continued)

FOREIGN PATENT DOCUMENTS

| | | |
|---|---|---|
| AU | 2015100713 A4 | 6/2015 |
| CA | 2876587 A1 | 2/2014 |

(Continued)

OTHER PUBLICATIONS

Corrected Notice of Allowance received for U.S. Appl. No. 17/903,946, mailed on Apr. 22, 2024, 2 pages.

(Continued)

*Primary Examiner* — Olisa Anwah
(74) *Attorney, Agent, or Firm* — DLA Piper LLP (US)

(57) ABSTRACT

The present disclosure generally relates to user interfaces for managing video conference sessions. In some embodiments, a video conference interface updates when participants join and/or leave the video conference session. In some embodiments, a video conference interface includes a representation of content being shared in the video conference session.

63 Claims, 50 Drawing Sheets

700 ─┐

702
Display a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations.

↓

704
While displaying the user interface of the real-time communication session, including the plurality of representations of participants of the real-time communication session, detect a change in one or more dimensions of the first region.

↓

706
In response to detecting the change in the one or more dimensions of the first region, change a number of representations of participants of the real-time communication session displayed in the first region based on the change in the one or more dimensions of the first region, including ceasing to display a first representation of a respective participant in the first region and displaying a second representation of the respective participant in the second region.

(56) References Cited

U.S. PATENT DOCUMENTS

| | | |
|---|---|---|
| 5,237,653 A | 8/1993 | Noguchi et al. |
| 5,287,447 A | 2/1994 | Miller et al. |
| 5,333,256 A | 7/1994 | Green et al. |
| 5,347,295 A | 9/1994 | Agulnick et al. |
| 5,384,911 A | 1/1995 | Bloomfield |
| 5,412,776 A | 5/1995 | Bloomfield et al. |
| 5,416,895 A | 5/1995 | Anderson et al. |
| 5,428,730 A | 6/1995 | Baker et al. |
| 5,463,725 A | 10/1995 | Henckel et al. |
| 5,487,143 A | 1/1996 | Southgate |
| 5,499,334 A | 3/1996 | Staab |
| 5,500,936 A | 3/1996 | Allen et al. |
| 5,557,724 A | 9/1996 | Sampat et al. |
| 5,560,022 A | 9/1996 | Dunstan et al. |
| 5,561,811 A | 10/1996 | Bier |
| 5,581,670 A | 12/1996 | Bier et al. |
| 5,583,984 A | 12/1996 | Conrad et al. |
| 5,617,526 A | 4/1997 | Oran et al. |
| 5,657,049 A | 8/1997 | Ludolph et al. |
| 5,659,693 A | 8/1997 | Hansen et al. |
| 5,721,850 A | 2/1998 | Farry |
| 5,745,116 A | 4/1998 | Pisutha-Arnond |
| 5,793,365 A | 8/1998 | Tang et al. |
| 5,825,357 A | 10/1998 | Malamud et al. |
| 5,910,882 A | 6/1999 | Burrell |
| 5,958,006 A | 9/1999 | Eggleston et al. |
| 6,025,871 A | 2/2000 | Kantor et al. |
| 6,166,736 A | 12/2000 | Hugh |
| 6,215,490 B1 | 4/2001 | Kaply |
| 6,219,047 B1 | 4/2001 | Bell |
| 6,230,170 B1 | 5/2001 | Zellweger et al. |
| 6,300,951 B1 | 10/2001 | Filetto et al. |
| 6,333,973 B1 | 12/2001 | Smith et al. |
| 6,346,962 B1 | 2/2002 | Goodridge |
| 6,486,895 B1 | 11/2002 | Robertson et al. |
| 6,493,002 B1 | 12/2002 | Christensen |
| 6,661,437 B1 | 12/2003 | Miller et al. |
| 6,726,094 B1 | 4/2004 | Rantze et al. |
| 6,728,784 B1 | 4/2004 | Mattaway |
| 6,731,308 B1 | 5/2004 | Tang et al. |
| 6,768,497 B2 | 7/2004 | Baar et al. |
| 7,007,241 B2 | 2/2006 | Boeuf |
| 7,102,663 B2 | 9/2006 | Crook |
| 7,148,911 B1 | 12/2006 | Mitsui et al. |
| 7,185,054 B1 | 2/2007 | Ludwig et al. |
| 7,343,561 B1 | 3/2008 | Stochosky et al. |
| 7,444,645 B1 | 10/2008 | St-Michel et al. |
| 7,458,014 B1 | 11/2008 | Rubin et al. |
| 7,506,260 B2 | 3/2009 | Wada et al. |
| 7,571,014 B1 | 8/2009 | Lambourne et al. |
| 7,676,767 B2 | 3/2010 | Hofmeister et al. |
| 7,707,514 B2 | 4/2010 | Forstall et al. |
| 7,739,622 B2 | 6/2010 | Deline et al. |
| 7,801,971 B1 | 9/2010 | Amidon et al. |
| 7,814,112 B2 | 10/2010 | Gupta et al. |
| 7,840,907 B2 | 11/2010 | Kikuchi et al. |
| 7,876,996 B1 | 1/2011 | Herz |
| 7,903,171 B2 | 3/2011 | Takabatake et al. |
| 7,954,056 B2 | 5/2011 | Graham |
| 7,982,762 B2 | 7/2011 | Chatting et al. |
| 8,077,157 B2 | 12/2011 | Sengupta et al. |
| 8,169,463 B2 | 5/2012 | Enstad et al. |
| 8,171,137 B1 | 5/2012 | Parks et al. |
| 8,181,119 B1 | 5/2012 | Ording |
| RE43,462 E | 6/2012 | Washino et al. |
| 8,196,061 B1 | 6/2012 | Bhojan |
| 8,224,894 B1 | 7/2012 | Parks et al. |
| 8,250,071 B1 | 8/2012 | Killalea et al. |
| 8,259,153 B1 | 9/2012 | Campbell et al. |
| 8,260,879 B2 | 9/2012 | Chan |
| 8,269,739 B2 | 9/2012 | Hillis et al. |
| 8,274,544 B2 | 9/2012 | Kurtz et al. |
| 8,290,777 B1 | 10/2012 | Nguyen et al. |
| 8,291,341 B2 | 10/2012 | Tseng et al. |
| 8,294,105 B2 | 10/2012 | Alameh et al. |
| 8,370,448 B2 | 2/2013 | Galchev |
| 8,427,303 B1 | 4/2013 | Brady et al. |
| 8,438,504 B2 | 5/2013 | Cranfill et al. |
| 8,443,280 B2 | 5/2013 | Noyes |
| 8,462,961 B1 | 6/2013 | Bywaters et al. |
| 8,478,363 B2 | 7/2013 | Levien et al. |
| 8,478,816 B2 | 7/2013 | Parks et al. |
| 8,499,236 B1 | 7/2013 | Keljo |
| 8,502,856 B2 | 8/2013 | Jeong et al. |
| 8,542,265 B1 | 9/2013 | Dodd et al. |
| 8,566,700 B2 | 10/2013 | Ueda |
| 8,613,070 B1 | 12/2013 | Borzycki et al. |
| 8,624,952 B2 | 1/2014 | Currivan et al. |
| 8,656,040 B1 | 2/2014 | Bajaj et al. |
| 8,698,845 B2 | 4/2014 | Lemay et al. |
| 8,718,556 B2 | 5/2014 | Lee et al. |
| 8,725,880 B2 | 5/2014 | Santamaria et al. |
| 8,738,090 B2 | 5/2014 | Kanda et al. |
| 8,762,844 B2 | 6/2014 | Kim et al. |
| 8,782,513 B2 | 7/2014 | Migos et al. |
| 8,799,406 B1 | 8/2014 | Slonh |
| 8,806,369 B2 | 8/2014 | Khoe et al. |
| 8,839,122 B2 | 9/2014 | Anzures et al. |
| 8,856,105 B2 | 10/2014 | Gargi |
| 8,914,752 B1 | 12/2014 | Spiegel |
| 8,949,250 B1 | 2/2015 | Garg et al. |
| 9,032,321 B1 | 5/2015 | Cohen et al. |
| 9,080,736 B1 | 7/2015 | Salzinger et al. |
| 9,095,779 B2 | 8/2015 | Chan et al. |
| 9,185,062 B1 | 11/2015 | Yang et al. |
| 9,253,531 B2 | 2/2016 | Relyea et al. |
| 9,253,631 B1 | 2/2016 | White et al. |
| 9,380,264 B1 | 6/2016 | Vakalapudi |
| 9,406,103 B1 | 8/2016 | Gray et al. |
| 9,417,781 B2 | 8/2016 | Lee et al. |
| 9,442,516 B2 | 9/2016 | Migos et al. |
| 9,445,048 B1 | 9/2016 | Nariyawala et al. |
| 9,462,017 B1 | 10/2016 | Siracusano, Jr. |
| 9,483,175 B2 | 11/2016 | Wagner |
| 9,552,015 B2 | 1/2017 | Capela et al. |
| 9,635,314 B2 | 4/2017 | Barkley et al. |
| 9,639,252 B2 | 5/2017 | Jin et al. |
| 9,781,540 B2 | 10/2017 | Jagannathan et al. |
| 9,787,938 B2 | 10/2017 | Cranfill et al. |
| 9,800,951 B1 | 10/2017 | Carlson et al. |
| 9,819,877 B1* | 11/2017 | Faulkner ............... H04N 7/147 |
| 9,830,056 B1 | 11/2017 | Keely et al. |
| 9,992,450 B1 | 6/2018 | Yuan et al. |
| 10,025,496 B2 | 7/2018 | Park et al. |
| 10,157,040 B2 | 12/2018 | Ballinger et al. |
| 10,194,189 B1 | 1/2019 | Goetz et al. |
| 10,198,144 B2 | 2/2019 | Munoz et al. |
| 10,270,983 B1 | 4/2019 | Van Os et al. |
| 10,284,812 B1 | 5/2019 | Van Os et al. |
| 10,300,394 B1 | 5/2019 | Evans et al. |
| 10,339,769 B2 | 7/2019 | Mixter et al. |
| 10,353,532 B1 | 7/2019 | Holz et al. |
| 10,362,272 B1 | 7/2019 | Van Os et al. |
| 10,386,994 B2* | 8/2019 | Singal .................. H04L 67/02 |
| 10,389,977 B1 | 8/2019 | Van Os et al. |
| 10,410,426 B2 | 9/2019 | Kamini et al. |
| 10,523,625 B1 | 12/2019 | Allen et al. |
| 10,523,976 B2 | 12/2019 | Hemmati et al. |
| 10,534,535 B2 | 1/2020 | Lee et al. |
| 10,645,294 B1 | 5/2020 | Manzari et al. |
| 10,757,366 B1 | 8/2020 | Kwatra et al. |
| 10,771,740 B1 | 9/2020 | Reynolds et al. |
| 10,771,741 B1 | 9/2020 | Reynolds et al. |
| 10,783,883 B2 | 9/2020 | Mixter et al. |
| 10,909,586 B2 | 2/2021 | Avedissian et al. |
| 10,924,446 B1 | 2/2021 | Paul |
| 10,929,099 B2 | 2/2021 | Querze et al. |
| 10,963,145 B1 | 3/2021 | Voss et al. |
| 10,972,655 B1 | 4/2021 | Ostap et al. |
| 11,012,575 B1 | 5/2021 | Leblang et al. |
| 11,024,303 B1 | 6/2021 | Devaraj et al. |
| 11,064,256 B1* | 7/2021 | Voss ................... H04N 21/47 |
| 11,079,913 B1 | 8/2021 | Kim et al. |
| 11,144,885 B2 | 10/2021 | Rosenberg |

(56) References Cited

U.S. PATENT DOCUMENTS

| | | |
|---|---|---|
| 11,164,113 B2 | 11/2021 | Howard |
| 11,164,580 B2 | 11/2021 | Kraker |
| 11,176,940 B1 | 11/2021 | Zhong et al. |
| 11,212,449 B1 | 12/2021 | Manzari et al. |
| 11,258,619 B2 | 2/2022 | Libin |
| 11,283,916 B2 | 3/2022 | Coffman et al. |
| 11,290,687 B1 | 3/2022 | Becchetti |
| 11,316,709 B2 | 4/2022 | Brown et al. |
| 11,343,613 B2 | 5/2022 | Gordon et al. |
| 11,360,634 B1 | 6/2022 | Chang et al. |
| 11,449,188 B1 | 9/2022 | Chang et al. |
| 11,523,166 B1 | 12/2022 | Tu et al. |
| 11,621,979 B1* | 4/2023 | Slotznick .............. H04L 65/403 348/14.07 |
| 11,671,697 B2 | 6/2023 | O'Leary et al. |
| 11,726,647 B2 | 8/2023 | Kim |
| 11,770,600 B2* | 9/2023 | O'Leary .............. H04L 12/1813 348/14.03 |
| 11,955,025 B2 | 4/2024 | Aoki et al. |
| 12,014,118 B2 | 6/2024 | Gruber et al. |
| 12,085,421 B2 | 9/2024 | Yedid et al. |
| 12,218,944 B1 | 2/2025 | Hadley et al. |
| 2001/0021649 A1 | 9/2001 | Kinnunen et al. |
| 2001/0030597 A1 | 10/2001 | Inoue et al. |
| 2001/0041007 A1 | 11/2001 | Aoki |
| 2002/0010707 A1 | 1/2002 | Chang et al. |
| 2002/0075334 A1 | 6/2002 | Yfantis |
| 2002/0083101 A1 | 6/2002 | Card et al. |
| 2002/0093531 A1* | 7/2002 | Barile ................... H04N 7/148 715/753 |
| 2002/0101446 A1 | 8/2002 | Tang et al. |
| 2002/0105537 A1 | 8/2002 | Orbanes et al. |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2003/0013493 A1 | 1/2003 | Irimajiri et al. |
| 2003/0030673 A1 | 2/2003 | Ho |
| 2003/0055977 A1 | 3/2003 | Miller |
| 2003/0076352 A1 | 4/2003 | Uhlig et al. |
| 2003/0098884 A1 | 5/2003 | Christensen |
| 2003/0112938 A1 | 6/2003 | Kanakubo et al. |
| 2003/0158886 A1 | 8/2003 | Walls et al. |
| 2003/0160861 A1 | 8/2003 | Barlow et al. |
| 2003/0184598 A1 | 10/2003 | Graham |
| 2003/0217096 A1 | 11/2003 | Mckelvie et al. |
| 2003/0218619 A1 | 11/2003 | Ben-Tovim |
| 2003/0225836 A1 | 12/2003 | Lee et al. |
| 2004/0003040 A1 | 1/2004 | Beavers et al. |
| 2004/0017404 A1 | 1/2004 | Schileru-Key |
| 2004/0048601 A1 | 3/2004 | Lee et al. |
| 2004/0048612 A1 | 3/2004 | Virtanen et al. |
| 2004/0080531 A1 | 4/2004 | Berstis |
| 2004/0102225 A1 | 5/2004 | Furuta et al. |
| 2004/0125081 A1 | 7/2004 | Hayakawa |
| 2004/0141016 A1 | 7/2004 | Fukatsu et al. |
| 2004/0162877 A1 | 8/2004 | Van et al. |
| 2004/0174398 A1 | 9/2004 | Luke et al. |
| 2004/0205514 A1 | 10/2004 | Sommerer et al. |
| 2004/0218035 A1 | 11/2004 | Crook |
| 2004/0239763 A1 | 12/2004 | Notea et al. |
| 2005/0015286 A1 | 1/2005 | Rudnik et al. |
| 2005/0099492 A1 | 5/2005 | Orr |
| 2005/0120306 A1 | 6/2005 | Klassen et al. |
| 2005/0124365 A1 | 6/2005 | Balasuriya et al. |
| 2005/0132281 A1 | 6/2005 | Pan et al. |
| 2005/0144247 A1 | 6/2005 | Christensen et al. |
| 2005/0177798 A1 | 8/2005 | Thomson et al. |
| 2005/0183035 A1 | 8/2005 | Ringel et al. |
| 2005/0223068 A1 | 10/2005 | Shohfi et al. |
| 2005/0233780 A1 | 10/2005 | Jani et al. |
| 2005/0239512 A1 | 10/2005 | Hasegawa et al. |
| 2005/0289482 A1 | 12/2005 | Anthony et al. |
| 2006/0002315 A1 | 1/2006 | Theurer et al. |
| 2006/0002523 A1 | 1/2006 | Bettis et al. |
| 2006/0031776 A1 | 2/2006 | Glein et al. |
| 2006/0033724 A1 | 2/2006 | Chaudhri et al. |
| 2006/0055789 A1 | 3/2006 | Jin et al. |
| 2006/0056837 A1 | 3/2006 | Vapaakoski |
| 2006/0071947 A1 | 4/2006 | Ubillos et al. |
| 2006/0098085 A1 | 5/2006 | Nichols et al. |
| 2006/0098634 A1 | 5/2006 | Umemoto et al. |
| 2006/0101122 A1 | 5/2006 | Ishii |
| 2006/0107226 A1 | 5/2006 | Matthews et al. |
| 2006/0129947 A1 | 6/2006 | Hamzy et al. |
| 2006/0149399 A1 | 7/2006 | Norhammar et al. |
| 2006/0150215 A1 | 7/2006 | Wroblewski et al. |
| 2006/0158730 A1 | 7/2006 | Kira |
| 2006/0161863 A1 | 7/2006 | Gallo |
| 2006/0184894 A1 | 8/2006 | Daniels et al. |
| 2006/0185005 A1 | 8/2006 | Graves et al. |
| 2006/0230346 A1 | 10/2006 | Bhogal et al. |
| 2006/0256188 A1 | 11/2006 | Mock et al. |
| 2007/0004389 A1 | 1/2007 | Wallace et al. |
| 2007/0004451 A1 | 1/2007 | Anderson |
| 2007/0015519 A1 | 1/2007 | Casey |
| 2007/0040898 A1 | 2/2007 | Lee et al. |
| 2007/0064112 A1 | 3/2007 | Chatting et al. |
| 2007/0083828 A1 | 4/2007 | Toriyama et al. |
| 2007/0115349 A1 | 5/2007 | Currivan et al. |
| 2007/0115933 A1 | 5/2007 | Muhamed et al. |
| 2007/0124783 A1 | 5/2007 | Ahiska et al. |
| 2007/0150842 A1 | 6/2007 | Chaudhri et al. |
| 2007/0156910 A1 | 7/2007 | Alfke et al. |
| 2007/0160345 A1 | 7/2007 | Sakai et al. |
| 2007/0174761 A1 | 7/2007 | Lin et al. |
| 2007/0177025 A1 | 8/2007 | Kopet et al. |
| 2007/0177804 A1 | 8/2007 | Elias et al. |
| 2007/0211141 A1* | 9/2007 | Christiansen ......... H04L 65/752 348/E7.083 |
| 2007/0226327 A1 | 9/2007 | Redpath |
| 2007/0233736 A1 | 10/2007 | Xiong et al. |
| 2007/0236476 A1 | 10/2007 | Suzuki |
| 2007/0239831 A1 | 10/2007 | Basu |
| 2007/0245249 A1 | 10/2007 | Weisberg et al. |
| 2007/0264977 A1 | 11/2007 | Zinn et al. |
| 2007/0277121 A1 | 11/2007 | Beckman |
| 2007/0279482 A1 | 12/2007 | Oswald et al. |
| 2007/0291736 A1 | 12/2007 | Furlong et al. |
| 2008/0032704 A1 | 2/2008 | Oneil et al. |
| 2008/0034307 A1 | 2/2008 | Cisler et al. |
| 2008/0036849 A1 | 2/2008 | Oh et al. |
| 2008/0063389 A1 | 3/2008 | Fang et al. |
| 2008/0068447 A1 | 3/2008 | Mattila et al. |
| 2008/0074049 A1 | 3/2008 | Kitai et al. |
| 2008/0074550 A1 | 3/2008 | Park |
| 2008/0084482 A1 | 4/2008 | Hansson et al. |
| 2008/0094368 A1 | 4/2008 | Ording et al. |
| 2008/0094370 A1 | 4/2008 | Ording et al. |
| 2008/0114716 A1 | 5/2008 | Mock |
| 2008/0117876 A1 | 5/2008 | Hidaka et al. |
| 2008/0122796 A1 | 5/2008 | Jobs et al. |
| 2008/0129816 A1 | 6/2008 | Mattila et al. |
| 2008/0129844 A1 | 6/2008 | Cusack et al. |
| 2008/0134033 A1 | 6/2008 | Burns et al. |
| 2008/0134088 A1 | 6/2008 | Tse et al. |
| 2008/0140488 A1 | 6/2008 | Oral et al. |
| 2008/0141182 A1 | 6/2008 | Barsness et al. |
| 2008/0160974 A1 | 7/2008 | Vartiainen et al. |
| 2008/0165144 A1 | 7/2008 | Forstall et al. |
| 2008/0165388 A1 | 7/2008 | Serlet |
| 2008/0168073 A1 | 7/2008 | Siegel et al. |
| 2008/0174570 A1 | 7/2008 | Jobs et al. |
| 2008/0218535 A1 | 9/2008 | Forstall et al. |
| 2008/0220752 A1 | 9/2008 | Forstall et al. |
| 2008/0246778 A1 | 10/2008 | Ham et al. |
| 2008/0282202 A1 | 11/2008 | Sunday |
| 2008/0306997 A1 | 12/2008 | Keohane et al. |
| 2008/0307323 A1 | 12/2008 | Coffman et al. |
| 2008/0307345 A1 | 12/2008 | Hart et al. |
| 2008/0313257 A1 | 12/2008 | Allen et al. |
| 2008/0313278 A1 | 12/2008 | Hochberg |
| 2008/0316183 A1 | 12/2008 | Westerman et al. |
| 2008/0316295 A1 | 12/2008 | King et al. |
| 2008/0319856 A1 | 12/2008 | Zito et al. |

(56) References Cited

U.S. PATENT DOCUMENTS

| | | |
|---|---|---|
| 2008/0319944 A1 | 12/2008 | Venolia et al. |
| 2009/0005011 A1 | 1/2009 | Christie et al. |
| 2009/0007017 A1 | 1/2009 | Anzures et al. |
| 2009/0046075 A1 | 2/2009 | Kim et al. |
| 2009/0049446 A1 | 2/2009 | Merten et al. |
| 2009/0089712 A1 | 4/2009 | Sato |
| 2009/0100383 A1 | 4/2009 | Sunday et al. |
| 2009/0103780 A1 | 4/2009 | Nishihara et al. |
| 2009/0106687 A1 | 4/2009 | De et al. |
| 2009/0109276 A1 | 4/2009 | Kim |
| 2009/0113347 A1 | 4/2009 | Hess et al. |
| 2009/0117936 A1 | 5/2009 | Maeng |
| 2009/0140960 A1 | 6/2009 | Mahowald et al. |
| 2009/0158217 A1 | 6/2009 | Stuart |
| 2009/0164322 A1 | 6/2009 | Khan et al. |
| 2009/0164587 A1 | 6/2009 | Gavita et al. |
| 2009/0174680 A1 | 7/2009 | Anzures et al. |
| 2009/0174763 A1 | 7/2009 | Bengtsson et al. |
| 2009/0177981 A1 | 7/2009 | Christie et al. |
| 2009/0179867 A1 | 7/2009 | Shim et al. |
| 2009/0183125 A1 | 7/2009 | Magal et al. |
| 2009/0187825 A1 | 7/2009 | Sandquist et al. |
| 2009/0213086 A1 | 8/2009 | Chae et al. |
| 2009/0228126 A1 | 9/2009 | Spielberg et al. |
| 2009/0228322 A1 | 9/2009 | Van et al. |
| 2009/0228820 A1 | 9/2009 | Kim et al. |
| 2009/0228825 A1 | 9/2009 | Van Os et al. |
| 2009/0228938 A1 | 9/2009 | White et al. |
| 2009/0232129 A1 | 9/2009 | Wong et al. |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0249244 A1 | 10/2009 | Robinson et al. |
| 2009/0254867 A1 | 10/2009 | Farouki et al. |
| 2009/0256780 A1 | 10/2009 | Small et al. |
| 2009/0259939 A1 | 10/2009 | Lockett et al. |
| 2009/0262200 A1 | 10/2009 | Takabatake et al. |
| 2009/0262206 A1 | 10/2009 | Park |
| 2009/0271381 A1 | 10/2009 | Beezer et al. |
| 2009/0287790 A1 | 11/2009 | Upton et al. |
| 2009/0305679 A1 | 12/2009 | Kim |
| 2009/0305732 A1 | 12/2009 | Marcellino et al. |
| 2009/0309897 A1 | 12/2009 | Morita et al. |
| 2009/0315841 A1 | 12/2009 | Cheng et al. |
| 2009/0319888 A1 | 12/2009 | Oygard |
| 2010/0009719 A1 | 1/2010 | Oh et al. |
| 2010/0011065 A1 | 1/2010 | Scherpa et al. |
| 2010/0023878 A1 | 1/2010 | Douris et al. |
| 2010/0023883 A1 | 1/2010 | Khazaka et al. |
| 2010/0029255 A1 | 2/2010 | Kim et al. |
| 2010/0039498 A1 | 2/2010 | Liu et al. |
| 2010/0040292 A1 | 2/2010 | Clarkson |
| 2010/0044121 A1 | 2/2010 | Simon et al. |
| 2010/0045616 A1 | 2/2010 | Li et al. |
| 2010/0053212 A1 | 3/2010 | Kang et al. |
| 2010/0058231 A1 | 3/2010 | Duarte et al. |
| 2010/0066763 A1 | 3/2010 | Macdougall et al. |
| 2010/0073454 A1 | 3/2010 | Lovhaugen et al. |
| 2010/0073455 A1 | 3/2010 | Iwabuchi et al. |
| 2010/0085416 A1 | 4/2010 | Hegde et al. |
| 2010/0087230 A1 | 4/2010 | Peh et al. |
| 2010/0095240 A1 | 4/2010 | Shiplacoff et al. |
| 2010/0097438 A1 | 4/2010 | Ujii |
| 2010/0107078 A1 | 4/2010 | Hayashi |
| 2010/0109864 A1 | 5/2010 | Haartsen et al. |
| 2010/0115388 A1 | 5/2010 | Nguyen |
| 2010/0121636 A1 | 5/2010 | Burke et al. |
| 2010/0123724 A1 | 5/2010 | Moore et al. |
| 2010/0125785 A1 | 5/2010 | Moore et al. |
| 2010/0125807 A1 | 5/2010 | Easterday et al. |
| 2010/0125811 A1 | 5/2010 | Moore et al. |
| 2010/0125816 A1 | 5/2010 | Bezos |
| 2010/0146384 A1 | 6/2010 | Peev et al. |
| 2010/0159994 A1 | 6/2010 | Stallings et al. |
| 2010/0159995 A1 | 6/2010 | Stallings et al. |
| 2010/0162108 A1 | 6/2010 | Stallings et al. |
| 2010/0162171 A1 | 6/2010 | Felt et al. |
| 2010/0169435 A1 | 7/2010 | Osullivan et al. |
| 2010/0174606 A1 | 7/2010 | Hoyle |
| 2010/0175018 A1 | 7/2010 | Petschnigg et al. |
| 2010/0177156 A1 | 7/2010 | Kim et al. |
| 2010/0185989 A1 | 7/2010 | Shiplacoff et al. |
| 2010/0189096 A1 | 7/2010 | Flynn et al. |
| 2010/0205563 A1 | 8/2010 | Haapsaari et al. |
| 2010/0211872 A1 | 8/2010 | Rolston et al. |
| 2010/0241699 A1 | 9/2010 | Muthukumarasamy et al. |
| 2010/0242066 A1 | 9/2010 | Tseng et al. |
| 2010/0246571 A1 | 9/2010 | Geppert et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0257490 A1 | 10/2010 | Lyon et al. |
| 2010/0262714 A1 | 10/2010 | Hife |
| 2010/0269039 A1 | 10/2010 | Pahlavan et al. |
| 2010/0269069 A1 | 10/2010 | Paila et al. |
| 2010/0281399 A1 | 11/2010 | Banker |
| 2010/0295789 A1 | 11/2010 | Shin et al. |
| 2010/0309284 A1 | 12/2010 | Samadani et al. |
| 2010/0311336 A1 | 12/2010 | Huotari et al. |
| 2010/0318928 A1 | 12/2010 | Neuman et al. |
| 2010/0318939 A1 | 12/2010 | Moon |
| 2010/0333045 A1 | 12/2010 | Guéziec et al. |
| 2011/0007029 A1 | 1/2011 | Ben-David |
| 2011/0010667 A1 | 1/2011 | Sakai et al. |
| 2011/0016417 A1 | 1/2011 | Shiplacoff et al. |
| 2011/0029864 A1 | 2/2011 | Stewart et al. |
| 2011/0029891 A1 | 2/2011 | Kim et al. |
| 2011/0030324 A1 | 2/2011 | Higgins |
| 2011/0032324 A1 | 2/2011 | George et al. |
| 2011/0035662 A1 | 2/2011 | King et al. |
| 2011/0041056 A1 | 2/2011 | Griffin et al. |
| 2011/0041096 A1 | 2/2011 | Larco et al. |
| 2011/0041102 A1 | 2/2011 | Kim |
| 2011/0043652 A1 | 2/2011 | King et al. |
| 2011/0065384 A1 | 3/2011 | Cader et al. |
| 2011/0074824 A1 | 3/2011 | Srinivasan et al. |
| 2011/0081889 A1 | 4/2011 | Gao et al. |
| 2011/0085017 A1 | 4/2011 | Robinson et al. |
| 2011/0087431 A1 | 4/2011 | Gupta et al. |
| 2011/0087955 A1 | 4/2011 | Ho et al. |
| 2011/0087970 A1 | 4/2011 | Swink et al. |
| 2011/0088086 A1 | 4/2011 | Swink et al. |
| 2011/0091182 A1 | 4/2011 | Look et al. |
| 2011/0096174 A1 | 4/2011 | King et al. |
| 2011/0105096 A1 | 5/2011 | Dods et al. |
| 2011/0107216 A1 | 5/2011 | Bi |
| 2011/0107241 A1 | 5/2011 | Moore |
| 2011/0115875 A1 | 5/2011 | Sadwick et al. |
| 2011/0115876 A1* | 5/2011 | Khot .................. H04N 7/15 348/14.09 |
| 2011/0115945 A1 | 5/2011 | Takano et al. |
| 2011/0117898 A1 | 5/2011 | Pereira et al. |
| 2011/0126148 A1 | 5/2011 | Krishnaraj et al. |
| 2011/0138295 A1 | 6/2011 | Momchilov et al. |
| 2011/0145068 A1 | 6/2011 | King et al. |
| 2011/0145691 A1 | 6/2011 | Noyes |
| 2011/0145692 A1 | 6/2011 | Noyes et al. |
| 2011/0161836 A1 | 6/2011 | Mu et al. |
| 2011/0164032 A1 | 7/2011 | Shadmi |
| 2011/0164042 A1 | 7/2011 | Chaudhri |
| 2011/0164058 A1 | 7/2011 | Lemay |
| 2011/0167058 A1 | 7/2011 | Van Os |
| 2011/0167339 A1 | 7/2011 | Lemay |
| 2011/0167357 A1 | 7/2011 | Benjamin et al. |
| 2011/0167382 A1 | 7/2011 | Van Os |
| 2011/0178811 A1 | 7/2011 | Sheridan |
| 2011/0179386 A1 | 7/2011 | Shaffer et al. |
| 2011/0184768 A1 | 7/2011 | Norton et al. |
| 2011/0191710 A1 | 8/2011 | Jang et al. |
| 2011/0193995 A1 | 8/2011 | Goh et al. |
| 2011/0205333 A1 | 8/2011 | Wu et al. |
| 2011/0209099 A1 | 8/2011 | Hinckley et al. |
| 2011/0209104 A1 | 8/2011 | Hinckley et al. |
| 2011/0209201 A1 | 8/2011 | Chollat |

(56) References Cited

U.S. PATENT DOCUMENTS

| | | |
|---|---|---|
| 2011/0227810 A1 | 9/2011 | Mckinney et al. |
| 2011/0234746 A1 | 9/2011 | Saleh et al. |
| 2011/0235549 A1 | 9/2011 | Ahlers et al. |
| 2011/0242356 A1 | 10/2011 | Aleksic et al. |
| 2011/0246944 A1 | 10/2011 | Byrne et al. |
| 2011/0249073 A1 | 10/2011 | Cranfill et al. |
| 2011/0249074 A1 | 10/2011 | Cranfill et al. |
| 2011/0249086 A1 | 10/2011 | Guo et al. |
| 2011/0252062 A1 | 10/2011 | Hanatani et al. |
| 2011/0252146 A1 | 10/2011 | Santamaria et al. |
| 2011/0252364 A1 | 10/2011 | Anzures et al. |
| 2011/0252368 A1 | 10/2011 | Anzures et al. |
| 2011/0252376 A1 | 10/2011 | Chaudhri et al. |
| 2011/0252377 A1 | 10/2011 | Anzures et al. |
| 2011/0252381 A1 | 10/2011 | Chaudhri |
| 2011/0261030 A1 | 10/2011 | Bullock |
| 2011/0273526 A1 | 11/2011 | Mehin et al. |
| 2011/0275358 A1 | 11/2011 | Faenger |
| 2011/0281568 A1 | 11/2011 | Le |
| 2011/0291945 A1 | 12/2011 | Ewing et al. |
| 2011/0295879 A1 | 12/2011 | Logis et al. |
| 2011/0296163 A1 | 12/2011 | Abernethy et al. |
| 2011/0296328 A1 | 12/2011 | Jikeya |
| 2011/0296333 A1 | 12/2011 | Bateman et al. |
| 2011/0296344 A1 | 12/2011 | Habib et al. |
| 2011/0296351 A1 | 12/2011 | Ewing et al. |
| 2011/0314398 A1 | 12/2011 | Yano et al. |
| 2012/0002001 A1 | 1/2012 | Prentice |
| 2012/0019610 A1 | 1/2012 | Hornyak et al. |
| 2012/0023438 A1 | 1/2012 | Xia et al. |
| 2012/0023462 A1 | 1/2012 | Rosing et al. |
| 2012/0033028 A1 | 2/2012 | Murphy et al. |
| 2012/0054278 A1 | 3/2012 | Taleb et al. |
| 2012/0062784 A1 | 3/2012 | Van et al. |
| 2012/0081375 A1 | 4/2012 | Robert et al. |
| 2012/0084644 A1 | 4/2012 | Robert et al. |
| 2012/0084691 A1 | 4/2012 | Yun |
| 2012/0092436 A1 | 4/2012 | Pahud et al. |
| 2012/0096069 A1 | 4/2012 | Chan |
| 2012/0096076 A1 | 4/2012 | Chan et al. |
| 2012/0096344 A1 | 4/2012 | Ho et al. |
| 2012/0096386 A1 | 4/2012 | Baumann et al. |
| 2012/0102387 A1 | 4/2012 | Badoiu et al. |
| 2012/0105225 A1 | 5/2012 | Valtonen |
| 2012/0114108 A1 | 5/2012 | Katis et al. |
| 2012/0121185 A1 | 5/2012 | Zavesky |
| 2012/0129496 A1 | 5/2012 | Park et al. |
| 2012/0131470 A1 | 5/2012 | Wessling et al. |
| 2012/0136998 A1 | 5/2012 | Hough et al. |
| 2012/0143694 A1 | 6/2012 | Zargahi et al. |
| 2012/0159364 A1 | 6/2012 | Hyun |
| 2012/0159373 A1 | 6/2012 | Archer et al. |
| 2012/0159380 A1 | 6/2012 | Kocienda et al. |
| 2012/0166950 A1 | 6/2012 | Frumar et al. |
| 2012/0173383 A1 | 7/2012 | Badawiyeh et al. |
| 2012/0179970 A1 | 7/2012 | Hayes |
| 2012/0182381 A1 | 7/2012 | Abate et al. |
| 2012/0185355 A1 | 7/2012 | Kilroy |
| 2012/0185467 A1 | 7/2012 | Prager et al. |
| 2012/0185542 A1 | 7/2012 | Vyrros et al. |
| 2012/0188394 A1 | 7/2012 | Park et al. |
| 2012/0192068 A1 | 7/2012 | Migos et al. |
| 2012/0192102 A1 | 7/2012 | Migos et al. |
| 2012/0192118 A1 | 7/2012 | Migos et al. |
| 2012/0201479 A1* | 8/2012 | Zhang ............... G06T 3/4038 382/284 |
| 2012/0214552 A1 | 8/2012 | Sirpal et al. |
| 2012/0216139 A1 | 8/2012 | Ording et al. |
| 2012/0218304 A1 | 8/2012 | Anzures et al. |
| 2012/0223890 A1 | 9/2012 | Borovsky et al. |
| 2012/0229591 A1 | 9/2012 | Lee |
| 2012/0233239 A1 | 9/2012 | Urim et al. |
| 2012/0240085 A1 | 9/2012 | Sim et al. |
| 2012/0257095 A1 | 10/2012 | Velazquez |
| 2012/0266098 A1 | 10/2012 | Webber |
| 2012/0274550 A1 | 11/2012 | Campbell et al. |
| 2012/0284256 A1 | 11/2012 | Mahajan et al. |
| 2012/0284297 A1 | 11/2012 | Aguera-Arcas et al. |
| 2012/0284673 A1 | 11/2012 | Lamb et al. |
| 2012/0289217 A1 | 11/2012 | Riemer et al. |
| 2012/0290657 A1 | 11/2012 | Parks et al. |
| 2012/0290943 A1 | 11/2012 | Toney et al. |
| 2012/0290950 A1 | 11/2012 | Rapaport et al. |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0304111 A1 | 11/2012 | Queru et al. |
| 2012/0320141 A1 | 12/2012 | Bowen et al. |
| 2013/0005487 A1 | 1/2013 | Frazzini et al. |
| 2013/0007665 A1 | 1/2013 | Chaudhri et al. |
| 2013/0014040 A1 | 1/2013 | Jagannathan et al. |
| 2013/0019182 A1 | 1/2013 | Gil et al. |
| 2013/0041790 A1 | 2/2013 | Murugesan et al. |
| 2013/0046893 A1 | 2/2013 | Hauser et al. |
| 2013/0050263 A1 | 2/2013 | Khoe et al. |
| 2013/0054697 A1 | 2/2013 | Cha et al. |
| 2013/0055113 A1 | 2/2013 | Chazin et al. |
| 2013/0061155 A1 | 3/2013 | Hon |
| 2013/0061175 A1 | 3/2013 | Matas et al. |
| 2013/0070046 A1 | 3/2013 | Wolf et al. |
| 2013/0073989 A1 | 3/2013 | Harris et al. |
| 2013/0080525 A1 | 3/2013 | Aoki et al. |
| 2013/0080923 A1 | 3/2013 | Anzures et al. |
| 2013/0088413 A1 | 4/2013 | Raffle et al. |
| 2013/0102281 A1 | 4/2013 | Kanda et al. |
| 2013/0111342 A1 | 5/2013 | Alameh et al. |
| 2013/0111603 A1 | 5/2013 | Sakai et al. |
| 2013/0120254 A1 | 5/2013 | Mun et al. |
| 2013/0122961 A1 | 5/2013 | Choi et al. |
| 2013/0124207 A1 | 5/2013 | Sarin et al. |
| 2013/0132865 A1 | 5/2013 | Li |
| 2013/0145295 A1 | 6/2013 | Bocking et al. |
| 2013/0145303 A1 | 6/2013 | Prakash et al. |
| 2013/0151623 A1 | 6/2013 | Weiser et al. |
| 2013/0151959 A1 | 6/2013 | Flynn et al. |
| 2013/0162781 A1 | 6/2013 | Hubner et al. |
| 2013/0166580 A1 | 6/2013 | Maharajh et al. |
| 2013/0169742 A1 | 7/2013 | Wu et al. |
| 2013/0173699 A1 | 7/2013 | Parks et al. |
| 2013/0185642 A1 | 7/2013 | Gammons |
| 2013/0185650 A1 | 7/2013 | Gutowitz |
| 2013/0187753 A1 | 7/2013 | Chiriyankandath |
| 2013/0191911 A1 | 7/2013 | Dellinger et al. |
| 2013/0212212 A1 | 8/2013 | Addepalli et al. |
| 2013/0216206 A1 | 8/2013 | Dubin et al. |
| 2013/0219276 A1 | 8/2013 | Shan |
| 2013/0219332 A1 | 8/2013 | Woley et al. |
| 2013/0225140 A1 | 8/2013 | Greisson |
| 2013/0230293 A1 | 9/2013 | Boyle et al. |
| 2013/0282180 A1 | 10/2013 | Layton |
| 2013/0283199 A1 | 10/2013 | Selig et al. |
| 2013/0283283 A1 | 10/2013 | Wang et al. |
| 2013/0290058 A1 | 10/2013 | Gray et al. |
| 2013/0293777 A1 | 11/2013 | Huber et al. |
| 2013/0298024 A1 | 11/2013 | Rhee et al. |
| 2013/0318158 A1 | 11/2013 | Teng et al. |
| 2013/0318249 A1 | 11/2013 | Mcdonough et al. |
| 2013/0321340 A1 | 12/2013 | Seo et al. |
| 2013/0325949 A1 | 12/2013 | Virani et al. |
| 2013/0325967 A1 | 12/2013 | Parks et al. |
| 2013/0328770 A1 | 12/2013 | Parham |
| 2013/0328997 A1 | 12/2013 | Desai |
| 2013/0332826 A1 | 12/2013 | Karunamuni et al. |
| 2013/0332856 A1 | 12/2013 | Sanders et al. |
| 2013/0332886 A1 | 12/2013 | Cranfill et al. |
| 2013/0346882 A1 | 12/2013 | Shiplacoff et al. |
| 2013/0346892 A1 | 12/2013 | Wren et al. |
| 2013/0346922 A1 | 12/2013 | Shiplacoff et al. |
| 2014/0013271 A1 | 1/2014 | Moore et al. |
| 2014/0018053 A1 | 1/2014 | Cho et al. |
| 2014/0024340 A1 | 1/2014 | Raleigh |
| 2014/0026074 A1 | 1/2014 | Cortes et al. |
| 2014/0032706 A1 | 1/2014 | Kuscher et al. |
| 2014/0043424 A1 | 2/2014 | Gava et al. |

(56) References Cited

U.S. PATENT DOCUMENTS

| | | |
|---|---|---|
| 2014/0047020 A1 | 2/2014 | Matus et al. |
| 2014/0047382 A1 | 2/2014 | Kim et al. |
| 2014/0055426 A1 | 2/2014 | Park et al. |
| 2014/0058941 A1 | 2/2014 | Moon et al. |
| 2014/0063176 A1 | 3/2014 | Modai et al. |
| 2014/0068477 A1 | 3/2014 | Roh |
| 2014/0082136 A1 | 3/2014 | Garcia Puga et al. |
| 2014/0089857 A1 | 3/2014 | Wang et al. |
| 2014/0099004 A1 | 4/2014 | Dibona et al. |
| 2014/0101597 A1 | 4/2014 | Bamford et al. |
| 2014/0101768 A1 | 4/2014 | Miller et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0118272 A1 | 5/2014 | Gunn |
| 2014/0119531 A1 | 5/2014 | Tuchman et al. |
| 2014/0122730 A1 | 5/2014 | Burch et al. |
| 2014/0123257 A1 | 5/2014 | Gordon et al. |
| 2014/0136481 A1 | 5/2014 | Quan et al. |
| 2014/0149884 A1 | 5/2014 | Flynn et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0173447 A1 | 6/2014 | Das et al. |
| 2014/0189524 A1 | 7/2014 | Murarka et al. |
| 2014/0201126 A1 | 7/2014 | Zadeh et al. |
| 2014/0201527 A1 | 7/2014 | Krivorot |
| 2014/0201632 A1 | 7/2014 | Kunigita et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0280812 A1 | 9/2014 | Bealkowski et al. |
| 2014/0282084 A1 | 9/2014 | Murarka et al. |
| 2014/0282103 A1 | 9/2014 | Jerry |
| 2014/0282110 A1 | 9/2014 | Chaudhri |
| 2014/0282208 A1 | 9/2014 | Chaudhri |
| 2014/0282233 A1 | 9/2014 | Sandler et al. |
| 2014/0282240 A1 | 9/2014 | Flynn et al. |
| 2014/0298253 A1 | 10/2014 | Jin et al. |
| 2014/0310643 A1 | 10/2014 | Karmanenko et al. |
| 2014/0317532 A1 | 10/2014 | Ma et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0331149 A1 | 11/2014 | Labey |
| 2014/0335827 A1 | 11/2014 | Tsuda |
| 2014/0337791 A1 | 11/2014 | Agnetta et al. |
| 2014/0340332 A1 | 11/2014 | Lemay et al. |
| 2014/0349754 A1 | 11/2014 | Kaneoka et al. |
| 2014/0351722 A1 | 11/2014 | Frederickson et al. |
| 2014/0354759 A1 | 12/2014 | Cranfill et al. |
| 2014/0359637 A1 | 12/2014 | Yan |
| 2014/0365929 A1 | 12/2014 | Ding |
| 2014/0366158 A1 | 12/2014 | Han et al. |
| 2014/0368547 A1* | 12/2014 | Elings .................. G06F 3/0346 345/659 |
| 2014/0368600 A1* | 12/2014 | Do ........................ G06V 40/16 348/14.01 |
| 2014/0368719 A1 | 12/2014 | Kaneko et al. |
| 2014/0373081 A1 | 12/2014 | Dodson et al. |
| 2014/0375577 A1 | 12/2014 | Yeh et al. |
| 2014/0375747 A1 | 12/2014 | Martinez et al. |
| 2014/0378099 A1 | 12/2014 | Huang et al. |
| 2014/0380187 A1 | 12/2014 | Gardenfors et al. |
| 2015/0004945 A1 | 1/2015 | Steeves et al. |
| 2015/0019966 A1 | 1/2015 | Jeon et al. |
| 2015/0033149 A1 | 1/2015 | Kuchoor |
| 2015/0040012 A1 | 2/2015 | Faaborg et al. |
| 2015/0049591 A1 | 2/2015 | Adams et al. |
| 2015/0058413 A1 | 2/2015 | Ge |
| 2015/0062158 A1 | 3/2015 | Hildreth et al. |
| 2015/0067541 A1 | 3/2015 | Owens et al. |
| 2015/0070272 A1 | 3/2015 | Kim et al. |
| 2015/0078680 A1 | 3/2015 | Shakib et al. |
| 2015/0082255 A1 | 3/2015 | Devries et al. |
| 2015/0082446 A1 | 3/2015 | Flowers et al. |
| 2015/0085057 A1 | 3/2015 | Ouyang et al. |
| 2015/0094120 A1 | 4/2015 | Suh et al. |
| 2015/0095804 A1 | 4/2015 | Grossman et al. |
| 2015/0098309 A1 | 4/2015 | Adams et al. |
| 2015/0106720 A1 | 4/2015 | Backer |
| 2015/0109966 A1 | 4/2015 | Hong et al. |
| 2015/0116353 A1 | 4/2015 | Miura et al. |
| 2015/0116363 A1* | 4/2015 | Monte ................... G06F 3/048 345/659 |
| 2015/0116464 A1 | 4/2015 | Tanaka |
| 2015/0121267 A1 | 4/2015 | Wu et al. |
| 2015/0121312 A1 | 4/2015 | Li |
| 2015/0128042 A1 | 5/2015 | Churchill et al. |
| 2015/0130892 A1* | 5/2015 | Whynot ................. H04N 7/152 348/14.09 |
| 2015/0135098 A1 | 5/2015 | Geppert et al. |
| 2015/0160832 A1 | 6/2015 | Walkin et al. |
| 2015/0163188 A1 | 6/2015 | Faaborg et al. |
| 2015/0169146 A1 | 6/2015 | Lalwani |
| 2015/0169182 A1 | 6/2015 | Khoe et al. |
| 2015/0177914 A1 | 6/2015 | Coyner et al. |
| 2015/0193069 A1 | 7/2015 | Di Censo et al. |
| 2015/0193196 A1 | 7/2015 | Lin et al. |
| 2015/0193392 A1 | 7/2015 | Greenblatt et al. |
| 2015/0199082 A1 | 7/2015 | Scholler et al. |
| 2015/0205488 A1 | 7/2015 | Yi et al. |
| 2015/0206529 A1 | 7/2015 | Kwon et al. |
| 2015/0248167 A1 | 9/2015 | Turbell et al. |
| 2015/0256796 A1 | 9/2015 | Ma |
| 2015/0264304 A1 | 9/2015 | Chastney et al. |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1* | 10/2015 | Bader-Natal ........ H04L 65/1069 348/14.03 |
| 2015/0304413 A1 | 10/2015 | Park |
| 2015/0309689 A1 | 10/2015 | Jin et al. |
| 2015/0319006 A1 | 11/2015 | Plummer et al. |
| 2015/0319144 A1 | 11/2015 | Barton et al. |
| 2015/0324067 A1 | 11/2015 | Cabral |
| 2015/0332031 A1 | 11/2015 | Mistry et al. |
| 2015/0334140 A1 | 11/2015 | Singh et al. |
| 2015/0334313 A1* | 11/2015 | Chougle ............... H04L 65/762 348/14.07 |
| 2015/0339007 A1 | 11/2015 | Yoshizawa et al. |
| 2015/0339466 A1 | 11/2015 | Gao et al. |
| 2015/0347010 A1 | 12/2015 | Yang et al. |
| 2015/0350143 A1 | 12/2015 | Lemay et al. |
| 2015/0350296 A1 | 12/2015 | Yang et al. |
| 2015/0350297 A1 | 12/2015 | Yang et al. |
| 2015/0350533 A1 | 12/2015 | Harris et al. |
| 2015/0358484 A1 | 12/2015 | Permude |
| 2015/0358584 A1 | 12/2015 | Mattson |
| 2015/0365306 A1 | 12/2015 | Chaudhri et al. |
| 2015/0370426 A1 | 12/2015 | Carrigan et al. |
| 2015/0370529 A1 | 12/2015 | Zambetti et al. |
| 2015/0373065 A1 | 12/2015 | Holmquist et al. |
| 2015/0373178 A1 | 12/2015 | Felt et al. |
| 2016/0014059 A1 | 1/2016 | Rathod |
| 2016/0014477 A1 | 1/2016 | Siders |
| 2016/0021155 A1 | 1/2016 | Sawato |
| 2016/0028875 A1 | 1/2016 | Brown et al. |
| 2016/0029004 A1 | 1/2016 | Campbell et al. |
| 2016/0048296 A1 | 2/2016 | Gan et al. |
| 2016/0048316 A1 | 2/2016 | Bae et al. |
| 2016/0057173 A1 | 2/2016 | Singman et al. |
| 2016/0059864 A1 | 3/2016 | Feit et al. |
| 2016/0062567 A1 | 3/2016 | Yang et al. |
| 2016/0062589 A1 | 3/2016 | Wan et al. |
| 2016/0065708 A1 | 3/2016 | Yang et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0099901 A1 | 4/2016 | Allen et al. |
| 2016/0099987 A1 | 4/2016 | Shamma |

(56) References Cited

U.S. PATENT DOCUMENTS

| | | |
|---|---|---|
| 2016/0110059 A1 | 4/2016 | Li et al. |
| 2016/0124614 A1 | 5/2016 | Bromberg et al. |
| 2016/0127636 A1 | 5/2016 | Ito et al. |
| 2016/0139785 A1 | 5/2016 | Griffin et al. |
| 2016/0142450 A1 | 5/2016 | Paul et al. |
| 2016/0170608 A1 | 6/2016 | Zambetti et al. |
| 2016/0180259 A1 | 6/2016 | Marianko et al. |
| 2016/0210602 A1 | 7/2016 | Siddique et al. |
| 2016/0212374 A1 | 7/2016 | Usbergo et al. |
| 2016/0227095 A1 | 8/2016 | Yoshizawa et al. |
| 2016/0231902 A1 | 8/2016 | Sirpal et al. |
| 2016/0259528 A1 | 9/2016 | Foss et al. |
| 2016/0261653 A1 | 9/2016 | Kim |
| 2016/0266769 A1 | 9/2016 | Oursbourn et al. |
| 2016/0277708 A1 | 9/2016 | Rintel et al. |
| 2016/0277903 A1 | 9/2016 | Poosala et al. |
| 2016/0291824 A1 | 10/2016 | Grossman et al. |
| 2016/0299679 A1 | 10/2016 | Park et al. |
| 2016/0306328 A1 | 10/2016 | Ko et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0316038 A1 | 10/2016 | Jolfaei |
| 2016/0320849 A1 | 11/2016 | Koo |
| 2016/0327911 A1 | 11/2016 | Eim et al. |
| 2016/0335041 A1 | 11/2016 | Wachter et al. |
| 2016/0352661 A1 | 12/2016 | Yang et al. |
| 2016/0364106 A1 | 12/2016 | Koum et al. |
| 2016/0380780 A1 | 12/2016 | Stephenson et al. |
| 2017/0006162 A1 | 1/2017 | Bargetzi et al. |
| 2017/0024100 A1 | 1/2017 | Pieper et al. |
| 2017/0024226 A1 | 1/2017 | Yan |
| 2017/0031557 A1 | 2/2017 | Xiangli et al. |
| 2017/0034583 A1 | 2/2017 | Long et al. |
| 2017/0048817 A1 | 2/2017 | Yang et al. |
| 2017/0064184 A1 | 3/2017 | Tsai |
| 2017/0083189 A1 | 3/2017 | Yang et al. |
| 2017/0094019 A1 | 3/2017 | Ahmed et al. |
| 2017/0097621 A1 | 4/2017 | Ackmann et al. |
| 2017/0097715 A1 | 4/2017 | Kim et al. |
| 2017/0111587 A1 | 4/2017 | Herbst et al. |
| 2017/0111595 A1 | 4/2017 | Soni et al. |
| 2017/0126592 A1 | 5/2017 | El |
| 2017/0150904 A1 | 6/2017 | Park et al. |
| 2017/0206779 A1 | 7/2017 | Lee et al. |
| 2017/0212667 A1 | 7/2017 | Miyazaki |
| 2017/0220212 A1 | 8/2017 | Yang et al. |
| 2017/0230585 A1 | 8/2017 | Nash et al. |
| 2017/0230705 A1 | 8/2017 | Pardue et al. |
| 2017/0244932 A1 | 8/2017 | Pistilli et al. |
| 2017/0280098 A1 | 9/2017 | Sethuraman et al. |
| 2017/0280494 A1 | 9/2017 | Jung et al. |
| 2017/0309174 A1 | 10/2017 | Gonzales et al. |
| 2017/0324784 A1 | 11/2017 | Taine et al. |
| 2017/0336960 A1 | 11/2017 | Chaudhri et al. |
| 2017/0344253 A1 | 11/2017 | Zhang |
| 2017/0353508 A1 | 12/2017 | Yoakum |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357917 A1 | 12/2017 | Holmes et al. |
| 2017/0359191 A1 | 12/2017 | Smith et al. |
| 2017/0359285 A1 | 12/2017 | Weinig et al. |
| 2017/0359461 A1 | 12/2017 | De Vries et al. |
| 2017/0367484 A1 | 12/2017 | Salvoni et al. |
| 2017/0371496 A1 | 12/2017 | Denoue et al. |
| 2017/0373868 A1 | 12/2017 | Deets, Jr. |
| 2018/0013799 A1 | 1/2018 | Davies |
| 2018/0020530 A1 | 1/2018 | Scordato et al. |
| 2018/0047200 A1 | 2/2018 | O'Hara et al. |
| 2018/0048820 A1 | 2/2018 | Hinkel et al. |
| 2018/0061158 A1 | 3/2018 | Greene |
| 2018/0070144 A1 | 3/2018 | Tang et al. |
| 2018/0081522 A1 | 3/2018 | Greenberg et al. |
| 2018/0081538 A1 | 3/2018 | Kim |
| 2018/0091732 A1 | 3/2018 | Wilson et al. |
| 2018/0095616 A1 | 4/2018 | Valdivia et al. |
| 2018/0095634 A1 | 4/2018 | Alexander |
| 2018/0095636 A1 | 4/2018 | Valdivia et al. |
| 2018/0101297 A1 | 4/2018 | Yang et al. |
| 2018/0103074 A1 | 4/2018 | Rosenberg |
| 2018/0121074 A1 | 5/2018 | Peron et al. |
| 2018/0122378 A1 | 5/2018 | Mixter et al. |
| 2018/0123986 A1 | 5/2018 | Faulkner et al. |
| 2018/0124128 A1 | 5/2018 | Faulkner et al. |
| 2018/0124359 A1 | 5/2018 | Faulkner |
| 2018/0131732 A1 | 5/2018 | Aronoff et al. |
| 2018/0131907 A1 | 5/2018 | Schmirler et al. |
| 2018/0139374 A1 | 5/2018 | Yu |
| 2018/0150433 A1* | 5/2018 | Sowden ............... G06F 3/0481 |
| 2018/0157455 A1 | 6/2018 | Troy et al. |
| 2018/0160072 A1 | 6/2018 | Cranfill et al. |
| 2018/0165002 A1 | 6/2018 | Yang et al. |
| 2018/0183849 A1 | 6/2018 | Shin et al. |
| 2018/0191965 A1* | 7/2018 | Faulkner ................ H04N 7/147 |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |
| 2018/0213396 A1 | 7/2018 | Segal et al. |
| 2018/0227341 A1 | 8/2018 | Rizzi |
| 2018/0228003 A1 | 8/2018 | O'Driscoll et al. |
| 2018/0228006 A1 | 8/2018 | Baker et al. |
| 2018/0249047 A1 | 8/2018 | Marlatt |
| 2018/0253152 A1 | 9/2018 | Forsblom et al. |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0293959 A1 | 10/2018 | Monga et al. |
| 2018/0295079 A1 | 10/2018 | Longo |
| 2018/0308480 A1 | 10/2018 | Jang et al. |
| 2018/0309801 A1 | 10/2018 | Rathod |
| 2018/0321842 A1 | 11/2018 | Lee et al. |
| 2018/0329586 A1 | 11/2018 | Sundstrom et al. |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0348764 A1 | 12/2018 | Zhang et al. |
| 2018/0359293 A1 | 12/2018 | Faulkner et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-Natal et al. |
| 2019/0005419 A1 | 1/2019 | Howard |
| 2019/0018586 A1 | 1/2019 | Yang et al. |
| 2019/0025943 A1 | 1/2019 | Jobs et al. |
| 2019/0028419 A1 | 1/2019 | Sullivan |
| 2019/0034849 A1 | 1/2019 | Romaine et al. |
| 2019/0037173 A1 | 1/2019 | Lee et al. |
| 2019/0065027 A1 | 2/2019 | Hauenstein et al. |
| 2019/0068670 A1 | 2/2019 | Adam et al. |
| 2019/0102049 A1* | 4/2019 | Anzures ............... G06F 3/0488 |
| 2019/0102145 A1 | 4/2019 | Wilberding et al. |
| 2019/0110087 A1 | 4/2019 | Parasseeri et al. |
| 2019/0124021 A1 | 4/2019 | Demattei |
| 2019/0138951 A1 | 5/2019 | Brownhill et al. |
| 2019/0149768 A1 | 5/2019 | Mcardle |
| 2019/0149887 A1 | 5/2019 | Williams et al. |
| 2019/0173939 A1 | 6/2019 | Lewis et al. |
| 2019/0199963 A1 | 6/2019 | Ahn et al. |
| 2019/0199993 A1 | 6/2019 | Babu J D et al. |
| 2019/0205861 A1 | 7/2019 | Bace |
| 2019/0208028 A1 | 7/2019 | Larabie-Belanger |
| 2019/0215503 A1 | 7/2019 | Monson et al. |
| 2019/0222775 A1 | 7/2019 | Ahn |
| 2019/0228495 A1 | 7/2019 | Tremblay et al. |
| 2019/0236142 A1 | 8/2019 | Balakrishnan et al. |
| 2019/0246238 A1 | 8/2019 | Crutchfield et al. |
| 2019/0279634 A1 | 9/2019 | Tak et al. |
| 2019/0297039 A1 | 9/2019 | Rodriguez et al. |
| 2019/0303861 A1 | 10/2019 | Mathias et al. |
| 2019/0332400 A1 | 10/2019 | Spoor et al. |
| 2019/0339769 A1 | 11/2019 | Cox et al. |

(56) References Cited

U.S. PATENT DOCUMENTS

| | | |
|---|---|---|
| 2019/0339825 A1 | 11/2019 | Anzures et al. |
| 2019/0342507 A1 | 11/2019 | Dye et al. |
| 2019/0342519 A1* | 11/2019 | Van Os .................. H04N 7/152 |
| 2019/0342621 A1 | 11/2019 | Carrigan et al. |
| 2019/0347181 A1 | 11/2019 | Cranfill et al. |
| 2019/0354252 A1 | 11/2019 | Badr |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0369862 A1 | 12/2019 | De Vries |
| 2019/0370805 A1 | 12/2019 | Van Os et al. |
| 2020/0004401 A1 | 1/2020 | Hwang et al. |
| 2020/0005539 A1 | 1/2020 | Hwang et al. |
| 2020/0034033 A1 | 1/2020 | Chaudhri et al. |
| 2020/0050502 A1 | 2/2020 | Ghafourifar et al. |
| 2020/0055515 A1 | 2/2020 | Herman et al. |
| 2020/0059628 A1 | 2/2020 | Cranfill et al. |
| 2020/0106952 A1 | 4/2020 | Missig et al. |
| 2020/0106965 A1 | 4/2020 | Malia et al. |
| 2020/0112690 A1* | 4/2020 | Harrison .......... H04N 21/44226 |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0186576 A1 | 6/2020 | Gopal et al. |
| 2020/0195887 A1 | 6/2020 | Van Os et al. |
| 2020/0213530 A1 | 7/2020 | Ahn |
| 2020/0226896 A1 | 7/2020 | Robertson et al. |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0312318 A1 | 10/2020 | Olson et al. |
| 2020/0322479 A1 | 10/2020 | De Vries et al. |
| 2020/0335187 A1 | 10/2020 | Lefkofsky et al. |
| 2020/0356063 A1 | 11/2020 | Guzman et al. |
| 2020/0371673 A1 | 11/2020 | Faulkner |
| 2020/0383157 A1 | 12/2020 | Lee et al. |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0096703 A1 | 4/2021 | Anzures et al. |
| 2021/0097768 A1 | 4/2021 | Malia et al. |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1 | 5/2021 | Boehlke |
| 2021/0176204 A1 | 6/2021 | Geppert et al. |
| 2021/0182169 A1 | 6/2021 | Mardente et al. |
| 2021/0195084 A1 | 6/2021 | Olajos et al. |
| 2021/0203878 A1 | 7/2021 | Lee et al. |
| 2021/0217106 A1 | 7/2021 | Hauser et al. |
| 2021/0265032 A1 | 8/2021 | Burgess et al. |
| 2021/0266274 A1 | 8/2021 | Liu et al. |
| 2021/0306288 A1 | 9/2021 | Boyd et al. |
| 2021/0321197 A1 | 10/2021 | Annamraju |
| 2021/0323406 A1 | 10/2021 | So et al. |
| 2021/0333864 A1 | 10/2021 | Harvey et al. |
| 2021/0349680 A1 | 11/2021 | Kim et al. |
| 2021/0352172 A1 | 11/2021 | Kim et al. |
| 2021/0360192 A1 | 11/2021 | Cranfill et al. |
| 2021/0360199 A1 | 11/2021 | Oz et al. |
| 2021/0373672 A1 | 12/2021 | Schwarz et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0014715 A1 | 1/2022 | Tamura et al. |
| 2022/0021680 A1 | 1/2022 | Roedel et al. |
| 2022/0046186 A1 | 2/2022 | Fayad et al. |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0086203 A1 | 3/2022 | Morris et al. |
| 2022/0100362 A1 | 3/2022 | Kim |
| 2022/0100812 A1 | 3/2022 | Anvaripour et al. |
| 2022/0103784 A1 | 3/2022 | Pollefeys |
| 2022/0122089 A1 | 4/2022 | Bonilla Kuhlmann et al. |
| 2022/0163996 A1 | 5/2022 | Yang et al. |
| 2022/0180862 A1 | 6/2022 | Sharifi et al. |
| 2022/0199267 A1 | 6/2022 | Subramanian et al. |
| 2022/0207840 A1 | 6/2022 | Cansizoglu et al. |
| 2022/0244836 A1 | 8/2022 | O'Leary et al. |
| 2022/0247587 A1 | 8/2022 | Rolin et al. |
| 2022/0247918 A1 | 8/2022 | O'Leary et al. |
| 2022/0247919 A1 | 8/2022 | O'Leary et al. |
| 2022/0253136 A1 | 8/2022 | Holder et al. |
| 2022/0253195 A1 | 8/2022 | Stevens et al. |
| 2022/0254074 A1 | 8/2022 | Berliner et al. |
| 2022/0263940 A1 | 8/2022 | De Vries et al. |
| 2022/0269882 A1 | 8/2022 | Proschowsky et al. |
| 2022/0278992 A1 | 9/2022 | Baker et al. |
| 2022/0286314 A1 | 9/2022 | Meyer et al. |
| 2022/0303150 A1 | 9/2022 | Jensen et al. |
| 2022/0343569 A1 | 10/2022 | Karri et al. |
| 2022/0365643 A1 | 11/2022 | Triverio et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0375358 A1 | 11/2022 | Shimomura et al. |
| 2023/0004264 A1 | 1/2023 | Anzures et al. |
| 2023/0041125 A1 | 2/2023 | Kim et al. |
| 2023/0086248 A1 | 3/2023 | Puyol et al. |
| 2023/0092103 A1 | 3/2023 | Puyol et al. |
| 2023/0094453 A1 | 3/2023 | O'Leary et al. |
| 2023/0098395 A1 | 3/2023 | O'Leary et al. |
| 2023/0109787 A1 | 4/2023 | O'Leary et al. |
| 2023/0143275 A1 | 5/2023 | Opara et al. |
| 2023/0188674 A1 | 6/2023 | Van Os et al. |
| 2023/0213764 A1 | 7/2023 | Arngren et al. |
| 2023/0236723 A1 | 7/2023 | Yang et al. |
| 2023/0246857 A1 | 8/2023 | Boucheron et al. |
| 2023/0262196 A1 | 8/2023 | Cranfill et al. |
| 2023/0262317 A1 | 8/2023 | O'Leary et al. |
| 2023/0319413 A1 | 10/2023 | Manzari et al. |
| 2023/0370507 A1 | 11/2023 | Chang et al. |
| 2023/0386145 A1 | 11/2023 | Faulkner |
| 2023/0388357 A1 | 11/2023 | Faulkner et al. |
| 2023/0393616 A1 | 12/2023 | Chao et al. |
| 2024/0036804 A1 | 2/2024 | Chang et al. |
| 2024/0048600 A1 | 2/2024 | Yerli |
| 2024/0064270 A1 | 2/2024 | Van Os et al. |
| 2024/0064395 A1 | 2/2024 | O'Leary et al. |
| 2024/0103677 A1 | 3/2024 | Mckenzie et al. |
| 2024/0103678 A1 | 3/2024 | Dryer et al. |
| 2024/0104819 A1 | 3/2024 | Chand et al. |
| 2024/0111333 A1 | 4/2024 | Yang et al. |
| 2024/0118793 A1 | 4/2024 | Triverio et al. |
| 2024/0163365 A1 | 5/2024 | De Vries et al. |
| 2024/0259669 A1 | 8/2024 | Missig et al. |
| 2024/0377922 A1 | 11/2024 | Rajam et al. |
| 2025/0039011 A1 | 1/2025 | Meyer et al. |
| 2025/0138697 A1 | 5/2025 | Smith et al. |
| 2025/0165123 A1 | 5/2025 | Anzures et al. |
| 2025/0165124 A1 | 5/2025 | Sundstrom et al. |
| 2025/0202961 A1 | 6/2025 | Triverio et al. |

FOREIGN PATENT DOCUMENTS

| | | |
|---|---|---|
| CA | 2845537 A1 | 9/2014 |
| CA | 2917174 A1 | 1/2015 |
| CN | 1473430 A | 2/2004 |
| CN | 1525723 A | 9/2004 |
| CN | 1658150 A | 8/2005 |

(56) References Cited

FOREIGN PATENT DOCUMENTS

| | | |
|---|---|---|
| CN | 1689327 A | 10/2005 |
| CN | 1801926 A | 7/2006 |
| CN | 1890996 A | 1/2007 |
| CN | 1918533 A | 2/2007 |
| CN | 1985319 A | 6/2007 |
| CN | 101075173 A | 11/2007 |
| CN | 101226444 A | 7/2008 |
| CN | 101296356 A | 10/2008 |
| CN | 101356493 A | 1/2009 |
| CN | 101409743 A | 4/2009 |
| CN | 101431564 A | 5/2009 |
| CN | 101535938 A | 9/2009 |
| CN | 101566866 A | 10/2009 |
| CN | 101682622 A | 3/2010 |
| CN | 101828166 A | 9/2010 |
| CN | 101853132 A | 10/2010 |
| CN | 101854247 A | 10/2010 |
| CN | 101854261 A | 10/2010 |
| CN | 101917529 A | 12/2010 |
| CN | 101950236 A | 1/2011 |
| CN | 102111505 A | 6/2011 |
| CN | 102215217 A | 10/2011 |
| CN | 102239740 A | 11/2011 |
| CN | 102262506 A | 11/2011 |
| CN | 102289446 A | 12/2011 |
| CN | 102317887 A | 1/2012 |
| CN | 102388355 A | 3/2012 |
| CN | 102439558 A | 5/2012 |
| CN | 102572369 A | 7/2012 |
| CN | 102609210 A | 7/2012 |
| CN | 102651731 A | 8/2012 |
| CN | 102707994 A | 10/2012 |
| CN | 102750086 A | 10/2012 |
| CN | 102821180 A | 12/2012 |
| CN | 102929917 A | 2/2013 |
| CN | 103019681 A | 4/2013 |
| CN | 103039064 A | 4/2013 |
| CN | 103049274 A | 4/2013 |
| CN | 103179283 A | 6/2013 |
| CN | 103222247 A | 7/2013 |
| CN | 103235688 A | 8/2013 |
| CN | 103237191 A | 8/2013 |
| CN | 103250138 A | 8/2013 |
| CN | 103336651 A | 10/2013 |
| CN | 103384235 A | 11/2013 |
| CN | 103442774 A | 12/2013 |
| CN | 103458215 A | 12/2013 |
| CN | 103582873 A | 2/2014 |
| CN | 103649985 A | 3/2014 |
| CN | 103718152 A | 4/2014 |
| CN | 103748610 A | 4/2014 |
| CN | 103765385 A | 4/2014 |
| CN | 103777842 A | 5/2014 |
| CN | 104010158 A | 8/2014 |
| CN | 104035663 A | 9/2014 |
| CN | 104081335 A | 10/2014 |
| CN | 104090720 A | 10/2014 |
| CN | 104169855 A | 11/2014 |
| CN | 104182123 A | 12/2014 |
| CN | 104270597 A | 1/2015 |
| CN | 104317516 A | 1/2015 |
| CN | 104331246 A | 2/2015 |
| CN | 104375741 A | 2/2015 |
| CN | 104423841 A | 3/2015 |
| CN | 104427288 A | 3/2015 |
| CN | 104469143 A | 3/2015 |
| CN | 104503689 A | 4/2015 |
| CN | 104584488 A | 4/2015 |
| CN | 104602133 A | 5/2015 |
| CN | 104615430 A | 5/2015 |
| CN | 104834439 A | 8/2015 |
| CN | 104869046 A | 8/2015 |
| CN | 104980578 A | 10/2015 |
| CN | 105094551 A | 11/2015 |
| CN | 105094957 A | 11/2015 |
| CN | 105141498 A | 12/2015 |
| CN | 105204846 A | 12/2015 |
| CN | 105264473 A | 1/2016 |
| CN | 105308634 A | 2/2016 |
| CN | 105389173 A | 3/2016 |
| CN | 105391778 A | 3/2016 |
| CN | 105554429 A | 5/2016 |
| CN | 105578111 A | 5/2016 |
| CN | 105637451 A | 6/2016 |
| CN | 105900376 A | 8/2016 |
| CN | 106210855 A | 12/2016 |
| CN | 106303648 A | 1/2017 |
| CN | 106471793 A | 3/2017 |
| CN | 106664389 A | 5/2017 |
| CN | 106713946 A | 5/2017 |
| CN | 106843626 A | 6/2017 |
| CN | 107066523 A | 8/2017 |
| CN | 107122049 A | 9/2017 |
| CN | 107491257 A | 12/2017 |
| CN | 107533417 A | 1/2018 |
| CN | 107534656 A | 1/2018 |
| CN | 107704177 A | 2/2018 |
| CN | 107728876 A | 2/2018 |
| CN | 104025538 B | 4/2018 |
| CN | 107992248 A | 5/2018 |
| CN | 108933965 A | 12/2018 |
| CN | 109196825 A | 1/2019 |
| CN | 110456971 A | 11/2019 |
| CN | 111095165 A | 5/2020 |
| CN | 111108740 A | 5/2020 |
| CN | 111601065 A | 8/2020 |
| CN | 111913630 A | 11/2020 |
| CN | 112088530 A | 12/2020 |
| CN | 112214275 A | 1/2021 |
| CN | 112261338 A | 1/2021 |
| CN | 112416223 A | 2/2021 |
| EP | 0483777 A2 | 5/1992 |
| EP | 0584392 A1 | 3/1994 |
| EP | 1215575 A2 | 6/2002 |
| EP | 1517228 A2 | 3/2005 |
| EP | 1562105 A2 | 8/2005 |
| EP | 1568966 A2 | 8/2005 |
| EP | 1760584 A1 | 3/2007 |
| EP | 1903791 A2 | 3/2008 |
| EP | 1986431 A2 | 10/2008 |
| EP | 2056568 A1 | 5/2009 |
| EP | 2151745 A2 | 2/2010 |
| EP | 2219105 A1 | 8/2010 |
| EP | 2237534 A1 | 10/2010 |
| EP | 2237536 A1 | 10/2010 |
| EP | 2521080 A2 | 11/2012 |
| EP | 2600584 A1 | 6/2013 |
| EP | 2682850 A1 | 1/2014 |
| EP | 2703974 A1 | 3/2014 |
| EP | 2725473 A1 | 4/2014 |
| EP | 2770708 A1 | 8/2014 |
| EP | 2787465 A1 | 10/2014 |
| EP | 2446619 B1 | 10/2015 |
| EP | 3038427 A1 | 6/2016 |
| EP | 3091421 A2 | 11/2016 |
| EP | 2761582 B1 | 3/2017 |
| EP | 2258103 B1 | 5/2018 |
| EP | 3163866 B1 | 5/2020 |
| EP | 4109891 A1 | 12/2022 |
| IN | 1038MUM2005 A | 6/2007 |
| JP | 6-110881 A | 4/1994 |
| JP | 6-113297 A | 4/1994 |
| JP | 6-276335 A | 9/1994 |
| JP | 6-276515 A | 9/1994 |
| JP | 6-282405 A | 10/1994 |
| JP | 7-135594 A | 5/1995 |
| JP | 7-325700 A | 12/1995 |
| JP | 8-76926 A | 3/1996 |
| JP | 8-279998 A | 10/1996 |
| JP | 9-182046 A | 7/1997 |
| JP | 9-233384 A | 9/1997 |
| JP | 9-247655 A | 9/1997 |
| JP | 9-265457 A | 10/1997 |
| JP | 10-240488 A | 9/1998 |

(56) References Cited

FOREIGN PATENT DOCUMENTS

| | | |
|---|---|---|
| JP | 2000-40158 A | 2/2000 |
| JP | 2000-200092 A | 7/2000 |
| JP | 2000-242390 A | 9/2000 |
| JP | 2000-283772 A | 10/2000 |
| JP | 2001-67099 A | 3/2001 |
| JP | 2001-101202 A | 4/2001 |
| JP | 2001-169166 A | 6/2001 |
| JP | 2002-251365 A | 9/2002 |
| JP | 2002-288125 A | 10/2002 |
| JP | 2002-320140 A | 10/2002 |
| JP | 2002-351802 A | 12/2002 |
| JP | 2003-101981 A | 4/2003 |
| JP | 2003-134382 A | 5/2003 |
| JP | 2003-189168 A | 7/2003 |
| JP | 2003-195998 A | 7/2003 |
| JP | 2003-274376 A | 9/2003 |
| JP | 2003-526820 A | 9/2003 |
| JP | 2003-299050 A | 10/2003 |
| JP | 2003-348444 A | 12/2003 |
| JP | 2004-187273 A | 7/2004 |
| JP | 2004-193860 A | 7/2004 |
| JP | 2004-221738 A | 8/2004 |
| JP | 2005-45744 A | 2/2005 |
| JP | 2005-94696 A | 4/2005 |
| JP | 2005-159567 A | 6/2005 |
| JP | 2005-222553 A | 8/2005 |
| JP | 2005-260289 A | 9/2005 |
| JP | 2005-286445 A | 10/2005 |
| JP | 2005-303736 A | 10/2005 |
| JP | 2005-332368 A | 12/2005 |
| JP | 2006-135495 A | 5/2006 |
| JP | 2006-166414 A | 6/2006 |
| JP | 2006-222822 A | 8/2006 |
| JP | 2006-245732 A | 9/2006 |
| JP | 2006-246019 A | 9/2006 |
| JP | 2006-254350 A | 9/2006 |
| JP | 2006-319742 A | 11/2006 |
| JP | 2007-88630 A | 4/2007 |
| JP | 2007-140060 A | 6/2007 |
| JP | 2007-150877 A | 6/2007 |
| JP | 2007-150917 A | 6/2007 |
| JP | 2007-150921 A | 6/2007 |
| JP | 2007-517462 A | 6/2007 |
| JP | 2007-200329 A | 8/2007 |
| JP | 2007-201727 A | 8/2007 |
| JP | 2007-274034 A | 10/2007 |
| JP | 2007-282263 A | 10/2007 |
| JP | 2007-300452 A | 11/2007 |
| JP | 2008-17373 A | 1/2008 |
| JP | 2008-28586 A | 2/2008 |
| JP | 2008-76818 A | 4/2008 |
| JP | 2008-76853 A | 4/2008 |
| JP | 2008-99330 A | 4/2008 |
| JP | 2008-125105 A | 5/2008 |
| JP | 2008-136119 A | 6/2008 |
| JP | 2008-533838 A | 8/2008 |
| JP | 2008-276801 A | 11/2008 |
| JP | 2008-289014 A | 11/2008 |
| JP | 2009-502048 A | 1/2009 |
| JP | 2009-80710 A | 4/2009 |
| JP | 2009-159253 A | 7/2009 |
| JP | 2009-188975 A | 8/2009 |
| JP | 2009-217815 A | 9/2009 |
| JP | 2009-232290 A | 10/2009 |
| JP | 2009-265692 A | 11/2009 |
| JP | 2009-296577 A | 12/2009 |
| JP | 2009-296583 A | 12/2009 |
| JP | 2010-15239 A | 1/2010 |
| JP | 2010-97353 A | 4/2010 |
| JP | 2010-511939 A | 4/2010 |
| JP | 2010-109789 A | 5/2010 |
| JP | 2010-522935 A | 7/2010 |
| JP | 2010-206745 A | 9/2010 |
| JP | 2010-245940 A | 10/2010 |
| JP | 2010-541398 A | 12/2010 |
| JP | 2011-118662 A | 6/2011 |
| JP | 2012-168966 A | 9/2012 |
| JP | 2012-215938 A | 11/2012 |
| JP | 2012-244340 A | 12/2012 |
| JP | 2013-25357 A | 2/2013 |
| JP | 2013-74499 A | 4/2013 |
| JP | 2013-93699 A | 5/2013 |
| JP | 2013-105468 A | 5/2013 |
| JP | 2013-524683 A | 6/2013 |
| JP | 2013-530433 A | 7/2013 |
| JP | 2013-191065 A | 9/2013 |
| JP | 2014-503861 A | 2/2014 |
| JP | 2014-44724 A | 3/2014 |
| JP | 2014-71835 A | 4/2014 |
| JP | 2014-87126 A | 5/2014 |
| JP | 2014-512044 A | 5/2014 |
| JP | 2014-170982 A | 9/2014 |
| JP | 2015-11507 A | 1/2015 |
| JP | 2015-520456 A | 7/2015 |
| JP | 2015-170234 A | 9/2015 |
| JP | 2015-201087 A | 11/2015 |
| JP | 2016-1446 A | 1/2016 |
| JP | 2016-24557 A | 2/2016 |
| JP | 2016-38615 A | 3/2016 |
| JP | 2016-53929 A | 4/2016 |
| JP | 2016-157292 A | 9/2016 |
| JP | 2016-167806 A | 9/2016 |
| JP | 2016-174282 A | 9/2016 |
| JP | 2017-532645 A | 11/2017 |
| JP | 2017-228843 A | 12/2017 |
| JP | 2017-229060 A | 12/2017 |
| JP | 2018-7158 A | 1/2018 |
| JP | 2018-56719 A | 4/2018 |
| JP | 2018-136828 A | 8/2018 |
| JP | 2018-200624 A | 12/2018 |
| JP | 2019-114282 A | 7/2019 |
| JP | 2020-510929 A | 4/2020 |
| JP | 2021-40300 A | 3/2021 |
| KR | 1997-0031883 | 6/1997 |
| KR | 1999-0044201 A | 6/1999 |
| KR | 10-2003-0016405 A | 2/2003 |
| KR | 10-2004-0016688 A | 2/2004 |
| KR | 10-2004-0045338 A | 6/2004 |
| KR | 10-2005-0054684 A | 6/2005 |
| KR | 10-2006-0031959 A | 4/2006 |
| KR | 10-2006-0064326 A | 6/2006 |
| KR | 10-2006-0116902 A | 11/2006 |
| KR | 10-2007-0111270 A | 11/2007 |
| KR | 10-2008-0057326 A | 6/2008 |
| KR | 10-2008-0096042 A | 10/2008 |
| KR | 10-2009-0002641 A | 1/2009 |
| KR | 10-2009-0004176 A | 1/2009 |
| KR | 10-2009-0017901 A | 2/2009 |
| KR | 10-2009-0017906 A | 2/2009 |
| KR | 10-2009-0036226 A | 4/2009 |
| KR | 10-2009-0042499 A | 4/2009 |
| KR | 10-0891449 B1 | 4/2009 |
| KR | 10-2009-0122805 A | 12/2009 |
| KR | 10-2009-0126516 A | 12/2009 |
| KR | 10-2012-0003323 A | 1/2012 |
| KR | 10-2012-0088746 A | 8/2012 |
| KR | 10-2012-0100433 A | 9/2012 |
| KR | 10-2013-0063019 A | 6/2013 |
| KR | 10-2013-0075783 A | 7/2013 |
| KR | 10-2013-0082190 A | 7/2013 |
| KR | 10-2013-0090244 A | 8/2013 |
| KR | 10-2013-0138150 A | 12/2013 |
| KR | 10-2013-0141688 A | 12/2013 |
| KR | 10-2014-0016244 A | 2/2014 |
| KR | 10-2014-0026263 A | 3/2014 |
| KR | 10-2014-0043370 A | 4/2014 |
| KR | 10-2016-0092820 A | 8/2016 |
| KR | 10-2017-0128498 A | 11/2017 |
| KR | 10-2018-0085931 A | 7/2018 |
| KR | 10-2019-0033082 A | 3/2019 |
| KR | 10-1989433 B1 | 6/2019 |
| KR | 10-2020-0039030 A | 4/2020 |
| TW | I321955 B | 3/2010 |
| TW | 201415345 A | 4/2014 |

(56) References Cited

FOREIGN PATENT DOCUMENTS

| | | |
|---|---|---|
| TW | 201416959 A | 5/2014 |
| WO | 01/18665 A1 | 3/2001 |
| WO | 01/27783 A1 | 4/2001 |
| WO | 02/11022 A2 | 2/2002 |
| WO | 02/37848 A1 | 5/2002 |
| WO | 02/093344 A1 | 11/2002 |
| WO | 03/077553 A1 | 9/2003 |
| WO | 2004/032507 A1 | 4/2004 |
| WO | 2005/060501 A2 | 7/2005 |
| WO | 2005/086159 A2 | 9/2005 |
| WO | 2005/109829 A1 | 11/2005 |
| WO | 2006/048028 A1 | 5/2006 |
| WO | 2006/063343 A1 | 6/2006 |
| WO | 2006/073020 A1 | 7/2006 |
| WO | 2007/002621 A2 | 1/2007 |
| WO | 2007/008321 A2 | 1/2007 |
| WO | 2007/063922 A1 | 6/2007 |
| WO | 2007/102110 A2 | 9/2007 |
| WO | 2008/030779 A2 | 3/2008 |
| WO | 2008/030879 A2 | 3/2008 |
| WO | 2008/040566 A1 | 4/2008 |
| WO | 2008/067498 A2 | 6/2008 |
| WO | 2008/090902 A1 | 7/2008 |
| WO | 2009/005914 A1 | 1/2009 |
| WO | 2009/012820 A1 | 1/2009 |
| WO | 2009/042579 A1 | 4/2009 |
| WO | 2009/143076 A2 | 11/2009 |
| WO | 2009/148781 A1 | 12/2009 |
| WO | 2010/001672 A1 | 1/2010 |
| WO | 2010/065752 A2 | 6/2010 |
| WO | 2010/065752 A3 | 9/2010 |
| WO | 2010/134729 A2 | 11/2010 |
| WO | 2010/137513 A1 | 12/2010 |
| WO | 2011/126502 A1 | 10/2011 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/028773 A1 | 3/2012 |
| WO | 2012/037170 A1 | 3/2012 |
| WO | 2012/051052 A1 | 4/2012 |
| WO | 2012/079530 A1 | 6/2012 |
| WO | 2012/087939 A1 | 6/2012 |
| WO | 2012/103117 A1 | 8/2012 |
| WO | 2012/126078 A1 | 9/2012 |
| WO | 2012/154748 A1 | 11/2012 |
| WO | 2012/170118 A1 | 12/2012 |
| WO | 2012/170446 A2 | 12/2012 |
| WO | 2012/172164 A1 | 12/2012 |
| WO | 2013/097896 A1 | 7/2013 |
| WO | 2013/114821 A1 | 8/2013 |
| WO | 2013/132144 A1 | 9/2013 |
| WO | 2013/173838 A2 | 11/2013 |
| WO | 2014/004524 A2 | 1/2014 |
| WO | 2014/052871 A1 | 4/2014 |
| WO | 2014/058937 A1 | 4/2014 |
| WO | 2014/077987 A1 | 5/2014 |
| WO | 2014/101527 A1 | 7/2014 |
| WO | 2014/160327 A1 | 10/2014 |
| WO | 2014/161323 A1 | 10/2014 |
| WO | 2014/168616 A1 | 10/2014 |
| WO | 2014/197279 A1 | 12/2014 |
| WO | 2014/200730 A1 | 12/2014 |
| WO | 2015/192085 A2 | 12/2015 |
| WO | 2016/022204 A1 | 2/2016 |
| WO | 2016/046589 A1 | 3/2016 |
| WO | 2016/168154 A1 | 10/2016 |
| WO | 2017/038261 A1 | 3/2017 |
| WO | 2017/218143 A1 | 12/2017 |
| WO | 2017/218153 A1 | 12/2017 |
| WO | 2018/057272 A1 | 3/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/067131 A1 | 4/2019 |
| WO | 2019/217009 A1 | 11/2019 |
| WO | 2019/217477 A1 | 11/2019 |
| WO | 2021/112983 A1 | 6/2021 |

OTHER PUBLICATIONS

Non-Final Office Action received for U.S. Appl. No. 17/950,868, mailed on Apr. 24, 2024, 16 pages.
Non-Final Office Action received for U.S. Appl. No. 18/138,348, mailed on Apr. 30, 2024, 16 pages.
Notice of Acceptance received for Australian Patent Application No. 2023204396, mailed on Apr. 15, 2024, 3 pages.
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Cosmic Mook, "Line laboratory, New function Exhaustive Coverage! Line 120% Application Guide, Inc.", Jan. 24, 2018, 7 pages (Official Copy Only). {See Communication Under Rule 37 CFR § 1.98(a) (3)}.
Examiner-Initiated Interview Summary received for U.S. Appl. No. 17/950,868, mailed on Jul. 5, 2024, 2 pages.
Myoko Mori, "Line Perfect Guidebook [Revised Version]", Sotec Co. Ltd., Dec. 31, 2013, 5 pages (Official Copy Only). {See Communication Under Rule 37 CFR § 1.98(a) (3)}.
Notice of Allowance received for Japanese Patent Application No. 2022-116534, mailed on Jun. 24, 2024, 4 pages (1 page of English Translation and 3 pages of Official Copy).
Notice of Allowance received for Korean Patent Application No. 10-2022-0053111, mailed on Jun. 25, 2024, 7 pages (2 pages of English Translation and 5 pages of Official Copy).
Octoba, "Enjoy free calls with Line! Part 2", retrieved from: https://web.archive.org/web/20170923013859/https://octoba.net/archives/line-call2.html, Sep. 23, 2017, 13 pages (Official Copy Only). {See Communication Under Rule 37 CFR § 1.98(a) (3)}.
Office Action received for European Patent Application No. 22792995.7, mailed on Jun. 24, 2024, 6 pages.
Office Action received for Japanese Patent Application No. 2023-097196, mailed on Jun. 7, 2024, 7 pages (3 pages of English Translation and 4 pages of Official Copy).
Office Action received for Japanese Patent Application No. 2024-003876, mailed on Jul. 2, 2024, 3 pages (1 page of English Translation and 2 pages of Official Copy).
Applicant-Initiated Interview Summary received for U.S. Appl. No. 17/684,843, mailed on Oct. 5, 2023, 4 pages.
Corrected Notice of Allowance received for U.S. Appl. No. 17/666,971, mailed on Sep. 29, 2023, 2 pages.
Corrected Notice of Allowance received for U.S. Appl. No. 17/872,736, mailed on Oct. 13, 2023, 3 pages.
Corrected Notice of Allowance received for U.S. Appl. No. 17/950,922, mailed on Oct. 2, 2023, 3 pages.
Extended European Search Report received for European Patent Application No. 23172038.4, mailed on Oct. 11, 2023, 10 pages.
Notice of Allowance received for Korean Patent Application No. 10-2023-7024157, mailed on Sep. 19, 2023, 7 pages (2 pages of English Translation and 5 pages of Official Copy).
Notice of Allowance received for U.S. Appl. No. 17/479,897, mailed on Oct. 3, 2023, 5 pages.
Notice of Allowance received for U.S. Appl. No. 17/732,204, mailed on Oct. 12, 2023, 8 pages.
Notice of Allowance received for U.S. Appl. No. 17/740,104, mailed on Oct. 4, 2023, 5 pages.
Corrected Notice of Allowance received for U.S. Appl. No. 17/950,900, mailed on Jun. 30, 2023, 2 pages.
Office Action received for European Patent Application No. 18779093.6, mailed on Jun. 28, 2023, 4 pages.
Advisory Action received for U.S. Appl. No. 17/483,679, mailed on Sep. 20, 2022, 8 pages.
Applicant-Initiated Interview Summary received for U.S. Appl. No. 17/476,404, mailed on Jul. 27, 2022, 6 pages.

(56) References Cited

OTHER PUBLICATIONS

Applicant-Initiated Interview Summary received for U.S. Appl. No. 17/482,987, mailed on Apr. 11, 2022, 4 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,907, mailed on Jan. 10, 2022, 2 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/157,166, mailed on Jun. 29, 2022, 4 pages.
Corrected Notice of Allowance received for U.S. Appl. No. 17/483,549, mailed on Aug. 24, 2022, 3 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
International Search Report and Written Opinion received for PCT Patent Application No. PCT/US2022/014271, mailed on Jul. 4, 2022, 23 pages.
International Search Report and Written Opinion received for PCT patent Application No. PCT/US2022/029261, mailed on Oct. 20, 2022, 18 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to pay Additional Fees and partial International Search Report received for PCT Patent Application No. PCT/US2022/029580, mailed on Sep. 5, 2022, 13 pages.
Non-Final Office Action received for U.S. Appl. No. 15/784,806, mailed on Oct. 5, 2022, 41 pages.
Non-Final Office Action received for U.S. Appl. No. 17/476,404, mailed on Sep. 14, 2022, 31 pages.
Non-Final Office Action received for U.S. Appl. No. 17/479,897, mailed on Aug. 30, 2022, 10 pages.
Non-Final Office Action received for U.S. Appl. No. 17/482,977, mailed on Oct. 13, 2022, 20 pages.
Non-Final Office Action received for U.S. Appl. No. 17/482,987, mailed on Jan. 18, 2022, 25 pages.
Non-Final Office Action received for U.S. Appl. No. 17/483,542, mailed on Sep. 22, 2022, 18 pages.
Non-Final Office Action received for U.S. Appl. No. 17/484,907, mailed on Nov. 19, 2021, 24 pages.
Notice of Allowance received for Chinese Patent Application No. 201910400179.2, mailed on Oct. 9, 2022, 4 pages (1 page of English Translation and 3 pages of Official Copy).
Notice of Allowance received for Chinese Patent Application No. 202110409273.1, mailed on Aug. 2, 2022, 4 pages (1 page of English Translation and 3 pages of Official Copy).
Notice of Allowance received for Japanese Patent Application No. 2020-159840, mailed on Jul. 8, 2022, 4 pages (1 page of English Translation and 3 pages of Official Copy).
Notice of Allowance received for Japanese patent Application No. 2021-074395, mailed on Jun. 27, 2022, 4 pages (1 page of English Translation and 3 pages of Official Copy).
Notice of Allowance received for Korean Patent Application No. 10-2020-0123805, mailed on Jun. 19, 2022, 5 pages (2 pages Of English Translation and 3 pages of Official Copy).
Notice of Allowance received for Korean patent Application No. 10-2022-0091730, mailed on Oct. 4, 2022, 5 pages (2 pages of English Translation and 3 pages of official copy).
Notice of Allowance received for U.S. Appl. No. 17/027,373, mailed on Aug. 2, 2022, 2 pages.
Notice of Allowance received for U.S. Appl. No. 17/027.373, mailed on Oct. 3, 2022, 5 pages.
Notice of Allowance received for U.S. Appl. No. 17/121,610, mailed on Jul. 7, 2022, 5 pages.
Notice of Allowance received for U.S. Appl. No. 17/121,610, mailed on Jul. 13, 2022, 4 pages.
Notice of Allowance received for U.S. Appl. No. 17/482,987, mailed on Jun. 23, 2022, 9 pages.
Notice of Allowance received for U.S. Appl. No. 17/482,987, mailed on May 11, 2022, 10 pages.
Notice of Allowance received for U.S. Appl. No. 17/484,907, mailed on Jul. 25, 2022, 10 pages.
Notice of Allowance received for U.S. Appl. No. 17/484,907, mailed on Mar. 2, 2022, 13 pages.
Notice of Allowance received for U.S. Appl. No. 17/484,907, mailed on May 20, 2022, 13 pages.
Office Action received for Chinese Patent Application No. 202010126661.4, mailed on Jun. 2, 2022, 11 pages (7 pages of English Translation and 4 pages of Official Copy).
Office Action received for Chinese Patent Application No. 202111652452.4, mailed on Aug. 29, 2022, 23 pages (12 pages of English Translation and 11 pages of Official Copy).
Summons to Attend Oral Proceedings received for European Patent Application No. 20205496.1, mailed on Sep. 8, 2022, 9 pages.
101075173, CN, A, Cited by Chinese Patent Office in an Office Action for related Patent Application No. 202110328601.5 on Apr. 27, 2022.
101917529, CN, A, Cited by Chinese Patent Office in an Office Action for related Patent Application No. 202110328597.2 on Apr. 15, 2022.
102572369, CN, A, Cited by Chinese Patent Office in an Office Action for related Patent Application No. 20188056514.5 on Sep. 2, 2020.
103336651, CN, A, Cited by Chinese Patent Office in an Office Action for related Patent Application No. 201910055588.3 on Nov. 24, 2021.
104182123, CN, A, Cited by Chinese Patent Office in an Office Action for related Patent Application No. 201780033771.2 on Jul. 15
104427288, CN, A, Cited by Chinese Patent Office in an Office Action for related Patent Application No. 202011243876.0 on Apr. 6, 2021.
104469143, CN, A, Cited by Chinese Patent Office in an Office Action for related Patent Application No. 202110328597.2 on Apr. 15, 2022.
105094957, CN, A, Cited by Chinese Patent Office in an Office Action for related Patent Application No. 201910704856.X on May 27, 2020.
105204846, CN, A, Cited by Chinese Patent Office in an Office Action for related Patent Application No. 201910400179.2 on Dec. 27, 2021.
106210855, CN, A, Cited by Chinese Patent Office in an Office Action for related Patent Application No. 202110328597.2 on Apr. 15, 2022.
107704177, CN, A, Cited by Chinese Patent Office in an Office Action for related Patent Application No. 201910400180.5 on Jun. 1, 2020.
107728876, CN, A, Cited by Chinese Patent Office in an Office Action for related Patent Application No. 202010126661.4 on Feb. 3, 2021.
107992248, CN, A, Cited by Chinese Patent Office in an Office Action for related Patent Application No. 201910400180.5 on Jun. 1, 2020.
2002-288125, JP, A, Cited by Japanese Patent Office in an Office Action for related Patent Application No. 2019-124728 on Sep. 18, 2020.

(56) References Cited

OTHER PUBLICATIONS 2005-94696, JP, A, Cited by Japanese Patent Office in an Office Action for related Patent Application No. 2019-194597 on Jan. 18, 2021.
2011-118662, JP, A, Cited by Japanese Patent Office in an Office Action for related Patent Application No. 2019-124728 on Sep. 18, 2020.
2014-71835, JP, A, Cited by Japanese Patent Office in an Office Action for related Patent Application No. 2020-159840 on Dec. 10, 2021.
2014-87126, JP, A, Cited by Japanese Patent Office in an Office Action for related Patent Application No. 2020-159840 on Dec. 10, 2021.
2014-512044, JP, A, Cited by Japanese Patent Office in an Office Action for related Patent Application No. 2019-124728 on Sep. 18, 2020.
2018-7158, JP, A, Cited by Japanese Patent Office in an Office Action for related Patent Application No. 2020-159840 on Dec. 10, 2021.
10-2013-0141688, KR, A, Cited by Japanese Patent Office in an Office Action for related Patent Application No. 2019-124728 on Sep. 18, 2020.
10-2014-0043370, KR, A, Cited by Korean Patent Office in an Office Action for related Patent Application No. 10-2021-0143923 on Jan. 27, 2022.
Kimura, Ryoji, "Keynote presentation practice guide for iPad & iPhone", K.K. Rutles, first edition, Feb. 29, 2012 4 pages, Cited by Japanese Patent Office in an Office Action for related Patent Application No. 2015-095183 on Jun. 3, 2016.
Issued by the Chinese Patent Office in related Patent Application No. 201620051290.7 on Jun. 22, 2016.
Issued by the Japanese Patent Office in related Patent Application No. 2015-095183 on Apr. 21, 2017.
Issued by the Japanese Patent Office in related Patent Application No. 2016-130565 on Aug. 28, 2017.
Issued by the Korean Patent Office in related Patent Application No. 10-2013-7022057 on Apr. 27, 2015.
Issued by the Taiwanese Patent Office in related Patent Application No. 104117041 on Feb. 24, 2017.
Issued by the Chinese Patent Office in related Patent Application No. 201080064125.0 on Jun. 10, 2014.
Issued by the Hong Kong Patent Office in related Patent Application No. 151051633 on Jun. 5, 2015.
Issued by the Japanese Patent Office in related Patent Application No. 2013-550664 on Jun. 10, 2016.
Issued by the Japanese Patent Office in related Patent Application No. 2013-262976 on Feb. 20, 2015.
Issued by the Korean Patent Office in related Patent Application No. 10-2012-7020548 on Oct. 10, 2013.
Issued by the Korean Patent Office in related Patent Application No. 10-2014-7033660 on Feb. 23, 2015.
Applicant-Initiated Interview Summary received for U.S. Appl. No. 17/483,679, mailed on Dec. 18, 2023, 2 pages.
Examiner's Answer to Appeal Brief received for U.S. Appl. No. 15/784,806, mailed on Dec. 22, 2023, 27 pages.
Intention to Grant received for European Patent Application No. 15714698.6, mailed on Dec. 8, 2023, 9 pages.
Intention to Grant received for European Patent Application No. 21728781.2, mailed on Dec. 12, 2023, 9 pages.
Non-Final Office Action received for U.S. Appl. No. 18/165,144, mailed on Dec. 27, 2023, 20 pages.
Notice of Allowance received for U.S. Appl. No. 17/483,542, mailed on Dec. 20, 2023, 6 pages.
Notice of Allowance received for U.S. Appl. No. 17/666,971, mailed on Dec. 15, 2023, 8 pages.
10-2017-0128498, KR, A, Cited by the Korean Patent Office in an Office Action for related Patent Application No. 10-2023-7044044 on Mar. 14, 2024.
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/032911, mailed on Jan. 4, 2024, 18 pages.
International Search Report and Written Opinion received for PCT Patent Application No. PCT/US2023/033372, mailed on Jan. 12, 2024, 21 pages.
Invitation to Pay Additional Fees and Partial International Search Report received for PCT Patent Application No. PCT/US2023/033372, mailed on Nov. 22, 2023, 13 pages.
Non-Final Office Action received for U.S. Appl. No. 17/484,899, mailed on Mar. 21, 2024, 42 pages.
Office Action received for Japanese Patent Application No. 2023-028786, mailed on Mar. 22, 2024, 10 pages (5 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy).
Corrected Notice of Allowance received for U.S. Appl. No. 17/483,542, mailed on Feb. 5, 2024, 3 pages.
Decision to Refuse received for Japanese Patent Application No. 2022-116534, mailed on Jan. 29, 2024, 5 pages (2 pages of English Translation and 3 pages of Official Copy).
Extended European Search Report received for European Patent Application No. 23203414.0, mailed on Jan. 26, 2024, 10 pages.
Final Office Action received for U.S. Appl. No. 17/483,679, mailed on Feb. 6, 2024, 45 pages.
Notice of Acceptance received for Australian Patent Application No. 2023248185, mailed on Jan. 23, 2024, 3 pages.
Office Action received for Australian Patent Application No. 2023201057, mailed on Jan. 25, 2024, 6 pages.
Applicant-Initiated Interview Summary received for U.S. Appl. No. 17/476,404. mailed on Oct. 31, 2023, 4 pages.
Final Office Action received for U.S. Appl. No. 17/484,899, mailed on Nov. 6, 2023, 39 pages.
Final Office Action received for U.S. Appl. No. 17/732,355, mailed on Nov. 3, 2023, 21 pages.
International Search Report and Written Opinion received for PCT Patent Application No. PCT/US2023/017280, mailed on Jun. 26, 2023, 20 pages.
Office Action received for Australian Patent Application No. 2023248185, mailed on Oct. 20, 2023, 3 pages.
Office Action received for European Patent Application No. 20166552.8, mailed on Nov. 3, 2023, 3 pages.
Office Action received for Korean Patent Application No. 10-2022-0053111, mailed on Oct. 23, 2023, 10 pages (5 pages of English Translation and 5 pages of Official Copy).
Applicant-Initiated Interview Summary received for U.S. Appl. No. 18/165,144, mailed on Feb. 27, 2024, 3 pages.
Corrected Notice of Allowance received for U.S. Appl. No. 17/684,843, mailed on Mar. 4, 2024, 2 pages.
Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2024-7000870, mailed on Feb. 13, 2024, 5 pages (2 pages of English Translation and 3 pages of Official Copy).
Applicant-Initiated Interview Summary received for U.S. Appl. No. 18/067,350, mailed on Mar. 13, 2024, 4 pages.
Office Action received for Chinese Patent Application No. 201910704856.X, mailed on Mar. 8, 2024, 13 pages (7 pages of English Translation and 6 pages of Official Copy).
Office Action received for Korean Patent Application No. 10-2023-7018775, mailed on Feb. 28, 2024, 9 pages (4 pages of English Translation and 5 pages of Official Copy).
Corrected Notice of Allowance received for U.S. Appl. No. 17/666,971, mailed on Jan. 16, 2024, 2 pages.
Corrected Notice of Allowance received for U.S. Appl. No. 17/740,104, mailed on Jan. 2, 2024, 2 pages.
Corrected Notice of Allowance received for U.S. Appl. No. 17/732,204, mailed on Dec. 4, 2023, 5 pages.

(56) References Cited

OTHER PUBLICATIONS

Final Office Action received for U.S. Appl. No. 18/067,350, mailed on Dec. 13, 2023, 44 pages.
International Preliminary Report on Patentability received for PCT Patent Application No. PCT/US2022/029261, mailed on Nov. 30, 2023, 12 pages.
International Preliminary Report on Patentability received for PCT Patent Application No. PCT/US2022/029273, mailed on Nov. 30, 2023, 14 pages.
International Preliminary Report on Patentability received for PCT Patent Application No. PCT/US2022/029580, mailed on Nov. 30, 2023, 14 pages.
International Search Report and Written Opinion received for PCT Patent Application No. PCT/US2023/020569, mailed on Nov. 13, 2023, 23 pages.
Applicant-Initiated Interview Summary received for U.S. Appl. No. 15/784,806, mailed on Nov. 3, 2022, 5 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/483,542, mailed on Nov. 23, 2022, 4 pages.
Decision on Opposition received for Australian Patent Application No. 2018271366, mailed on Mar. 3, 2023, 3 pages.
Final Office Action received for U.S. Appl. No. 15/784,806, mailed on Nov. 25, 2022, 52 pages.
Final Office Action received for U.S. Appl. No. 17/479,897, mailed on Jan. 10, 2023, 15 pages.
International Preliminary Report on Patentability received for PCT Patent Application No. PCT/US2021/031760, mailed on Nov. 24, 2022, 11 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
Invitation to Pay Additional Fees received for PCT Patent Application No. PCT/US2022/029273, mailed on Sep. 2, 2022, 13 pages.
Invitation to Pay Search Fees received for European Patent Application No. 15714698.6, mailed on Dec. 16, 2022, 4 pages.
Invitation to Pay Search Fees received for European Patent Application No. 21728781.2, mailed on Dec. 2, 2022, 3 pages.
Non-Final Office Action received for U.S. Appl. No. 17/483,542, mailed on Jan. 31, 2023, 14 pages.
Non-Final Office Action received for U.S. Appl. No. 17/483,564, mailed on Nov. 28, 2022, 24 pages.
Non-Final Office Action received for U.S. Appl. No. 17/483,679, mailed on Dec. 9, 2022, 31 pages.
Non-Final Office Action received for U.S. Appl. No. 17/666,971, mailed on Dec. 8, 2022, 26 pages.
Notice of Acceptance received for Australian Patent Application No. 2021201243, mailed on Feb. 23, 2023, 3 pages.
Notice of Allowance received for Japanese Patent Application No. 2022-125792, mailed on Jan. 27, 2023, 4 pages (1 page of English Translation and 3 pages of Official Copy).
Notice of Allowance received for Korean Patent Application No. 10-2021-7017731, mailed on Feb. 28, 2023, 5 pages (2 pages of English Translation and 3 pages of Official Copy).
Notice of Allowance received for U.S. Appl. No. 17/482,977, mailed on Jan. 24, 2023, 10 pages.
Office Action received for Australian Patent Application No. 2021201243, mailed on Dec. 12, 2022, 3 pages.
Office Action received for Australian Patent Application No. 2022201532, mailed on Dec. 19, 2022, 5 pages.
Office Action received for Chinese Patent Application No. 202110327012.5, mailed on Nov. 28, 2022, 16 pages (10 pages of English Translation and 6 pages of Official Copy).
Office Action received for Chinese Patent Application No. 202110328597.2, mailed on Oct. 10, 2022, 13 pages (7 pages of English Translation and 6 pages of Official Copy).
Office Action received for Chinese Patent Application No. 202110328601.5, mailed on Nov. 2, 2022, 29 pages (19 pages of English Translation and 10 pages of Official Copy).
Office Action received for Chinese Patent Application No. 202110328602.X, mailed on Dec. 1, 2022, 28 pages (17 pages of English Translation 11 pages of Official Copy).
Office Action received for Chinese Patent Application No. 202111652452.4, mailed on Feb. 11, 2023, 28 pages (13 pages of English Translation and 15 pages of Official Copy).
Office Action received for European Patent Application No. 21728781.2, mailed on Mar. 1, 2023, 13 pages.
Office Action received for Japanese Patent Application No. 2021-206121, mailed on Feb. 20, 2023, 7 pages (3 pages of English Translation and 4 pages of Official Copy).
Office Action received for Korean Patent Application No. 10-2022-0053111, mailed on Dec. 12, 2022, 9 pages (4 pages of English Translation and 5 pages of Official Copy).
Dolan, Tim, "How to Make a Laptop Webcam into a Document Camera—IPEVO Mirror-Cam Review", Retrieved from the Internet: https://www.youtube.com/watch?v=-K8jyZ1hbbg, Aug. 29, 2020, 1 page.
Larson, Tom, "How to Turn your Webcam into a Document Camera", Retrieved from the Internet: URL: https://www.youtube.com/watchv=UlaW22FxRZM, Nov. 7, 2020, 1 page.
QQ, "Method of QQ voice chat", Online Available at: https://www.taodocs.com/p-47909082.html, May 25, 2016, 3 pages (Official Copy Only) (See Communication under 37 CFR § 1.98(a) (3)).
Applicant-Initiated Interview Summary received for U.S. Appl. No. 17/483,679, mailed on Aug. 18, 2023, 2 pages.
Corrected Notice of Allowance received for U.S. Appl. No. 17/479,897, mailed on Aug. 17, 2023, 2 pages.
Corrected Notice of Allowance received for U.S. Appl. No. 17/483,542, mailed on Aug. 25, 2023, 3 pages.
Ex-Parte Quayle Action received for U.S. Appl. No. 17/903,946, mailed on Aug. 4, 2023, 4 pages.
International Preliminary Report on Patentability received for PCT Patent Application No. PCT/US2022/014271, mailed on Aug. 10, 2023, 17 pages.
Non-Final Office Action received for U.S. Appl. No. 17/684,843, mailed on Aug. 11, 2023, 23 pages.
Notice of Allowance received for U.S. Appl. No. 17/483,542, mailed on Aug. 11, 2023, 9 pages.
Notice of Allowance received for U.S. Appl. No. 17/666,971, mailed on Aug. 16, 2023, 8 pages.
Notice of Allowance received for U.S. Appl. No. 17/872,736, mailed on Aug. 21, 2023, 6 pages.
Applicant Initiated Interview Summary received for U.S. Appl. No. 17/666,971, mailed on Jun. 9, 2023, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/483,564, mailed on Jun. 21, 2023, 4 pages.
Examiner Interview Summary received for U.S. Appl. No. 17/903,946, mailed on Jun. 28, 2023, 2 pages.
Final Office Action received for U.S. Appl. No. 17/483,679, mailed on Jun. 13, 2023, 33 pages.
Non-Final Office Action received for U.S. Appl. No. 17/484,899, mailed on Jun. 14, 2023, 41 pages.
Notice of Allowance received for U.S. Appl. No. 17/950,900, mailed on Jun. 16, 2023, 6 pages.
Office Action received for Chinese Patent Application No. 202111652452.4, mailed on May 19, 2023, 15 pages (8 pages of English Translation and 7 pages of Official Copy).
6. Voice chat with friends through QQ, online available at: https://v.qq.com/x/page/a0166p7xrt0.html, Sep. 22, 2015, 1 page (Official Copy Only) (See Communication under 37 CFR § 1.98(a) (3)).

(56) References Cited

OTHER PUBLICATIONS

Applicant-Initiated Interview Summary received for U.S. Appl. No. 17/483,542, mailed on May 22, 2023, 3 pages.
Applicant-Initiated Interview Summary received for U.S. Appl. No. 17/483,564, mailed on Apr. 21, 2023, 5 pages.
Applicant-Initiated Interview Summary received for U.S. Appl. No. 17/483,679, mailed on May 19, 2023, 3 pages.
Applicant-Initiated Interview Summary received for U.S. Appl. No. 17/950,900, mailed on Jan. 26, 2023, 5 pages.
Brief Communication Regarding Oral Proceedings received for European Patent Application No. 20205496.1, mailed on Apr. 19, 2023, 1 page.
Corrected Notice of Allowance received for U.S. Appl. No. 17/482,977, mailed on Apr. 24, 2023, 3 pages.
Corrected Notice of Allowance received for U.S. Appl. No. 17/950,900, mailed on Apr. 14, 2023, 2 pages.
Corrected Notice of Allowance received for U.S. Appl. No. 17/950,922, mailed on Apr. 14, 2023, 2 pages.
Decision to Refuse received for European Patent Application No. 20205496.1, mailed on May 12, 2023, 16 pages.
Final Office Action received for U.S. Appl. No. 17/666,971, mailed on May 12, 2023, 29 pages.
Final Office Action received for U.S. Appl. No. 17/950,900, mailed on Jan. 23, 2023, 14 pages.
International Search Report and Written Opinion received for PCT Patent Application No. PCT/US2022/044592, mailed on Mar. 14, 2023, 22 pages.
Invitation to Pay Additional Fees received for PCT Patent Application No. PCT/US2022/044592, mailed on Jan. 16, 2023, 21 pages.
Jiutian Technology, "Windows 8 Chinese version from entry to proficiency", Jan. 1, 2014, 5 pages (Official Copy Only) (See Communication under 37 CFR § 1.98(a) (3)).
Minutes of the Oral Proceedings received for European Patent Application No. 20205496.1, mailed on May 9, 2023, 7 pages.
Non-Final Office Action received for U.S. Appl. No. 17/476,404, mailed on Mar. 30, 2023, 29 pages.
Non-Final Office Action received for U.S. Appl. No. 17/479,897, mailed on Apr. 25, 2023, 14 pages.
Non-Final Office Action received for U.S. Appl. No. 17/872,736, mailed on May 11, 2023, 17 pages.
Non-Final Office Action received for U.S. Appl. No. 17/903,946, mailed on Apr. 14, 2023, 17 pages.
Non-Final Office Action received for U.S. Appl. No. 17/950,900, mailed on Dec. 1, 2022, 14 pages.
Notice of Acceptance received for Australian Patent Application No. 2018271366, mailed on Mar. 31, 2023, 3 pages.
Notice of Allowance received for Japanese Patent Application No. 2021-206121, mailed on May 15, 2023, 4 pages (1 page of English Translation and 3 pages of Official Copy).
Notice of Allowance received for U.S. Appl. No. 17/950,900, mailed on Mar. 7, 2023, 10 pages.
Notice of Allowance received for U.S. Appl. No. 17/950,922, mailed on Apr. 5, 2023, 10 pages.
Office Action received for Australian Patent Application No. 2022228207, mailed on Apr. 28, 2023, 3 pages.
Office Action received for Chinese Patent Application No. 202110327012.5, mailed on Mar. 16, 2023, 12 pages (7 pages of English Translation and 5 pages of Official Copy).
Office Action received for Chinese Patent Application No. 202110328601.5, mailed on Mar. 24, 2023, 25 pages (15 pages of English Translation and 10 pages of Official Copy).
Office Action received for European Patent Application No. 15714698.6, mailed on Apr. 18, 2023, 14 pages.
Office Action received for Indian Patent Application No. 202015013360, mailed on Mar. 17, 2023, 7 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Result of Consultation received for European Patent Application No. 20205496.1, mailed on Apr. 18, 2023, 3 pages.
Song Jianhua, "Guidelines for Network", Feb. 29, 2008, 11 pages (Official Copy Only) (See Communication under 37 CFR § 1.98(a) (3)).
Decision to Grant received for European Patent Application No. 15714698.6, mailed on Apr. 5, 2024, 2 pages.
International Preliminary Report on Patentability received for PCT Patent Application No. PCT/US2022/044592, mailed on Apr. 4, 2024, 21 pages.
Non-Final Office Action received for U.S. Appl. No. 17/970,417, mailed on Apr. 10, 2024, 16 pages.
Notice of Allowance received for Korean Patent Application No. 10-2023-7044044, mailed on Mar. 14, 2024, 7 pages (2 pages of English Translation and 5 pages of Official Copy).
Notice of Allowance received for U.S. Appl. No. 17/903,946, mailed on Apr. 10, 2024, 7 pages.
Applicant-Initiated Interview Summary received for U.S. Appl. No. 17/950,868, mailed on Jul. 19, 2024, 2 pages.
Applicant-Initiated Interview Summary received for U.S. Appl. No. 18/165,144, mailed on Jul. 15, 2024, 4 pages.
Non-Final Office Action received for U.S. Appl. No. 18/380,116, mailed on Jul. 18, 2024, 16 pages.
Notice of Allowance received for Korean Patent Application No. 10-2023-7040599, mailed on Jun. 26, 2024, 7 pages (2 pages of English Translation and 5 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202110894284.3, mailed on Jun. 27, 2024, 10 pages (5 pages of English Translation and 5 pages of Official Copy).
Office Action received for Chinese Patent Application No. 202311185909.4, mailed on Jun. 12, 2024, 18 pages (10 pages of English Translation and 8 pages of Official Copy).
Non-Final Office Action received for U.S. Appl. No. 18/067,350, mailed on May 28, 2024, 43 pages.
Notice of Allowance received for Chinese Patent Application No. 202311042451.7, mailed on May 15, 2024, 4 pages (1 page of English Translation and 3 pages of Official Copy).
Intention to Grant received for European Patent Application No. 20166552.8, mailed on Jun. 29, 2023, 8 pages.
Notice of Allowance received for Australian Patent Application No. 2022228207, mailed on Jul. 3, 2023, 3 pages.
Notice of Allowance received for U.S. Appl. No. 17/483,564, mailed on Jul. 17, 2023, 46 pages.
Office Action received for European Patent Application No. 21206800.1, mailed on Jun. 30, 2023, 6 pages.
Office Action received for Korean Patent Application No. 10-2022-0053111, mailed on Jun. 29, 2023, 7 pages (3 pages of English Translation and 4 pages of Official Copy).
Applicant-Initiated Interview Summary received for U.S. Appl. No. 17/872,736, mailed on Jul. 25, 2023, 2 pages.
Garrison Dr., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.
Notice of Allowance received for Chinese Patent Application No. 202110328601.5, mailed on Jul. 5, 2023, 5 pages (1 page of English Translation and 4 pages of Official Copy).
Notice of Allowance received for U.S. Appl. No. 17/479,897, mailed on Jul. 26, 2023, 7 pages.
Shangmeng Li, "The Design and Implementation of Mobile Terminal System of Multimedia Conference Based on Symbian Operating System", China Academic Journal Electronic Publishing House, online available at: http://www.cnki.net, 2011, 66 pages (Official Copy only) (See Communication Under 37 CFR § 1.98(a) (3)).
Applicant-Initiated Interview Summary received for U.S. Appl. No. 17/484,899, mailed on Jun. 24, 2024, 4 pages.

(56) References Cited

OTHER PUBLICATIONS

Applicant-Initiated Interview Summary received for U.S. Appl. No. 17/970,417, mailed on Jun. 26, 2024, 2 pages.
Extended European Search Report received for European Patent Application No. 24164409.5, mailed on Jun. 14, 2024, 5 pages.
Notice of Allowance received for Korean Patent Application No. 10-2023-0001668, mailed on May 22, 2024, 6 pages (2 pages of English Translation and 4 pages of Official Copy).
Office Action received for Australian Patent Application No. 2023201057, mailed on Jun. 19, 2024, 5 pages.
Office Action received for Chinese Patent Application No. 201910704856.X, mailed on Jun. 11, 2024, 33 pages (1 page of English Translation and 32 pages of Official Copy).
Advisory Action received for U.S. Appl. No. 10/179,775, mailed on Oct. 13, 2015, 4 pages.
Abdulezer et al., "Skype for Dummies", Available Online at: https://ixn.es/Skype%20For%20Dummies.pdf, 2007, 361 pages.
Advisory Action received for U.S. Appl. No. 10/179,775, mailed on Oct. 14, 2010, 2 pages.
Advisory Action received for U.S. Appl. No. 10/179,775, mailed on Sep. 15, 2009, 2 pages.
Advisory Action received for U.S. Appl. No. 12/890,499, mailed on Jan. 11, 2016, 3 pages.
Advisory Action received for U.S. Appl. No. 13/077,850, mailed on Apr. 24, 2014, 3 pages.
Advisory Action received for U.S. Appl. No. 13/077,855, mailed on Jun. 15, 2016, 4 pages.
Advisory Action received for U.S. Appl. No. 13/077,862, mailed on Apr. 7, 2016, 3 pages.
Advisory Action received for U.S. Appl. No. 13/077,874, mailed on Aug. 19, 2016, 3 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Anonymous, "Chapter 13: Menus", Apple Human Interface Guidelines, available at <https://developer.apple.com/library/mac/documentation/UserExperience/Conceptual/OSXHIGuidelines/index.html>, retrieved on Aug. 20, 2009, pp. 165-190.
Appeal Decision received for U.S. Appl. No. 13/077,862, mailed on Mar. 22, 2019, 10 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant-Initiated Interview Summary received for U.S. Appl. No. 14/641,304, mailed on Dec. 2, 2019, 5 pages.
Applicant-Initiated Interview Summary received for U.S. Appl. No. 14/641,304, mailed on Jul. 28, 2020, 5 pages.
Applicant-Initiated Interview Summary received for U.S. Appl. No. 15/784,806, mailed on Aug. 2, 2021, 5 pages.
Applicant-Initiated Interview Summary received for U.S. Appl. No. 15/784,806, mailed on Dec. 21, 2020, 5 pages.
Applicant-Initiated Interview Summary received for U.S. Appl. No. 15/784,806, mailed on Jan. 24, 2022, 3 pages.
Applicant-Initiated Interview Summary received for U.S. Appl. No. 15/784,806, mailed on Jun. 2, 2020, 5 pages.
Applicant-Initiated Interview Summary received for U.S. Appl. No. 15/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/790,619, mailed on Jul. 28, 2020, 3 pages.
Applicant-Initiated Interview Summary received for U.S. Appl. No. 16/799,481, mailed on Jul. 24, 2020, 3 pages.
Applicant-Initiated Interview Summary received for U.S. Appl. No. 16/859,101, mailed on Nov. 30, 2021, 2 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/121,610, mailed on Oct. 29, 2021, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/484,899, mailed on Apr. 27, 2022, 5 pages.
Baig Ed, "Palm Pre: The Missing Manual", Safari Books Online, Available at <http://my.safaribooksonline.com/book/operating-systems/0596528264>, Aug. 27, 2009, 16 pages.
Benge et al., "Designing Custom Controls", IBM OS/2 Developer, The Magazine for Advanced Software Development, vol. 5, No. 2, 1993, pp. 72-85.
Board Decision received for Chinese Patent Application No. 201510288981.9, mailed on May 6, 2021, 31 pages (3 pages of English Translation and 28 pages of Official Copy).
Board Opinion received for Chinese Patent Application No. 201510288981.9, mailed on Jan. 4, 2021, 21 pages (9 pages of English Translation and 12 pages of Official Copy).
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Chan Christine, "Handoff Your Browser to Your iPhone or iPad! Plus a Chance to Win a Copy!", Apr. 12, 2011, 2 pages.
Corrected Notice of Allowance received for U.S. Appl. No. 13/077,874, mailed on Dec. 9, 2016, 2 pages.
Corrected Notice of Allowance received for U.S. Appl. No. 14/641,298, mailed on Dec. 9, 2021, 5 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 16/859,101, mailed on Mar. 25, 2022, 2 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on Apr. 13, 2022, 4 pages.
Corrected Notice of Allowance received for U.S. Appl. No. 17/157,166, mailed on Apr. 25, 2022, 4 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.
Corrected Notice of Allowance received for U.S. Appl. No. 17/483,582, mailed on Feb. 15, 2022, 2 pages.
Corrected Search Report and Opinion received for Danish Patent Application No. PA201870364, mailed on Sep. 5, 2018, 13 pages.

(56) References Cited

OTHER PUBLICATIONS

Cuyamaca LRC Computer Labs, "Topics in CommonSpace Application", Available at <http://www.cuyamaca.net/librarylab/Technical%20Help/cmspace.asp>, Retrieved on May 19, 2014, 16 pages.
Decision on Appeal received for U.S. Appl. No. 14/641,298, mailed on Nov. 1, 2021, 9 pages.
Decision to Grant received for Danish Patent Application No. PA201870362, mailed on May 15, 2020, 2 pages.
Decision to Grant received for European Patent Application No. 10799259.6, mailed on Aug. 31, 2017, 2 pages.
Decision to Grant received for European Patent Application No. 11150223.3, mailed on Aug. 1, 2013, 2 pages.
Decision to Grant received for European Patent Application No. 12704175.4, mailed on Jul. 19, 2018, 2 pages.
Decision to Grant received for European Patent Application No. 13175232.1, mailed on Feb. 18, 2016, 2 pages.
Decision to Grant received for European Patent Application No. 15713062.6, mailed on Apr. 11, 2019, 2 pages.
Decision to Grant received for European Patent Application No. 17810737.1, mailed on Nov. 11, 2021, 2 pages.
Decision to Grant received for European Patent Application No. 19729395.4, mailed on Dec. 9, 2021, 2 pages.
Decision to Grant received for German Patent Application No. 102015208532.5, mailed on Sep. 22, 2020, 10 pages (1 page of English Translation and 9 pages of Official Copy).
Decision to Grant received for Japanese Patent Application No. 2013-262976, mailed on Nov. 16, 2015, 6 pages (3 pages of English Translation and 3 pages of Official Copy).
Decision to Grant received for Japanese Patent Application No. 2019-124728, mailed on Apr. 2, 2021, 4 pages (1 page of English Translation and 3 pages of Official Copy).
Esther, "Instructions for Kobo Books: How to change to scrolling mode and do table of contents navigation—Google Groups", XP055513050, Retrieved from the Internet:URL: https://groups.google.com/forum/print/msg/viphone/-dkqODh_31N8acJK2dGPe8J?ctz=4607561_48_52_123900_ 48_ 436380 [retrieved on Oct. 5, 2018]., Aug. 28, 2010, 3 pages.
Evaluation Report for Utility Model Patent received for Chinese Patent Application No. 201620051290.7, completed on Sep. 19, 2016, 11 pages (6 pages of English translation and 5 pages of Official Copy).
Ex Parte Quayle Action received for U.S. Appl. No. 17/121,610, mailed on Dec. 9, 2021, 7 pages.
Examiner-Initiated Interview Summary received for U.S. Appl. No. 14/641,298, mailed on Mar. 10, 2020, 4 pages.
Examiner-Initiated Interview Summary received for U.S. Appl. No. 16/528,941, mailed on Dec. 1, 2020, 2 pages.
Examiner-Initiated Interview Summary received for U.S. Appl. No. 16/859,101, mailed on Dec. 1, 2021, 2 pages.
Examiner-Initiated Interview Summary received for U.S. Appl. No. 17/027,373, mailed on Mar. 31, 2022, 4 pages.
Examiner's Answer to Appeal Brief received for U.S. Appl. No. 14/641,298, mailed on Mar. 22, 2021, 19 pages.
Extended European Search Report (includes Partial European Search Report and European Search Opinion) received for European Patent Application No. 11150223.3, mailed on May 16, 2011, 7 pages.
Extended European Search Report (includes Partial European Search Report and European Search Opinion) received for European Patent Application No. 13175232.1 mailed on Oct. 21, 2013, 7 pages.
Extended European Search Report received for European Patent Application No. 17810737.1, mailed on Oct. 28, 2019, 11 pages.
Extended European Search Report received for European Patent Application No. 18185408.4, mailed on Oct. 17, 2018, 10 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Extended European Search Report received for European Patent Application No. 21206800.1, mailed on Jan. 24, 2022, 8 pages.
Fahey M., "The iPad Blows Up iPhone Apps Real Good", Available at <www.kotaku.com.au/2010/01/the-ipad-blows-up-iphone-apps-real-good/>, Jan. 28, 2010, 3 pages.
Fehily C., "Visual QuickStart Guide: Microsoft Windows 7", Peachpit Press, Sep. 8, 2009, pp. x,34-37, 40, 71, 76, and 267.
Final Office Action received for U.S. Appl. No. 10/179,775, mailed on Apr. 5, 2006, 14 pages.
Final Office Action received for U.S. Appl. No. 10/179,775, mailed on Aug. 16, 2013, 12 pages.
Final Office Action received for U.S. Appl. No. 10/179,775, mailed on Jul. 8, 2009, 11 pages.
Final Office Action received for U.S. Appl. No. 10/179,775, mailed on Jun. 22, 2010, 13 pages.
Final Office Action received for U.S. Appl. No. 10/179,775, mailed on May 22, 2015, 15 pages.
Final Office Action received for U.S. Appl. No. 10/179,775, mailed on Oct. 8, 2008, 12 pages.
Final Office Action received for U.S. Appl. No. 12/789,426, mailed on Oct. 10, 2013, 9 pages.
Final Office Action received for U.S. Appl. No. 12/843,814, mailed on Apr. 23, 2015, 28 pages.
Final Office Action received for U.S. Appl. No. 12/843,814, mailed on Jan. 31, 2014, 20 pages.
Final Office Action received for U.S. Appl. No. 12/843,814, mailed on Nov. 14, 2012, 13 pages.
Final Office Action received for U.S. Appl. No. 12/890,472, mailed on Feb. 6, 2013, 10 pages.
Final Office Action received for U.S. Appl. No. 12/890,482, mailed on Sep. 12, 2013, 10 pages.
Final Office Action received for U.S. Appl. No. 12/890,489, mailed on Aug. 14, 2013, 9 pages.
Final Office Action received for U.S. Appl. No. 12/890,499, mailed on Jul. 8, 2013, 17 pages.
Final Office Action received for U.S. Appl. No. 12/890,499, mailed on May 22, 2017, 17 pages.
Final Office Action received for U.S. Appl. No. 12/890,499, mailed on Oct. 19, 2015, 14 pages.
Final Office Action received for U.S. Appl. No. 13/077,850, mailed on Nov. 7, 2013, 14 pages.
Final Office Action received for U.S. Appl. No. 13/077,855, mailed on Mar. 17, 2014, 11 pages.
Final Office Action received for U.S. Appl. No. 13/077,855, mailed on Nov. 7, 2013, 14 pages.
Final Office Action received for U.S. Appl. No. 13/077,862, mailed on Nov. 8, 2013, 15 pages.
Final Office Action received for U.S. Appl. No. 13/077,862, mailed on Oct. 22, 2015, 16 pages.
Final Office Action received for U.S. Appl. No. 13/077,867, mailed on May 23, 2013, 10 pages.
Final Office Action received for U.S. Appl. No. 13/077,874, mailed on Dec. 3, 2014, 23 pages.
Final Office Action received for U.S. Appl. No. 13/077,874, mailed on May 5, 2016, 26 pages.
Final Office Action received for U.S. Appl. No. 13/333,909, mailed on Dec. 5, 2013, 24 pages.
Final Office Action received for U.S. Appl. No. 14/641,289, mailed on Jul. 1, 2016, 32 pages.
Final Office Action received for U.S. Appl. No. 14/641,298, mailed on Jun. 26, 2020, 50 pages.
Final Office Action received for U.S. Appl. No. 14/641,298, mailed on May 16, 2019, 50 pages.
Final Office Action received for U.S. Appl. No. 14/641,298, mailed on Oct. 4, 2017, 30 pages.
Final Office Action received for U.S. Appl. No. 14/641,304, mailed on Jul. 24, 2018, 19 pages.
Final Office Action received for U.S. Appl. No. 14/641,304, mailed on Oct. 15, 2019, 21 pages.
Final Office Action received for U.S. Appl. No. 15/784,806, mailed on Aug. 3, 2020, 33 pages.
Final Office Action received for U.S. Appl. No. 15/784,806, mailed on May 22, 2019, 38 pages.
Final Office Action received for U.S. Appl. No. 15/784,806, mailed on Nov. 9, 2021, 42 pages.

(56) References Cited

OTHER PUBLICATIONS

Final Office Action received for U.S. Appl. No. 16/528,941, mailed on Jul. 13, 2020, 15 pages.
Final Office Action received for U.S. Appl. No. 17/026,818, mailed on Jan. 29, 2021, 21 pages.
Final Office Action received for U.S. Appl. No. 17/476,404, mailed on May 5, 2022, 30 pages.
Final Office Action received for U.S. Appl. No. 17/483,564, mailed on Apr. 18, 2022, 23 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
Final Office Action received for U.S. Appl. No. 13/077,855, mailed on Mar. 24, 2016, 19 pages.
Final Office Action Received for U.S. Appl. No. 15/608,866, mailed on Mar. 8, 2019, 36 pages.
G Pad, LG's latest Uls that shine even more on the G-Pad, Online available at: http://bungq.com/1014., Nov. 19, 2013, 49 pages (30 pages of English Translation and 19 pages of Official Copy).
Harris et al., "Inside WordPerfect 6 for Windows", New Riders Publishing, 1994, pp. 1104-1108.
HuddleCamHD SimplTrack2 Auto Tracking Camera Installation & Operation Manual, Available Online at: https://huddlecamhd.com/wp-content/uploads/2021/01/SimplTrack2-User-Manual-v1_2-6-20.pdf, Jun. 2020, 41 pages.
Intention to Grant received for Danish Patent Application No. PA201870362, mailed on Feb. 14, 2020, 2 pages.
Intention to Grant received for Danish Patent Application No. PA202070617, mailed on Nov. 15, 2021, 2 pages.
Intention to Grant received for European Patent Application No. 10799259.6, mailed on Apr. 20, 2017, 8 pages.
Intention to Grant received for European Patent Application No. 12704175.4, mailed on Mar. 22, 2018, 8 pages.
Intention to Grant received for European Patent Application No. 13175232.1, mailed on Sep. 8, 2015, 7 pages.
Intention to Grant received for European Patent Application No. 15713062.6, mailed on Mar. 25, 2019, 7 pages.
Intention to Grant received for European Patent Application No. 15713062.6, mailed on Oct. 8, 2018, 8 pages.
Intention to Grant received for European Patent Application No. 17810737.1, mailed on Jul. 5, 2021, 8 pages.
Intention to Grant received for European Patent Application No. 19729395.4, mailed on Jul. 23, 2021, 10 pages.
International Preliminary Report on Patentability received for PCT Patent Application No. PCT/US2018/032396, mailed on Nov. 28, 2019, 9 pages.
International Preliminary Report on Patentability received for PCT Patent Application No. PCT/US2010/062306, mailed on Jul. 19, 2012, 13 pages.
International Preliminary Report on Patentability received for PCT Patent Application No. PCT/US2010/062314, mailed on Jul. 10, 2012, 14 pages.
International Preliminary Report on Patentability received for PCT Patent Application No. PCT/US2012/022401, mailed on Aug. 8, 2013, 12 pages.
International Preliminary Report on Patentability Received for PCT Patent Application No. PCT/US2015/019306, mailed on Dec. 15, 2016, 10 pages.
International Preliminary Report on Patentability Received for PCT Patent Application No. PCT/US2015/019309, mailed on Dec. 15, 2016, 10 pages.
International Preliminary Report on Patentability received for PCT Patent Application No. PCT/US2017/035326, mailed on Dec. 20, 2018, 19 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Search Report and Written Opinion received for PCT Patent Application No. PCT/US2010/062306, mailed on May 17, 2011, 18 pages.
International Search Report and Written Opinion received for PCT Patent Application No. PCT/US2010/062314, mailed on Jun. 22, 2011, 17 pages.
International Search Report and Written Opinion received for PCT Patent Application No. PCT/US2012/022401, mailed on Jul. 6, 2012, 16 pages.
International Search Report and Written Opinion received for PCT Patent Application No. PCT/US2015/019306, mailed on Jun. 17, 2015, 15 pages.
International Search Report and Written Opinion received for PCT Patent Application No. PCT/US2015/019309, mailed on Jun. 25, 2015, 15 pages.
International Search Report and Written Opinion received for PCT Patent Application No. PCT/US2017/035326, mailed on Oct. 5, 2017, 22 pages.
International Search Report and Written Opinion received for PCT Patent Application No. PCT/US2018/032396, mailed on Jul. 30, 2018, 13 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.
International Search Report received for PCT Patent Application No. PCT/US95/11025, mailed on Jan. 3, 1996, 3 pages.
Invitation to Pay Additional Fee received for PCT Patent Application No. PCT/US2017/035326, mailed on Aug. 7, 2017, 2 pages.
Invitation to Pay Additional Fees received for PCT Patent Application No. PCT/US2012/022401, May 4, 2012, 8 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Kimura Ryoji, "Keynote presentation practice guide for iPad & iPhone", K.K. Rutles, first edition, Feb. 29, 2012, 4 pages (Official Copy Only) (See Communication Under 37 CFR § 1.98(a) (3)).
King Adrian, "Inside Windows 95", Microsoft Press., Aug. 1994, pp. 176-182.
LG G Pad 8.3 Tablet Q Remote User, Available at: <https://mushroomprincess.tistory.com/1320>, Dec. 26, 2013, 37 pages (20 pages of English Translation and 17 pages of Official Copy).
Microsoft Windows 3.1, available at: http://www.guidebookgallery.org/screenshots/win31, 1992, pp. 1-31.
Minutes of Oral Hearing received for German Patent Application No. 102015208532.5, mailed on Dec. 13, 2019, 21 pages (3 pages of English Translation and 18 pages of Official Copy).
Minutes of the Oral Proceedings received for European Patent Application No. 19729395.4, mailed on Jul. 21, 2021, 6 pages.
Moth D., "Share Code—Write Code Once for Both Mobile and Desktop Apps", MSDN Magazine, http://msdn.microsoft.com/en-us/magazine/cc163387.aspx, retrieved on Apr. 20, 2011, Jul. 2007, 11 pages.
Mr Analytical, "Samsung Gear S3 App Launcher Widget—App Review", Available Online at <https://www.youtube.com/watch?v=HEfTv17peik>, Dec. 26, 2016, 5 pages.
Non-Final Office Action received for U.S. Appl. No. 16/035,422, mailed on Nov. 30, 2018, 13 pages.
Non-Final Office Action received for U.S. Appl. No. 17/157,166, mailed on Jul. 9, 2021, 12 pages.
Non-Final Office Action received for U.S. Appl. No. 10/179,775, mailed on Aug. 14, 2014, 13 pages.
Non-Final Office Action received for U.S. Appl. No. 10/179,775, mailed on Dec. 23, 2009, 13 pages.

(56) References Cited

OTHER PUBLICATIONS

Non-Final Office Action received for U.S. Appl. No. 10/179,775, mailed on Dec. 23, 2015, 14 pages.
Non-Final Office Action received for U.S. Appl. No. 10/179,775, mailed on Jan. 22, 2009, 11 pages.
Non-Final Office Action received for U.S. Appl. No. 10/179,775, mailed on Jul. 2, 2007, 12 pages.
Non-Final Office Action received for U.S. Appl. No. 10/179,775, mailed on Mar. 14, 2008, 11 pages.
Non-Final Office Action received for U.S. Appl. No. 10/179,775, mailed on Mar. 28, 2013, 11 pages.
Non-Final Office Action received for U.S. Appl. No. 10/179,775, mailed on Oct. 12, 2005, 16 pages.
Non-Final Office Action received for U.S. Appl. No. 12/789,426, mailed on Apr. 4, 2013, 8 pages.
Non-Final Office Action received for U.S. Appl. No. 12/789,436, mailed on Jun. 25, 2012, 23 pages.
Non-Final Office Action received for U.S. Appl. No. 12/843,814, mailed on Apr. 27, 2012, 26 pages.
Non-Final Office Action received for U.S. Appl. No. 12/843,814, mailed on May 28, 2013, 17 pages.
Non-Final Office Action received for U.S. Appl. No. 12/843,814, mailed on Oct. 8, 2014, 14 pages.
Non-Final Office Action received for U.S. Appl. No. 12/890,472, mailed on Jul. 5, 2012, 9 pages.
Non-Final Office Action received for U.S. Appl. No. 12/890,482, mailed on Sep. 27, 2012, 11 pages.
Non-Final Office Action received for U.S. Appl. No. 12/890,489, mailed on Nov. 6, 2014, 22 pages.
Non-Final Office Action received for U.S. Appl. No. 12/890,489, mailed on Nov. 30, 2012, 8 pages.
Non-Final Office Action received for U.S. Appl. No. 12/890,499, mailed on Apr. 6, 2015, 14 pages.
Non-Final Office Action received for U.S. Appl. No. 12/890,499, mailed on Nov. 1, 2016, 16 pages.
Non-Final Office Action received for U.S. Appl. No. 12/890,499, mailed on Nov. 26, 2012, 12 pages.
Non-Final Office Action received for U.S. Appl. No. 12/890,499, mailed on Sep. 11, 2014, 11 pages.
Non-Final Office Action received for U.S. Appl. No. 13/077,850, mailed on Mar. 28, 2013, 15 pages.
Non-Final Office Action received for U.S. Appl. No. 13/077,850, mailed on Sep. 10, 2015, 14 pages.
Non-Final Office Action received for U.S. Appl. No. 13/077,855, mailed on Aug. 13, 2015, 13 pages.
Non-Final Office Action received for U.S. Appl. No. 13/077,855, mailed on Mar. 28, 2013, 15 pages.
Non-Final Office Action received for U.S. Appl. No. 13/077,862, mailed on Dec. 29, 2014, 11 pages.
Non-Final Office Action received for U.S. Appl. No. 13/077,862, mailed on Jul. 17, 2020, 20 pages.
Non-Final Office Action received for U.S. Appl. No. 13/077,862, mailed on Mar. 15, 2013, 10 pages.
Non-Final Office Action received for U.S. Appl. No. 13/077,862, mailed on Nov. 21, 2019, 18 pages.
Non-Final Office Action received for U.S. Appl. No. 13/077,867, mailed on Dec. 21, 2012, 9 pages.
Non-Final Office Action received for U.S. Appl. No. 13/077,867, mailed on Jul. 20, 2012, 10 pages.
Non-Final Office Action received for U.S. Appl. No. 13/077,874, mailed on Jun. 19, 2014, 15 pages.
Non-Final Office Action received for U.S. Appl. No. 13/333,909, mailed on Mar. 19, 2013, 18 pages.
Non-Final Office Action received for U.S. Appl. No. 14/456,852, mailed on Jul. 1, 2015, 19 pages.
Non-Final Office Action received for U.S. Appl. No. 14/641,289, mailed on Jul. 16, 2015, 31 pages.
Non-Final Office Action received for U.S. Appl. No. 14/641,289, mailed on Mar. 11, 2016, 26 pages.
Non-Final Office Action received for U.S. Appl. No. 14/641,298, mailed on Mar. 6, 2017, 26 pages.
Non-Final Office Action received for U.S. Appl. No. 14/641,298, mailed on Nov. 29, 2019, 47 pages.
Non-Final Office Action received for U.S. Appl. No. 14/641,298, mailed on Sep. 19, 2018, 41 pages.
Non-Final Office Action received for U.S. Appl. No. 14/641,304, mailed on Feb. 27, 2019, 18 pages.
Non-Final Office Action received for U.S. Appl. No. 14/641,304, mailed on Mar. 4, 2020, 21 pages.
Non-Final Office Action received for U.S. Appl. No. 14/641,304, mailed on Sep. 11, 2017, 18 pages.
Non-Final Office Action received for U.S. Appl. No. 15/608,866, mailed on Nov. 2, 2018, 46 pages.
Non-Final Office Action received for U.S. Appl. No. 15/784,806, mailed on Apr. 30, 2021, 42 pages.
Non-Final Office Action received for U.S. Appl. No. 15/784,806, mailed on Jan. 4, 2019, 27 pages.
Non-Final Office Action received for U.S. Appl. No. 15/784,806, mailed on Mar. 13, 2020, 36 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/383,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/790,619, mailed on May 4, 2020, 13 pages.
Non-Final Office Action received for U.S. Appl. No. 16/799,481, mailed on May 1, 2020, 13 pages.
Non-Final Office Action received for U.S. Appl. No. 16/859,101, mailed on Aug. 5, 2021, 19 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Non-Final Office Action received for U.S. Appl. No. 17/476,404, mailed on Feb. 8, 2022, 26 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Non-Final Office Action received for U.S. Appl. No. 17/483,679, mailed on Feb. 1, 2022, 19 pages.
Non-Final Office Action received for U.S. Appl. No. 17/484,899, mailed on Jan. 24, 2022, 24 pages.
Non-Final Office Action received for U.S. Appl. No. 13/077,874, mailed on Dec. 3, 2015, 23 pages.
Non-Final Office Action received for U.S. Appl. No. 14/253,494, mailed on Dec. 30, 2015, 14 pages.
Notice of Acceptance received for Australian Patent Application No. 2010339636, mailed on Jul. 3, 2014, 2 pages.
Notice of Acceptance received for Australian Patent Application No. 2010339698, mailed on Dec. 8, 2014, 2 pages.
Notice of Acceptance received for Australian Patent Application No. 2012209199, mailed on Jan. 27, 2016, 3 pages.
Notice of Acceptance received for Australian Patent Application No. 2015201884, mailed on Oct. 4, 2016, 3 pages.
Notice of Acceptance received for Australian Patent Application No. 2019266225, mailed on Dec. 23, 2020, 3 pages.
Notice of Acceptance received for Australian Patent Application No. 2020239711, mailed on Dec. 16, 2021, 3 pages.
Notice of Acceptance received for Australian Patent Application No. 2021200789, mailed on Feb. 26, 2021, 3 pages.

(56) References Cited

OTHER PUBLICATIONS

Notice of Acceptance received for Australian Patent Application No. 2021203903, mailed on May 25, 2022, 3 pages.
Notice of Allowance received for Australian Patent Application No. 2016202837, mailed on Apr. 21, 2017, 3 pages.
Notice of Allowance received for Chinese Patent Application No. 201080063864.8, mailed on Jan. 15, 2016, 4 pages (2 pages of English Translation and 2 pages of Official Copy).
Notice of Allowance received for Chinese Patent Application No. 201080064125.0, mailed on Sep. 8, 2015, 3 pages (1 page of English Translation and 2 pages of Official Copy).
Notice of Allowance received for Chinese Patent Application No. 201280006317.5, mailed on Feb. 17, 2017, 2 pages (1 page of English Translation and 1 page of Official Copy).
Notice of Allowance received for Chinese Patent Application No. 201620051290.7, mailed on Jun. 22, 2016, 2 pages (Official Copy only) (See Communication under 37 CFR § 1.98(a) (3)).
Notice of Allowance received for Chinese Patent Application No. 201710240907.9, mailed on Nov. 25, 2019, 2 pages (1 page of English Translation and 1 page of Official Copy).
Notice of Allowance received for Chinese Patent Application No. 201780033771.2, mailed on Feb. 3, 2021, 2 pages (1 page of English Translation and 1 page of Official Copy).
Notice of Allowance received for Chinese Patent Application No. 201880056514.5, mailed on Jan. 11, 2021, 2 pages (1 page of English Translation and 1 page of Official Copy).
Notice of Allowance received for Chinese Patent Application No. 201910055588.3, mailed on Mar. 2, 2022, 2 pages (1 page of English Translation and 1 page of Official Copy).
Notice of Allowance received for Chinese Patent Application No. 201910400180.5, mailed on Nov. 5, 2020, 2 pages (1 page of English Translation and 1 page of Official Copy).
Notice of Allowance received for Chinese Patent Application No. 202011243876.0, mailed on Sep. 8, 2021, 4 pages (1 page of English Translation and 3 pages of Official Copy).
Notice of Allowance received for Chinese Patent Application No. 201520364847.8, mailed on Nov. 5, 2015, 9 pages (7 page of English Translation and 2 pages of Official Copy).
Notice of Allowance received for Japanese Patent Application No. 2015-095183, mailed on Apr. 21, 2017, 3 pages. (Official Copy Only) (See Communication under 37 CFR § 1.98(a) (3)).
Notice of Allowance received for Japanese Patent Application No. 2016-130565, mailed on Aug. 28, 2017, 3 pages (Official Copy Only) (See Communication under 37 CFR § 1.98(a) (3)).
Notice of Allowance received for Japanese Patent Application No. 2017-101107, mailed on Jun. 3, 2019, 5 pages (1 page of English Translation and 4 pages of Official Copy).
Notice of Allowance received for Japanese Patent Application No. 2018-183504, mailed on Sep. 27, 2019, 4 pages (1 page of English Translation and 3 pages of Official Copy).
Notice of Allowance received for Japanese Patent Application No. 2019-194597, mailed on Nov. 19, 2021, 4 pages (1 page of English Translation and 3 pages of Official Copy).
Notice of Allowance received for Korean Patent Application No. 10-2013-7022057, mailed on Apr. 27, 2015, 2 pages (Official Copy only) (See Communication under 37 CFR § 1.98(a) (3)).
Notice of Allowance received for Korean Patent Application No. 10-2014-7033660, mailed on Sep. 25, 2015, 3 pages (1 page of English Translation and 2 pages of Official Copy).
Notice of Allowance received for Korean Patent Application No. 10-2015-0072162, mailed on Dec. 27, 2017, 4 pages (2 pages of English Translation and 2 pages of Official Copy).
Notice of Allowance received for Korean Patent Application No. 10-2015-7013849, mailed on Mar. 28, 2016, 3 pages (1 page of English Translation and 2 pages of Official Copy).
Notice of Allowance received for Korean Patent Application No. 10-2016-7017508, mailed on Apr. 27, 2017, 3 pages (1 page of English translation and 2 pages of Official Copy).
Notice of Allowance received for Korean Patent Application No. 10-2018-0035949, mailed on Nov. 28, 2019, 3 pages (1 page of English Translation and 2 pages of Official Copy).
Notice of Allowance received for Korean Patent Application No. 10-2020-0024632, mailed on Jul. 26, 2021, 3 pages (1 page of English Translation and 2 pages of Official Copy).
Notice of Allowance received for Korean Patent Application No. 10-2020-7032110, mailed on Mar. 8, 2021, 4 pages (1 page of English Translation and 3 pages of Official Copy).
Notice of Allowance received for Korean Patent Application No. 10-2021-0143923, mailed on Jan. 27, 2022, 4 pages (1 page of English Translation and 3 pages of Official Copy).
Notice of Allowance Received for Taiwanese Patent Application No. 104117041, mailed on Feb. 24, 2017, 3 pages. (Official Copy Only) (See Communication under 37 CFR § 1.98(a) (3)).
Notice of Allowance received for Taiwanese Patent Application No. 106144804, mailed on Jun. 27, 2018, 6 pages (2 pages of English Translation and 4 pages of Official Copy).
Notice of Allowance received for Taiwanese Patent Application No. 104117042, mailed on Nov. 17, 2017, 5 pages (2 pages of English Translation and 3 pages of Official Copy).
Notice of Allowance received for U.S. Appl. No. 16/035,422, mailed on Apr. 10, 2019, 6 pages.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 17/157,166, mailed on Nov. 16, 2021, 6 pages.
Notice of Allowance received for U.S. Appl. No. 10/179,775, mailed on Aug. 24, 2017, 3 pages.
Notice of Allowance received for U.S. Appl. No. 10/179,775, mailed on Jul. 13, 2017, 11 pages.
Notice of Allowance received for U.S. Appl. No. 12/789,426, mailed on Feb. 20, 2014, 7 pages.
Notice of Allowance received for U.S. Appl. No. 12/789,436, mailed on Jan. 7, 2013, 9 pages.
Notice of Allowance received for U.S. Appl. No. 12/843,814, mailed on Jun. 22, 2016, 13 pages.
Notice of Allowance received for U.S. Appl. No. 12/890,482, mailed on May 8, 2014, 5 pages.
Notice of Allowance received for U.S. Appl. No. 12/890,489, mailed on Jul. 27, 2015, 8 pages.
Notice of Allowance received for U.S. Appl. No. 13/077,850, mailed on May 5, 2016, 15 pages.
Notice of Allowance received for U.S. Appl. No. 13/077,855, mailed on Jan. 30, 2017, 7 pages.
Notice of Allowance received for U.S. Appl. No. 13/077,862, mailed on Jun. 20, 2019, 9 pages.
Notice of Allowance received for U.S. Appl. No. 13/077,862, mailed on Sep. 20, 2019, 2 pages.
Notice of Allowance received for U.S. Appl. No. 13/077,867, mailed on Mar. 12, 2014, 7 pages.
Notice of Allowance received for U.S. Appl. No. 13/077,867, mailed on Sep. 18, 2013, 8 pages.
Notice of Allowance received for U.S. Appl. No. 13/077,874, mailed on Nov. 22, 2016, 13 pages.
Notice of Allowance received for U.S. Appl. No. 13/333,909, mailed on Mar. 31, 2014, 20 pages.
Notice of Allowance received for U.S. Appl. No. 14/253,494, mailed on Jan. 18, 2017, 4 pages.
Notice of Allowance received for U.S. Appl. No. 14/253,494, mailed on Oct. 4, 2016, 12 pages.
Notice of Allowance received for U.S. Appl. No. 14/456,852, mailed on Jul. 31, 2015, 8 pages.
Notice of Allowance received for U.S. Appl. No. 14/641,289, mailed on Aug. 24, 2017, 6 pages.
Notice of Allowance received for U.S. Appl. No. 14/641,298, mailed on Dec. 12, 2017, 5 pages.
Notice of Allowance received for U.S. Appl. No. 14/641,298, mailed on Nov. 29, 2021, 8 pages.
Notice of Allowance received for U.S. Appl. No. 14/641,304, mailed on Sep. 9, 2020, 15 pages.

(56) References Cited

OTHER PUBLICATIONS

Notice of Allowance received for U.S. Appl. No. 15/608,866, mailed on Feb. 28, 2020, 2 pages.
Notice of Allowance received for U.S. Appl. No. 16/109,552, mailed on Mar. 13, 2019, 25 pages.
Notice of Allowance received for U.S. Appl. No. 16/109,552, mailed on May 13, 2019, 2 pages.
Notice of Allowance received for U.S. Appl. No. 16/144,572, mailed on Feb. 28, 2019, 7 pages.
Notice of Allowance received for U.S. Appl. No. 16/147,432, mailed on Dec. 18, 2018, 13 pages.
Notice of Allowance received for U.S. Appl. No. 16/147,432, mailed on May 20, 2019, 6 pages.
Notice of Allowance received for U.S. Appl. No. 16/383,403, mailed on Jan. 10, 2020, 11 pages.
Notice of Allowance received for U.S. Appl. No. 16/511,578, mailed on Nov. 18, 2019, 12 pages.
Notice of Allowance received for U.S. Appl. No. 16/790,619, mailed on Sep. 8, 2020, 6 pages.
Notice of Allowance received for U.S. Appl. No. 16/799,481, mailed on Sep. 8, 2020, 6 pages.
Notice of Allowance received for U.S. Appl. No. 16/859,101, mailed on Jan. 18, 2022, 10 pages.
Notice of Allowance received for U.S. Appl. No. 17/026,818, mailed on May 13, 2021, 10 pages.
Notice of Allowance received for U.S. Appl. No. 17/027,373, mailed on Jun. 3, 2022, 8 pages.
Notice of Allowance received for U.S. Appl. No. 17/121,610, mailed on Mar. 11, 2022, 5 pages.
Notice of Allowance received for U.S. Appl. No. 17/157,166, mailed on Mar. 30, 2022, 6 pages.
Notice of Allowance received for U.S. Appl. No. 17/483,549, mailed on Apr. 15, 2022, 10 pages.
Notice of Allowance received for U.S. Appl. No. 17/483,582, mailed on Apr. 19, 2022, 5 pages.
Notice of Allowance received for U.S. Appl. No. 17/483,582, mailed on Jan. 20, 2022, 10 pages.
Notice of Allowance received for U.S. Appl. No. 15/608,866, mailed on Dec. 18, 2019, 9 pages.
Office Action received for Australian Patent Application No. 2015201884, mailed on Oct. 12, 2015, 4 pages.
Office Action received for Australian Patent Application No. 2010339636, mailed on Jun. 19, 2013, 3 pages.
Office Action Received for Australian Patent Application No. 2010339698, mailed on Aug. 8, 2014, 3 pages.
Office Action Received for Australian Patent Application No. 2010339698, mailed on Jun. 14, 2013, 3 pages.
Office Action received for Australian Patent Application No. 2012209199, mailed on Jan. 15, 2015, 3 pages.
Office Action received for Australian Patent Application No. 2015100490, mailed on Jun. 9, 2015, 6 pages.
Office Action received for Australian Patent Application No. 2015100490, mailed on Dec. 15, 2016, 2 pages.
Office Action received for Australian Patent Application No. 2016202837, mailed on Jan. 10, 2017, 2 pages.
Office Action received for Australian Patent Application No. 2016266010, mailed on Aug. 23, 2018, 4 pages.
Office Action received for Australian Patent Application No. 2016266010, mailed on May 4, 2018, 4 pages.
Office Action received for Australian Patent Application No. 2016266010, mailed on Nov. 28, 2018, 5 pages.
Office Action received for Australian Patent Application No. 2016266010, mailed on Nov. 30, 2017, 5 pages.
Office Action received for Australian Patent Application No. 2018271366, mailed on Feb. 25, 2020, 5 pages.
Office Action received for Australian Patent Application No. 2018271366, mailed on Jan. 19, 2021, 5 pages.
Office Action received for Australian Patent Application No. 2018271366, mailed on May 17, 2021, 5 pages.
Office Action received for Australian Patent Application No. 2018271366, mailed on Oct. 26, 2020, 5 pages.
Office Action received for Australian Patent Application No. 2019100499, mailed on Jun. 28, 2019, 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019266225, mailed on Nov. 23, 2020, 4 pages.
Office Action received for Australian Patent Application No. 2020239711, mailed on Sep. 13, 2021, 5 pages.
Office Action received for Australian Patent Application No. 2021201243, mailed on Feb. 17, 2022, 4 pages.
Office Action received for Australian Patent Application No. 2021201243, mailed on Jun. 1, 2022, 5 pages.
Office Action received for Australian Patent Application No. 2021203903, mailed on Feb. 24, 2022, 3 pages.
Office Action received for Chinese Patent Application No. 201080063864.8, mailed on Jul. 14, 2015, 8 pages (4 pages of English Translation & 4 pages of Official Copy).
Office Action received for Chinese Patent Application No. 201080063864.8, mailed on Sep. 2, 2014, 31 pages (17 pages of English Translation and 14 pages of Official Copy).
Office Action received for Chinese Patent Application No. 201080064125.0, mailed on Jun. 10, 2014, 8 pages (Official Copy only) (See Communication under 37 CFR § 1.98(a) (3)).
Office Action received for Chinese Patent Application No. 201080064125.0, mailed on Mar. 11, 2015, 7 pages (2 pages of English Translation and 5 pages of Official Copy).
Office Action Received for Chinese Patent Application No. 201280006317.5, mailed on Jan. 11, 2016, 10 pages (5 pages of English Translation and 5 pages of official Copy).
Office Action received for Chinese Patent Application No. 201280006317.5, mailed on Jul. 11, 2016, 6 pages (1 page of English Translation and 5 pages of Official Copy).
Office Action received for Chinese Patent Application No. 201510288981.9, mailed on Jul. 1, 2019, 16 pages (8 pages of English Translation and 8 pages of Official Copy).
Office Action received for Chinese Patent Application No. 201510288981.9, mailed on Jul. 3, 2018, 19 pages (8 pages of English Translation and 11 pages of Official Copy).
Office Action received for Chinese Patent Application No. 201510288981.9, mailed on Mar. 6, 2019, 20 pages (10 pages of English Translation and 10 pages of Official Copy).
Office Action received for Chinese Patent Application No. 201710240907.9, mailed on Jun. 5, 2019, 10 pages (5 pages of English Translation and 5 pages of Official Copy).
Office Action received for Chinese Patent Application No. 201780033771.2, mailed on Jul. 15, 2020, 18 pages (9 pages of English Translation and 9 pages of Official Copy).
Office Action received for Chinese Patent Application No. 201880056514.5, mailed on Sep. 2, 2020, 7 pages (1 page of English Translation and 6 pages of Official Copy).
Office Action received for Chinese Patent Application No. 201910055588.3, mailed on Nov. 24, 2021, 24 pages (14 pages of English Translation and 10 pages of Official Copy).
Office Action received for Chinese Patent Application No. 201910400179.2, mailed on Dec. 27, 2021, 32 pages (13 pages of English Translation and 19 pages of Official Copy).
Office Action received for Chinese Patent Application No. 201910400180.5, mailed on Jun. 1, 2020, 11 pages (5 pages of English Translation and 6 pages of Official Copy).
Office Action received for Chinese Patent Application No. 201910704856.X, mailed on Apr. 6, 2021, 13 pages (7 pages of English Translation and 6 pages of Official Copy).
Office Action received for Chinese Patent Application No. 201910704856.X, mailed on Dec. 9, 2020, 23 pages (13 pages of English Translation and 10 pages of Official Copy).
Office Action received for Chinese Patent Application No. 201910704856.X, mailed on May 27, 2020, 26 pages (14 pages of English Translation and 12 pages of Official Copy).

(56) References Cited

OTHER PUBLICATIONS

Office Action received for Chinese Patent Application No. 202010126661.4, mailed on Feb. 3, 2021, 16 pages (9 pages of English Translation and 7 pages of Official Copy).
Office Action received for Chinese Patent Application No. 202010126661.4, mailed on Mar. 4, 2022, 13 pages (8 pages of English Translation and 5 pages of Official Copy).
Office Action received for Chinese Patent Application No. 202011243876.0, mailed on Apr. 6, 2021, 11 pages (5 pages of English Translation and 6 pages of Official Copy).
Office Action received for Chinese Patent Application No. 202110327012.5, mailed on Apr. 29, 2022, 17 pages (10 pages of English Translation and 7 pages of Official Copy).
Office Action received for Chinese Patent Application No. 202110328597.2, mailed on Apr. 15, 2022, 18 pages (9 pages of English Translation and 9 pages of Official Copy).
Office Action received for Chinese Patent Application No. 202110328601.5, mailed on Apr. 27, 2022, 25 pages (14 pages of English Translation and 11 pages of Official Copy).
Office Action received for Chinese Patent Application No. 202110328602.X, mailed on Mar. 24, 2022, 6 pages (3 pages of English Translation and 3 pages of Official Copy).
Office Action received for Chinese Patent Application No. 202110409273.1, mailed on Jan. 11, 2022, 11 pages (6 pages of English Translation and 5 pages of Official Copy).
Office Action received for Danish Patent Application No. PA201570256, mailed on Jul. 7, 2015, 2 pages.
Office Action received for Danish Patent Application No. PA201570256, mailed on Mar. 17, 2016, 5 pages.
Office Action received for Danish Patent Application No. PA201570256, mailed on May 23, 2017, 3 pages.
Office Action received for Danish Patent Application No. PA201570256, mailed on Oct. 10, 2016, 3 pages.
Office Action received for Danish Patent Application No. PA201870362, mailed on Aug. 22, 2019, 4 pages.
Office Action received for Danish Patent Application No. PA201870362, mailed on Dec. 18, 2018, 2 pages.
Office Action received for Danish Patent Application No. PA201870363, mailed on Mar. 26, 2019, 3 pages.
Office Action received for Danish Patent Application No. PA201870364, mailed on Jan. 28, 2019, 8 pages.
Office Action received for Danish Patent Application No. PA201870364, mailed on Jun. 11, 2019, 11 pages.
Office Action received for Danish Patent Application No. PA202070617, mailed on Sep. 24, 2021, 4 pages.
Office Action received for European Patent Application No. 10799259.6, mailed on Jun. 1, 2015, 9 pages.
Office Action Received for European Patent Application No. 11150223.3, mailed on Mar. 29, 2012, 3 pages.
Office Action received for European Patent Application No. 13175232.1, mailed on Nov. 21, 2014, 5 pages.
Office Action received for European Patent Application No. 15713062.6, mailed on Dec. 6, 2017, 7 pages.
Office Action received for European Patent Application No. 15714698.6, mailed on Oct. 13, 2021, 2 pages.
Office Action received for European Patent Application No. 17810737.1, mailed on Jan. 20, 2021, 6 pages.
Office Action received for European Patent Application No. 18779093.6, mailed on Dec. 11, 2020, 4 pages.
Office Action received for European Patent Application No. 18779093.6, mailed on Mar. 17, 2022, 4 pages.
Office Action received for European Patent Application No. 19729395.4, mailed on Jul. 15, 2020, 4 pages.
Office Action received for European Patent Application No. 19729395.4, mailed on Sep. 29, 2020, 10 pages.
Office Action received for European Patent Application No. 20166552.8, mailed on Mar. 24, 2021, 8 pages.
Office Action received for European Patent Application No. 20205496.1, mailed on Nov. 10, 2021, 5 pages.
Office Action received for German Patent Application No. 102015208532.5, mailed on Apr. 1, 2019, 20 pages (10 pages of English Translation and 10 pages of Official Copy).
Office Action received for German Patent Application No. 102015208532.5, mailed on Apr. 21, 2020, 3 pages (1 page of English Translation and 2 pages of Official Copy).
Office Action received for German Patent Application No. 102015208532.5, mailed on Aug. 21, 2019, 15 pages (5 pages of English Translation and 10 pages of Official Copy).
Office Action received for Hong Kong Patent Application No. 151051633, mailed on Jun. 5, 2015, 11 pages (Official Copy Only) (See Communication under 37 CFR § 1.98(a) (3)).
Office Action received for Indian Patent Application No. 201814036860, mailed on Jul. 29, 2021, 8 pages.
Office Action received for Indian Patent Application No. 202014041529, mailed on Dec. 6, 2021, 6 pages.
Office Action received for Japanese Patent Application No. 2013-550664, mailed on Jun. 10, 2016, 3 pages (Official Copy only) (See Communication under 37 CFR § 1.98(a) (3)).
Office Action received for Japanese Patent Application No. 2013-262976, mailed on Feb. 20, 2015, 2 pages (Official Copy only) (See Communication under 37 CFR § 1.98(a) (3)).
Office Action received for Japanese Patent Application No. 2013-550664, mailed on Aug. 24, 2015, 9 pages (4 pages of English Translation and 5 pages of Official Copy).
Office Action received for Japanese Patent Application No. 2013-550664, mailed on Sep. 12, 2014, 10 pages (6 pages of English Translation and 4 pages of Official Copy).
Office Action received for Japanese Patent Application No. 2015-095183, mailed on Jun. 3, 2016, 13 pages (6 pages of English Translation and 7 pages of Official Copy).
Office Action received for Japanese Patent Application No. 2017-101107, mailed on Sep. 7, 2018, 14 pages (7 pages of English Translation and 7 pages of Official Copy).
Office Action received for Japanese Patent Application No. 2019-124728, mailed on Dec. 14, 2020, 4 pages (2 pages of English Translation and 2 pages of Official Copy).
Office Action received for Japanese Patent Application No. 2019-124728, mailed on Sep. 18, 2020, 6 pages (3 pages of English Translation and 3 pages of Official Copy).
Office Action received for Japanese Patent Application No. 2019-194597, mailed on Jan. 18, 2021, 10 pages (5 pages of English Translation and 5 pages of Official Copy).
Office Action received for Japanese Patent Application No. 2020-159840, mailed on Dec. 10, 2021, 13 pages (7 pages of English Translation and 6 pages of Official Copy).
Office Action received for Japanese Patent Application No. 2020-159840, mailed on Mar. 28, 2022, 6 pages (3 pages of English Translation and 3 pages of Official Copy).
Office Action received for Korean Patent Application No. 10-2012-7020548, mailed on Oct. 10, 2013, 5 pages (Official Copy only) (See Communication under 37 CFR § 1.98(a) (3)).
Office Action received for Korean Patent Application No. 10-2013-7022057, mailed on May 28, 2014, 7 pages (3 pages of English Translation and 4 pages of Official Copy).
Office Action received for Korean Patent Application No. 10-2014-7033660, mailed on Feb. 23, 2015, 3 pages (Official Copy only) (See Communication under 37 CFR § 1.98(a) (3)).
Office Action received for Korean Patent Application No. 10-2015-0072162, mailed on Apr. 20, 2016, 11 pages (6 pages of English Translation and 5 pages of Official Copy).
Office Action received for Korean Patent Application No. 10-2015-0072162, mailed on Feb. 27, 2017, 12 pages (6 pages of English Translation and 6 pages of Official Copy).
Office Action received for Korean Patent Application No. 10-2015-7013849, mailed on Aug. 20, 2015, 5 pages (2 pages of English Translation and 3 pages of Official Copy).
Office Action received for Korean Patent Application No. 10-2016-7017508, mailed on Oct. 20, 2016, 5 pages (2 pages of English Translation and 3 pages of Official Copy).
Office Action received for Korean Patent Application No. 10-2018-0035949, mailed on Apr. 24, 2019, 9 pages (4 pages of English Translation and 5 pages of Official Copy).

(56) References Cited

OTHER PUBLICATIONS

Office Action received for Korean Patent Application No. 10-2018-0035949, mailed on Dec. 24, 2018, 7 pages (3 pages of English Translation and 4 pages of Official Copy).
Office Action received for Korean Patent Application No. 10-2018-0035949, mailed on Jun. 20, 2018, 9 pages (4 pages of English Translation and 5 pages of Official Copy).
Office Action received for Korean Patent Application No. 10-2020-0024632, mailed on Dec. 29, 2020, 11 pages (5 pages of English Translation and 6 pages of Official Copy).
Office Action received for Korean Patent Application No. 10-2020-0024632, mailed on May 18, 2020, 11 pages (5 pages of English Translation and 6 pages of Official Copy).
Office Action received for Korean Patent Application No. 10-2020-7032110, mailed on Dec. 15, 2020, 6 pages (2 pages of English Translation and 4 pages of official Copy).
Office Action received for Korean Patent Application No. 10-2021-7017731, mailed on May 30, 2022, 5 pages (2 pages of English Translation and 3 pages of Official Copy).
Office Action Received for Taiwanese Patent Application No. 104117041, mailed on Aug. 22, 2016, 6 pages (3 pages of English Translation and 3 pages of Official Copy).
Office Action received for Taiwanese Patent Application No. 104117042, mailed on Apr. 20, 2017, 18 pages (7 pages of English Translation and 11 pages of Official Copy).
Office Action Report received for Australian Patent Application No. 2012209199, mailed on Dec. 17, 2015, 3 pages.
Pogue David, "Windows Vista for Starters: The Missing Manual", available at <http://academic.safaribooksonline.com/book/operating-systems/0596528264>, Jan. 25, 2007, 18 pages.
Q Pair, When I connected to LG G Pad 8.3 Q pair G Flex . . . -G Pad 8.3 review, Posting of a blog, Online Available at: <http://www.leaderyou.co.kr/2595>, Dec. 7, 2013, 28 pages (15 page of English Translation and 13 pages of Official Copy).
Qpair, online available at : http://mongri.net/entry/G-Pad-83-Qpair, Retrieved on Mar. 6, 2017, Dec. 20, 2013, 22 pages (10 pages of English translation and 12 pages of Official Copy).
Record of Oral Hearing received for U.S. Appl. No. 14/641,298, mailed on Oct. 8, 2021, 17 pages.
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870362, mailed on Sep. 7, 2018, 9 pages.
Search Report and Opinion received for Danish Patent Application No. PA201870363, mailed on Sep. 11, 2018, 12 pages.
Search Report and Opinion received for Danish Patent Application No. PA201870364, mailed on Sep. 4, 2018, 12 pages.
Search Report and Opinion received for Danish Patent Application No. PA202070617, mailed on Dec. 23, 2020, 8 pages.
Search Report received for Netherlands Patent Application No. 2014737, mailed on Oct. 29, 2015, 9 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Summons to Attend Oral Proceedings received for European Patent Application No. 10799259.6, mailed on Aug. 2, 2016, 16 pages.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Supplemental Notice of Allowance received for U.S. Appl. No. 15/608,866, mailed on Feb. 20, 2020, 2 pages.
Supplemental Notice of Allowance received for U.S. Appl. No. 16/859,101, mailed on Feb. 7, 2022, 2 pages.
Supplemental Notice of Allowance received for U.S. Appl. No. 16/859,101, mailed on Feb. 25, 2022, 2 pages.
Trish's World, "Samsung Gear S3 Apps Launcher", Available Online at <https://www.youtube.com/watch?v=zlamYA-4XSQ>, Feb. 5, 2017, 1 page.
Wolfe Joanna, "Annotation Technologies: A Software and Research Review", Computers and Composition, vol. 19, No. 4, 2002, pp. 471-497.
Written Opinion received for PCT Patent Application No. PCT/US95/11025, mailed on Oct. 4, 1996, 6 pages.
Ziegler Chris, "Palm® Pre.TM. for Dummies®", For Dummies, Oct. 19, 2009, 9 pages.
Applicant-Initiated Interview Summary received for U.S. Appl. No. 17/484,899, mailed on Feb. 14, 2024, 8 pages.
Decision to Grant received for European Patent Application No. 21728781.2, mailed on Feb. 8, 2024, 3 pages.
Notice of Allowance received for U.S. Appl. No. 17/684,843, mailed on Feb. 14, 2024, 8 pages.
Corrected Notice of Allowance received for U.S. Appl. No. 17/732,204, mailed on Jan. 18, 2024, 5 pages.
Office Action received for Australian Patent Application No. 2023204396, mailed on Jan. 8, 2024, 5 pages.
Applicant-Initiated Interview Summary received for U.S. Appl. No. 18/067,350, mailed on Sep. 11, 2023, 4 pages.
Corrected Notice of Allowance received for U.S. Appl. No. 17/732,204, mailed on Nov. 16, 2023, 6 pages.
Invitation to Pay Additional Fees and Partial International Search Report received for PCT Patent Application No. PCT/US2023/020569, mailed on Sep. 21, 2023, 14 pages.
Non-Final Office Action received for U.S. Appl. No. 18/067,350, mailed on Aug. 3, 2023, 41 pages.
Office Action received for Australian Patent Application No. 2023248185, mailed on Nov. 22, 2023, 2 pages.
Office Action received for Korean Patent Application No. 10-2023-0001668, mailed on Nov. 3, 2023, 5 pages (2 pages of English Translation and 3 pages of Official Copy).
Applicant-Initiated Interview Summary received for U.S. Appl. No. 17/484,899, mailed on Sep. 12, 2023, 6 pages.
Final Office Action received for U.S. Appl. No. 17/476,404, mailed on Sep. 12, 2023, 30 pages.
Non-Final Office Action received for U.S. Appl. No. 17/483,679, mailed on Sep. 13, 2023, 32 pages.
Notice of Allowance received for U.S. Appl. No. 17/476,404, mailed on Aug. 30, 2023, 4 pages.
Office Action received for Japanese Patent Application No. 2022-116534, mailed on Aug. 28, 2023, 10 pages (5 pages of English Translation and 5 pages of Offical Copy).
Avery et al., "Kinect", Wikipedia, Feb. 26, 2015, 14 pages.
Extended European Search Report received for European Patent Application No. 24160234.1, mailed on May 28, 2024, 6 pages.
Final Office Action received for U.S. Appl. No. 18/165,144, mailed on Jun. 11, 2024, 32 pages.
Notice of Acceptance received for Australian Patent Application No. 2024202768, mailed on Jun. 4, 2024, 3 pages.
Notice of Allowance received for U.S. Appl. No. 17/684,843, mailed on Jun. 5, 2024, 5 pages.
Office Action received for European Patent Application No. 22705232.1, mailed on May 27, 2024, 7 pages.
Office Action received for Japanese Patent Application No. 2023-571161, mailed on May 28, 2024, 4 pages (2 pages of English Translation and 2 pages of Official Copy).
Applicant-Initiated Interview Summary received for U.S. Appl. No. 17/476,404, mailed on Jun. 2, 2023, 2 pages.
Final Office Action received for U.S. Appl. No. 17/483,564, mailed on May 25, 2023, 26 pages.
Notice of Acceptance received for Australian Patent Application No. 2022201532, mailed on May 22, 2023, 3 pages.
Office Action received for Chinese Patent Application No. 202110328597.2, mailed on May 15, 2023, 13 pages (6 pages of English Translation and 7 pages of Official Copy).

(56) References Cited

OTHER PUBLICATIONS

Applicant-Initiated Interview Summary received for U.S. Appl. No. 17/732,355, mailed on Sep. 20, 2023, 2 pages.
Notice of Allowance received for U.S. Appl. No. 17/950,922, mailed on Sep. 20, 2023, 6 pages.
Notice of Hearing received for Indian Patent Application No. 201814036860, mailed on Sep. 8, 2023, 2 pages.
Intention to Grant received for European Patent Application No. 21728781.2, mailed on Jul. 28, 2023, 9 pages.
Non-Final Office Action received for U.S. Appl. No. 17/732,204, mailed on Aug. 4, 2023, 18 pages.
Non-Final Office Action received for U.S. Appl. No. 17/732,355, mailed on Aug. 4, 2023, 19 pages.
Non-Final Office Action received for U.S. Appl. No. 17/740,104, mailed on Aug. 2, 2023, 15 pages.
Office Action received for Chinese Patent Application No. 202110328597.2, mailed on Jul. 18, 2023, 16 pages (1 page of English Translation and 15 pages of Official Copy).
Office Action received for Chinese Patent Application No. 202110328602.X, mailed on Jun. 29, 2023, 27 pages (18 pages of English Translation and 9 pages of Official Copy).
That Guy Who Loves Metv, "Kinect Party Gameplay", Available online at: https://youtu.be/bkbOlzfyLzc?si=QAAKh_V4aqY0iegL, Oct. 20, 2021, 2 pages.
Xbox, "Kinect Tips, Part 3: Gesture Controls", Available online at: https://youtu.be/VXhhE-196qQ?si=gLmHbp9jOm-w0fNW, May 7, 2014, 3 pages.
Applicant-Initiated Interview Summary received for U.S. Appl. No. 17/950,868, mailed on Sep. 10, 2024, 3 pages.
Corrected Notice of Allowance received for U.S. Appl. No. 17/903,946, mailed on Sep. 3, 2024, 2 pages.
Decision on Appeal received for U.S. Appl. No. 15/784,806, mailed on Sep. 4, 2024, 15 pages.
Decision to Grant received for Japanese Patent Application No. 2023-571312, mailed on Aug. 29, 2024, 3 pages (1 page of English Translation and 2 pages of Official Copy).
Decision to Grant received for Japanese Patent Application No. 2024-003876, mailed on Sep. 2, 2024, 3 pages (1 page of English Translation and 2 pages of Official Copy).
Final Office Action received for U.S. Appl. No. 17/950,868, mailed on Aug. 29, 2024, 13 pages.
International Search Report and Written Opinion received for PCT Patent Application No. PCT/US2024/017017, mailed on Aug. 2, 2024, 27 pages.
Non-Final Office Action received for U.S. Appl. No. 18/389,655, mailed on Aug. 23, 2024, 23 pages.
Notice of Allowance received for U.S. Appl. No. 17/484,899, mailed on Aug. 26, 2024, 21 pages.
Notice of Allowance received for U.S. Appl. No. 17/903,946, mailed on Aug. 27, 2024, 5 pages.
Office Action received for Chinese Patent Application No. 202410030102.1, mailed on Jul. 23, 2024, 18 pages (9 pages of English Translation and 9 pages of Official Copy).
Record of Oral Hearing received for U.S. Appl. No. 15/784,806, mailed on Aug. 28, 2024, 16 pages.
Applicant-Initiated Interview Summary received for U.S. Appl. No. 18/067,350, mailed on Jul. 29, 2024, 3 pages.
Extended European Search Report received for European Patent Application No. 24159026.4, mailed on Jul. 10, 2024, 9 pages.
Invitation to Pay Additional Fees received for PCT Patent Application No. PCT/US2024/017017, mailed on May 15, 2024, 3 pages.
Notice of Allowance received for Japanese Patent Application No. 2023-097196, mailed on Jul. 29, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Office Action received for Japanese Patent Application No. 2023-571312, mailed on Jul. 16, 2024, 4 pages (2 pages of English Translation and 2 pages of Official Copy).
Office Action received for Korean Patent Application No. 10-2024-7019962, mailed on Jul. 16, 2024, 6 pages (2 pages of English Translation and 4 pages of Official Copy).
Corrected Notice of Allowance received for U.S. Appl. No. 15/784,806, mailed on Jan. 17, 2025, 2 pages.
Extended European Search Report received for European Patent Application No. 24215184.3, mailed on Jan. 24, 2025, 11 pages.
Intention to Grant received for European Patent Application No. 24164409.5, mailed on Jan. 14, 2025, 8 pages.
Notice of Allowance received for Chinese Patent Application No. 202311831154.0, mailed on Jan. 17, 2025, 4 pages (1 page of English Translation and 3 pages of Official Copy).
Notice of Allowance received for U.S. Appl. No. 17/484,899, mailed on Jan. 16, 2025, 16 pages.
Notice of Allowance received for U.S. Appl. No. 18/140,449, mailed on Jan. 21, 2025, 10 pages.
Office Action received for Chinese Patent Application No. 202110894284.3, mailed on Jan. 10, 2025, 9 pages (4 pages of English Translation and 5 pages of Official Copy).
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Advisory Action received for U.S. Appl. No. 17/950.868, mailed on Sep. 24, 2024, 3 pages.
Advisory Action received for U.S. Appl. No. 17/970,417, mailed on Dec. 12, 2024, 7 pages.
Applicant-Initiated Interview Summary received for U.S. Appl. No. 14/263,889, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2018, 3 pages.
Applicant-Initiated Interview Summary received for U.S. Appl. No. 15/725,868, mailed on Nov. 20, 2024, 3 pages.
Applicant-Initiated Interview Summary received for U.S. Appl. No. 17/970,417, mailed on Nov. 4, 2024, 2 pages.
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Aug. 27, 2024, 2 pages.
Applicant-Initiated Interview Summary received for U.S. Appl. No. 18/140,449, mailed on Nov. 26, 2024, 2 pages.
Applicant-Initiated Interview Summary received for U.S. Appl. No. 18/165,144, mailed on Dec. 23, 2024, 4 pages.
Applicant-Initiated Interview Summary received for U.S. Appl. No. 18/389,655, mailed on Sep. 20, 2024, 6 pages.
Applicant-Initiated Interview Summary received for U.S. Appl. No. 18/422,571, mailed on Jan. 2, 2025, 2 pages.
Baudsich et al., "Back-of-device interaction allows creating very small touch devices", Chi 2009—Digital Life, New World:Conference Proceedings And Extended Abstracts; The 27th Annual Chi Conference On Human Factors In Computing Systems. Available online at <http://dx.doi.org/10.1145/1518701.1518995>. Apr. 9, 2009, pp. 1923-1932.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 16/666,073, mailed on Apr. 6, 2021, 3 pages.
Corrected Notice of Allowance received for U.S. Appl. No. 16/666,073, mailed on Apr. 26, 2021, 4 pages.
Corrected Notice of Allowance received for U.S. Appl. No. 16/666,073, mailed on Feb. 22, 2021, 3 pages.
Corrected Notice of Allowance received for U.S. Appl. No. 16/666,073, mailed on Mar. 11, 2021, 3 pages.
Corrected Notice of Allowance received for U.S. Appl. No. 17/684,843, mailed on Oct. 7, 2024, 2 pages.
Corrected Notice of Allowance received for U.S. Appl. No. 17/950,868, mailed on Nov. 27, 2024, 3 pages.

(56) References Cited

OTHER PUBLICATIONS

Corrected Notice of Allowance received for U.S. Appl. No. 18/138,348, mailed on Nov. 27, 2024, 2 pages.
Decision on Appeal received for Korean Patent Application No. 10-2020-7034959, mailed on Jul. 25, 2022, 28 pages (5 pages of English Translation and 23 pages of Official Copy).
Decision to Grant received for European Patent Application No. 10763539.3, mailed on Jul. 19, 2018, 3 pages.
Decision to Grant received for European Patent Application No. 18188433.9, mailed on Aug. 13, 2020, 3 pages.
Decision to Grant received for European Patent Application No. 22734711.9, mailed on Jan. 7, 2025, 2 pages.
Decision to Refuse received for Japanese Patent Application No. 2013-503731, mailed on Jun. 23, 2014, 4 pages (2 pages of English Translation and 2 pages of Official Copy).
Extended's Pre-Review Report received for Japanese Patent Application No. 2014-212867, mailed on Nov. 4, 2016, 5 pages (2 pages of English Translation and 3 pages of Official Copy).
Extended European Search Report received for European Patent Application No. 18188433.9, mailed on Oct. 29, 2018, 8 pages.
Final Office Action received for U.S. Appl. No. 12/794,766, mailed on Nov. 26, 2012, 23 pages.
Final Office Action received for U.S. Appl. No. 14/263,889, mailed on Jan. 4, 2016, 9 pages.
Final Office Action received for U.S. Appl. No. 15/725,868, mailed on Sep. 27, 2018, 25 pages.
Final Office Action received for U.S. Appl. No. 16/666,073, mailed on Apr. 17, 2020, 18 pages.
Final Office Action received for U.S. Appl. No. 17/332,829, mailed on Feb. 6, 2023, 19 pages.
Final Office Action received for U.S. Appl. No. 17/970,417, mailed on Sep. 18, 2024, 24 pages.
Final Office Action received for U.S. Appl. No. 18/067,350, mailed on Oct. 31, 2024, 44 pages.
Final Office Action received for U.S. Appl. No. 18/138,348, mailed on Oct. 18, 2024, 10 pages.
Final Office Action received for U.S. Appl. No. 18/140,449, mailed on Oct. 18, 2024, 11 pages.
Intention to Grant received for European Patent Application No. 10763539.3, mailed on Mar. 15, 2018, 6 pages.
Intention to Grant received for European Patent Application No. 18188433.9, mailed on Apr. 6, 2020, 9 pages.
Intention to Grant received for European Patent Application No. 21206800.1, mailed on Jan. 7, 2025, 9 pages.
Intention to Grant received for European Patent Application No. 22734711.9, mailed on Sep. 13, 2024, 7 pages.
Intention to Grant received for European Patent Application No. 24160234.1, mailed on Nov. 4, 2024, 9 pages.
International Preliminary Report on Patentability received for PCT Patent Application No. PCT/US2010/050311, mailed on Oct. 18, 2012, 11 pages.
International Preliminary Report on Patentability received for PCT Patent Application No. PCT/US2023/017280, mailed on Oct. 17, 2024, 15 pages.
International Preliminary Report on Patentability received for PCT Patent Application No. PCT/US2023/020569, mailed on Nov. 21, 2024, 16 pages.
International Preliminary Report on Patentability received for PCT Patent Application No. PCT/US2010/050311, mailed on Aug. 24, 2011, 15 pages.
International Preliminary Report on Patentability received for PCT Patent Application No. PCT/US2024/023231, mailed on Oct. 23, 2024, 24 pages.
Invitation to Pay Additional Fees and Partial International Search Report received for PCT Patent Application No. PCT/US2010/050311, mailed on Dec. 21, 2010, 6 pages.
Invitation to Pay Additional Fees and Partial International Search Report received for PCT Patent Application No. PCT/US2024/023231, mailed on Aug. 29, 2024, 17 pages.

Koyama, Kaori, "Mac Fan Macintosh Master Book Mac OS X v10.4 "Tiger" & iLife", '06 version, Mainichi Communications Inc. Nobuyuki Nakagawa, Jul. 9, 2007, 4 pages (Official Copy Only) {See Communication Under Rule 37 CFR § 1.98(a) (3)}.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Non-Final Office Action received for U.S. Appl. No. 14/263,889, mailed on Jul. 26, 2016, 11 pages.
Non-Final Office Action received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 16/666,073, mailed on Dec. 10, 2019, 16 pages.
Non-Final Office Action received for U.S. Appl. No. 17/332,829, mailed on Aug. 1, 2022, 17 pages.
Non-Final Office Action received for U.S. Appl. No. 18/140,449, mailed on May 24, 2024, 19 pages.
Non-Final Office Action received for U.S. Appl. No. 18/165,144, mailed on Sep. 11, 2024, 25 pages.
Non-Final Office Action received for U.S. Appl. No. 18/422,571, mailed on Sep. 26, 2024, 19 pages.
Non-Final Office Action received for U.S. Appl. No. 18/535,820, mailed on Sep. 25, 2024, 27 pages.
Notice of Acceptance received for Australian Patent Application No. 2010350749, mailed on Jan. 13, 2015, 3 pages.
Notice of Acceptance received for Australian Patent Application No. 2015201127, mailed on Feb. 14, 2017, 3 pages.
Notice of Allowance received for Brazilian Patent Application No. BR112012025746-3, mailed on Jul. 6, 2013, 3 pages (1 page of English Translation and 3 pages of Official Copy).
Notice of Allowance received for Chinese Patent Application No. 201010602653.9, mailed on Nov. 15, 2014, 2 pages (1 page of English Translation and 2 pages of Official Copy).
Notice of Allowance received for Chinese Patent Application No. 20101066000623.4, mailed on Aug. 11, 2014, 4 pages (1 page of English Translation and 3 pages of Official Copy).
Notice of Allowance received for Chinese Patent Application No. 201410575145.4, mailed on May 10, 2018, 2 pages (1 page of English Translation and 3 pages of Official Copy).
Notice of Allowance received for Chinese Patent Application No. 201910704856.X, mailed on Sep. 30, 2024, 4 pages (1 page of English Translation and 3 pages of Official Copy).
Notice of Allowance received for Japanese Patent Application No. 2014-212867, mailed on Mar. 30, 2018, 3 pages (1 page of English Translation and 2 pages of Official Copy).
Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2021-154573, mailed on Nov. 11, 2022, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Japanese Patent Application No. 2023-028786, mailed on Dec. 2, 2024, 4 pages (1 page of English Translation and 3 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2014-7005164, mailed on Dec. 21, 2014, 4 pages (1 page of English Translation and 3 pages of Official Copy).

(56) References Cited

OTHER PUBLICATIONS

Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2016-7014580, mailed on Dec. 17, 2019, 6 pages (2 pages of English Translation and 4 pages of Official Copy).
Notice of Allowance received for Korean Patent Application No. 10-2018-7036975, mailed on Sep. 18, 2019, 4 pages (2 pages of English Translation and 4 pages of Official Copy).
Notice of Allowance received for Korean Patent Application No. 10-2020-7002845, mailed on Sep. 24. 2020, 5 pages (1 page of English Translation and 4 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7018775, mailed on Sep. 30, 2024, 7 pages (2 pages of English Translation and 5 pages of Official Copy).
Notice of Allowance received for Korean Patent Application No. 10-2023-7040599, mailed on Oct. 18, 2024, 7 pages (2 pages of English Translation and 5 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020. 3 pages (1 page of English Translation and 2 pages of Official Copy).
Notice of Allowance received for Mexican Patent Application No. MX/a/2020/003290, mailed on Feb. 9, 2023, 4 pages (1 page of English Translation and 3 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance received for U.S. Appl. No. 12/794,766, mailed on Jan. 17, 2014, 6 pages.
Notice of Allowance received for U.S. Appl. No. 12/794,768, mailed on Mar. 22, 2013, 6 pages.
Notice of Allowance received for U.S. Appl. No. 14/263,889, mailed on Feb. 1, 2017, 10 pages.
Notice of Allowance received for U.S. Appl. No. 14/263,889, mailed on Jun. 16, 2017, 6 pages.
Notice of Allowance received for U.S. Appl. No. 15/725,868, mailed on Jun. 12, 2019, 9 pages.
Notice of Allowance received for U.S. Appl. No. 15/784,806, mailed on Jan. 2, 2025, 5 pages.
Notice of Allowance received for U.S. Appl. No. 15/784,806, mailed on Oct. 23, 2024, 5 pages.
Notice of Allowance received for U.S. Appl. No. 16/666,073, mailed on Jan. 21, 2021, 11 pages.
Notice of Allowance received for U.S. Appl. No. 17/483,679, mailed on Nov. 21, 2024, 8 pages.
Notice of Allowance received for U.S. Appl. No. 17/684,843 mailed on Sep. 17, 2024, 5 pages.
Notice of Allowance received for U.S. Appl. No. 17/950,868, mailed on Oct.23, 2024, 10 pages.
Notice of Allowance received for U.S. Appl. No. 18/138,348, mailed on Nov. 13, 2024, 10 pages.
Notice of Allowance received for U.S. Appl. No. 18/389,655, mailed on Nov. 27, 2024, 8 pages.
Notice of Hearing received for Indian Patent Application No. 202015013360, mailed on Dec. 26, 2024, 2 pages.
Office Action received for Australian Patent Application No. 2010350749, mailed on Oct. 16, 2013, 3 pages.
Office Action received for Australian Patent Application No. 2015201127, mailed on Mar. 21, 2016, 3 pages.
Office Action received for Australian Patent Application No. 2023201057, mailed on Dec. 19, 2024, 4 pages.
Office Action received for Australian Patent Application No. 2023201057, mailed on Oct. 24, 2024, 3 pages.
Office Action received for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).
Office Action received for Chinese Patent Application No. 201010602653.9, mailed on Dec. 9, 2013, 10 pages (6 pages of English Translation and 4 pages of Official Copy).
Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106600623.4, mailed on May 2, 2013, 27 pages (15 pages of English Translation and 12 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy).
Office Action received for Chinese Patent Application No. 202311835200.4, mailed on Aug. 29, 2024, 16 pages (7 pages of English Translation and 9 pages of Official Copy).
Office Action received for European Patent Application No. 10763539.3, mailed on Jun. 13, 2016, 5 pages.
Office Action received for European Patent Application No. 22705232.1, mailed on Sep. 26, 2024, 8 pages.
Office Action received for European Patent Application No. 22733778.9, mailed on Oct. 22, 2024, 6 pages.
Office Action received for European Patent Application No. 22792995.7, mailed on Oct. 15, 2024, 8 pages.
Notice of Allowance received for Japanese Patent Application No. 2013-503731, mailed on Mar. 3, 2014, 8 pages (2 pages of English Translation and 6 pages of Official Copy).
Notice of Allowance received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).

(56) References Cited

OTHER PUBLICATIONS

Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2022-197327, mailed on Mar. 1, 2024, 14 pages (7 pages of English Translation and 7 pages of Official Copy).
Office Action received for Japanese Patent Application No. 2023-028786, mailed on Aug. 23, 2024, 10 pages (5 pages of English Translation and 5 pages of Official Copy).
Office Action received for Japanese Patent Application No. 2023-572748, mailed on Jul. 29, 2024, 4 pages (2 pages of English Translation and 2 pages of Official Copy).
Office Action received for Japanese Patent Application No. 2024-146741, mailed on Nov. 25, 2024, 12 pages (6 pages of English Translation and 6 pages of Official Copy).
Office Action received for Korean Patent Application No. 10-2012-7028535, mailed on Nov. 26, 2013, 10 pages (4 pages of English Translation and 6 pages of Official Copy).
Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2022-7006973, mailed on May 19, 2022, 10 pages (4 pages of English Translation and 6 pages of Official Copy).
Office Action received for Korean Patent Application No. 10-2022-7006973, mailed on Nov. 24, 2022, 6 pages (3 pages of English Translation and 3 pages of Official Copy).
Office Action received for Korean Patent Application No. 10-2023-7005442, mailed on Jul. 25, 2023, 10 pages (4 pages of English Translation and 6 pages of Official Copy).
Office Action received for Korean Patent Application No. 10-2024-7019962, mailed on Sep. 25, 2024, 7 pages (2 pages of English Translation and 5 pages of Official Copy).
Office Action received for Mexican Patent Application No. MX/a/2014/004295, mailed on Aug. 21, 2014, 4 pages (2 pages of English Translation and 2 pages of Official Copy),.
Office Action received for Mexican Patent Application No. MX/a/2014/004295, mailed on Jan. 20, 2015, 4 pages (1 page of English Translation and 3 pages of Official Copy).
Office Action received for Mexican Patent Application No. MX/a/2015/010523, mailed on Jan. 26, 2016, 4 pages (2 pages of English Translation and 2 pages of Official Copy).
Office Action received for Mexican Patent Application No. MX/a/2016/012174, mailed on Apr. 10, 2019, 7 pages (4 pages of English Translation and 3 pages of Official Copy).
Office Action received for Mexican Patent Application No. MX/a/2016/012174, mailed on Aug. 8, 2019, 7 pages (2 pages of English Translation and 5 pages of Official Copy).
Office Action received for Mexican Patent Application No. MX/a/2020/003290, mailed on Nov. 11, 2022, 7 pages (2 pages of English Translation and 5 pages of Official Copy).
Office Action received for Mexican Patent Application No. MX/a/2020/003290. mailed on Oct. 26, 2022, 8 pages (3 pages of English Translation and 5 pages of Official Copy).
Office Action received for Mexican Patent Application No. MX/a/2023/005388, mailed on Dec. 15, 2023, 18 pages (9 pages of English Translation and 9 pages of Official Copy).
Office Action received for Mexican Patent Application No. MX/a/2023/005388, mailed on Jun. 2, 2023. 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Sharf et al., "SnapPaste:an interactive technique for easy mesh composition", The Visual Computer; International Journal Of Computer Graphics, Springer, Berlin, De, vol. 22. No. 9-11. Available Online at <http://dx.doi.org/10.1007/s00371-006-0068-5>, Aug. 25, 2006, pp. 835-844.
Supplemental Notice of Allowance received for U.S. Appl. No. 17/484,899, mailed on Oct. 29, 2024, 5 pages.
Supplemental Notice of Allowance received for U.S. Appl. No. 17/484,899, mailed on Sep. 30, 2024, 5 pages.
Final Office Action received for U.S. Appl. No. 18/380,116, mailed on Jan. 30, 2025, 17 pages.
Notice of Allowance received for U.S. Appl. No. 17/483,679, mailed on Jan. 29, 2025, 5 pages.
Office Action received for Japanese Patent Application No. 2023-572748, mailed on Nov. 21, 2024, 31 pages (28 pages of English Translation and 3 pages of Official Copy).

(56) References Cited

OTHER PUBLICATIONS

Supplemental Notice of Allowance received for U.S. Appl. No. 17/484,899, mailed on Feb. 3, 2025, 5 pages.
8-279998, JP, A, Cited by Japanese Patent Office in an Office in an Office Action for related Patent Application No. 2024-173274 on Jan. 6, 2025.
2010-206745, JP, A, Cited by Japanese Patent Office in an Office in an Office Action for related Patent Application No. 2024-173274 on Jan. 6, 2025.
Applicant-Initiated Interview Summary received for U.S. Appl. No. 18/499,848, mailed on Feb. 12, 2025, 2 pages.
Applicant-Initiated Interview Summary received for U.S. Appl. No. 18/499,848, mailed on Feb. 14, 2025, 3 pages.
Decision to Grant received for Japanese Patent Application No. 2024-173274, mailed on Feb. 10, 2025, 3 pages (1 page of English Translation and 2 pages of Official Copy).
Notice of Allowance received for U.S. Appl. No. 17/950,868, mailed on Feb. 12, 2025, 6 pages.
Office Action received for Japanese Patent Application No. 2024-173274, mailed on Jan. 6, 2025, 3 pages (2 pages of English Translation and 1 page of Official Copy).
Non-Final Office Action received for U.S. Appl. No. 18/499,848, mailed on Jan. 27, 2025, 18 pages.
Notice of Allowance received for U.S. Appl. No. 17/970,417, mailed on Feb. 5, 2025, 6 pages.
Office Action received for Australian Patent Application No. 2023201057, mailed on Jan. 28, 2025, 3 pages.
Office Action received for Chinese Patent Application No. 202311835200.4, mailed on Dec. 26, 2024, 11 pages (6 pages of English Translation and 5 pages of Official Copy).
Applicant-Initiated Interview Summary received for U.S. Appl. No. 18/165,144, mailed on Apr. 22, 2025, 2 pages.
Corrected Notice of Allowance received for U.S. Appl. No. 17/970,417, mailed on Feb. 20, 2025, 2 pages.
Corrected Notice of Allowance received for U.S. Appl. No. 18/138,348, mailed on Apr. 16, 2025, 2 pages.
Corrected Notice of Allowance received for U.S. Appl. No. 18/138,348, mailed on Mar. 26, 2025, 2 pages.
Corrected Notice of Allowance received for U.S. Appl. No. 18/389,655, mailed on Feb. 24, 2025, 2 pages.
Corrected Notice of Allowance received for U.S. Appl. No. 18/422,571, mailed on Apr. 3, 2025, 2 pages.
Final Office Action received for U.S. Appl. No. 18/165,144, mailed on Feb. 27, 2025, 37 pages.
Final Office Action received for U.S. Appl. No. 18/535,820, mailed on Feb. 27, 2025, 35 pages.
Intention to Grant received for European Patent Application No. 22792995.7, mailed on Feb. 17, 2025, 9 pages.
International Preliminary Report on Patentability received for PCT Patent Application No. PCT/US2023/032792, mailed on Apr. 3, 2025, 10 pages.
International Preliminary Report on Patentability received for PCT Patent Application No. PCT/US2023/032911, mailed on Apr. 3, 2025, 13 pages.
International Preliminary Report on Patentability received for PCT Patent Application No. PCT/US2023/033372, mailed on April. 3, 2025, 15 pages.
Final Office Action received for U.S. Appl. No. 18/067,350, mailed on Apr. 17, 2025, 49 pages.
Final Office Action received for U.S. Appl. No. 18/077,154, mailed on Apr. 10, 2025, 27 pages.
Notice of Allowance received for U.S. Appl. No. 18/138,348, mailed on Mar. 12, 2025, 10 pages.
Notice of Allowance received for U.S. Appl. No. 18/140,449, mailed on Mar. 26, 2025, 10 pages.
Notice of Allowance received for U.S. Appl. No. 18/422,571, mailed on Mar. 21, 2025, 10 pages.
Notice of Allowance received for U.S. Appl. No. 18/499,848, mailed on Apr. 2, 2025, 11 pages.
Office Action received for Chinese Patent Application No. 202110327012.5, mailed on Feb. 10, 2025, 22 pages (13 pages of English Translation and 9 pages of Official Copy).
Office Action received for Chinese Patent Application No. 202110409221.4, mailed on Mar. 12, 2025, 15 pages (8 pages of English Translation and 7 pages of Official Copy).
Office Action received for Chinese Patent Application No. 202311185909.4, mailed on Feb. 13, 2025, 16 pages (10 pages of English Translation and 6 pages of Official Copy).
Office Action received for Chinese Patent Application No. 202410030102.1, mailed on Jan. 22, 2025, 14 pages (8 pages of English Translation and 6 pages of Official Copy).
Office Action received for Chinese Patent Application No. 202410924550.6, mailed on Mar. 1, 2025, 12 pages (5 pages of English Translation and 7 pages of Official Copy).
Office Action received for Chinese Patent Application No. 202410924556.3, mailed on Feb. 28, 2025, 11 pages (5 pages of English Translation and 6 pages of Official Copy).
Office Action received for European Patent Application No. 22705232.1, mailed on Feb. 4, 2025, 10 pages.
Office Action received for European Patent Application No. 22729921.1, mailed on Mar. 13, 2025, 8 pages.
Office Action received for European Patent Application No. 2273778.9, mailed on Feb. 20, 2025, 4 pages.
Office Action received for European Patent Application No. 24160234.1, mailed on Feb. 20, 2025, 3 pages.
Office Action received for Japanese Patent Application No. 2024-146741, mailed on Mar. 28, 2025, 10 pages (5 pages of English Translation and 5 pages of Official Copy).
Office Action received for Korean Patent Application No. 10-2024-7043493, mailed on Mar. 19, 2025, 11 pages (4 pages of English Translation and 7 pages of Official Copy).
Pre-Appeal Review Report received for Japanese Patent Application No. 2023-572748, mailed on Apr. 1, 2025, 4 pages (2 pages of English Translation and 2 pages of Official Copy).
Result of Consultation received for European Patent Application No. 22705232.1, mailed on Mar. 26, 2025, 3 pages.
102609210, CN, A, Cited by Chinese Patent Office in an Office Action for related Patent Application No. 2022110409221.4, on Mar. 12, 2025.
103777842, CN, A, Cited by Chinese Patent Office in an Office Action for related Patent Application No. 2022110409221.4, on Mar. 12, 2025.
104423841, CN, A, Cited by Chinese Patent Office in an Office Action for related Patent Application No. 2022110409221.4, on Mar. 12, 2025.
106664389, CN, A, Cited by Chinese Patent Office in an Office Action for related Patent Application No. 202410924556.3, on Feb. 28, 2025.
111913630, CN, A, Cited by Chinese Patent Office in an Office Action for related Patent Application No. 2022110409221.4, on Mar. 12, 2025.
06-282405, JP, A, Cited by the Japanese Patent Office in an Office Action for related Patent Application No. 2024-146741, on Mar. 28, 2025.
10-2013-0090244, KR, A, Cited by the Korean Patent Office in an Office Action for related Patent Application No. 10-2024-7043493, on Mar. 19, 2025.
Board Decision received for Chinese Patent Application No. 201810375380.5, mailed on Jul. 6, 2022, 2 pages (1 page of English Translation and 1 page of Official Copy).
CNET, "Android Lollipop Lock-Screen Notification Tips", Available online at: https://www.youtube.com/watch?v=LZTxHBOwzIU, Nov. 13, 2014, 3 pages.
Decision on Appeal received for U.S. Appl. No. 16/136,178, mailed on Jun. 2, 2022, 10 pages.
Decision to Grant received for Danish Patent Application No. 201570874, mailed on Jan. 26, 2018, 2 pages.
Decision to Grant received for Danish Patent Application No. PA201570865, mailed on Mar. 19, 2018, 2 pages.
Decision to Grant received for Danish Patent Application No. PA201570867, mailed on Mar. 13, 2018, 2 pages.

(56) References Cited

OTHER PUBLICATIONS

Decision to Grant received for Danish Patent Application No. PA201570871, mailed on Mar. 19, 2018, 2 pages.
Decision to Grant received for European Patent Application No. 16728165.8, mailed on Sep. 12, 2019, 2 pages.
Decision to Grant received for European Patent Application No. 18196448.7, mailed on Aug. 6, 2020, 2 pages.
Decision to Grant received for European Patent Application No. 20193661.4, mailed on Sep. 7, 2023, 2 pages.
Extended European Search Report received for European Patent Application No. 18196448.7, mailed on Oct. 16, 2018, 9 pages.
Extended European Search Report received for European Patent Application No. 20193661.4, mailed on Feb. 2, 2021, 10 pages.
Final Office Action received for U.S. Appl. No. 15/835,366, mailed on Apr. 5, 2019, 17 pages.
Final Office Action received for U.S. Appl. No. 15/835,366, mailed on Oct. 21, 2019, 18 pages.
Final Office Action received for U.S. Appl. No. 15/835,382, mailed on Apr. 8, 2019, 20 pages.
Final Office Action received for U.S. Appl. No. 16/136,178, mailed on Jul. 10, 2020, 17 pages.
Final Office Action received for U.S. Appl. No. 18/127,535, mailed on Jul. 19, 2024, 26 pages.
Intention to Grant received for Danish Patent Application No. PA201570865, mailed on Jan. 3, 2018, 2 pages.
Intention to Grant received for Danish Patent Application No. PA201570867, mailed on Sep. 22, 2017, 2 pages.
Intention to Grant received for Danish Patent Application No. PA201570871, mailed on Jan. 15, 2018, 2 pages.
Intention to Grant received for Danish Patent Application No. PA201570874, mailed on Nov. 16, 2017, 2 pages.
Intention to Grant received for Danish Patent Application No. PA201570880, mailed on May 9, 2018, 2 pages.
Intention to Grant received for European Patent Application No. 16728165.8, mailed on Apr. 30, 2019, 7 pages.
Intention to Grant received for European Patent Application No. 18196448.7, mailed on Jun. 19, 2020, 7 pages.
International Preliminary Report on Patentability received for PCT/US2016/033528, mailed on Dec. 12, 2017, 30 pages.
International Search Report and Written Opinion received for PCT Patent Application No. PCT/US2016/033528, mailed on Feb. 6, 2017, 43 pages.
Non-Final Office Action received for U.S. Appl. No. 15/835,366, mailed on Feb. 6, 2020, 15 pages.
Non-Final Office Action received for U.S. Appl. No. 15/835,366, mailed on Jun. 26, 2019, 19 pages.
Non-Final Office Action received for U.S. Appl. No. 15/835,366, mailed on Nov. 16, 2018, 4 pages.
Non-Final Office Action received for U.S. Appl. No. 15/835,382, mailed on Nov. 29, 2018, 14 pages.
Non-Final Office Action received for U.S. Appl. No. 16/136,178, mailed on Jan. 6, 2020, 15 pages.
Non-Final Office Action received for U.S. Appl. No. 18/127,535, mailed on Dec. 20, 2023, 20 pages.
Notice of Acceptance received for Australian Patent Application No. 2016276028, mailed on Aug. 6, 2019, 3 pages.
Notice of Allowance received for Chinese Patent Application No. 201680026995.6, mailed on Mar. 18, 2020, 2 pages (1 page of English Translation and 1 page of Official Copy).
Notice of Allowance received for Chinese Patent Application No. 201810368058.X, mailed on Jul. 30, 2021, 2 pages (1 page of English Translation and 1 page of Official Copy).
Notice of Allowance received for Chinese Patent Application No. 201810375380.5, mailed on Jul. 25, 2022, 1 pages (1 page of English Translation and 1 page of Official Copy).
Notice of Allowance received for Chinese Patent Application No. 201810760112.5, mailed on Sep. 21, 2020, 4 pages (1 page of English Translation and 3 pages of Official Copy).
Notice of Allowance received for U.S. Appl. No. 15/835,366, mailed on Jul. 23, 2020, 10 pages.
Notice of Allowance received for U.S. Appl. No. 16/136,178, mailed on Dec. 5, 2022, 9 pages.
Notice of Allowance received for U.S. Appl. No. 16/136,178, mailed on Sep. 9, 2022, 8 pages.
Office Action received for Australian Patent Application No. 2016276028, mailed on Aug. 9, 2018, 4 pages.
Office Action received for Australian Patent Application No. 2016276028, mailed on May 13, 2019, 4 pages.
Office Action received for Australian Patent Application No. 2019257353, mailed on Sep. 7, 2020, 4 pages.
Office Action received for Chinese Patent Application No. 201680026995.6, mailed on Oct. 22, 2019, 15 pages (6 pages of English Translation and 9 pages of Official Copy).
Office Action received for Chinese Patent Application No. 201810368058.X, mailed on Mar. 20, 2020, 15 pages (7 pages of English Translation and 8 pages of Official Copy).
Office Action received for Chinese Patent Application No. 201810368058.X, mailed on May 8, 2021, 16 pages (3 pages of English Translation and 3 pages of Official Copy).
Office Action received for Chinese Patent Application No. 201810368058.X, mailed on Nov. 3, 2020, 16 pages (7 pages of English Translation and 9 pages of Official Copy).
Office Action received for Chinese Patent Application No. 201810375380.5, mailed on Apr. 2, 2022, 11 pages (6 pages of English Translation and 5 pages of Official Copy).
Office Action received for Chinese Patent Application No. 201810375380.5, mailed on Jan. 14, 2022, 16 pages (8 pages of English Translation and 8 pages of Official Copy).
Office Action received for Chinese Patent Application No. 201810375380.5, mailed on Mar. 3, 2020, 13 pages (6 pages of English Translation and 7 pages of Official Copy).
Office Action received for Chinese Patent Application No. 201810375380.5, mailed on Nov. 12, 2020, 16 pages (8 pages of English Translation and 8 pages of Official Copy).
Office Action received for Chinese Patent Application No. 201810375380.5, mailed on Sep. 15, 2021, 10 pages (5 pages of English Translation and 5 pages of Official Copy).
Office Action received for Chinese Patent Application No. 201810760112.5, mailed on Feb. 26, 2020, 11 pages (5 pages of English Translation and 6 pages of Official Copy).
Office Action received for Chinese Patent Application No. 201810760112.5, mailed on Jul. 21, 2020, 6 pages (3 pages of English Translation and 3 pages of Official Copy).
Office Action received for Danish Patent Application No. PA201570865, mailed on Mar. 8, 2017, 5 pages.
Office Action received for Danish Patent Application No. PA201570865, mailed on Oct. 10, 2017, 2 pages.
Office Action received for Danish Patent Application No. PA201570865, mailed on Sep. 2, 2017, 4 pages.
Office Action received for Danish Patent Application No. PA201570867, mailed on Feb. 21, 2017, 2 pages.
Office Action received for Danish Patent Application No. PA201570867, mailed on Sep. 7, 2016, 3 pages.
Office Action received for Danish Patent Application No. PA201570871, mailed on Jun. 12, 2017, 3 pages.
Office Action received for Danish Patent Application No. PA201570871, mailed on Oct. 18, 2016, 4 pages.
Office Action received for Danish Patent Application No. PA201570874, mailed on Aug. 31, 2016, 4 pages.
Office Action received for Danish Patent Application No. PA201570874, mailed on May 15, 2017, 4 pages.
Office Action received for Danish Patent Application No. PA201570880, mailed on Feb. 1, 2018, 2 pages.
Office Action received for Danish Patent Application No. PA201570880, mailed on Mar. 31, 5 pages.
Office Action received for Danish Patent Application No. PA201570880, mailed on Oct. 24, 2017, 4 pages.
Office Action received for Danish Patent Application No. PA201570880, mailed on Sep. 7, 2016, 3 pages.
Office Action received for European Patent Application No. 16728165.8, mailed on Aug. 29, 2018, 4 pages.
Office Action received for European Patent Application No. 18196448.7, mailed on Sep. 16, 2019, 4 pages.

(56) References Cited

OTHER PUBLICATIONS

Office Action received for European Patent Application No. 20193661.4, mailed on Sep. 13, 2021, 6 pages.
Search Report and Opinion received for Danish Patent Application No. PA201570865, mailed on Mar. 30, 2016, 6 pages.
Search Report and Opinion received for Danish Patent Application No. PA201570867, mailed on Apr. 1, 2016, 6 pages.
Search Report and Opinion received for Danish Patent Application No. PA201570871, mailed on Apr. 12, 2016, 7 pages.
Search Report and Opinion received for Danish Patent Application No. PA201570874, mailed on Mar. 30, 2016, 7 pages.
Search Report and Opinion received for Danish Patent Application No. PA201570880, mailed on Apr. 4, 2016, 6 pages.
Schulzrinne H, "Indication of Message Composition for Instant Messaging", Network Working Group, Columbia University, Jan. 2005, 14 pages.
Advisory Action received for U.S. Appl. No. 18/380,116, mailed on May 21, 2025, 4 pages.
Applicant-Initiated Interview Summary received for U.S. Appl. No. 18/077,154, mailed on Jul. 2, 2025, 2 pages.
Applicant-Initiated Interview Summary received for U.S. Appl. No. 18/242,363, mailed on Jun. 4, 2025, 3 pages.
Applicant-Initiated Interview Summary received for U.S. Appl. No. 18/367,977, mailed on Jul. 3, 2025, 5 pages.
Corrected Notice of Allowance received for U.S. Appl. No. 18/422,571, mailed on Jun. 17, 2025, 2 pages.
Corrected Notice of Allowance received for U.S. Appl. No. 18/422,571, mailed on May 30, 2025, 2 pages.
Corrected Notice of Allowance received for U.S. Appl. No. 18/499,848, mailed on May 19, 2025, 3 pages.
Decision to Grant received for European Patent Application No. 21206800.1, mailed on May 15, 2025, 2 pages.
Decision to Grant received for European Patent Application No. 24164409.5, mailed on May 22, 2025, 3 pages.
Examiner-Initiated Interview Summary received for U.S. Appl. No. 18/067,350, mailed on Jun. 26, 2025, 4 pages.
Intention to Grant received for European Patent Application No. 18779093.6, mailed on May 9, 2025, 9 pages.
Intention to Grant received for European Patent Application No. 20166552.8, mailed on Apr. 30, 2025, 9 pages.
Intention to Grant received for European Patent Application No. 22792995.7, mailed on Jun. 10, 2025, 9 pages.
Intention to Grant received for European Patent Application No. 24160234.1, mailed on Jun. 20, 2025, 9 pages.
International Search Report and Written Opinion received for PCT Patent Application No. PCT/US2024/053247, mailed on Jan. 28, 2025, 13 pages.
Non-Final Office Action received for U.S. Appl. No. 18/242,363, mailed on May 13, 2025, 29 pages.
Non-Final Office Action received for U.S. Appl. No. 18/367,977, mailed on May 29, 2025, 20 pages.
Notice of Allowance received for Chinese Patent Application No. 202110894284.3, mailed on May 13, 2025, 4 pages (1 page of English Translation and 3 pages of Official Copy).
Notice of Allowance received for Chinese Patent Application No. 202311185909.4, mailed on Apr. 30, 2025, 3 pages (2 pages of English Translation and 1 page of Official Copy).
Notice of Allowance received for Chinese Patent Application No. 202311753064.4, mailed on May 12, 2025, 6 pages (2 pages of English Translation and 4 pages of Official Copy).
Notice of Allowance received for U.S. Appl. No. 18/165,144, mailed on Jul. 2, 2025, 7 pages.
Notice of Allowance received for U.S. Appl. No. 18/499,848, mailed on Jun. 16, 2025, 7 pages.
Office Action received for Chinese Patent Application No. 202110327012.5, mailed on Mar. 31, 2025, 19 pages (1 page of English Translation and 18 pages of Official Copy).
Office Action received for Chinese Patent Application No. 202311835200.4, mailed on Apr. 29, 2025, 9 pages (5 pages of English Translation and 4 pages of Official Copy).
Office Action received for Chinese Patent Application No. 202410030102.1, mailed on Apr. 24, 2025, 11 pages (6 pages of English Translation and 5 pages of Official Copy).
Office Action received for European Patent Application No. 22733778.9, mailed on Jun. 20, 2025, 4 pages.
Office Action received for European Patent Application No. 23172038.4, mailed on May 22, 2025, 6 pages.
Office Action received for Indian Patent Application No. 202315041189, mailed on Jun. 26, 2025, 7 pages.
Office Action received for Japanese Patent Application No. 2024-146741, mailed on Jun. 20, 2025, 6 pages (3 pages of English Translation and 3 pages of Official Copy).
Office Action received for Korean Patent Application No. 10-2023-7039401, mailed on May 19, 2025, 7 pages (3 pages of English Translation and 4 pages of Official Copy).
Result of Consultation received for European Patent Application No. 22729921.1, mailed on Jun. 12, 2025, 3 pages.
Result of Consultation received for European Patent Application No. 22729921.1, mailed on Jun. 27, 2025, 3 pages.

\* cited by examiner

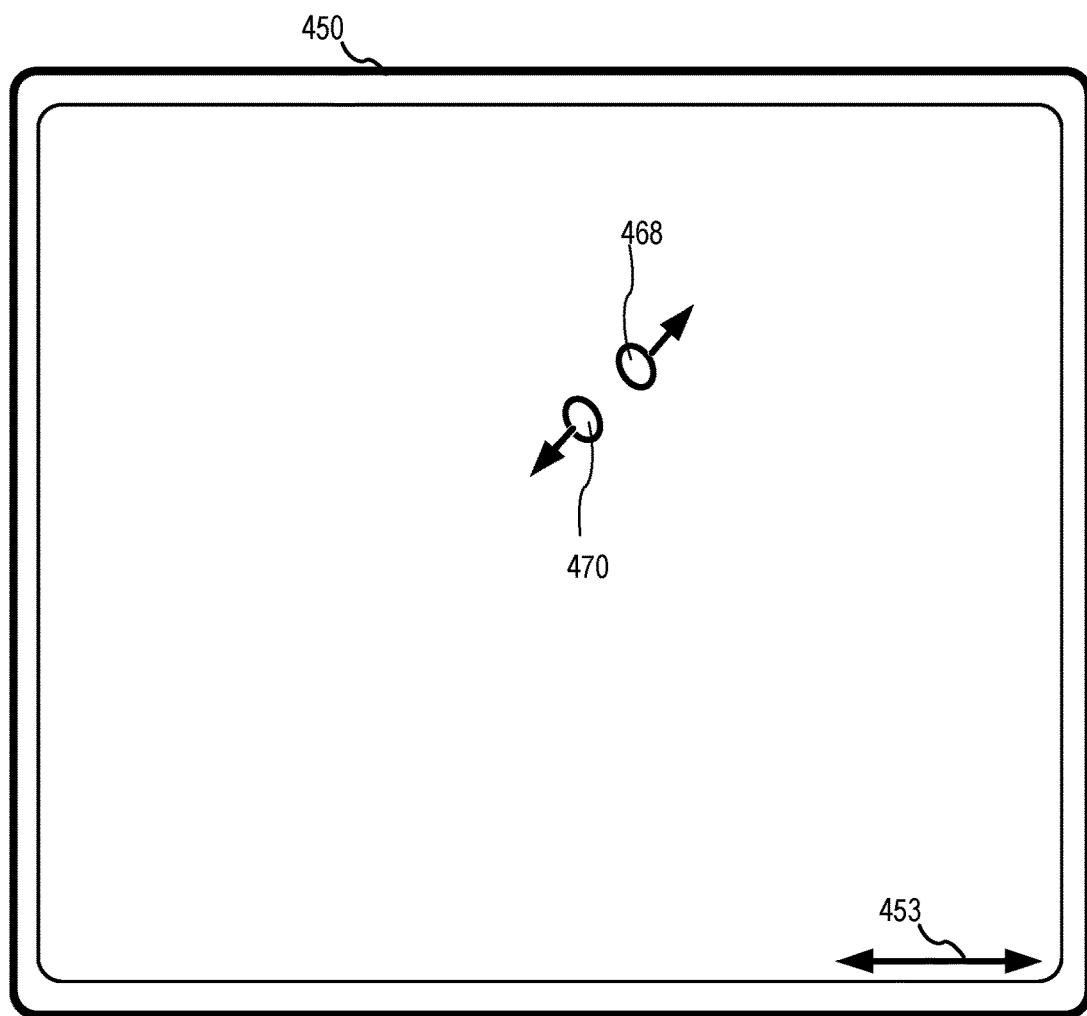
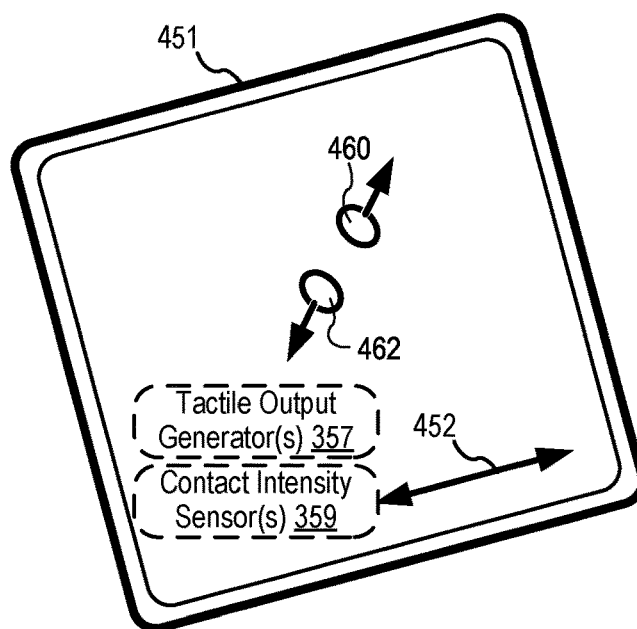
FIG. 4B

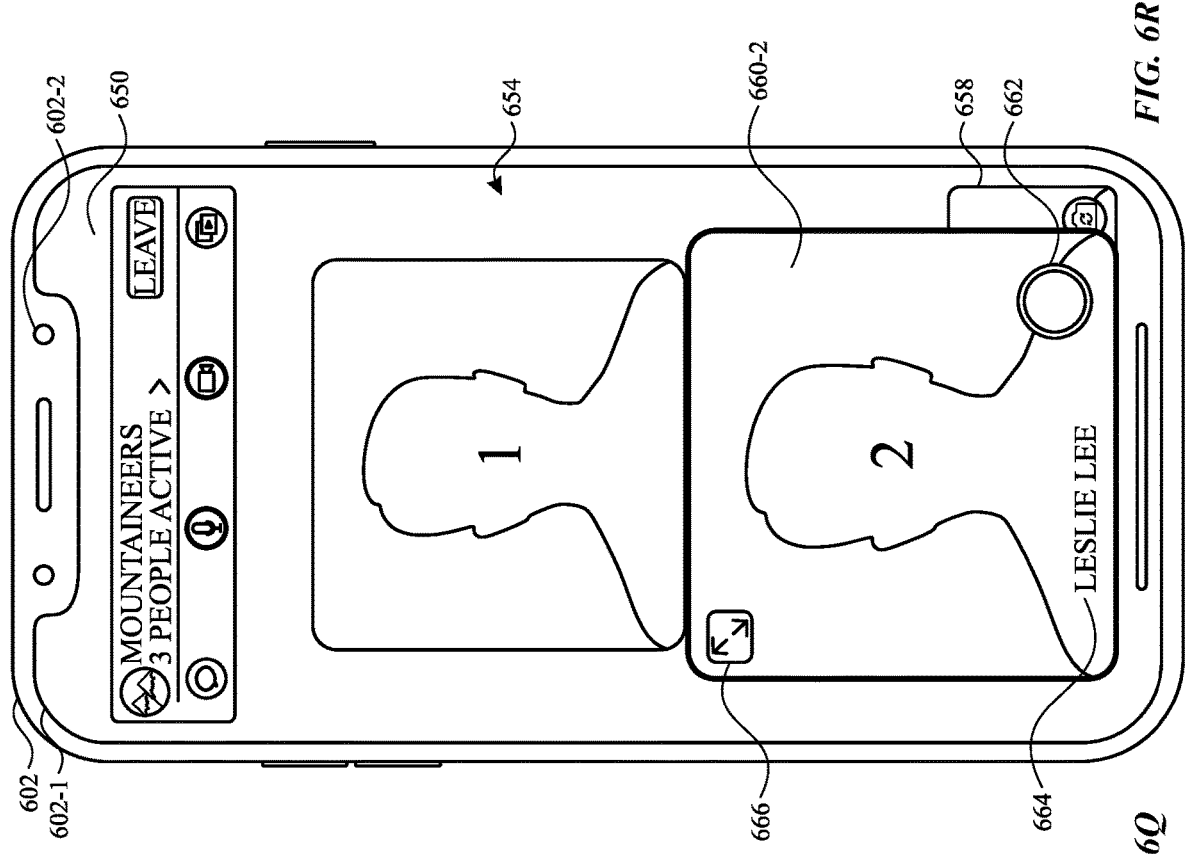
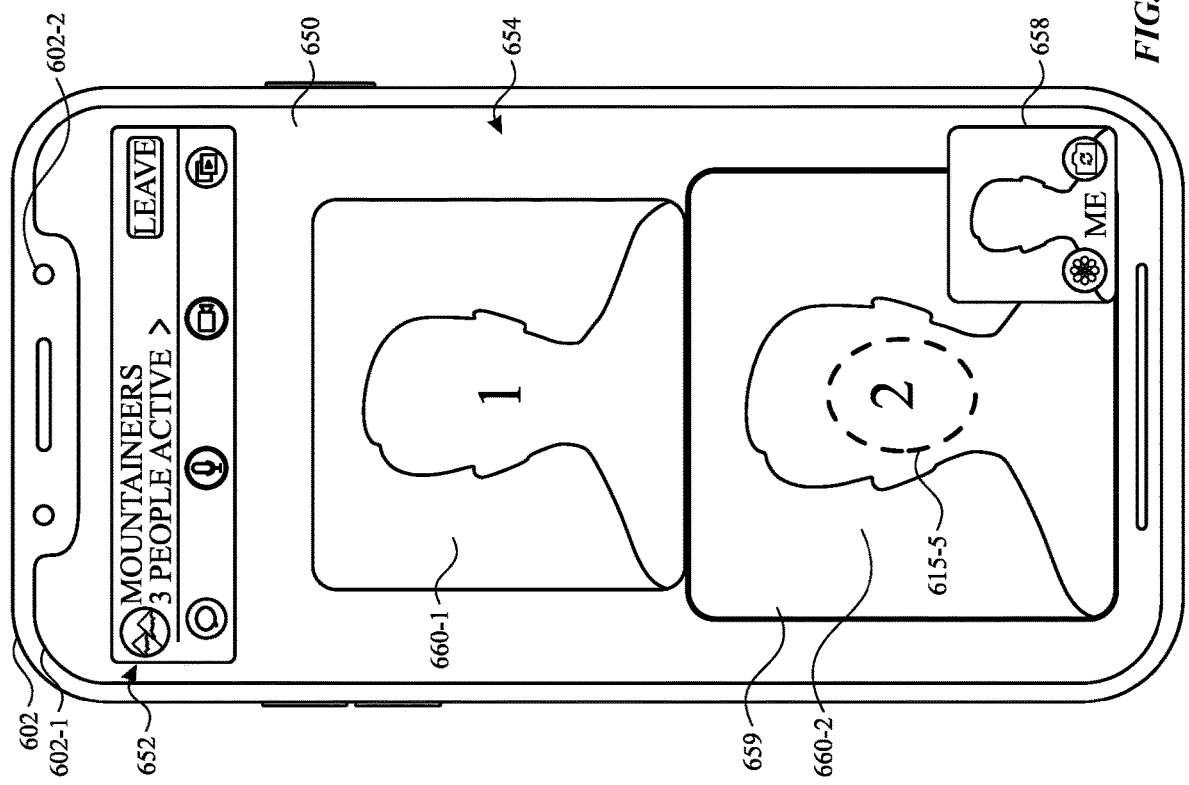
FIG. 6R
FIG. 6Q

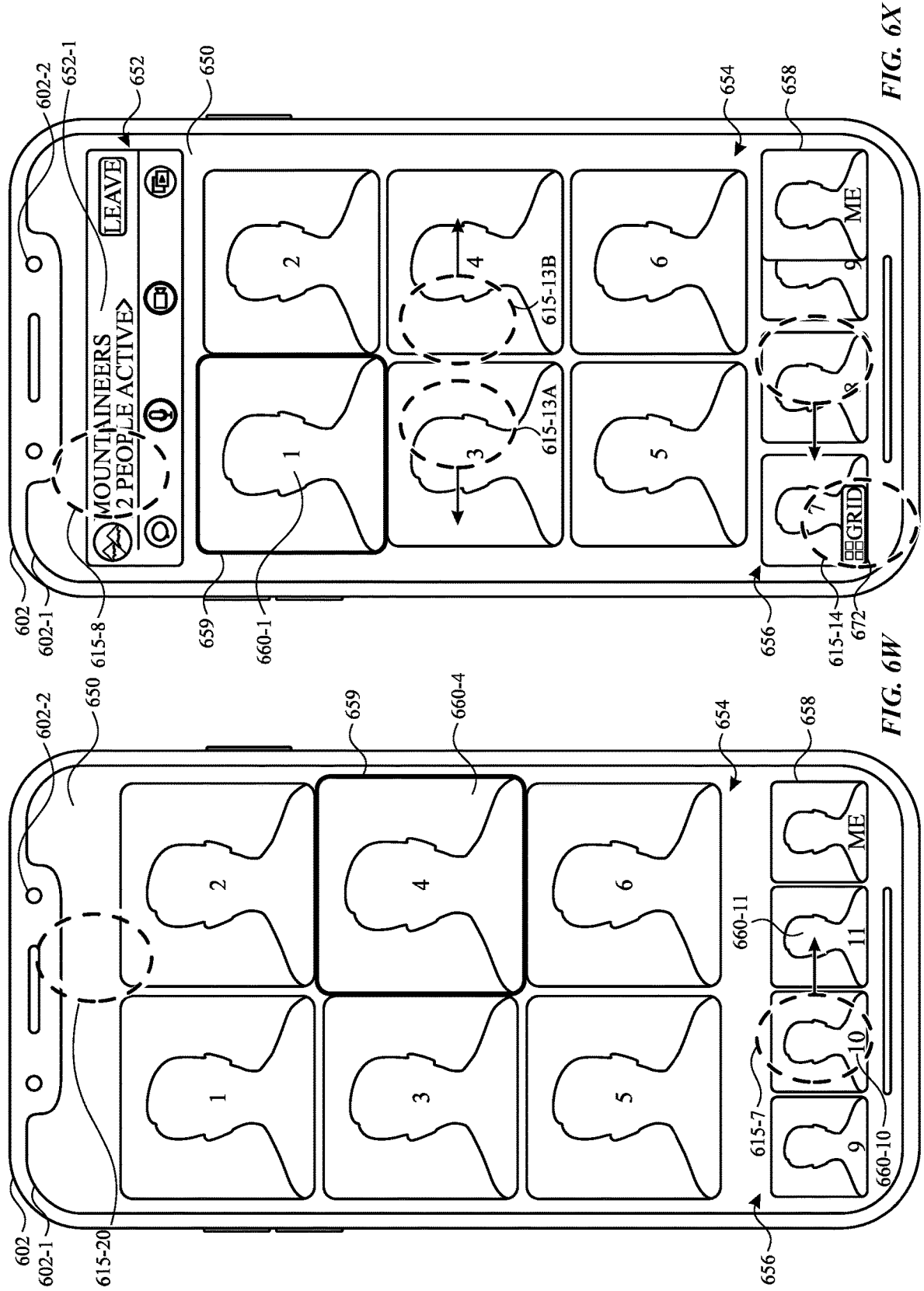

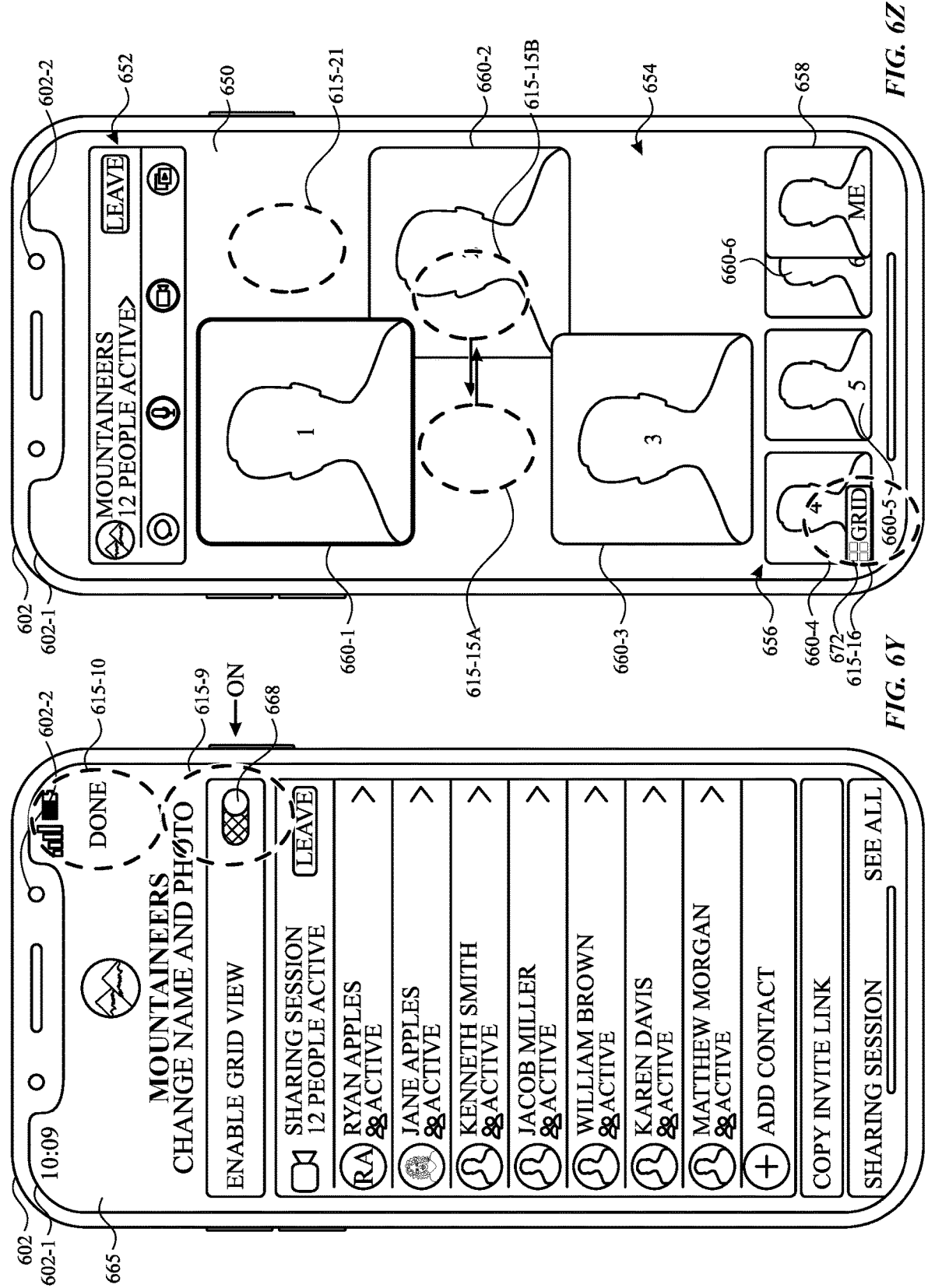

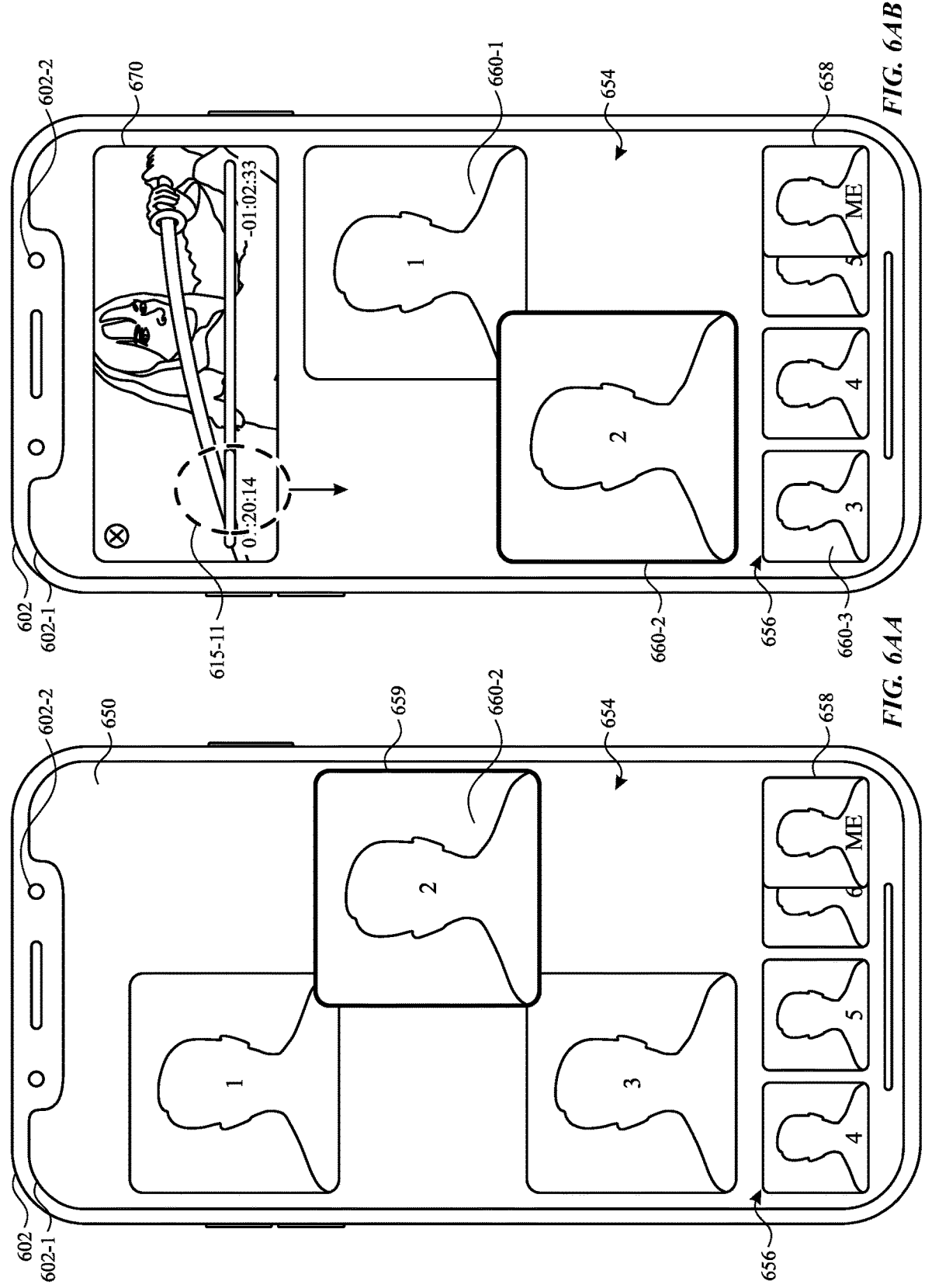

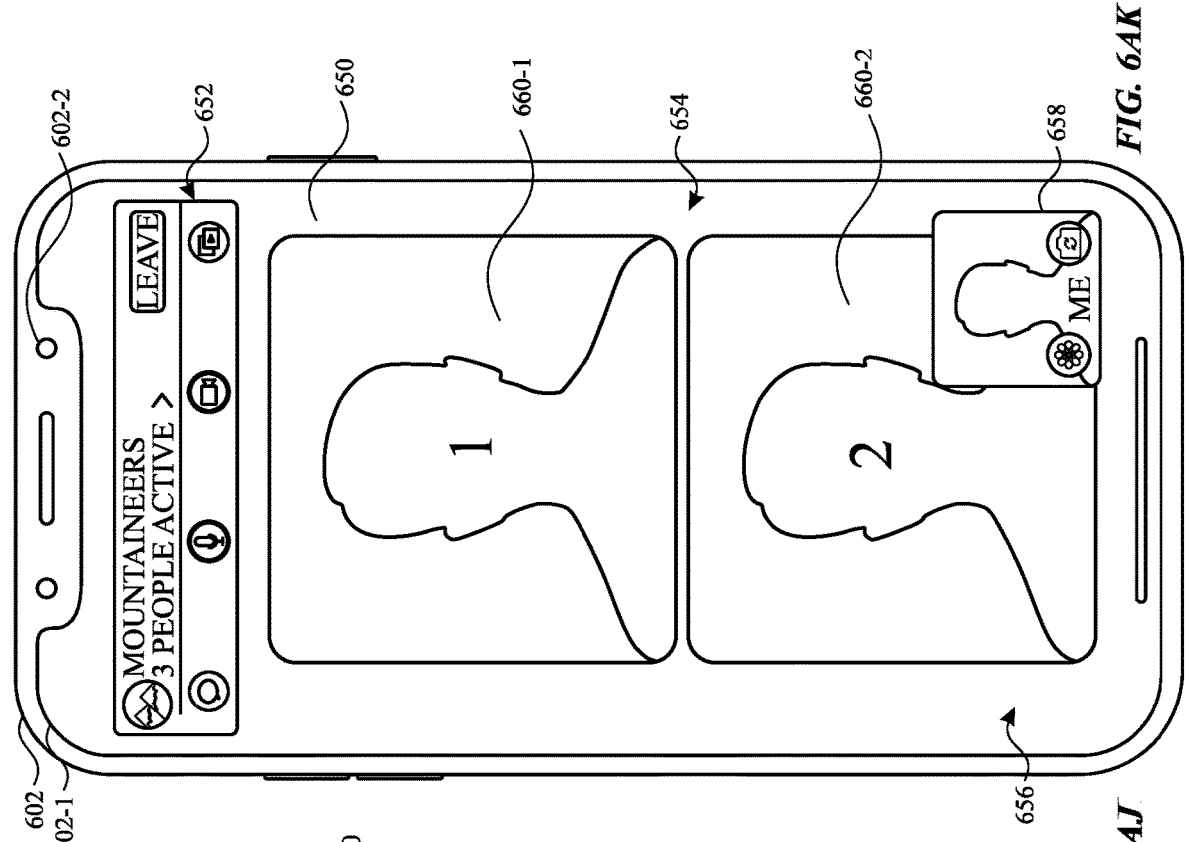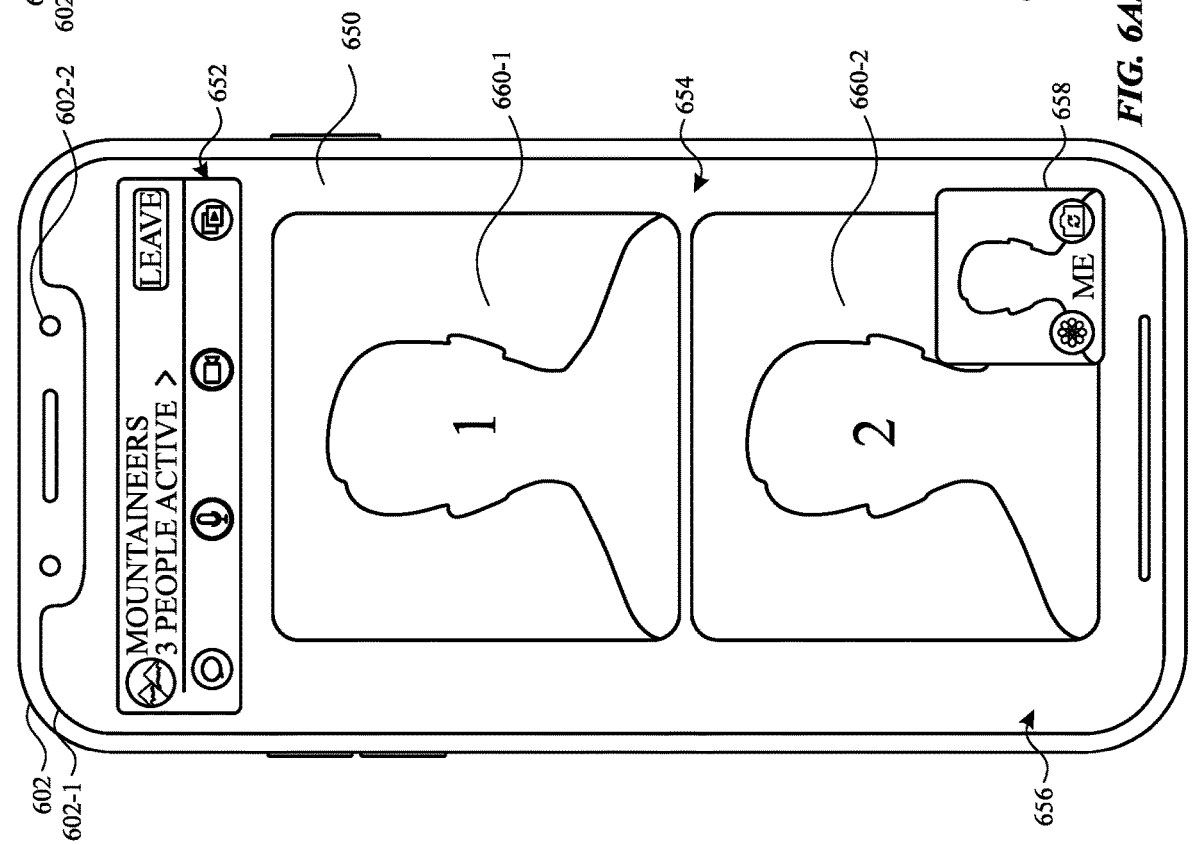

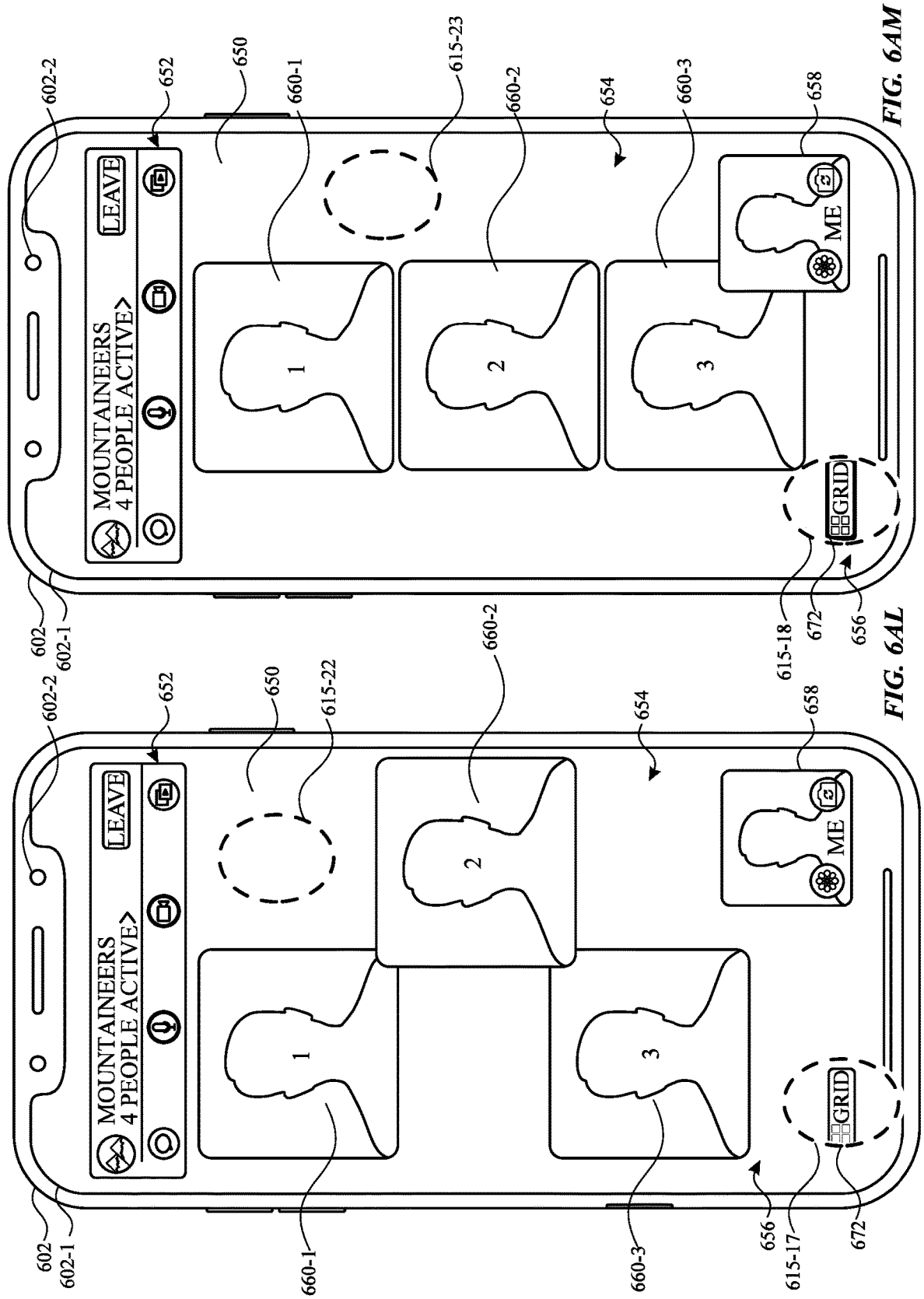

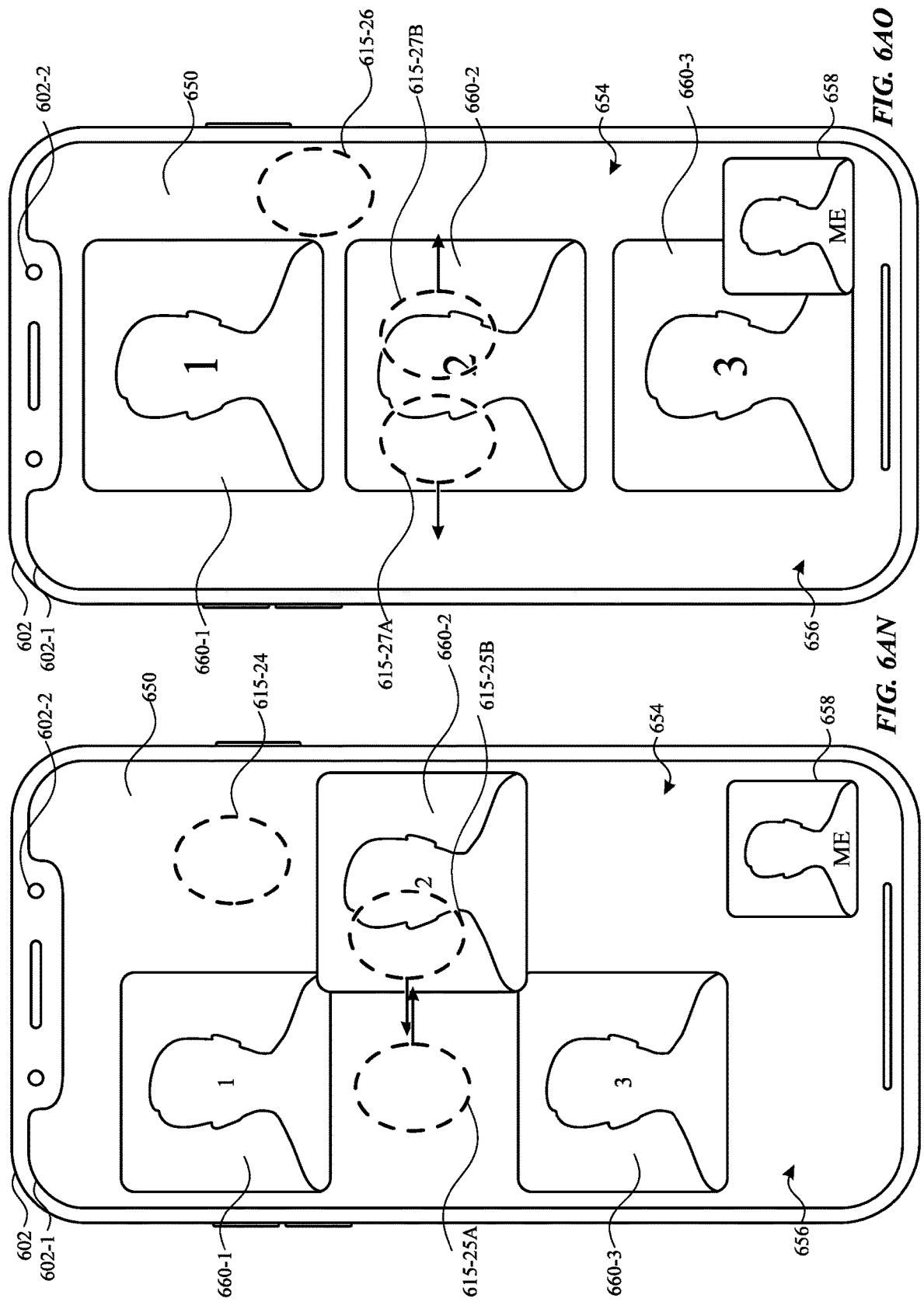

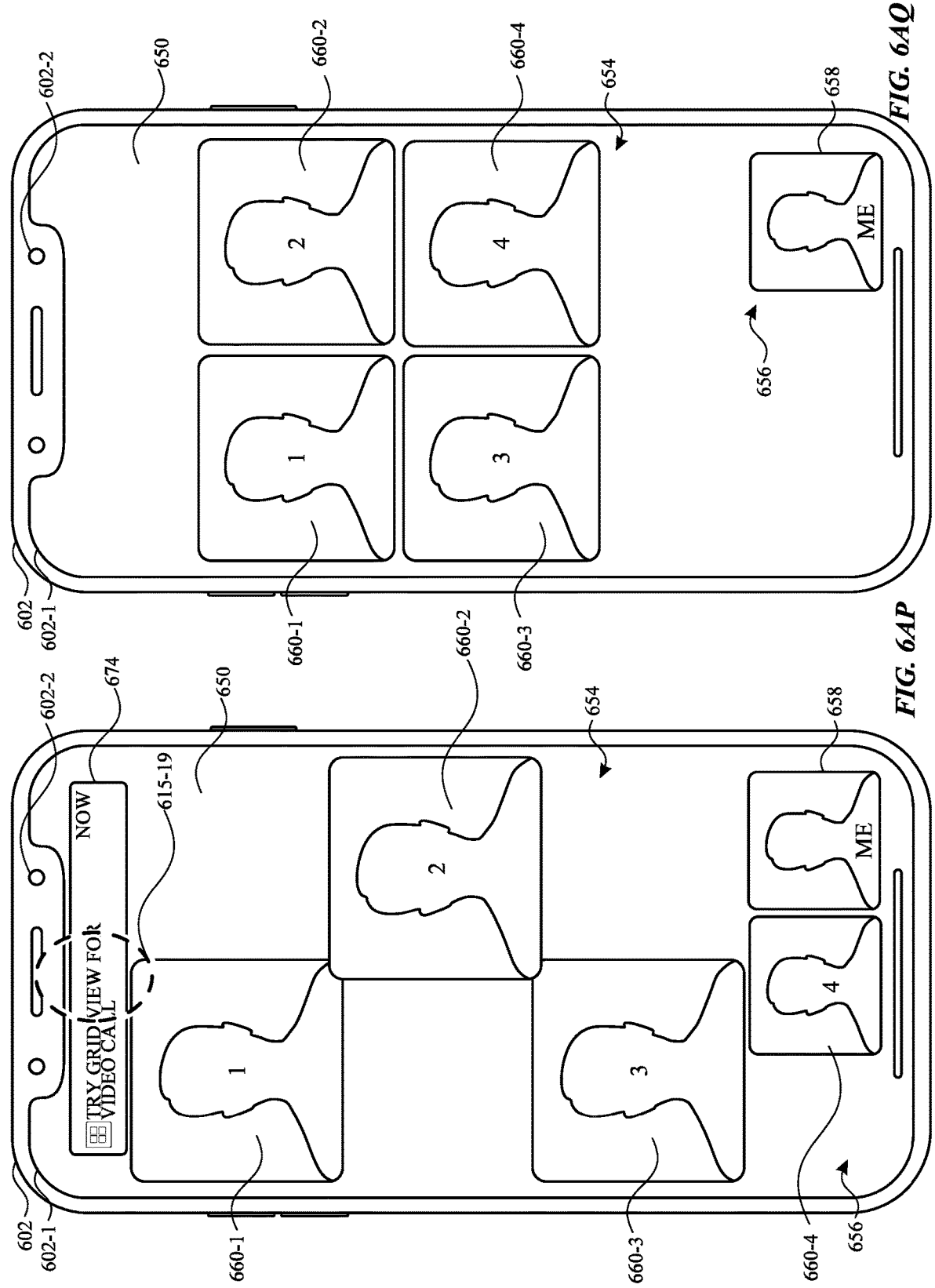

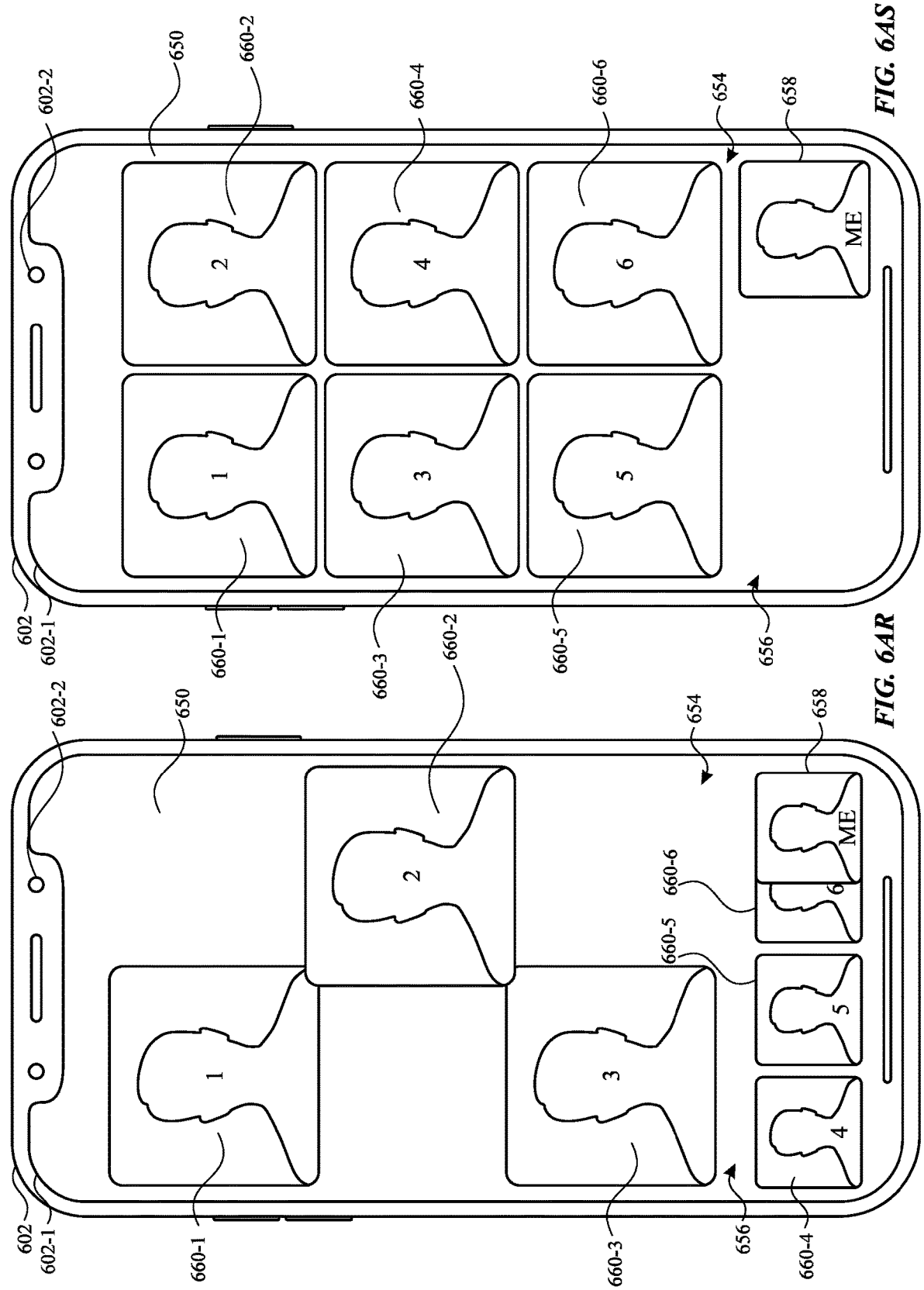

700

702
Display a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations.

704
While displaying the user interface of the real-time communication session, including the plurality of representations of participants of the real-time communication session, detect a change in one or more dimensions of the first region.

706
In response to detecting the change in the one or more dimensions of the first region, change a number of representations of participants of the real-time communication session displayed in the first region based on the change in the one or more dimensions of the first region, including ceasing to display a first representation of a respective participant in the first region and displaying a second representation of the respective participant in the second region.

*FIG. 7*

ADAPTIVE VIDEO CONFERENCE USER INTERFACES

CROSS-REFERENCE TO RELATED APPLICATIONS

The application claims priority to U.S. Provisional Application Ser. No. 63/230,476, filed Aug. 6, 2021, entitled "ADAPTIVE VIDEO CONFERENCE USER INTERFACES;" U.S. Provisional Application Ser. No. 63/197,461, filed Jun. 6, 2021, entitled "ADAPTIVE VIDEO CONFERENCE USER INTERFACES;" and U.S. Provisional Application Ser. No. 63/190,224, filed May 18, 2021, entitled "ADAPTIVE VIDEO CONFERENCE USER INTERFACES," the entire contents of each of which are hereby incorporated by reference.

FIELD

The present disclosure relates generally to computer user interfaces, and more specifically to techniques for managing video conference sessions.

BACKGROUND

Computer systems can include hardware and/or software for displaying interfaces for various types of communication and information sharing.

BRIEF SUMMARY

Some techniques for communication and information sharing using electronic devices, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

The present technique provides electronic devices with faster, more efficient methods and interfaces for managing video conference sessions. Such methods and interfaces optionally complement or replace other methods for managing video conference sessions. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with one or more display generation components and one or more input devices is described. The method comprises: displaying a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations; while displaying the user interface of the real-time communication session, including the plurality of representations of participants of the real-time communication session, detecting a change in one or more dimensions of the first region; and in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations; while displaying the user interface of the real-time communication session, including the plurality of representations of participants of the real-time communication session, detecting a change in one or more dimensions of the first region; and in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations; while displaying the user interface of the real-time communication session, including the plurality of representations of participants of the real-time communication session, detecting a change in one or more dimensions of the first region; and in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

In accordance with some embodiments, a computer system configured to communicate with one or more display generation components and one or more input devices is described. The computer system comprises: one or more processors; and memory storing one or more programs configured to be executed by the one or more processors, the one or more programs including instructions for: displaying a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations; while displaying the user interface of the real-time communication session, including the plurality of representations of participants of the real-time communication session, detecting a change in one or more dimensions of the first region; and in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

In accordance with some embodiments, a computer system configured to communicate with one or more display generation components and one or more input devices is described. The computer system comprises: means for displaying a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations; means for, while displaying the user interface of the real-time communication session, including the plurality of representations of participants of the real-time communication session, detecting a change in one or more dimensions of the first region; and means for, in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

In accordance with some embodiments, a computer program product is described. The computer program product comprises one or more programs configured to be executed by one or more processors of a computer system that is in communication with one or more display generation components and one or more input devices, the one or more programs including instructions for: displaying a user interface of a real-time communication session, the user interface including a plurality of representations of participants of the real-time communication session, the plurality of representations including: a first set of representations of participants displayed in a grid pattern in a first region of the user interface of the real-time communication session; and a second set of representations of participants displayed in a second region of the user interface that is visually distinct from the first region, wherein the representations of the first set of representations are larger than the representations of the second set of representations; while displaying the user interface of the real-time communication session, including the plurality of representations of participants of the real-time communication session, detecting a change in one or more dimensions of the first region; and in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

In accordance with some embodiments, a method performed at a computer system that is in communication with one or more display generation components and one or more input devices is described. The method comprises: receiving a request to display a user interface of a real-time communication application corresponding to a real-time communication session; in response to receiving the request to display the user interface of the real-time communication application corresponding to the real-time communication session, displaying the user interface of the real-time communication application corresponding to the real-time communication session; and while the computer system is connected to the real-time communication session and connected to a shared-content session: displaying, concurrently in the user interface of the real-time communication application: a plurality of representations of participants of the real-time communication session, the plurality of representations displayed in a two-dimensional array that includes two or more rows and two or more columns; and a representation of content in the shared-content session, the representation of content displayed visually associated with the array, wherein the representation of content has a size corresponding to two or more rows of the array and/or two or more columns of the array.

In accordance with some embodiments, a non-transitory computer-readable storage medium is described. The non-transitory computer-readable medium stores one or more programs configured to be executed by one or more processors of a computer system that is in communication with one or more display generation components and one or more input devices, the one or more programs including instructions for: receiving a request to display a user interface of a real-time communication application corresponding to a real-time communication session; in response to receiving the request to display the user interface of the real-time communication application corresponding to the real-time communication session, displaying the user interface of the real-time communication application corresponding to the real-time communication session; and while the computer system is connected to the real-time communication session and connected to a shared-content session: displaying, concurrently in the user interface of the real-time communication application: a plurality of representations of participants of the real-time communication session, the plurality of representations displayed in a two-dimensional array that includes two or more rows and two or more columns; and a representation of content in the shared-content session, the representation of content displayed visually associated with the array, wherein the representation of content has a size corresponding to two or more rows of the array and/or two or more columns of the array.

In accordance with some embodiments, a transitory computer-readable storage medium is described. The transitory computer-readable medium stores one or more programs configured to be executed by one or more processors of a computer system that is in communication with one or more display generation components and one or more input devices, the one or more programs including instructions for: receiving a request to display a user interface of a real-time communication application corresponding to a real-time communication session; in response to receiving the request to display the user interface of the real-time communication application corresponding to the real-time communication session, displaying the user interface of the real-time communication application corresponding to the real-time communication session; and while the computer system is connected to the real-time communication session and connected to a shared-content session: displaying, concurrently in the user interface of the real-time communication application: a plurality of representations of participants of the real-time communication session, the plurality of representations displayed in a two-dimensional array that includes two or more rows and two or more columns; and a representation of content in the shared-content session, the representation of content displayed visually associated with the array, wherein the representation of content has a size corresponding to two or more rows of the array and/or two or more columns of the array.

In accordance with some embodiments, a computer system configured to communicate with one or more display generation components and one or more input devices is described. The computer system comprises: one or more processors; and memory storing one or more programs configured to be executed by the one or more processors, the one or more programs including instructions for: receiving a request to display a user interface of a real-time communication application corresponding to a real-time communication session; in response to receiving the request to display the user interface of the real-time communication application corresponding to the real-time communication session, displaying the user interface of the real-time communication application corresponding to the real-time communication session; and while the computer system is connected to the real-time communication session and connected to a shared-content session: displaying, concurrently in the user interface of the real-time communication application: a plurality of representations of participants of the real-time communication session, the plurality of representations displayed in a two-dimensional array that includes two or more rows and two or more columns; and a representation of content in the shared-content session, the representation of content displayed visually associated with the array, wherein the representation of content has a size corresponding to two or more rows of the array and/or two or more columns of the array.

In accordance with some embodiments, a computer system configured to communicate with one or more display generation components and one or more input devices is described. The computer system comprises: means for receiving a request to display a user interface of a real-time communication application corresponding to a real-time communication session; means for, in response to receiving the request to display the user interface of the real-time communication application corresponding to the real-time communication session, displaying the user interface of the real-time communication application corresponding to the real-time communication session; and means for, while the computer system is connected to the real-time communication session and connected to a shared-content session: displaying, concurrently in the user interface of the real-time communication application: a plurality of representations of participants of the real-time communication session, the plurality of representations displayed in a two-dimensional array that includes two or more rows and two or more columns; and a representation of content in the shared-content session, the representation of content displayed visually associated with the array, wherein the representation of content has a size corresponding to two or more rows of the array and/or two or more columns of the array.

In accordance with some embodiments, a computer program product is described. The computer program product comprises one or more programs configured to be executed by one or more processors of a computer system that is in communication with one or more display generation components and one or more input devices, the one or more programs including instructions for: receiving a request to display a user interface of a real-time communication application corresponding to a real-time communication session; in response to receiving the request to display the user interface of the real-time communication application corresponding to the real-time communication session, displaying the user interface of the real-time communication application corresponding to the real-time communication session; and while the computer system is connected to the real-time communication session and connected to a shared-content session: displaying, concurrently in the user interface of the real-time communication application: a plurality of representations of participants of the real-time communication session, the plurality of representations displayed in a two-dimensional array that includes two or more rows and two or more columns; and a representation of content in the shared-content session, the representation of content displayed visually associated with the array, wherein the representation of content has a size corresponding to two or more rows of the array and/or two or more columns of the array.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing video conference sessions, thereby increasing the effectiveness, efficiency, and user satisfaction with such devices. Such methods and interfaces may complement or replace other methods for managing video conference sessions.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 depicts a flow diagram illustrating a method for managing video conference sessions, in accordance with some embodiments.

DESCRIPTION OF EMBODIMENTS

Figure 1A:
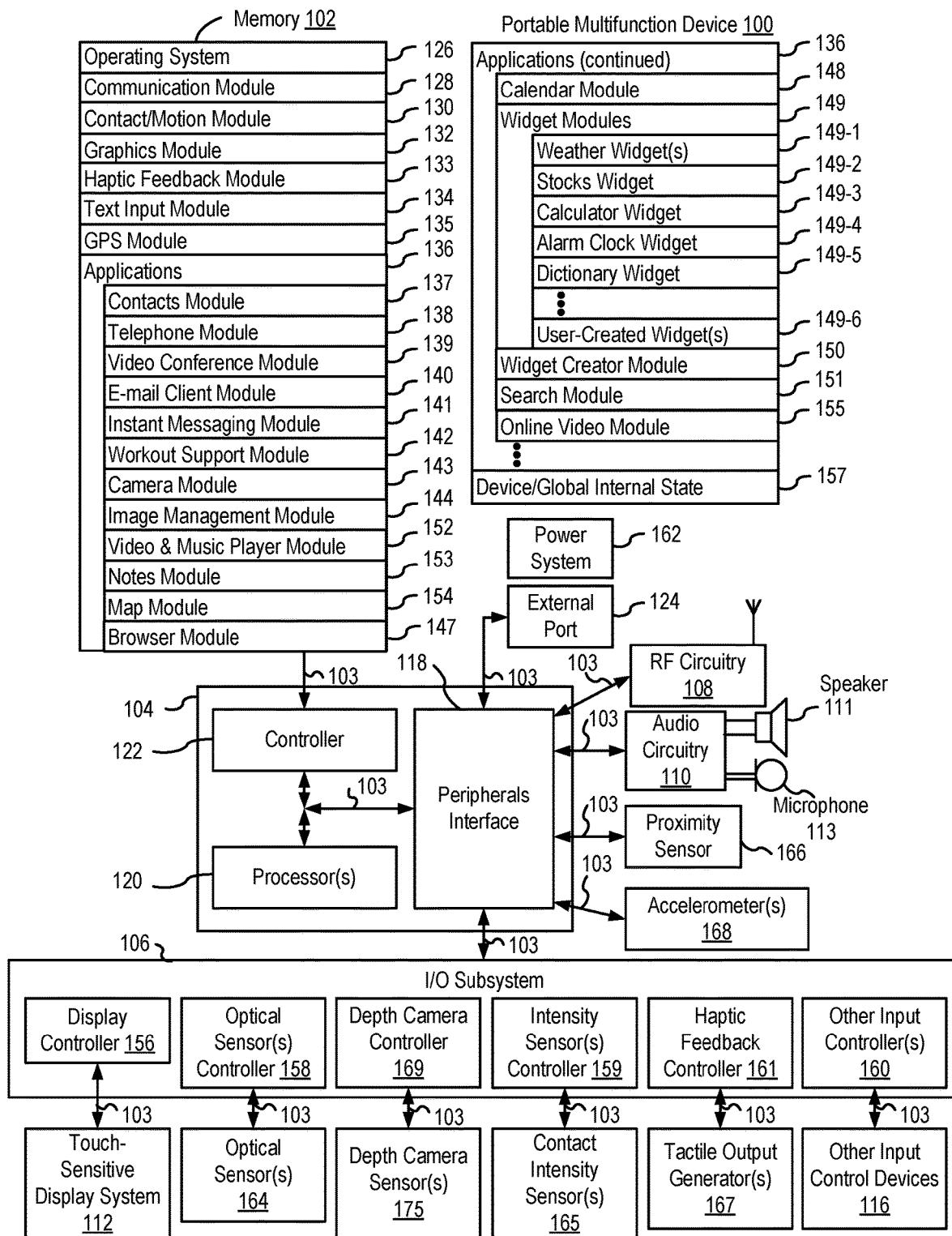
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing video conference sessions. Such techniques can reduce the cognitive burden on a user who accesses content in a video conference session, thereby enhancing productivity. Further, such techniques can reduce processor and battery power otherwise wasted on redundant user inputs.

Below, FIGS. 1A-1B, 2, 3, 4A-4B, and 5A-5C provide a description of exemplary devices for performing the techniques for managing video conference sessions. FIGS. 6A-6AS illustrate exemplary user interfaces for managing video conference sessions. FIG. 7 is a flow diagram illustrating methods of managing video conference sessions in accordance with some embodiments. The user interfaces in FIGS. 6A-6AS are used to illustrate the processes described below, including the processes in FIG. 7. FIGS. 8A-8H illustrate exemplary user interfaces for managing video conference sessions. FIG. 9 is a flow diagram illustrating methods of managing video conference sessions in accordance with some embodiments. The user interfaces in FIGS. 8A-8H are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
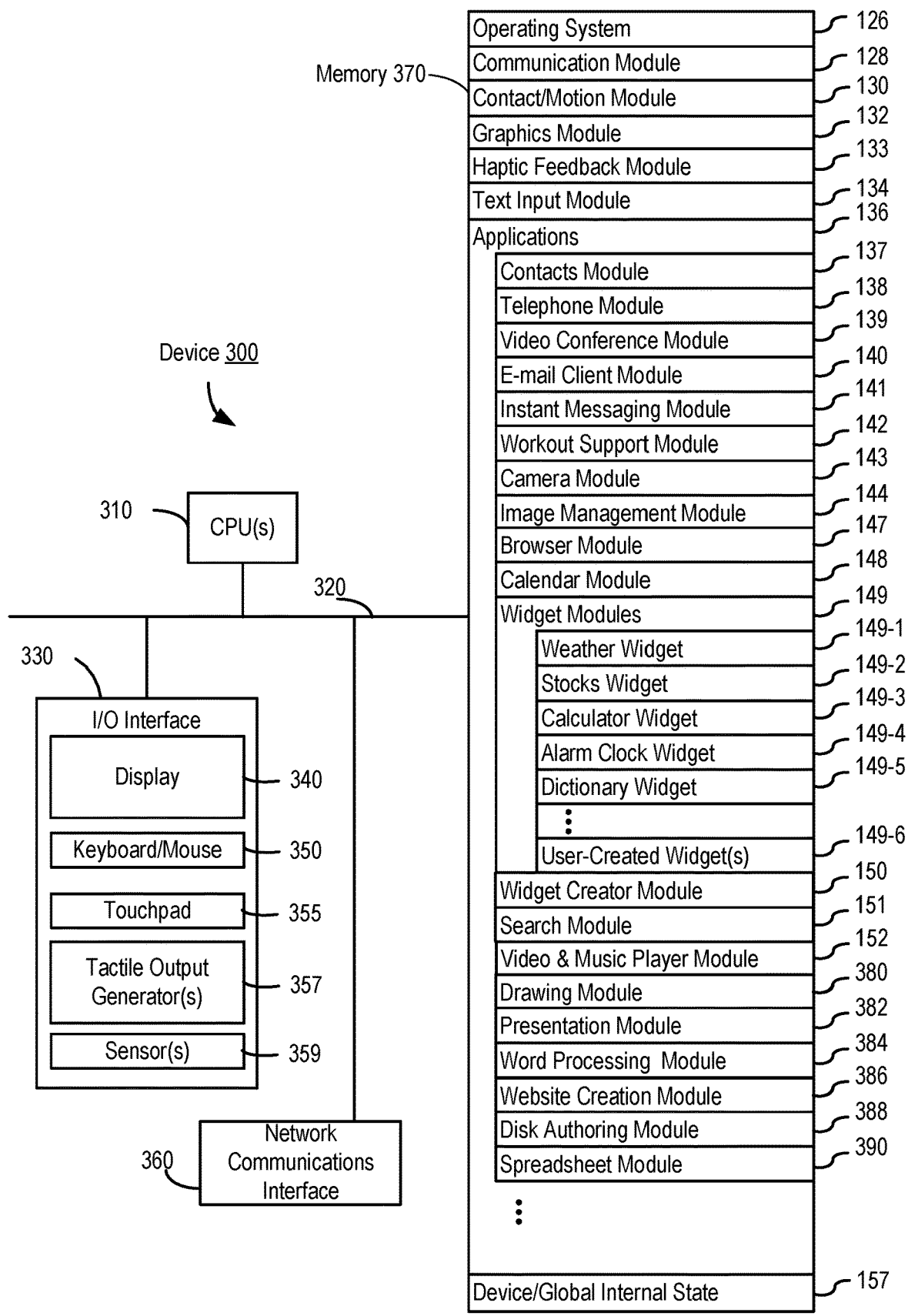
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
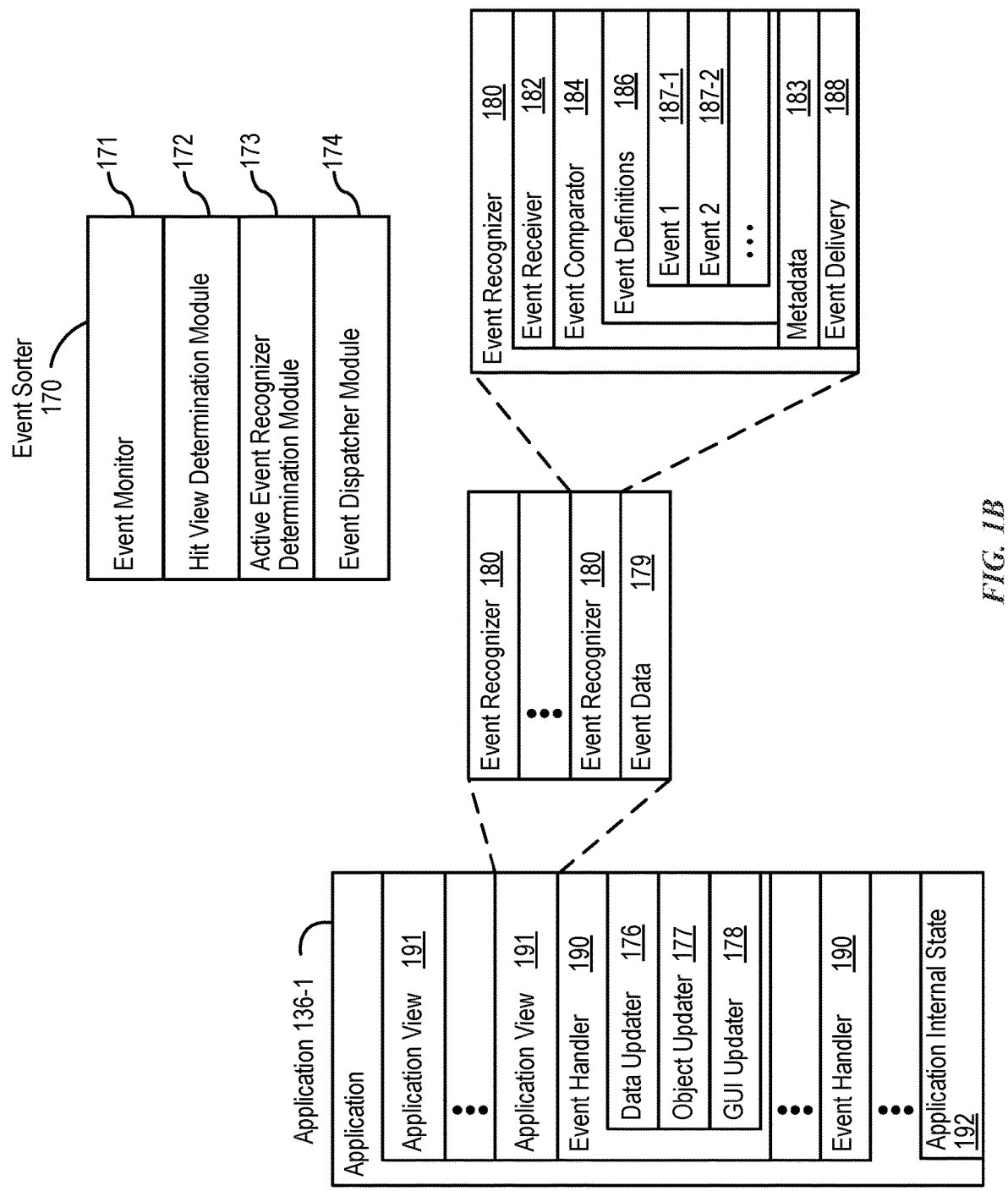
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
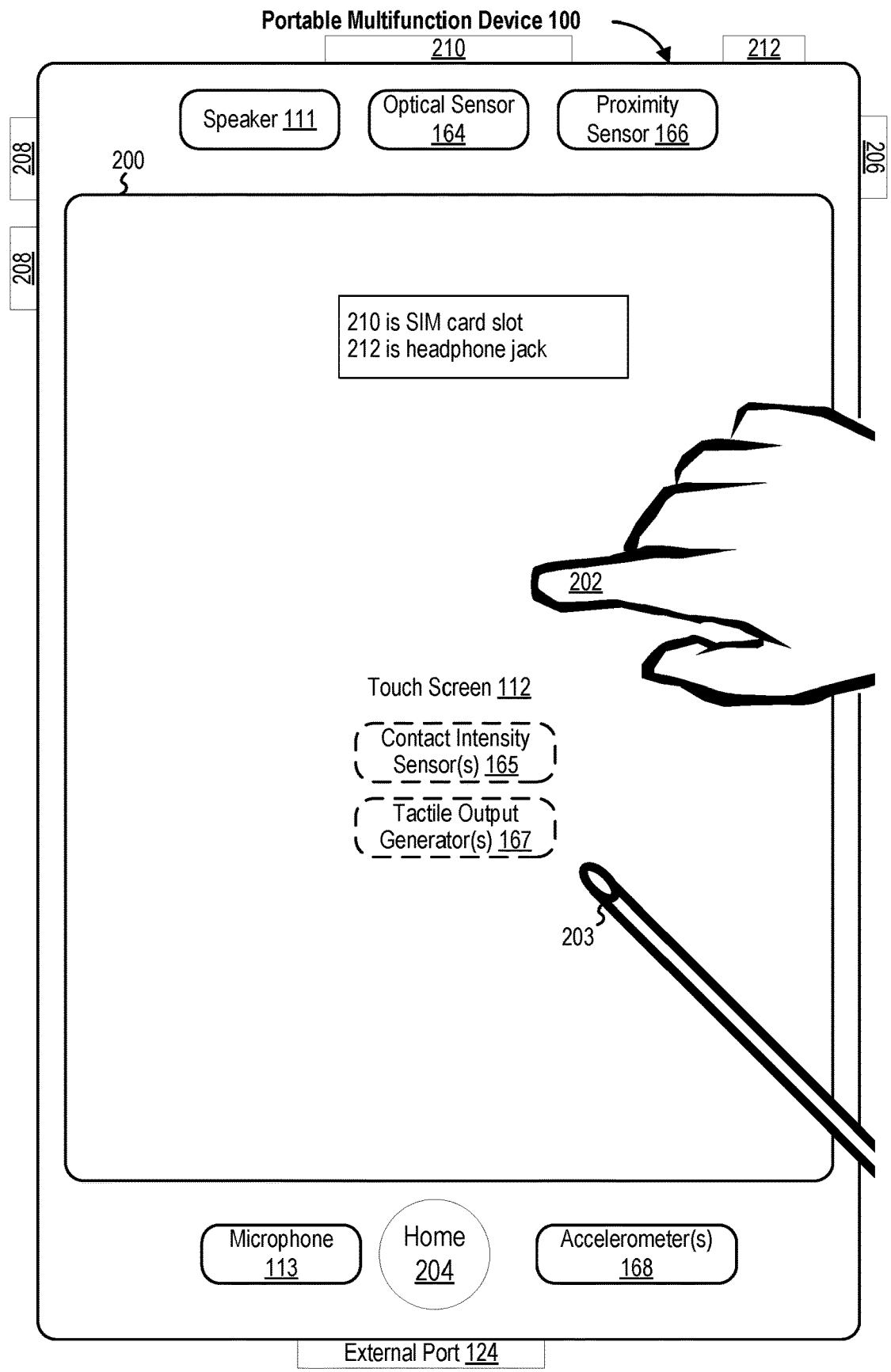
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
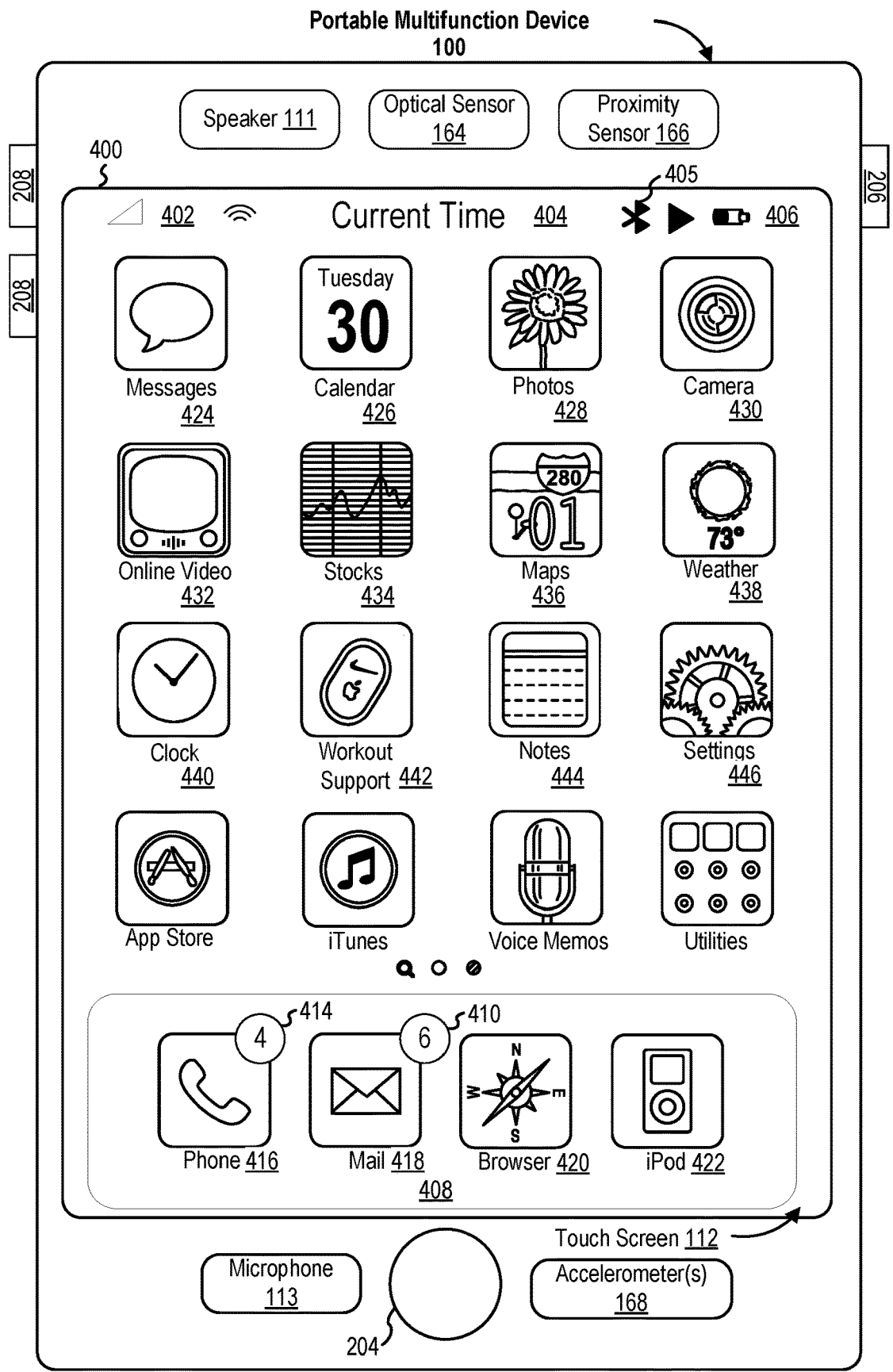
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
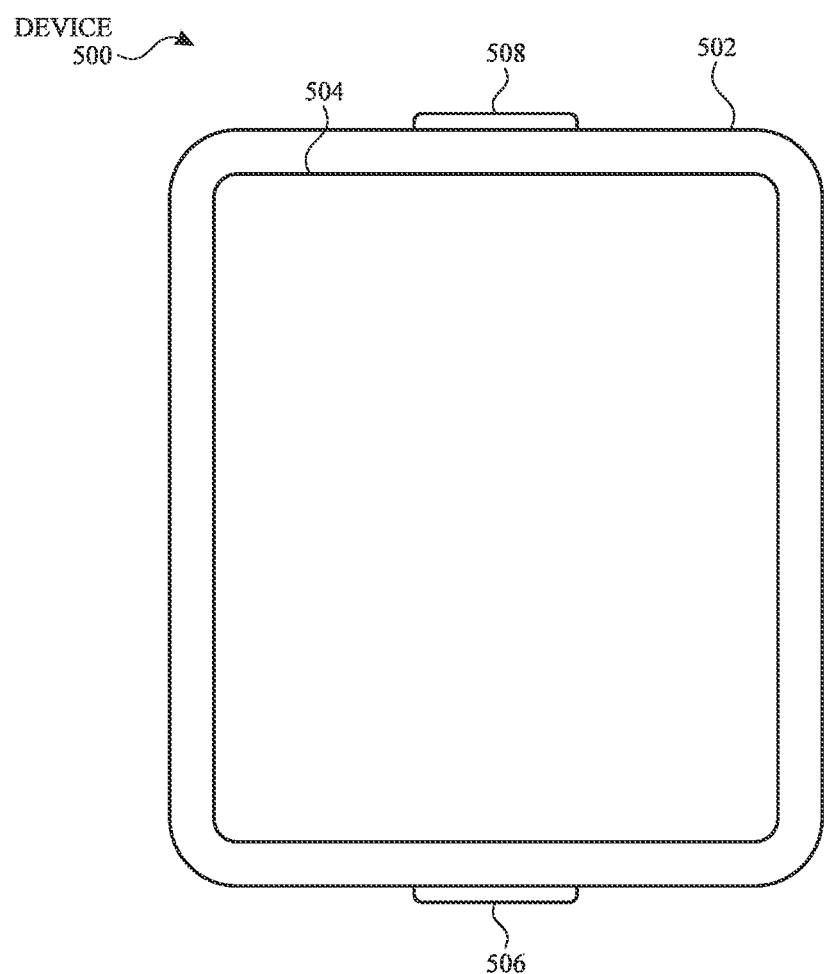
FIG. 5A illustrates a personal electronic device in accordance with some embodiments.
Figure 6A:
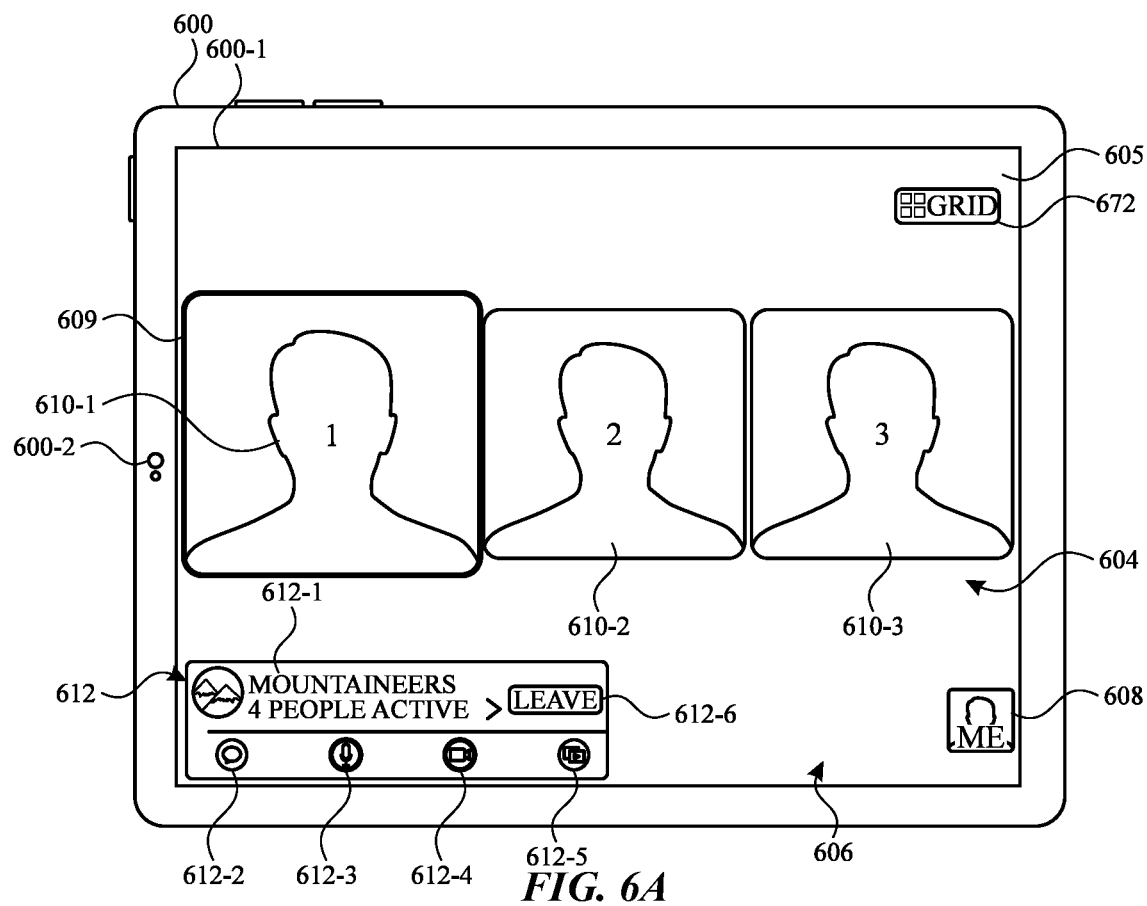
FIGS. 6A-6AS illustrate exemplary user interfaces for managing video conference sessions, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
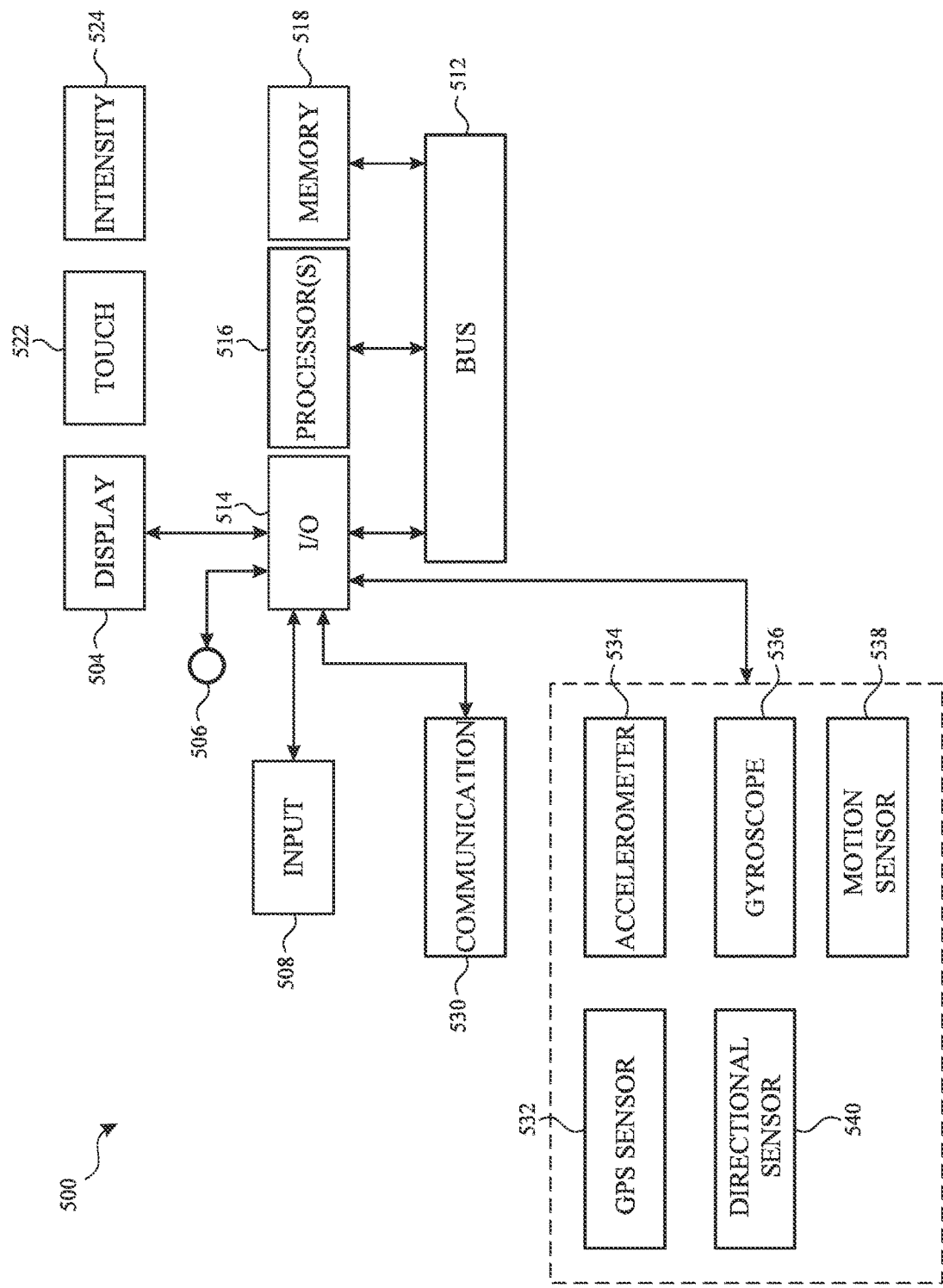
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 5C:
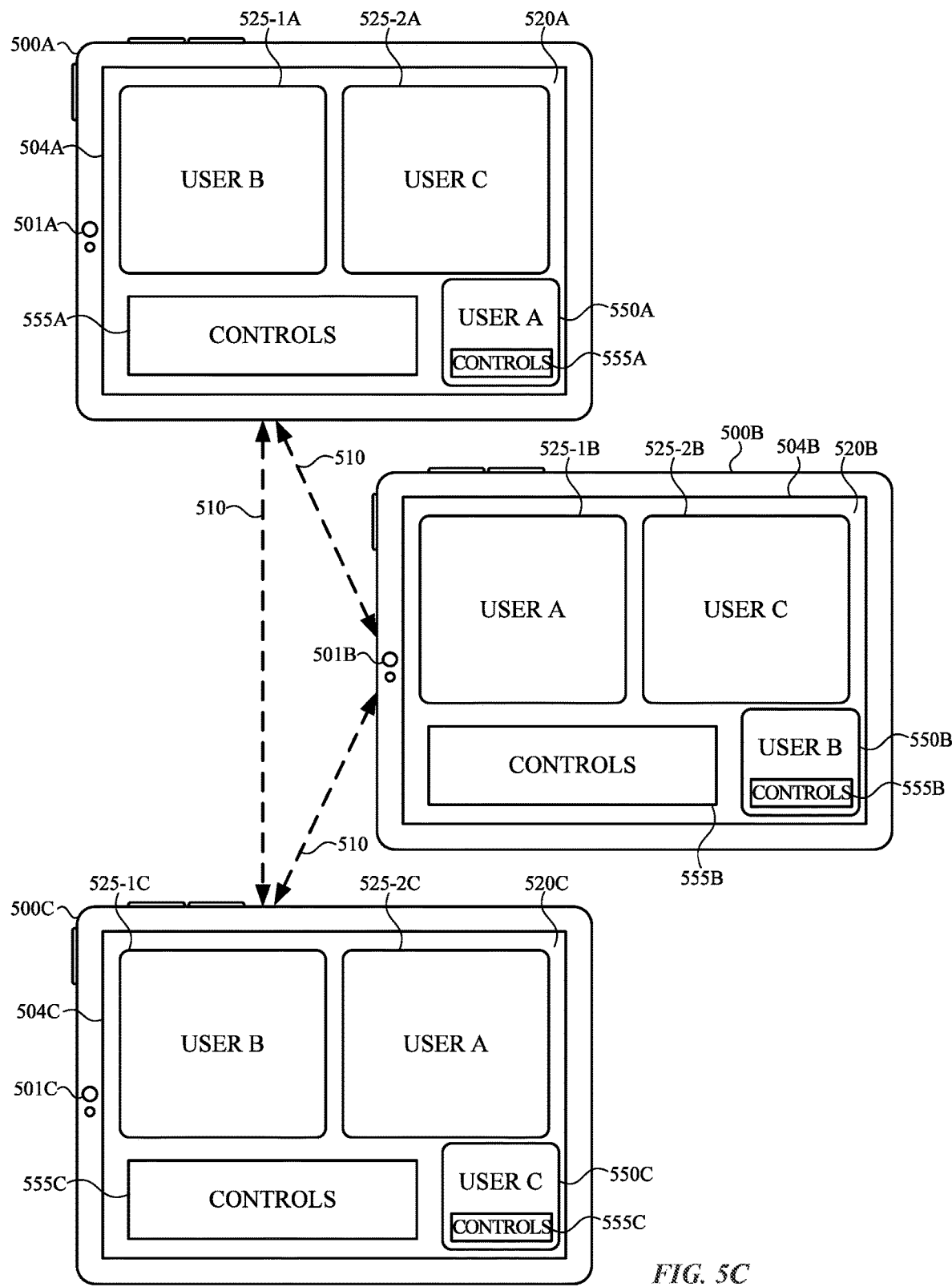
FIG. 5C illustrates an exemplary diagram of a communication session between electronic devices, in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6AS and 8A-8H. In some embodiments, the communication sessions depicted in FIGS. 6A-6AS and 8A-8H include two or more electronic devices, even if other electronic devices participating in the communication session are not depicted in the figures.

Attention is now directed towards embodiments of user interfaces ("UI") and associated processes that are implemented on an electronic device, such as portable multifunction device 100, device 300, or device 500.

FIGS. 6A-6AS illustrate exemplary user interfaces for managing video conference sessions, in accordance with some embodiments. The user interfaces in these figures are used to illustrate the processes described below, including the processes in FIG. 7. In some embodiments, the user interfaces in FIGS. 6A-6AS can be used to illustrate the processes described below with respect to FIG. 9.

The present disclosure describes embodiments for managing a video conference session. In some embodiments, the video conference session is provided in connection with a shared-content session (also referred to as a sharing session) in which respective content can be concurrently output at multiple devices participating in the shared-content session. In some embodiments, the video conference session is ongoing while the shared-content session is inactive or not ongoing. In some embodiments, the video conference session is ongoing concurrently with the shared-content session. In some embodiments, the shared-content session is initiated from the video conference session or a user interface for providing the video conference session. In some embodiments, the video conference session is initiated from the shared-content session or a user interface for providing the shared-content session.

In some embodiments, the respective content that is concurrently output at multiple devices participating in the shared-content session is screen-share content. For example, the content of a host device's displayed screen is shared with participants of the shared-content session such that the participants can view, at their respective devices, the screen content of the host device (the sharing device, or, the device whose screen content is being shared), including any changes to the displayed screen content, in real time. In some embodiments, the respective content is synchronized content that is output concurrently at the respective devices of the participants of the shared-content session. For example, the respective devices of the participants separately access the respective content (e.g., a video, a movie, a TV show, and/or a song) from a remote server and/or local memory and are synchronized in their respective output of the content such that the content is output (e.g., via an application local to the respective devices) concurrently at the respective devices as each device separately accesses the respective content from the remote server(s) and/or local memory. In some embodiments, the respective devices exchange information (e.g., via a server) to facilitate synchronization. For example, the respective devices can share play state and/or playback location information of the content, as well as indications of local commands (e.g., play, pause, stop, fast forward, and/or rewind) in order to implement the commands on the output of the content on other devices. Sharing play state and/or playback location information is more efficient and effective for synchronizing the content at the respective devices, because the host device is not transmitting the content to the respective devices, but rather, smaller data packets containing the play state and/or playback location information. Additionally, each respective device outputs the content at a size and quality that is appropriate for the respective device and connectivity (e.g., data connection conditions such as data transmission and/or processing speeds) of the device, thereby providing a more customized, yet synchronized, playback experience at each of the respective devices. In some embodiments, an application (or "app") is available (e.g., downloaded and/or installed) at a respective device to enable the device to participate in shared-content sessions.

As discussed herein, the term "share," "sharing," or "shared" is used generally to refer to a situation in which content (e.g., screen-share content and/or synchronized content) is, or is capable of, being output (e.g., viewed and/or played) concurrently at multiple devices that are participating in a shared-content session. Unless specifically noted otherwise, these terms do not require that the content being "shared" is transmitted from any particular device participating in the shared-content session to any of the other devices with which the content is being shared. In some embodiments, the content that is being shared in the shared-content session is content that is separately accessed by each respective device, for example, from a remote server or another source other than one of the devices participating in the shared-content session. For example, in some embodiments, when media content, such as a movie, is being played at devices participating in the shared-content session, the movie is said to be shared with the participants, even though the respective participants are accessing (e.g., from a movie application) and playing the movie separate from (but concurrently with) the other participants in the shared-content session. In some embodiments, screen-share content is shared with participants of the shared-content session by transmitting, from a host device, image data representing content displayed on a display screen of the host device to other devices participating in the shared-content session.

In some embodiments, one or more audio channels are active (e.g., open) during the shared-content session such that participants of the shared-content session can speak to one another in real time while the shared-content session is ongoing and, optionally, while content is being shared (e.g., screen-share content and/or synchronized content) via the shared-content session. In some embodiments, one or more video channels are open (e.g., via a video conferencing application that is local to respective devices) such that participants of the shared-content session can participate in a live video communication (e.g., video chat) while the shared-content session is ongoing and, optionally, while content is being shared via the shared-content session. Various aspects of these embodiments, and further details of a shared-content session, are discussed below with reference to the figures.

In some embodiments, content is displayed as a window that is optionally overlaid on another user interface and can be moved separately from the user interface over which it is displayed. In some embodiments, such windows are referred to herein as a picture-in-picture window or "PiP." In some embodiments, a PiP can include shared content such as screen-share content and/or synchronized content. In some embodiments, a PiP can include content that is independent of a shared-content session such as a video feed from a video conference (although, in some embodiments, such PiPs can be displayed in connection with a shared-content session).

FIGS. 6A-6AS illustrate exemplary devices and user interfaces for participating in video conference sessions, in accordance with some embodiments. Specifically, these devices include device 600 (e.g., a tablet), device 601 (e.g., a laptop), and device 602 (e.g., a smartphone). The devices include a display (e.g., 600-1, 601-1, and 602-1, respectively), one or more cameras (e.g., 600-2, 601-2, and 602-2, respectively), and one or more microphones. Devices 600, 601, and 602 include one or more elements of devices 100, 300, and/or 500.

In the embodiments provided herein, device 600, 601, or 602 can be described as performing a set of functions associated with the video conference and/or shared-content session. These descriptions are not intended to limit the functions performed by the respective devices, but rather, are provided to illustrate various aspects and embodiments of a video conference and/or shared-content session. Thus, unless specified otherwise, the functions that are described as being performed by device 600 are similarly capable of being performed by device 601 and device 602. Similarly, the functions that are described as being performed by device 601 are similarly capable of being performed by device 600 and 602, and the functions that are described as being performed by device 602 are capable of being performed by device 600 or 601, unless specified otherwise.

FIGS. 6A-6AS illustrate example embodiments depicting a video conference session between participants of a group. The participants of the video conference are represented in the video conference with respective video feeds from respective devices associated with the respective participants. For the sake of simplicity, the respective video feeds of the participants are represented in the figures by a tile 610 having a number inside of a silhouette, with each number corresponding to a specific participant's video feed. In some embodiments, the tiles are numbered in the order in which the participants joined the call. Similarly, a representation of a camera preview (or self-view) video feed for device 600, 601, or 602 is indicated by a tile (e.g., tile 608) having the text "me" inside of a silhouette. In FIGS. 6A-6L, tile 608 represents the video feed of device 600, generated, for example, using camera 600-2.

In FIG. 6A, device 600 displays video conference interface 605, which includes at least two regions for displaying tiles corresponding to the participants of the video conference: main region 604 and roster 606. In some embodiments, tiles are generally displayed in main region 604, but can be displayed in roster 606 based on various criteria such as, for example, when there is not sufficient space for the respective tiles to be displayed in main region 604.

In some embodiments, tiles displayed in roster 606 are smaller than tiles displayed in main region 604. In some embodiments, tiles displayed in roster 606 are all displayed at the same size. In some embodiments, tile 608 of the camera preview is aligned with or displayed within roster 606 and is displayed with the same size as the tiles in roster 606.

Roster 606 can display a number of full tiles and one partial tile (e.g., underneath or overlaid by tile 608). Additional tiles in roster 606 can be hidden and displayed by scrolling roster 606 (e.g., either in response to user input or a detected event such as a participant actively participating by talking or moving). A tile in roster 606 that is overlapped by tile 608 can be partially shaded to indicate that more tiles exist in roster 606 and/or that roster 606 can be scrolled. In some embodiments, the order of tiles in roster 606 depends on the order in which participants join the video conference session. In some embodiments, the order of tiles in roster 606 changes over time (e.g., as participants join or leave the video conference session or as participants move in or out of main region 604 due to, e.g., user selection of a tile in roster 606 or active participation by participants represented in roster 606). In some embodiments, the order of tiles in roster 606 is fixed (e.g., the order in which tiles in roster 606 are displayed does not change over time). In some embodiments, the order of the tiles in roster 606 is based on the order of a list associated with a group (e.g., the order in which the participants were added to the group when the group was created). In some embodiments, the display (e.g., video feed) of tiles in main region 604 is updated at a higher rate than display of tiles in roster 606 (e.g., the video feed of tiles in roster 606 is updated at a lower rate than the video feed of tiles in main region 604).

In some embodiments, tiles are associated with a priority level for display, and tiles having a higher priority are displayed in the main region, with the remaining tiles (or a subset of the remaining tiles) displayed in the roster. In some embodiments, tiles having a higher priority are those that display a video feed of a more active (or more recently active) participant, tiles that are associated with participants who are sharing content or have recently shared content, participants who joined the video conference earlier in the call session, or tiles that have been selected (e.g., pinned) for display in the main region. In some embodiments, a tile with a higher priority can be displayed in the roster if there is not sufficient space to display the tile in the main region. In some embodiments, tiles are moved from main region 604 to roster 606 (or vice versa) as the priority of those participants changes or as other conditions dictate. In some embodiments, not all tiles may be visible in the roster. In such cases, the roster can be scrolled in response to user input (e.g., a swipe or drag gesture on the roster) to display additional tiles assigned to the roster. In some embodiments, in response to user input (e.g., a tap on camera preview 608), camera preview 608 is displayed over at least a portion of roster 606, and tiles in roster 606 can be scrolled under, or out from under, camera preview 608.

In some embodiments, the tiles in main region 604 can be displayed in various arrangements based on whether or not a grid view setting is enabled. When the grid view setting is enabled, device 600 displays the tiles in a grid arrangement, as shown, for example, in FIGS. 6A-6L. When the grid view setting is disabled, device 600 displays the tiles in an overlapping or non-grid display arrangement, as discussed in greater detail below (see FIG. 6Z or FIG. 8H).

Video conference interface 605 also includes control region 612, which includes information and various controls associated with the video conference and, optionally, a shared-content session that is concurrently active with the video conference session. In FIG. 6A, control region 612 includes status region 612-1 which indicates that four participants of a group called "Mountaineers" are currently active in a video conference session. Control region 612 also includes various options that are selectable to control operations, parameters, and/or settings of the video conference and/or shared-content session. For example, messages option 612-2 can be selected to, in some embodiments, display a messages interface to view a messages conversation between the members of the Mountaineers group. Mic option 612-3 can be selected to, in some embodiments, enable, disable, or change settings for a microphone used for the video conference and/or shared-content session. Camera option 612-4 can be selected to, in some embodiments, initiate a video conference session with the Mountaineers group, view an ongoing video conference session, to enable/disable a camera, and/or to select different cameras to be used for the video conference and/or shared-content session. Sharing option 612-5 is selectable to, in some embodiments, display and/or change various media playback settings or to initiate a screen-sharing option whereby the content displayed on the screen of device 600 is shared with participants of the video conference (e.g., via a shared-content session). Leave option 612-6 is selectable to, in some embodiments, cause device 600 to leave the video conference and/or shared-content session. In some embodiments, status region 612-1 can be selected to view information for the Mountaineers group and/or other settings for the video conference and/or shared-content session. For example, in some embodiments, status region 612-1 can be selected to display a group card that includes an option to enable or disable the grid view setting.

FIGS. 6A-6H illustrate an example embodiment depicting the progression of video conference interface 605 as participants join the video conference session. In some embodiments, the arrangement of the tiles is automatically determined (e.g., by device 600) so as to balance various factors such as the aesthetics of the displayed tile arrangement, the space available for displaying tiles, the priority of the tiles, and the sizes of the displayed tiles, while also reducing (e.g., minimizing) moving and/or rearranging the tiles as participants join or leave the communication session, so as to avoid confusing or distracting the user viewing video conference interface 605.

In FIG. 6A, device 600 displays tiles 610-1, 610-2, and 610-3 corresponding to participants 1-3 of the video conference. The tiles are displayed in a single row in main region 604, with no tiles displayed in roster 606. In some embodiments, as participants 1-3 join the video conference, the tile corresponding to the joining participant is added to main region 604, shifting the positions of, and optionally resizing, existing tiles. For example, when participant 1 is the only remote participant in the video conference, tile 610-1 is displayed in an enlarged (e.g., full-screen or using all of the screen outside of a portion of the screen designated for system status information and/or system controls) view and, when participant 2 joins, tile 610-1 is reduced in size and displayed in main region 604 with tile 610-2 of participant 2, which is displayed having the same size as tile 610-1.

In some embodiments, a respective participant is determined to be an active (or most active) participant based on the activity of the participant represented in the tile (e.g., speaking, sharing content, playing content, and/or moving within the camera feed). Device 600 emphasizes the tile of the active participant to provide visual feedback to the viewer of video conference interface 605, identifying the active participant. For example, in FIG. 6A, participant 1 is the most active participant and, therefore, device 600 displays tile 610-1 growing to an enlarged size (relative to the other tiles) and including shadow 609 to provide a simulated depth to tile 610-1.

In some embodiments, video conference interface 605 includes arrangement-selection option 672 that can be selected to change between a mode in which representations of participants in video conference interface 605 are displayed in a grid pattern (e.g., as shown in FIG. 6A) and a mode in which representations of participants are displayed in an overlapping arrangement (e.g., as shown in FIG. 6Z). In some embodiments, arrangement-selection option 672 indicates (e.g., via the text "GRID") that a grid pattern (also referred to as a grid view or grid arrangement) option is available. In some embodiments, arrangement-selection option 672 is visually emphasized (e.g., highlighted, bolded, outlined, and/or filled-in) if the grid pattern is enabled, and is not visually emphasized if the grid pattern is not enabled (e.g., the overlapping arrangement is enabled). Features of arrangement-selection 672 are also described with reference to FIGS. 6X, 6Z, and 6AH-6AS.

Figure 6B:
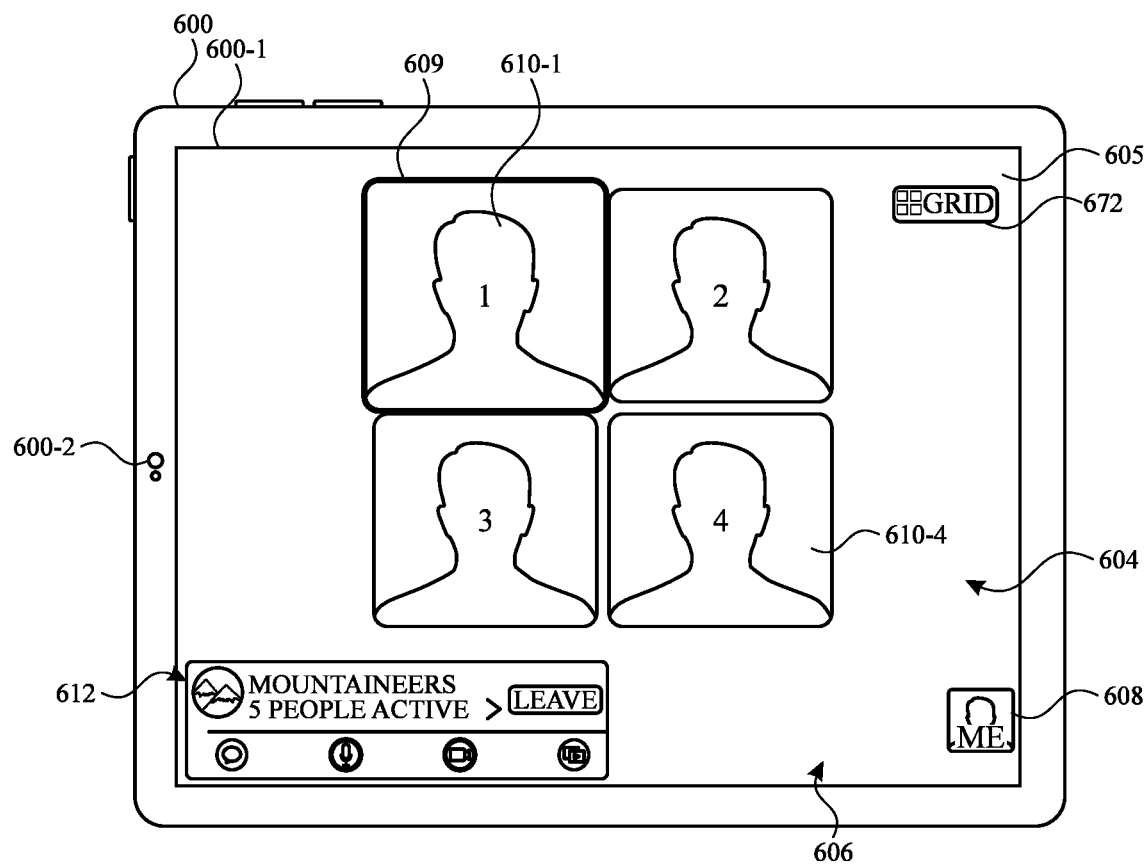

In FIG. 6B, participant 4 joins the video conference, and device 600 displays tile 610-4 in main region 604 with tiles 610-1 to 610-3. When tile 610-4 is added to main region 604, the tiles are displayed in a 2×2 arrangement with tiles 610-1 and 610-2 in the top row, and tiles 610-3 and 610-4 in the bottom row. Participant 1 continues to be the most active participant.

Figure 6C:
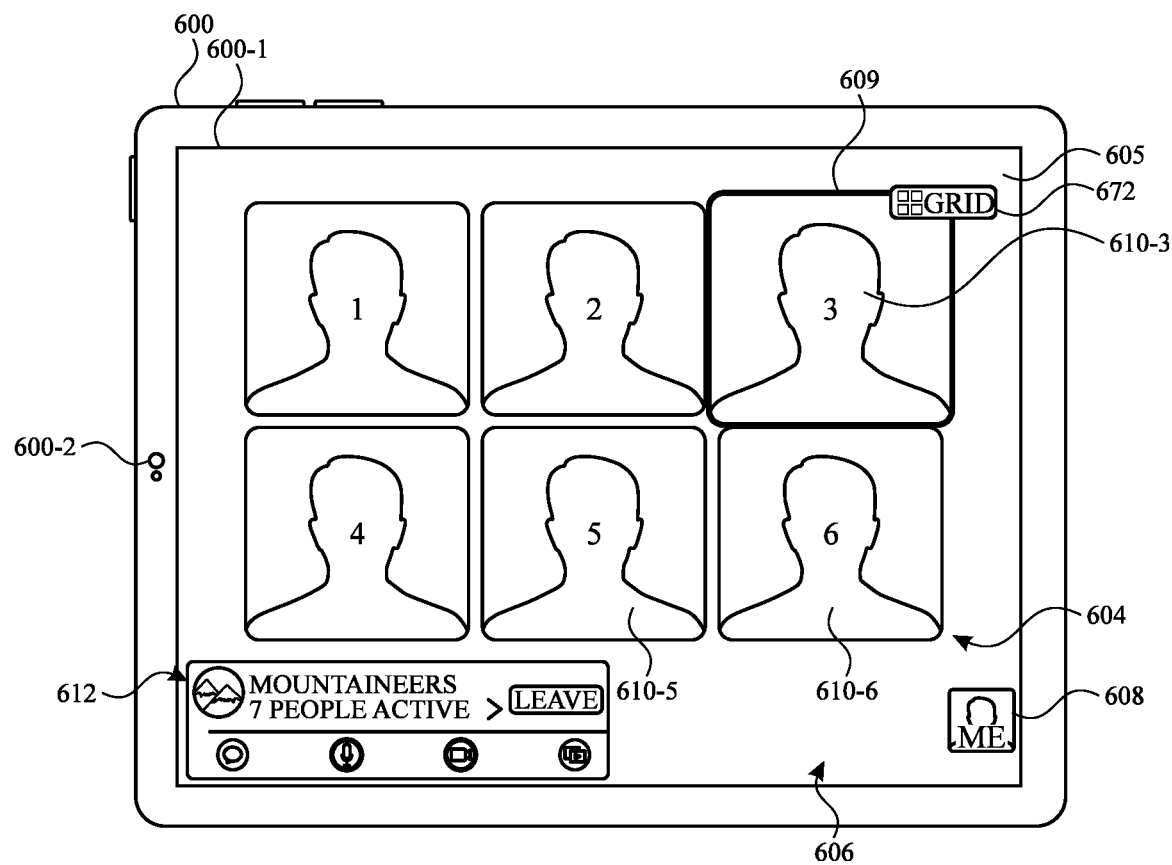

In FIG. 6C, participants 5 and 6 join the video conference, and device 600 displays corresponding tiles 610-5 and 610-6 in main region 604. Device 600 displays the tiles in a 2×3 arrangement with tiles 610-1 to 610-3 in the top row, and tiles 610-4 to 610-6 in the bottom row. Participant 3 is now determined to be the most active participant. Accordingly, device 600 returns tile 610-1 to a deemphasized state, increases the size of tile 610-3, and displays shadow 609 around tile 610-3.

Figure 6D:
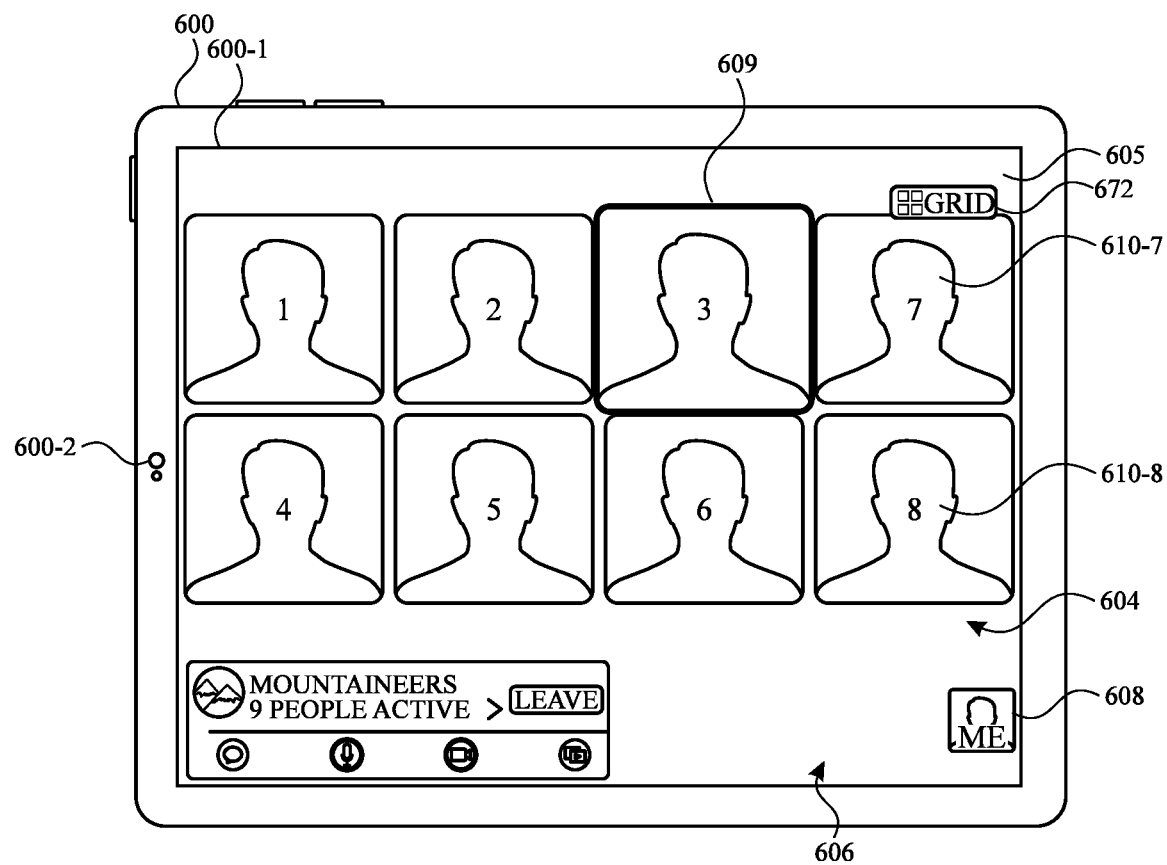

In FIG. 6D, participants 7 and 8 join the video conference, and device 600 displays corresponding tiles 610-7 and 610-8 in a new column in main region 604. Device 600 displays the tiles in a 2×4 arrangement with tile 610-7 added to the end of the top row and tile 610-8 added to the end of the bottom row, shrinking the sizes of tiles 610-1 to 610-6 to accommodate the addition of the new tiles. Participant 3 continues to be the most active participant.

Figure 6E:
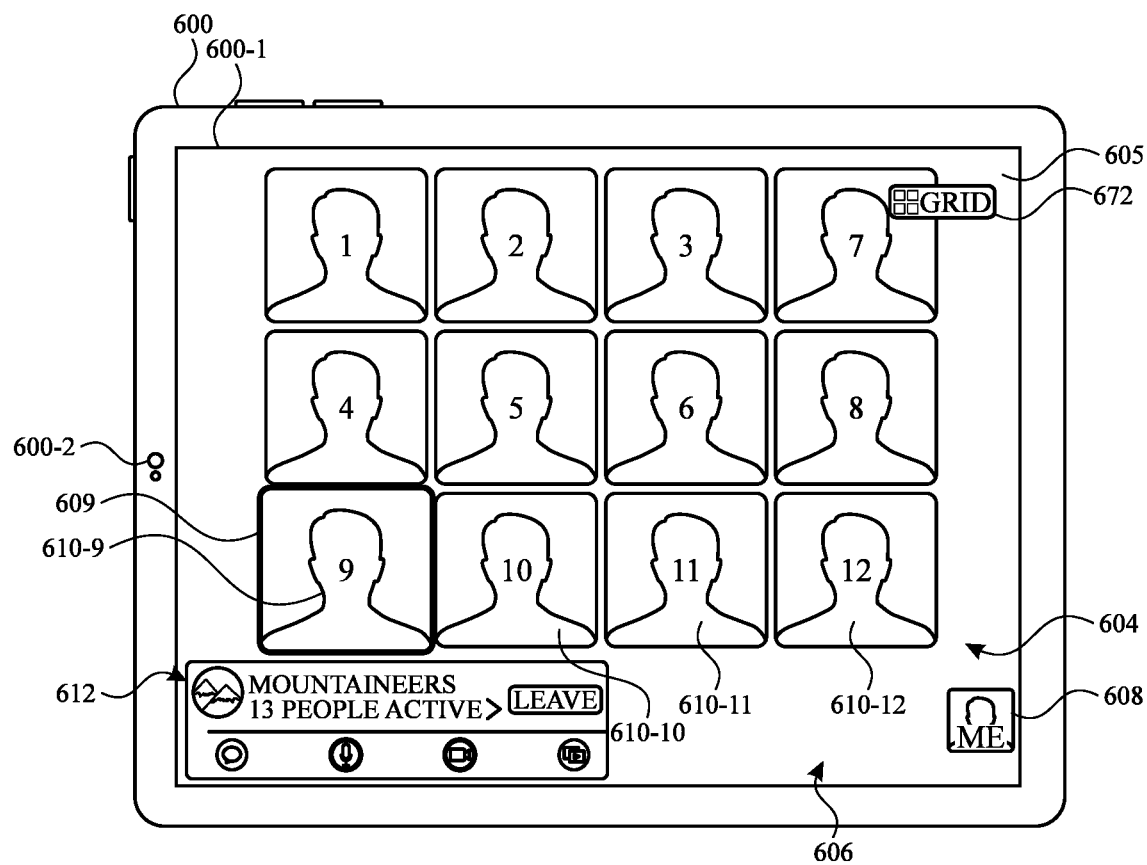

In FIG. 6E, participants 9-12 join the video conference, and device 600 displays corresponding tiles 610-9 to 610-12 in a new row in main region 604. Device 600 displays the tiles in a 3×4 arrangement, shrinking the sizes of the tiles to accommodate the addition of the new row with tiles 610-9 to 610-12. Participant 9 is now determined to be the most active participant as indicated by the increased size of tile 610-9 (relative to the other tiles) and shadow 609.

Figure 6F:
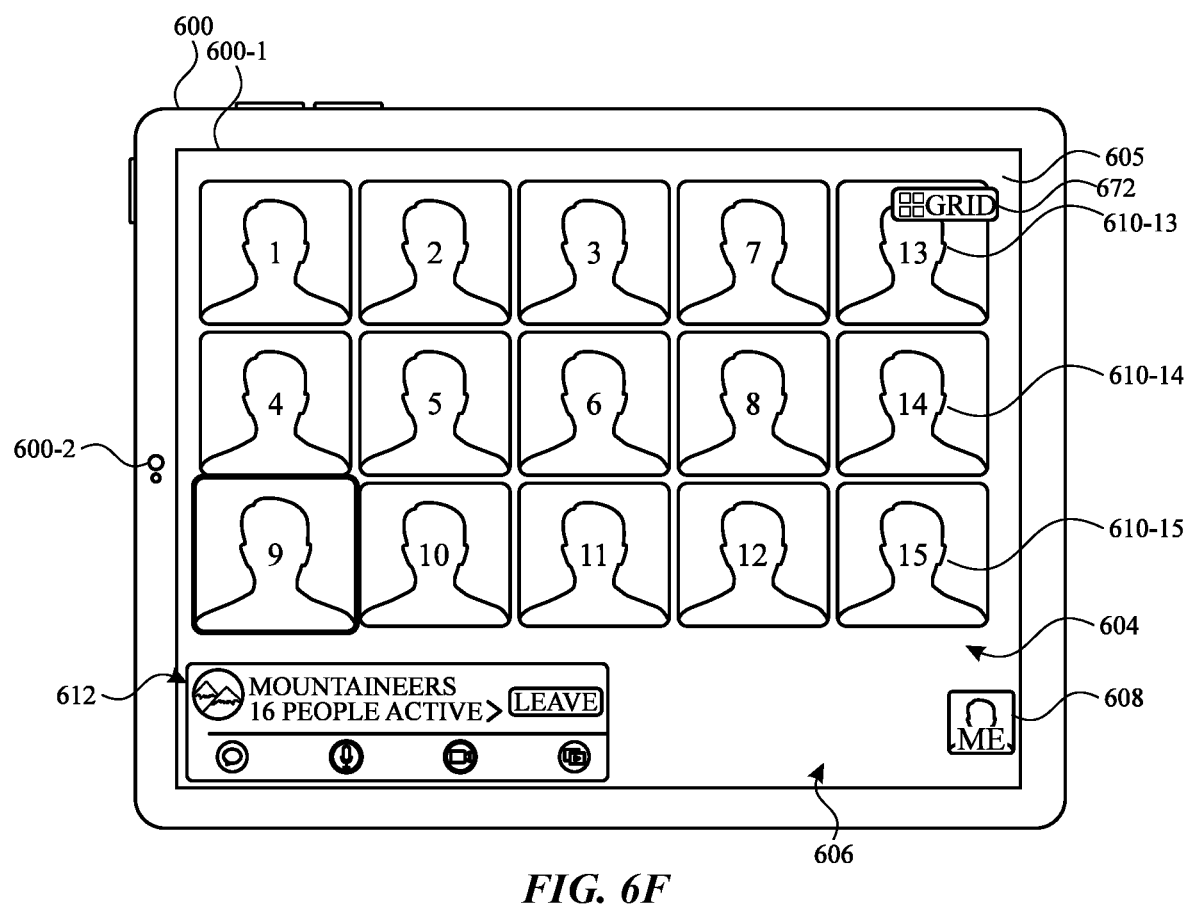

In FIG. 6F, participants 13-15 join the video conference, and device 600 displays corresponding tiles 610-13 to 610-15 in a new column in main region 604. Device 600 displays the tiles in a 3×5 arrangement, shrinking the sizes of the tiles to accommodate the addition of the new column with tiles 610-13 to 610-15. Participant 9 continues to be the most active participant.

Figure 6G:
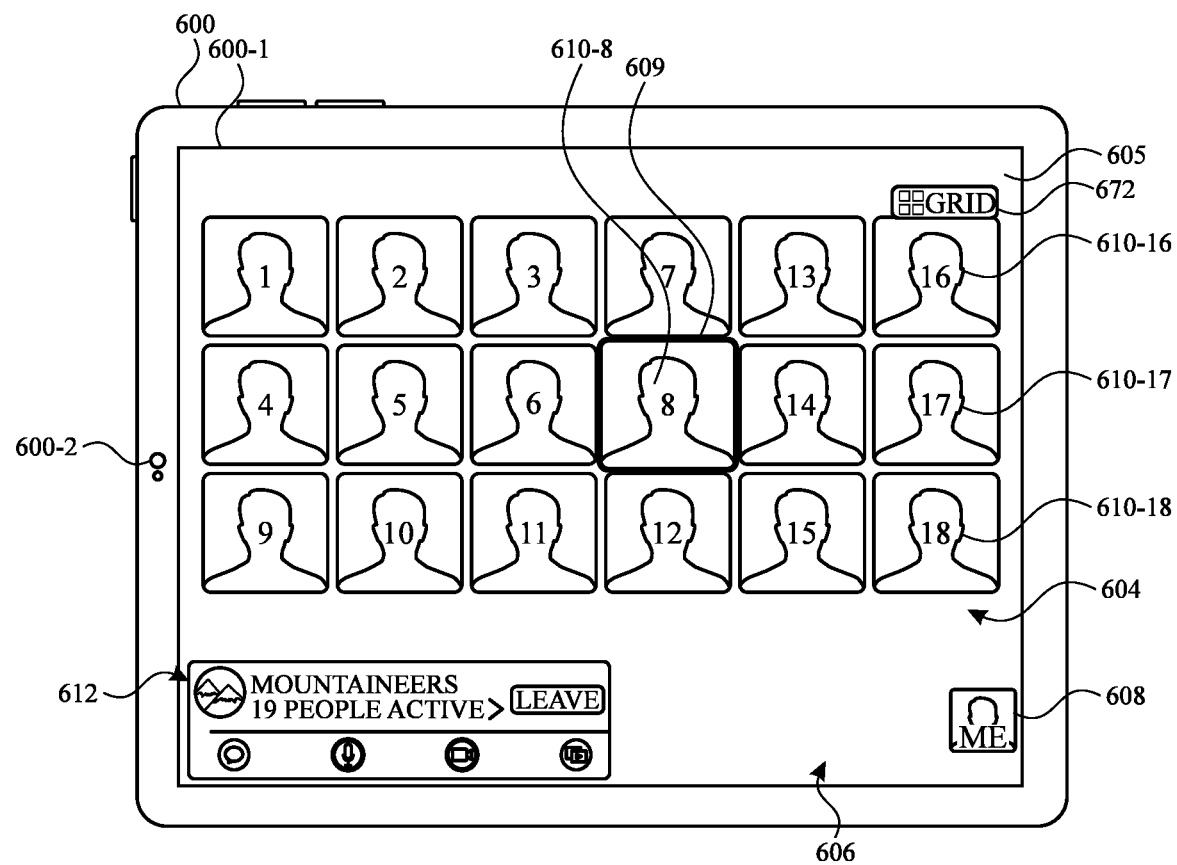

In FIG. 6G, participants 16-18 join the video conference, and device 600 displays corresponding tiles 610-16 to 610-18 in a new column in main region 604. Device 600 displays the tiles in a 3×6 arrangement, shrinking the sizes of the tiles to accommodate the addition of the new column with tiles 610-16 to 610-18. Participant 8 is now the most active participant.

Figure 6H:
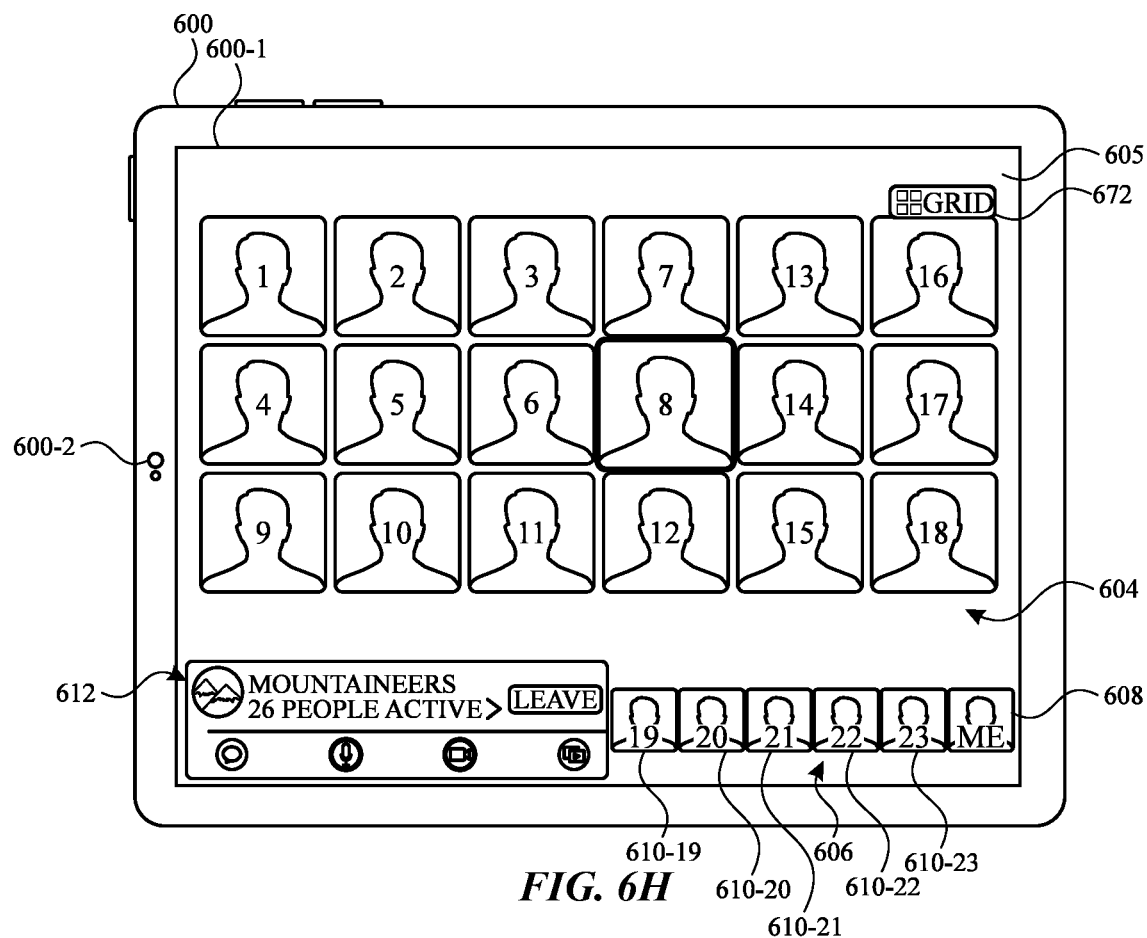

After device 600 fills main region 604, the device begins placing additional participants in roster 606. For example, in FIG. 6H, participants 19-25 have joined the video conference, as noted by the indication of 26 active participants in status region of control region 612. Instead of adding rows or columns to the grid in main region 604, device 600 displays the additional tiles in roster 606, as indicated by tiles 610-19 to 610-23. Although device 600 assigns the tiles for participants 19-25 to the roster, in the embodiment depicted in FIG. 6H, there is not enough space on display 601 to show all tiles in the roster. Accordingly, some of the tiles in roster 606—specifically, the tiles for participants 24 and 25—are not displayed, as depicted in FIG. 6H. However, these additional roster tiles can be revealed by manipulating the arrangement of tiles in video conference interface 605. For example, roster 606 can be scrolled to display the additional tiles. As another example, the dimensions of main region 604 can be increased or otherwise altered to accommodate additional tiles in main region 604. An example of such an embodiment is depicted in FIG. 6I.

Figure 6I:
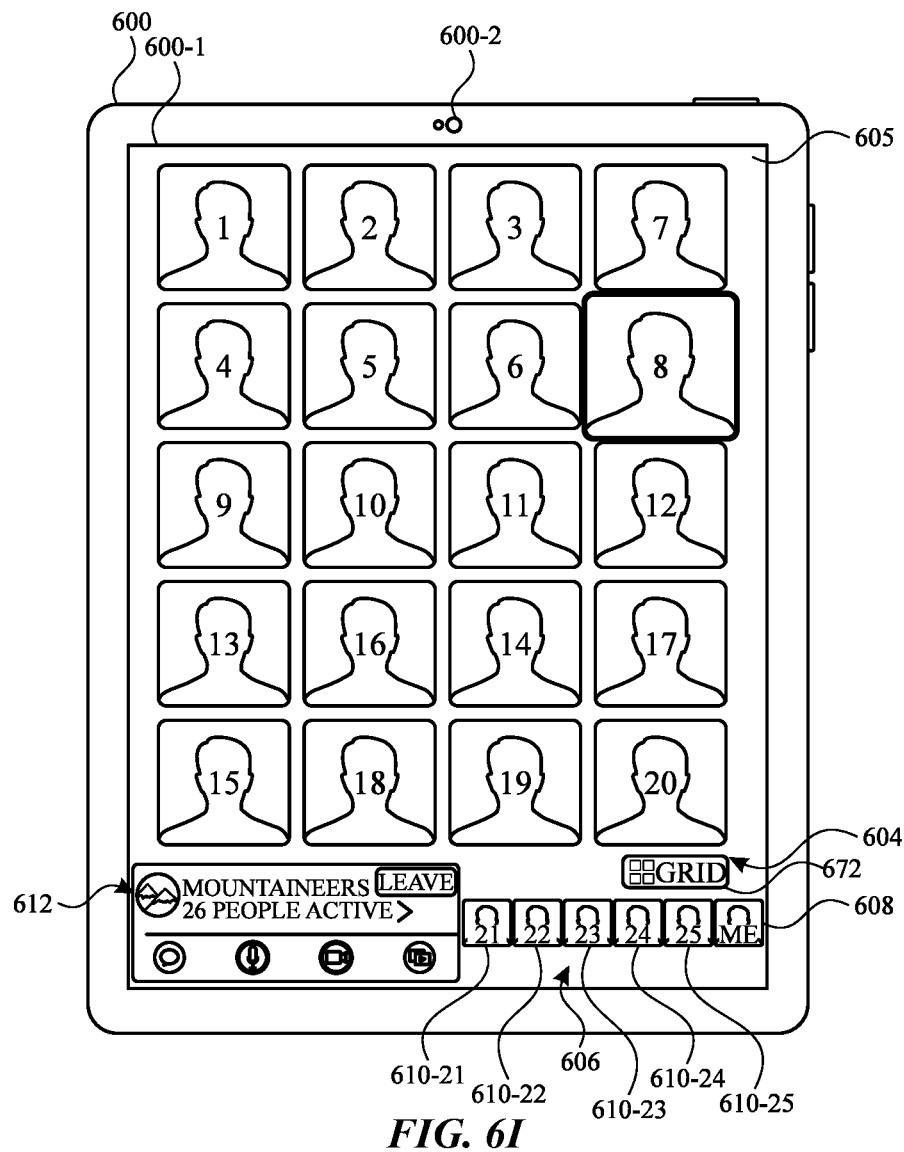

In FIG. 6I, device 600 is rotated, changing video conference interface 605 from a landscape orientation to a portrait orientation. As a result of the rotated orientation and, in some embodiments, due to the aspect ratio of the tiles, device 600 accommodates a greater number of tiles in main region 604, than when video conference interface 605 is in the landscape orientation. Accordingly, device 600 moves some of the tiles (e.g., tiles having the highest priority of the tiles in the roster) from roster 606 to main region 604. Specifically, tiles 610-19 and 610-20 are moved from roster 606 to main region 604, and the tiles in roster 606 slide over to fill the void created by moving tiles 610-19 and 610-20 to main region 604, thereby revealing tiles 610-24 and 610-25 corresponding to participants 24 and 25, respectively.

In some embodiments, when device 600 rotates the orientation of video conference interface 605, device 600 maintains the relative locations of several of the tiles in order to avoid or minimize rearranging the displayed tiles. For example, in FIG. 6I device 600 preserves the locations of tiles 610-1 to 610-12 with respect to each other (remaining positioned in the first four columns and top three rows shown in FIG. 6H), and moves tiles 610-13 to 610-18 from the two rightmost columns (as shown in FIG. 6H) to the two bottom rows in FIG. 6I, filling in the final two spots in the arrangement with tiles 610-19 and 610-20. Although tiles 610-13 to 610-18 are moved, device 600 still maintains relative locations of a subset of those tiles. For example, tiles 610-13 and 610-16 remain positioned next to each other, as do tiles 610-14 and 610-17, and tiles 610-15 and 610-18. In some embodiments, the transition from the arrangement in FIG. 6H to the arrangement in FIG. 6I is displayed as an animation where the two rightmost columns of FIG. 6H (e.g., tiles 610-13 to 610-18) fade out of view when device 600 is rotated, and fade into view in the two bottom rows with tiles 610-19 and 610-20 in FIG. 6I, while the remaining tiles remain displayed and rotate in place to remain in an upright viewing position.

Figure 6J:
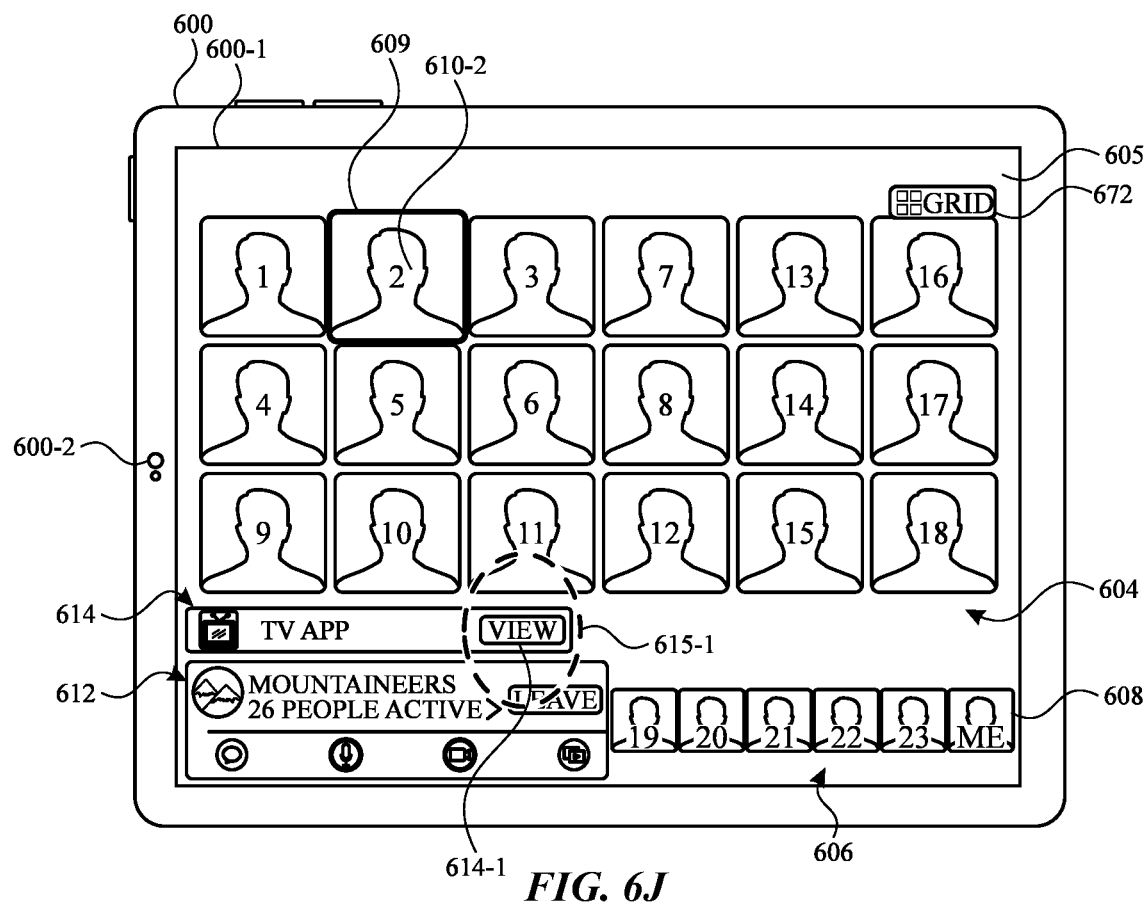

In some embodiments, the rearrangement of tiles from FIG. 6H to FIG. 6I can be reversed by again rotating device 600. In FIG. 6J, device 600 is returned to the landscape orientation. Accordingly, the transition described above with respect to FIGS. 6H and 6I is reversed, with tiles 610-19 and 610-20 moving from main region 604 to roster 606, and tiles 610-24 and 610-25 sliding off-screen (e.g., scrolling off-screen behind camera preview 608). Additionally, tiles 610-13 to 610-18 are moved from the two bottom rows in FIG. 6I to the two rightmost columns in FIG. 6J. In some embodiments, this transition is displayed as an animation where the two bottom rows of FIG. 6I (e.g., tiles 610-13 to 610-20) fade out of view when device 600 is rotated, and fade into view in the respective locations (e.g., tiles 610-19 and 610-20 in roster 606, and tiles 610-13 to 610-18 in the two rightmost columns of FIG. 6J), while the remaining tiles remain displayed and rotate in place to remain in an upright viewing position.

Figure 6K:
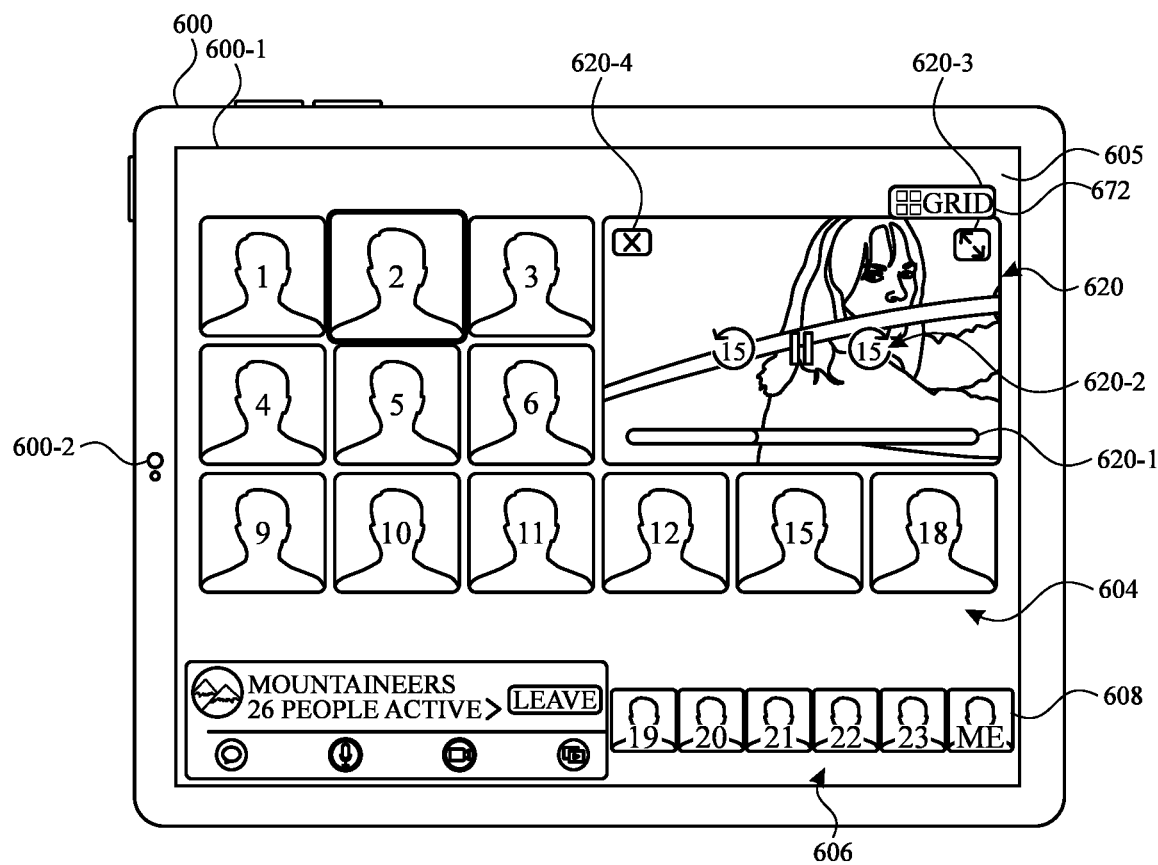

In FIG. 6J, notification 614 is displayed, indicating that one of the participants (e.g., participant 2) has selected content (e.g., a TV show) for viewing in the video conference session (e.g., via a shared-content session). Because participant 2 has selected content for sharing with the Mountaineers group, tile 610-2 is now emphasized, indicating participant 2 is the most active participant. Notification 614 includes option 614-1, which can be selected to initiate playback of the content at device 600, where playback is synchronized with other participants of the Mountaineers group who are also playing the content using their respective devices. In response to input 615-1 selecting option 614-1, device 600 launches the TV app to begin playing the TV show that participant 2 selected for the Mountaineers group, as shown in FIG. 6K. In some embodiments, playback of shared content is handled at device 600 in accordance with various device settings including, for example, settings for shared-content sessions and/or settings for specific apps (such as the TV app). In the embodiment illustrated in FIG. 6J, the settings of device 600 are such that device 600 prompts the user to play the shared content (e.g., by displaying notification 614). However, in some embodiments, the settings of device 600 can be set such that content that is selected for sharing with the group is automatically played at device 600 (e.g., without displaying notification 614).

In FIG. 6K, device 600 launches the TV app to play the TV show selected by participant 2 for the Mountaineers group. The TV show content is displayed at device 600 in content PiP 620. In some embodiments, device 600 displays content PiP 620 overlaying tiles in video conference interface 605. In some embodiments, device 600 rearranges the display of the tiles to avoid being overlaid by content PiP 620. Content PiP 620 includes playback controls 620-2 for adjusting playback (e.g., pause, play, fast forward, rewind, and/or skip) and scrubber bar 620-1 indicating an elapsed play time, which can be selected to scrub through the displayed content. Content PiP 620 can be manipulated on the display of device 600, including being moved (e.g., in response to a drag input), resized (e.g., in response to pinch or de-pinch gestures), minimized (e.g., in response to dragging content PiP 620 to the edge of display 600-1), or enlarged (e.g., to an expanded view, full-screen view, or a view that uses all of the screen outside of a portion of the screen designated for system status information and/or system controls) (e.g., in response to a selection of enlarge affordance 620-3). Playback of the content can be terminated by selecting close affordance 620-4. In some embodiments, terminating playback of the content also terminates playback of the same content at the respective devices of the other members of the Mountaineers group. Similarly, adjusting playback of the content (e.g., playing, pausing, scrubbing content) also adjusts playback of the content at the respective devices of the other members of the Mountaineers group so that the members of the Mountaineers group are able to experience the shared content in synch with the other members. Likewise, other members of the Mountaineers group are able to control playback of the content in content PiP 620 of device 600 by manipulating the playback controls for the content displayed at their respective devices. In some embodiments, the members are able to experience (e.g., watch and listen to) the shared content while simultaneously interacting with each other through the audio and video channels of the video conference session.

Figure 6L:
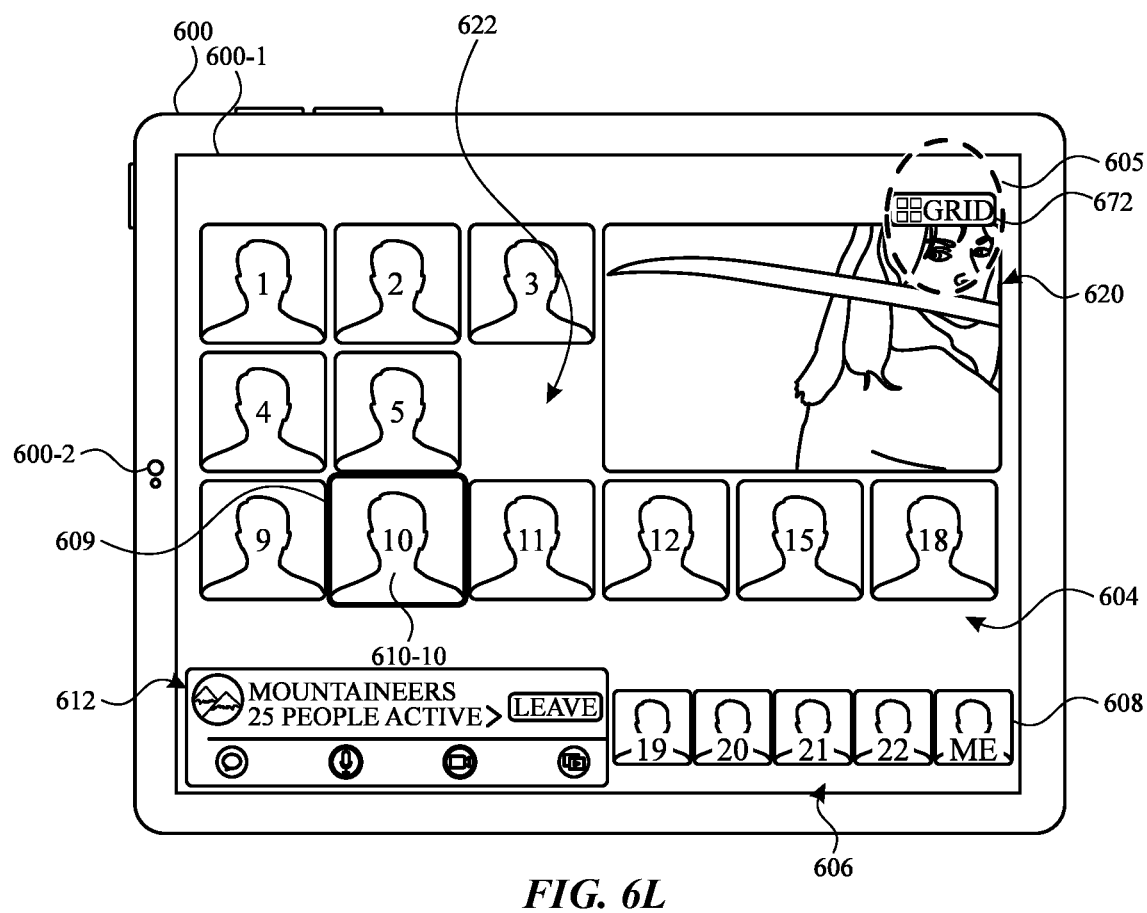

In FIG. 6L, device 600 continues to play the TV show in content PiP 620. Playback controls and other elements of content PiP 620 are automatically dismissed (e.g., after a predetermined amount of time has elapsed without input at content PiP 620). Additionally, participant 10 is now the most active participant (for example, participant 10 started talking about the TV show), and participant 6 has left the video conference session. In some embodiments, device 600 avoids rearranging the displayed arrangement of tiles, even when a participant leaves the video conference. For example, in FIG. 6L, device 600 stops displaying tile 610-6 corresponding to the participant who left, leaving a void 622 in the grid. In some embodiments, device 600 fills the void by replacing the tile of the participant who left, with a tile from roster 606.

FIGS. 6M-6P illustrate example embodiments of a video conference interface displayed using device 601. Device 601 includes display 601-1, camera 601-2, and keyboard 601-3 (optionally included a trackpad, mouse, or other input device). Device 601 displays a video conference interface in video conference window 630, which is similar to video conference interface 605. Video conference window 630 includes various tiles 640 (similar to tiles 610) displayed in main region 634 (similar to main region 604) and roster 636 (similar to roster 606), camera preview 638 (similar to camera preview 608), and control region 632, which includes various controls similar to those shown in control region 612. Camera preview 638 represents at least a portion of the video feed of camera 601-2. In some embodiments, video conference window 630 includes arrangement-selection option 672 that can be selected to change between a grid pattern and an overlapping arrangement of tiles 640 in main region 634 in a manner analogous to that described with reference to FIGS. 6A, 6X, 6Z, and 6AH-6AS.

Figure 6M:
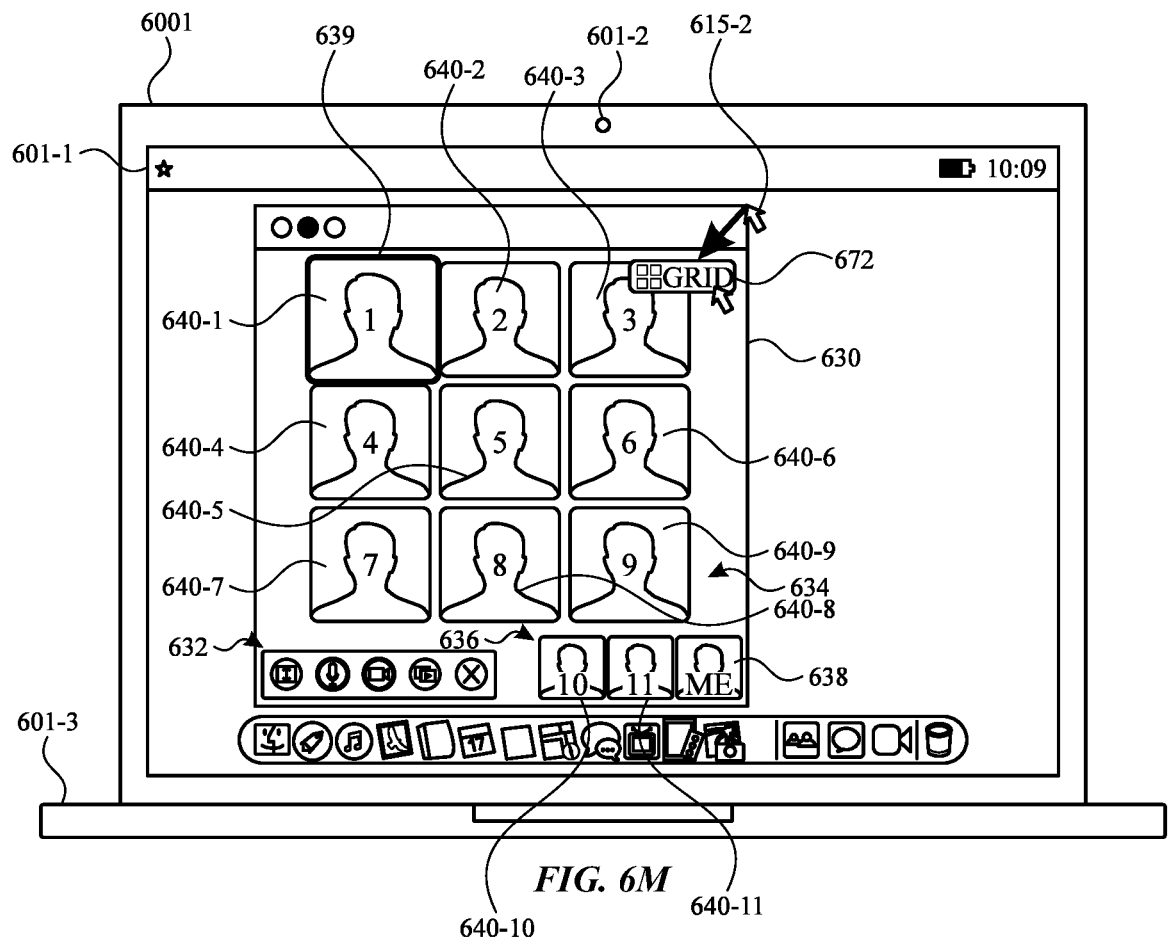
Figure 6N:
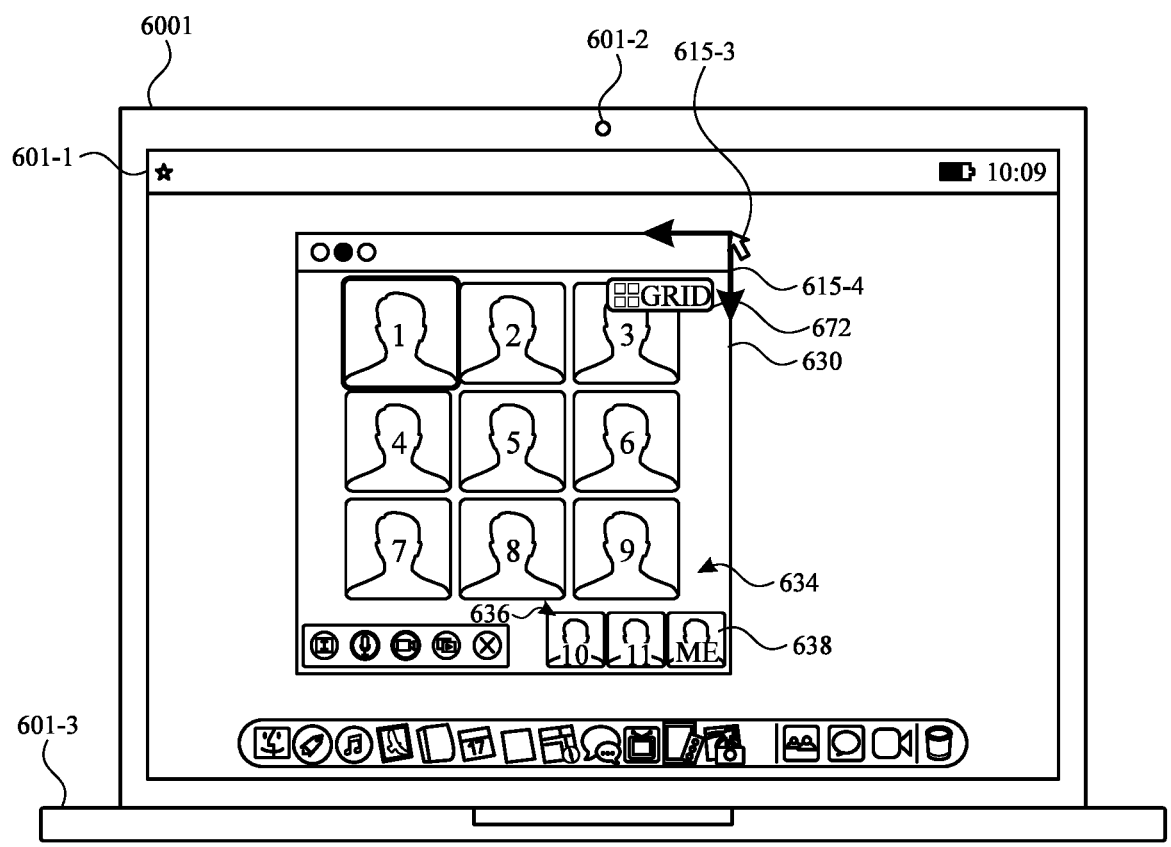

In FIG. 6M, device 601 displays tiles 640-1 to 640-9 in a grid arrangement in main region 634, and tiles 640-10 and 640-11 in roster 636. Tile 640-1 is shown emphasized with a slightly enlarged size and shadow 639, indicating that participant 1 is the most active participant. Device 601 detects input 615-2 (e.g., a click-and-drag gesture with a cursor) using a mouse, trackpad, or other input device. In response to input 615-2, device 601 slightly resizes (e.g., shrinks) video conference window 630 as shown in FIG. 6N, including shrinking tiles 640-1 to 640-11 and camera preview 638, without moving any of the tiles from main region 634 to roster 636 (or vice versa). In some embodiments, the resizing can be reversed (e.g., enlarging the tiles and camera preview) by enlarging window 630.

In FIG. 6N, device 601 detects inputs 615-3 or 615-4. Input 615-3 is a click-and-drag gesture to narrow video conference window 630. Input 615-4 is a click-and-drag gesture to shorten video conference window 630. The results of these respective inputs are illustrated in FIGS. 6O and 6P, respectively, as discussed in greater detail below.

Figure 6O:
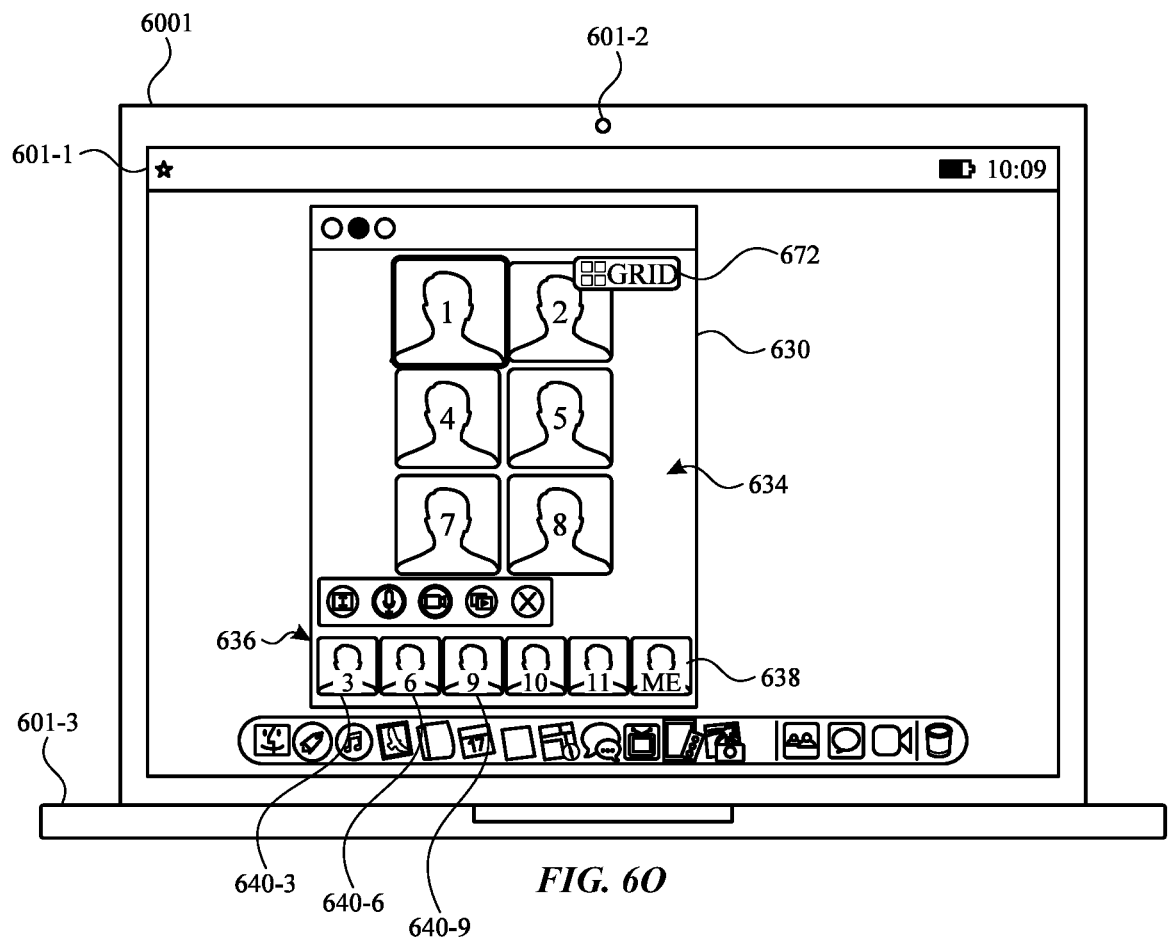

FIG. 6O illustrates the result of narrowing input 615-3. Device 601 narrows window 630, including narrowing main region 634. As a result, the dimensions of main region 634 are decreased in the horizontal direction, and device 601 moves the rightmost column of tiles from main region 634 to roster 636. Specifically, tiles 640-3, 640-6, and 640-9 are moved from main region 634 to roster 636, next to tiles 640-10 and 640-11, which are also in the roster. In some embodiments, the narrowing of window 630 can be reversed (e.g., by clicking and dragging the side edge of window 630 to widen the window), which also reverses the arrangement of the tiles, moving tiles 640-3, 640-6, and 640-9 from roster 636 to main region 634.

Figure 6P:
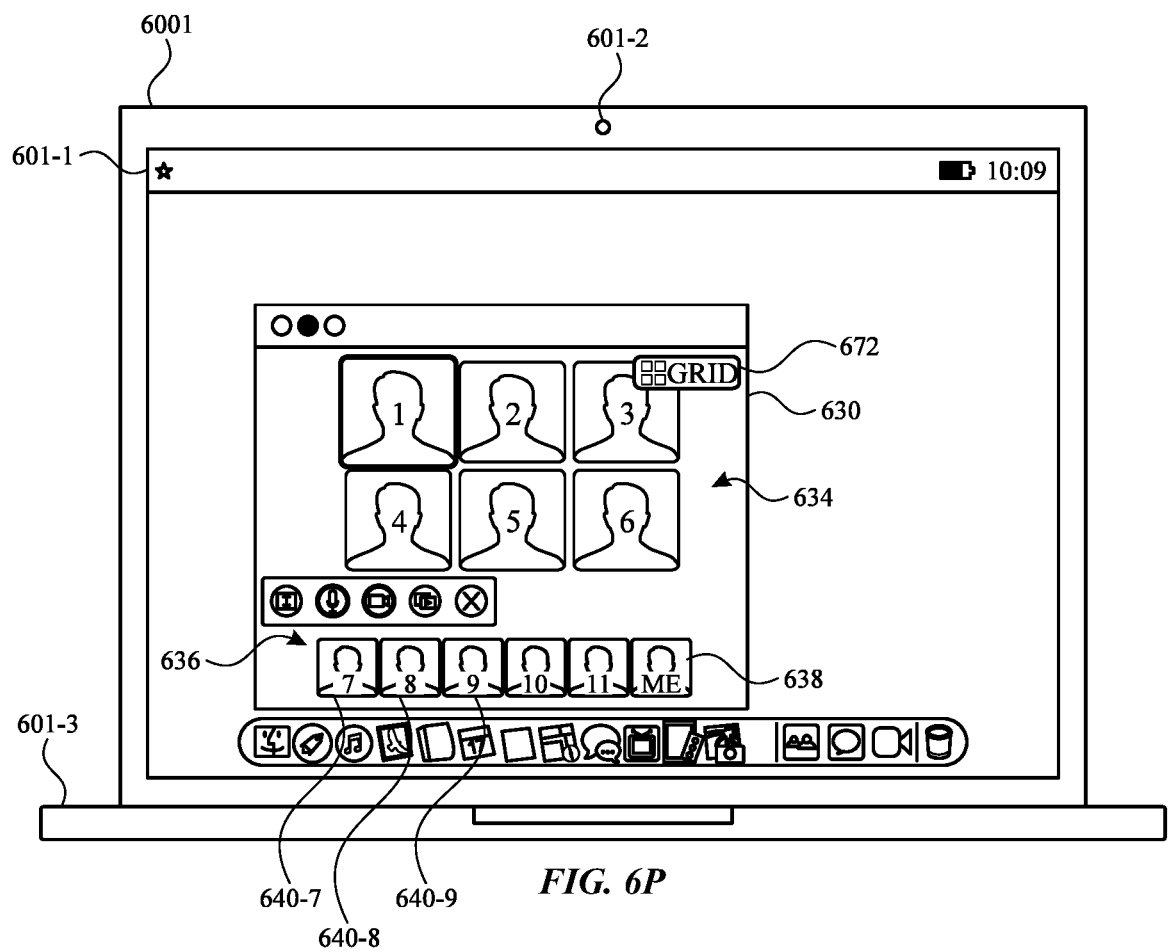

FIG. 6P illustrates the result of shortening input 615-4. Device 601 shortens window 630, including shortening main region 634. As a result, the dimensions of main region 634 are decreased in the vertical direction, and device 601 moves the bottom row of tiles from main region 634 to roster 636. Specifically, tiles 640-7, 640-8, and 640-9 are moved from main region 634 to roster 636, next to tiles 640-10 and 640-11, which are also in the roster. In some embodiments, the shortening of window 630 can be reversed (e.g., by clicking and dragging the top edge of window 630 to lengthen the window), which also reverses the arrangement of the tiles, moving tiles 640-7, 640-8, and 640-9 from roster 636 to main region 634.

FIGS. 6Q-6AG illustrate example embodiments of a video conference interface displayed using device 602. Device 602 includes display 602-1 and camera 602-2. Device 602 displays video conference interface 650, which is similar to video conference interface 605 and video conference window 630. Video conference interface 650 includes various tiles 660 (similar to tiles 610 and tiles 640) displayed in main region 654 (similar to main region 604 and main region 634), camera preview 658 (similar to camera preview 608 and camera preview 638), and control region 652 (similar to control region 612). Camera preview 658 represents the video feed of camera 602-2. In some embodiments, the roster is not displayed when there are no tiles in the roster. For example, in FIG. 6Q, device 602 displays tile 660-2 in main region 654 and partially located at a region of display 602-1 that typically displays the roster, when applicable (e.g., as shown in FIG. 6V).

In FIG. 6Q, device 602 displays tiles 660-1 and 660-2 in main region 654. Participant 2 is the most active participant, as indicated by the enlarged size of tile 660-2 and shadow 659. Camera preview 658 is displayed overlapping tile 660-2. Device 602 detects input 615-5 on tile 660-2 and, in response, brings tile 660-2 in front of camera preview 658, and displays additional controls and elements associated with tile 660-2, as shown in FIG. 6R. Specifically, device 602 displays participant name 664, capture affordance 662, and enlarge affordance 666. Capture affordance 662 can be selected to capture an image of tile 660-2, and enlarge affordance 666 can be selected to enlarge tile 660-2 (e.g., in a pinned view, full-screen view, or a view that uses all of the screen outside of a portion of the screen designated for system status information and/or system controls).

Figure 6T:
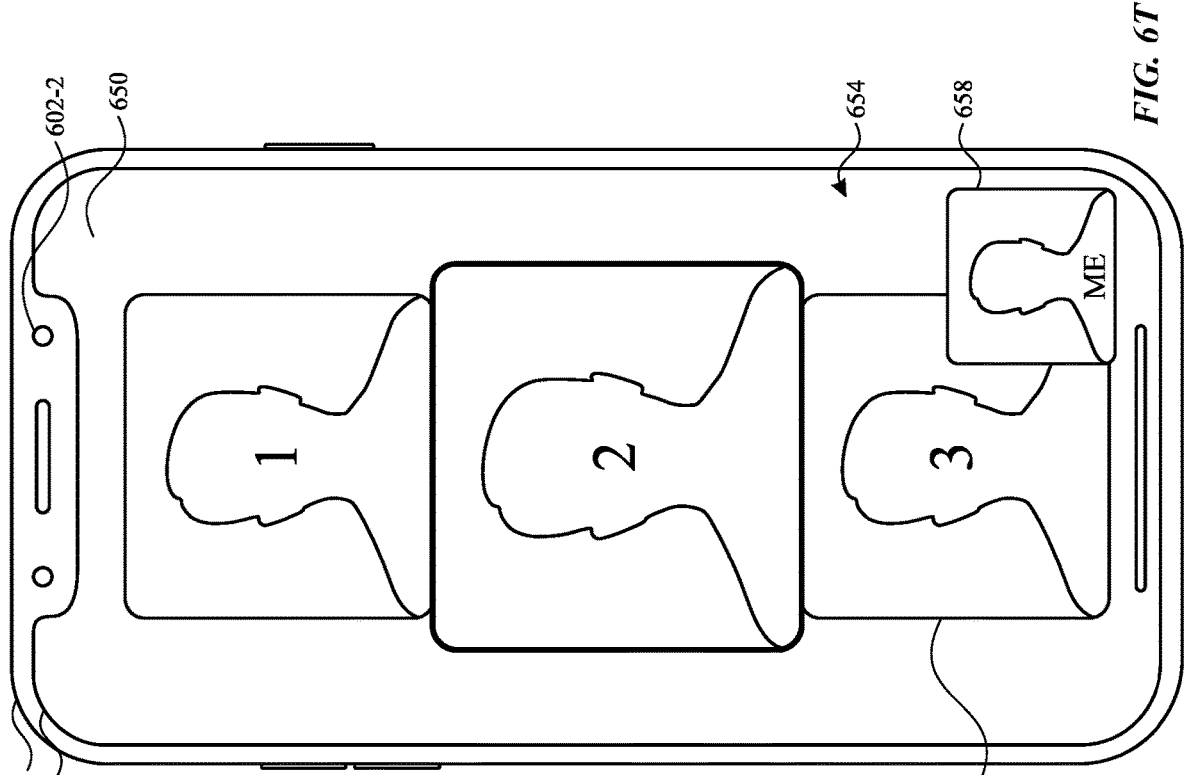
Figure 6S:
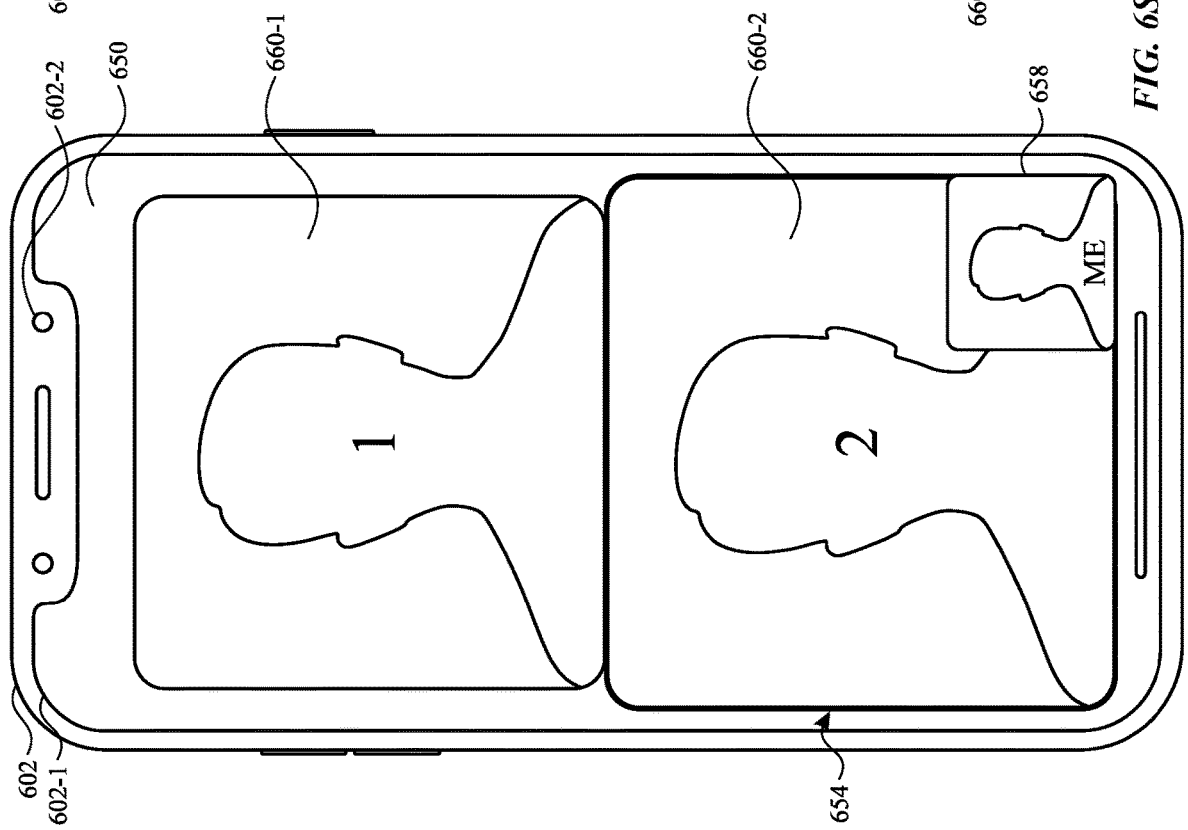

In some embodiments, the devices adjust the displayed sizes and/or arrangements of the tiles in the video conference interface based on the available space in the main region. For example, in FIG. 6S, control region 652 disappears after a predetermined amount of time, and device 602 enlarges and shifts the positions of tiles 660-1 and 660-2 to fill out the available space created by the removal of control region 652. Conversely, when control region 652 is displayed, device 602 resizes and shifts the positions of tiles 660-1 and 660-2 to make room for the control region (e.g., as shown in FIG. 6Q). In FIG. 6T, participant 3 joins the video conference session and, in response, device 602 displays tile 660-3 in main region 654, shrinking tiles 660-1 and 660-2 to make room for tile 660-3. In FIG. 6U, participant 4 joins the video conference session and, in response, device 602 displays tile 660-4 in main region 654, shrinking and rearranging tiles 660-1 to 660-3 to accommodate tile 660-4.

Figure 6V:
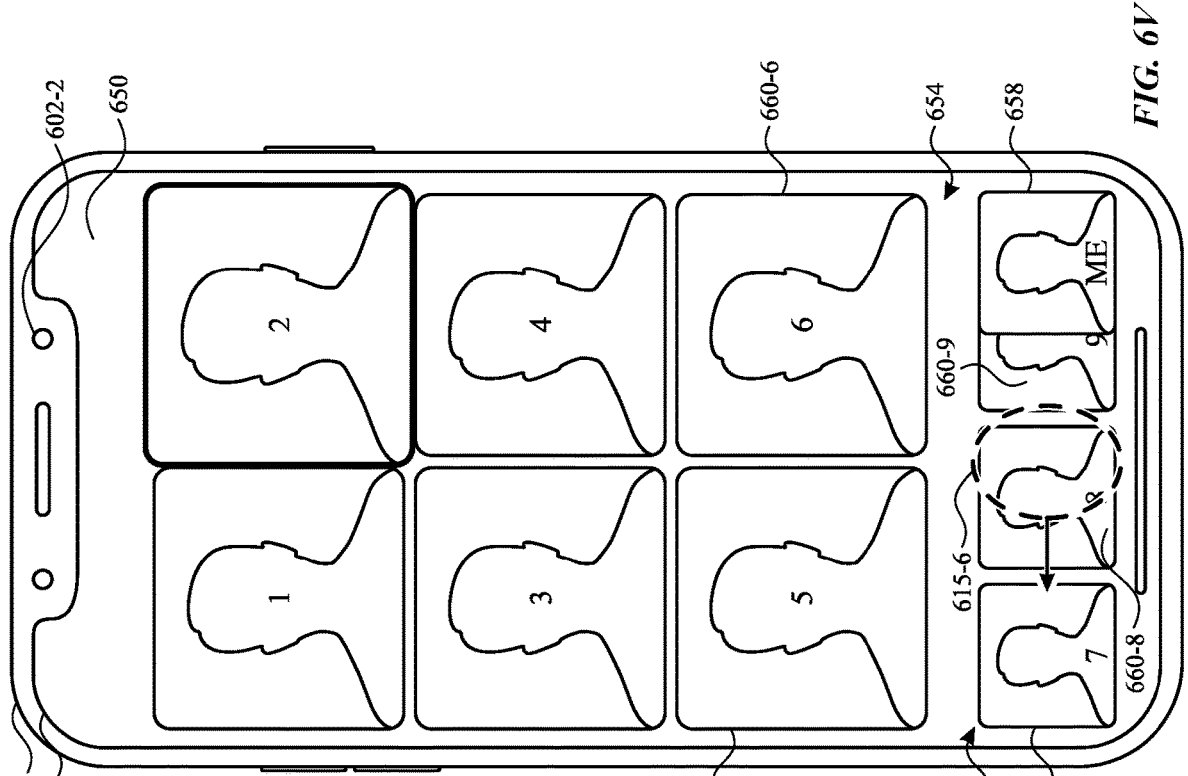
Figure 6U:
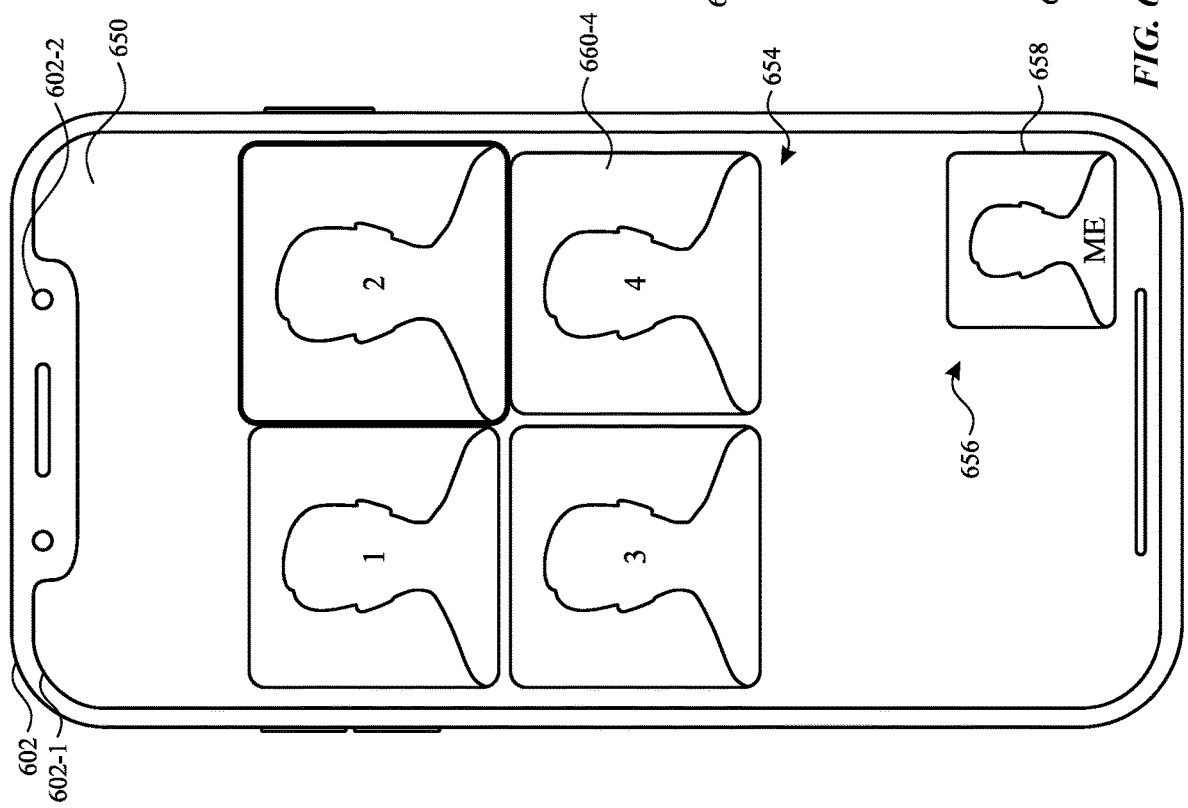
Figure 6A:
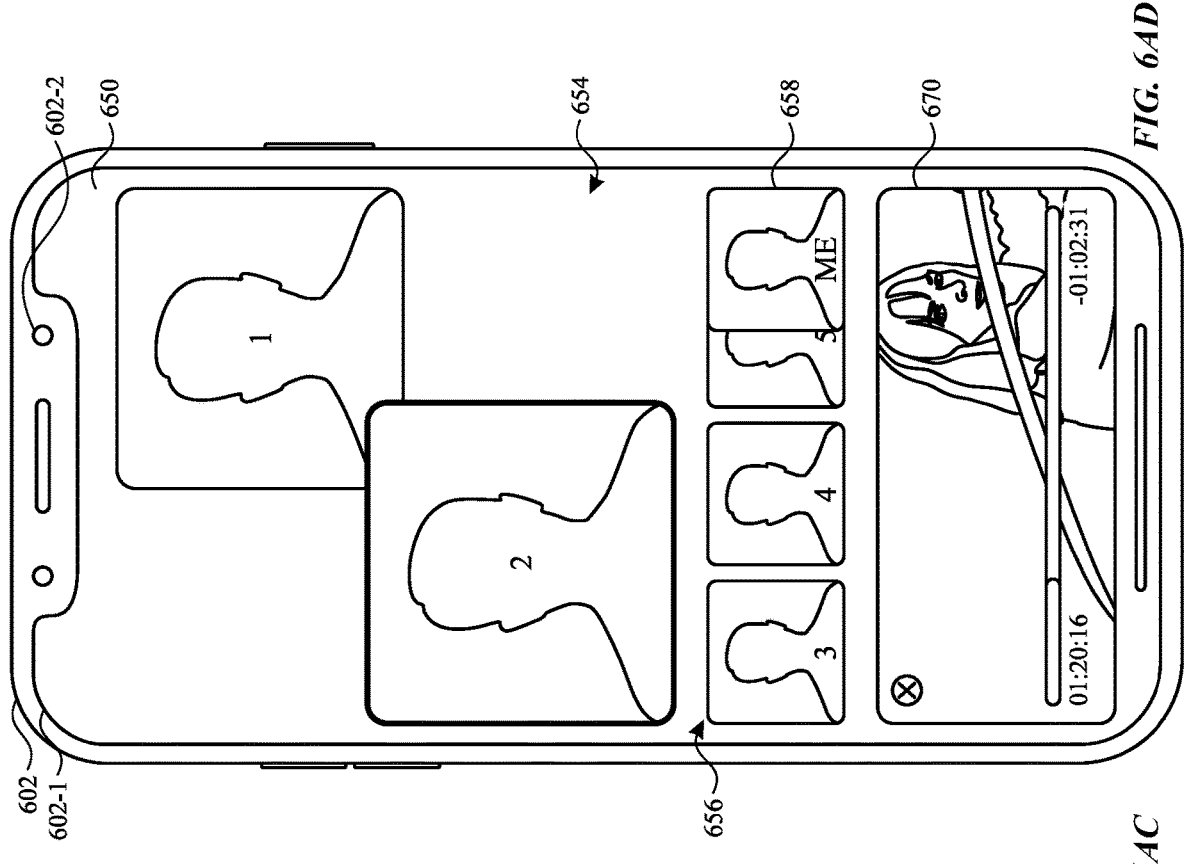
Figure 6A:
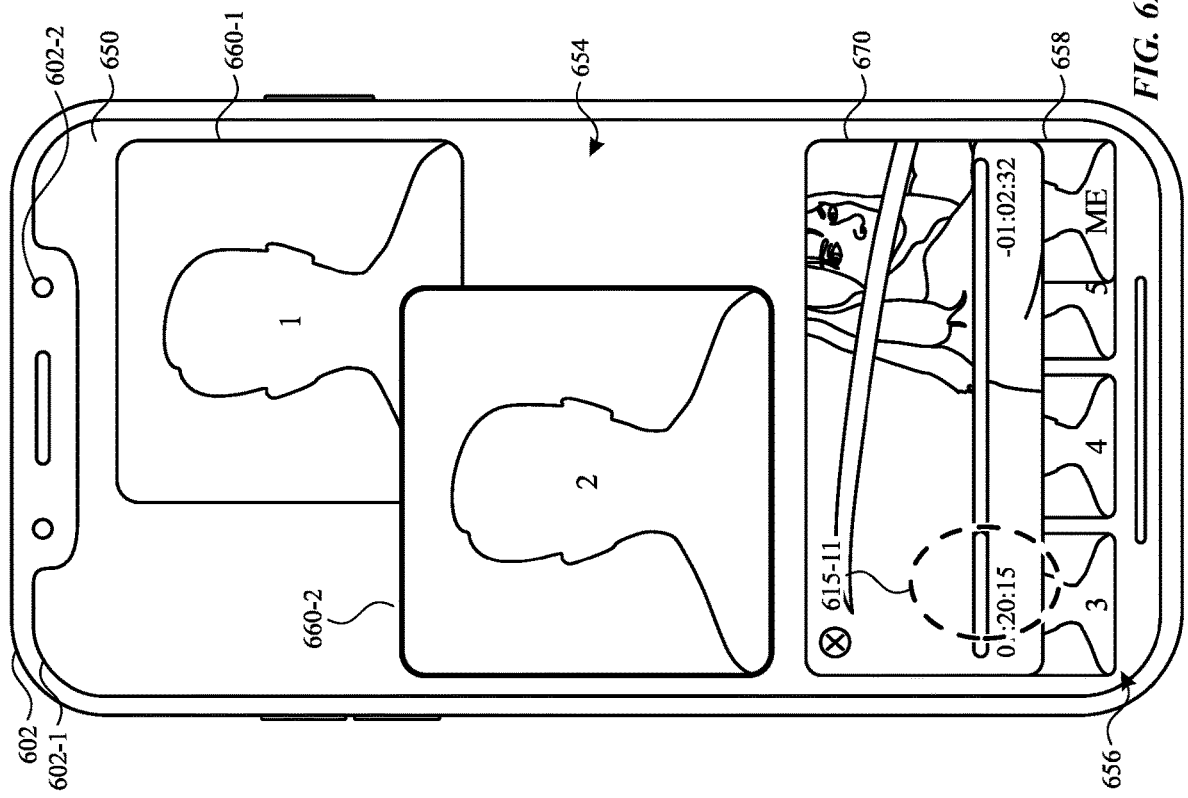
Figure 6A:
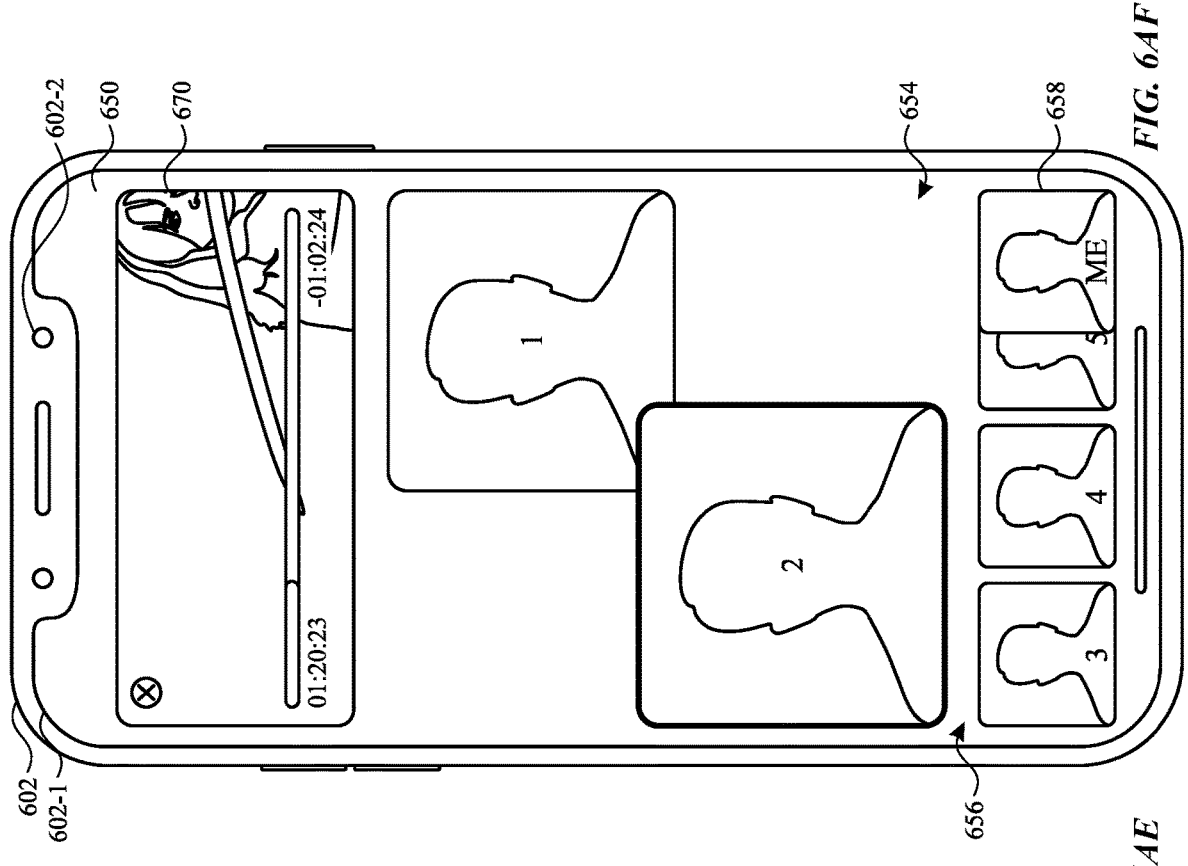
Figure 6A:
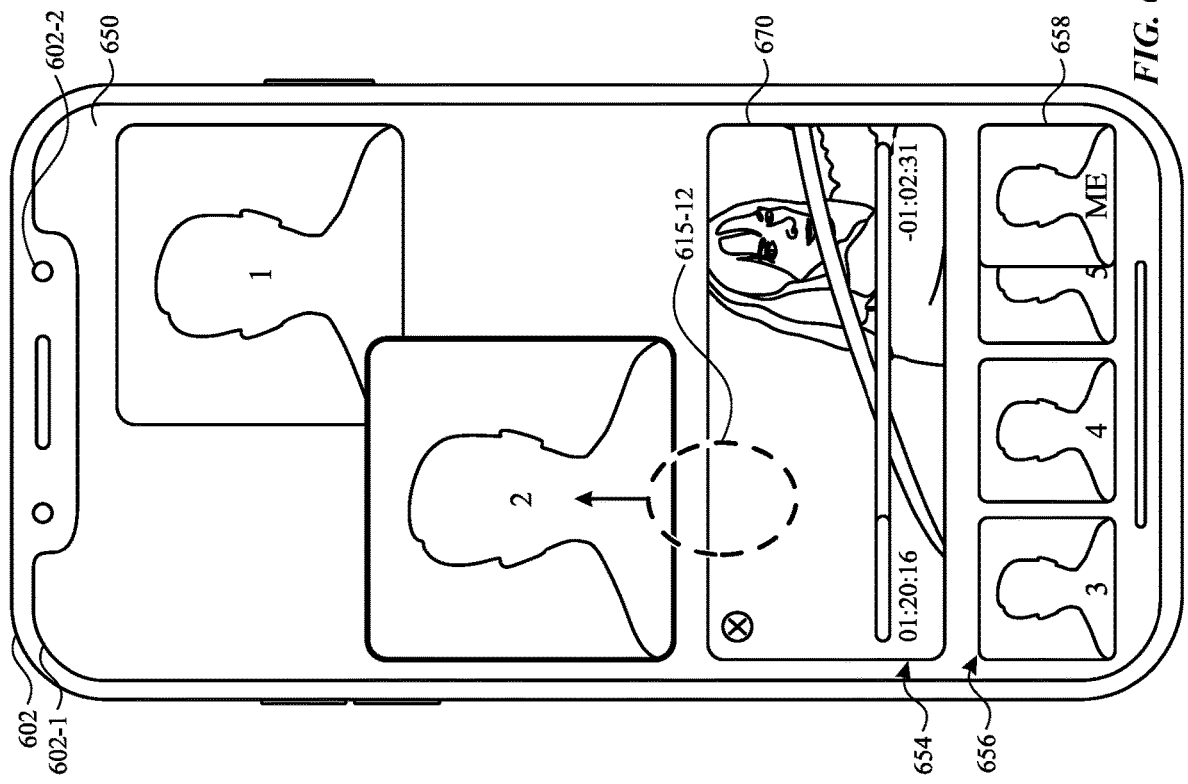
Figure 6A:
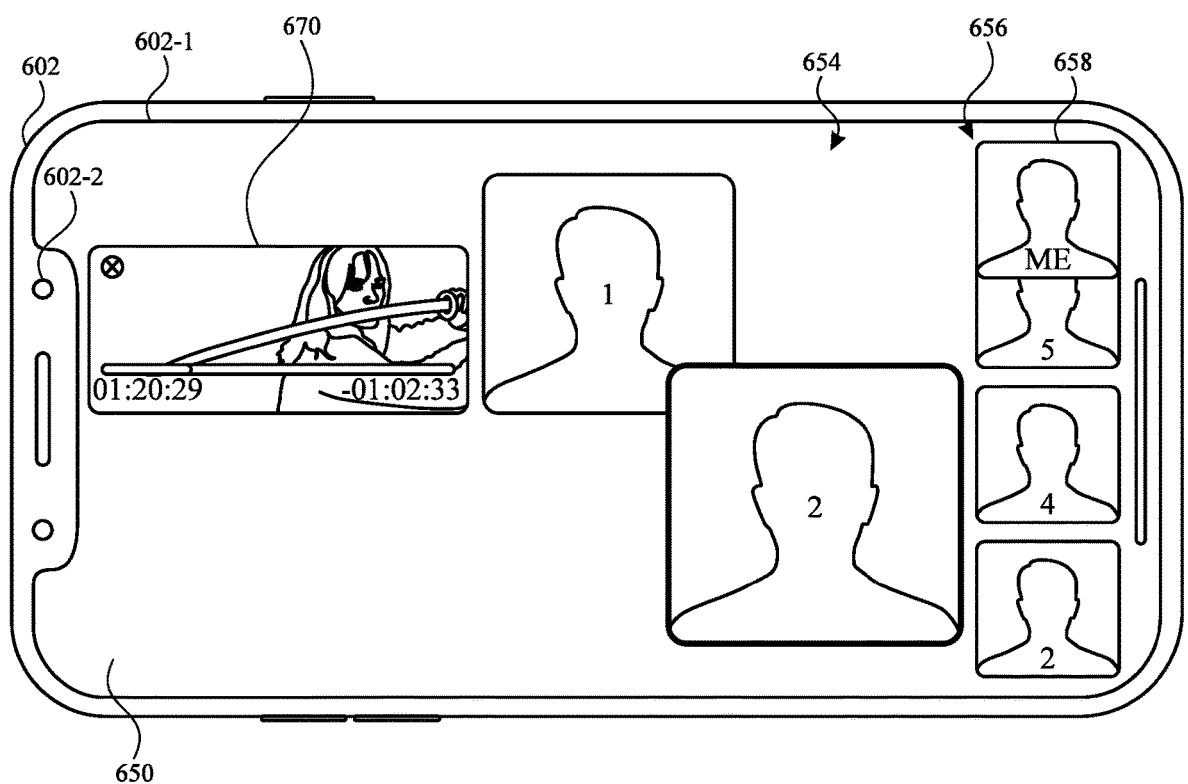
Figure 6A:
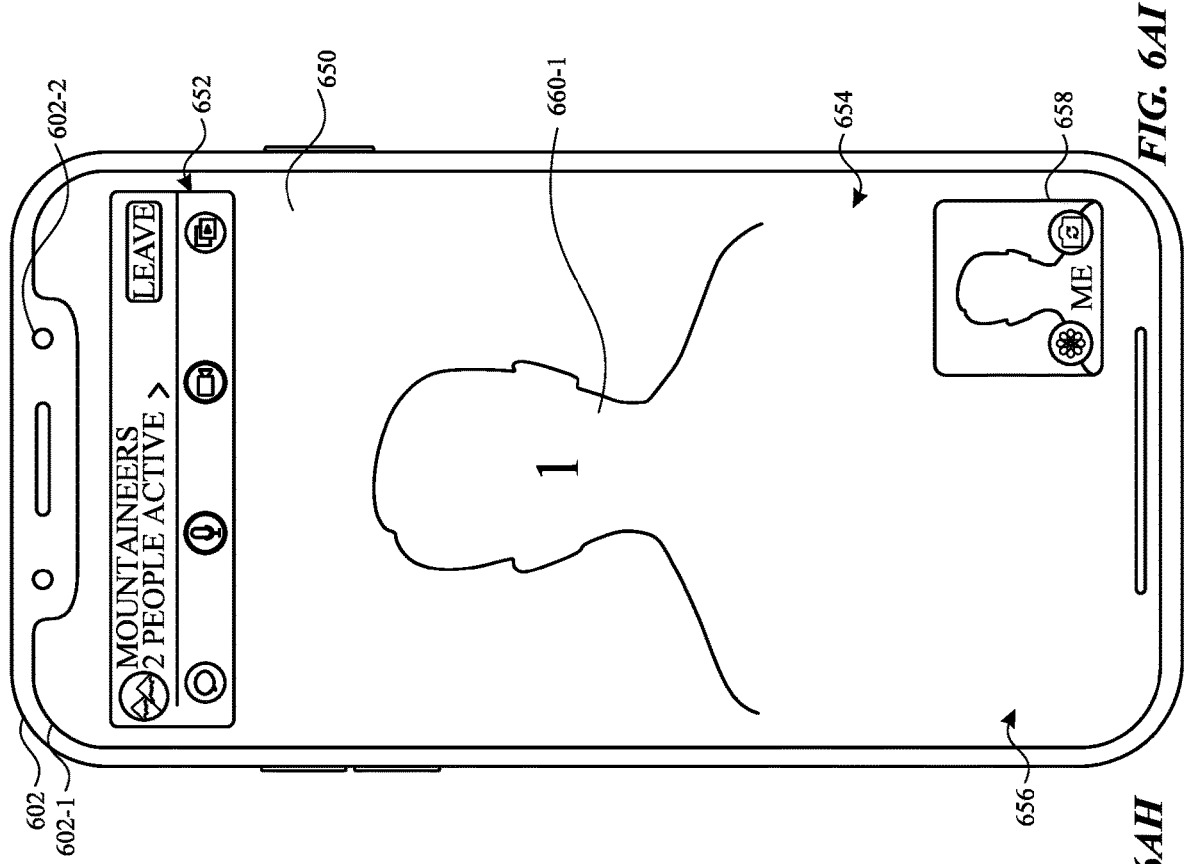
Figure 6A:
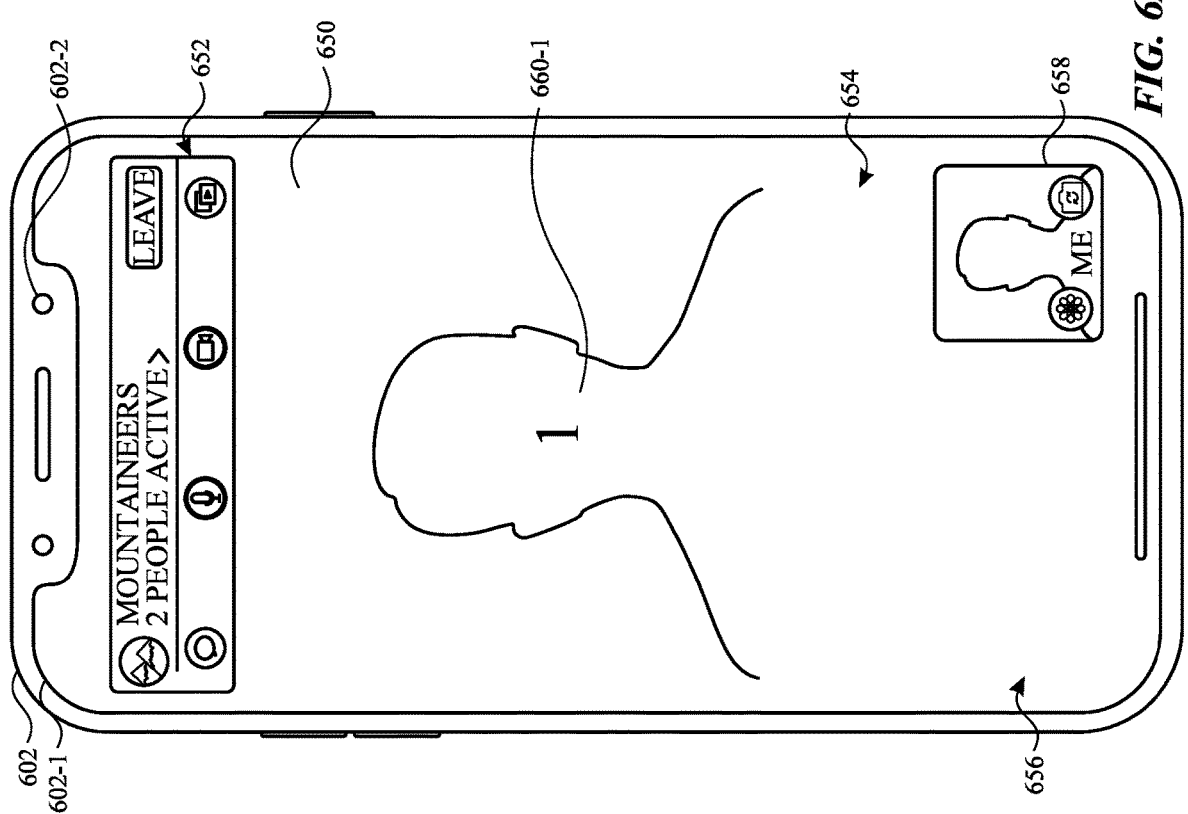

FIG. 6V depicts device 602 after participants 5-11 have joined the video conference session. Tiles 660-5 and 660-6 are displayed in main region 654, and tiles 660-7 to 660-9 are shown in roster 656, with tile 660-9 positioned behind camera preview 658. In response to input 615-6, device 602 scrolls the tiles in roster 656 to show tiles 660-9 to 660-11 in FIG. 6W. Participant 4 is now the most active participant, and device 602 detects input 615-7, scrolling the roster in the opposite direction, thereby hiding tiles 660-10 and 660-11 and redisplaying tiles 660-7 and 660-8, as shown in FIG. 6X.

In FIG. 6X, in response to detecting input 615-20 (e.g., a tap) in FIG. 6W, device 602 displays control region 652 and arrangement-selection option 672, and shifts and resizes tiles 660-1 to 660-6 to accommodate the display of control region 652. Device 602 detects input 615-8 at status region 652-1 of control region 652 and, in response, displays group card interface 665, as shown in FIG. 6Y. In some embodiments, group card interface 665 includes an option to enable or disable the grid view arrangement. For example, in FIG. 6Y, device 602 displays group card interface 665 with grid view option 668, shown in an enabled state. In some embodiments, grid view option 668 is placed at a different location in group card interface 665. For example, grid view option 668 is displayed below a listing of participants (optionally included in a region with a copy invitation link) and, in some embodiments, is displayed after scrolling group card interface 665 (e.g., when there is a large number of participants). In FIG. 6Y, device 602 detects input 615-9 selecting grid view option 668 to disable the grid view arrangement, and detects input 615-10 to return to video conference interface 650. In FIG. 6Z, device 602 displays video conference interface 650 with the grid view arrangement disabled. Accordingly, tiles 660-1, 660-2, and 660-3 are displayed in a non-grid arrangement (e.g., an overlapping arrangement) in main region 654, and tiles 660-4, 660-5, and 660-6 are moved to roster 656 with tiles 660-6 to 660-11.

In some embodiments, video conference interface 650 changes from the grid pattern shown in FIG. 6X to the overlapping arrangement shown in FIG. 6Z in response to detecting input 615-14 (e.g., selection of arrangement-selection option 672) in FIG. 6X. In some embodiments, video conference interface 650 changes from the grid pattern shown in FIG. 6X to the overlapping arrangement shown in FIG. 6Z in response to detecting input 615-13 (e.g., a gesture that includes contacts 615-13A and 615-13B) in FIG. 6X. In the embodiment illustrated in FIG. 6X, input 615-13 is a de-pinch gesture with two contacts that move further apart over time and/or move through locations corresponding to one or more of the representations (e.g., 660) of participants in the user interface. In some embodiments, video conference interface 650 changes from the grid pattern shown in FIG. 6X to the overlapping arrangement shown in FIG. 6Z in response to detecting a pinch gesture with two or more contacts (e.g., 615-15A and 615-15B) that move closer together over time and move through locations corresponding to one or more of the representations (e.g., 660) of participants in the user interface.

In some embodiments, video conference interface 650 changes from the overlapping arrangement shown in FIG. 6Z to the grid pattern shown in FIG. 6X in response to detecting input 615-16 (e.g., selection of arrangement-selection option 672) in FIG. 6Z. In some embodiments, video conference interface 650 changes from the overlapping arrangement shown in FIG. 6Z to the grid pattern shown in FIG. 6X in response to detecting input 615-15 (e.g., a gesture that includes contacts 615-15A and 615-15B) in FIG. 6Z. In the embodiment illustrated in FIG. 6Z, input 615-15 is a pinch gesture with two contacts that move closer together over time and/or move through locations corresponding to one or more of the representations (e.g., 660) of participants in the user interface. In some embodiments, video conference interface 650 changes from the overlapping arrangement shown in FIG. 6Z to the grid pattern shown in FIG. 6X in response to detecting a de-pinch gesture with two or more contacts (e.g., 615-13A and 615-13B) that move further apart over time and move through locations corresponding to one or more of the representations (e.g., 660) of participants in the user interface.

In FIG. 6AA, after a predetermined amount of time passes without an input, or in response to input 615-21 (e.g., a tap in video conference interface 650 that is not directed to a representation 660) in FIG. 6Z, device 602 hides control region 652 and resizes and shifts tiles 660-1 to 660-3 in main region 654. Participant 2 is now the most active participant as indicated by the slightly enlarged size of tile 660-2 and shadow 659.

FIGS. 6AB-6AG illustrate various embodiments of device 602 moving tiles to avoid overlapping with shared content. In FIG. 6AB, device 602 is playing media from a shared-content session (e.g., a TV show or movie) in content PiP 670 (similar to content PiP 620). Tiles 660-1 and 660-2 are resized and shifted, and tile 660-3 has been moved to roster 656, to accommodate non-overlapping display of content PiP 670. Device 602 detects input 615-11 (e.g., a drag gesture) on content PiP 670 and, in response, moves content PiP 670 on the display while input 615-11 is maintained. As content PiP 670 is dragged on the display, device 602 moves tiles 660-1 and 660-2 out of the way of content PiP 670, as shown in FIG. 6AC.

In some embodiments, device 602 moves roster 656 and camera preview 658 to accommodate movement of content PiP 670. For example, in FIG. 6AD, device 602 moves roster 656 and camera preview 658 when content PiP 670 is moved to the bottom of display 602-1. In some embodiments, device 602 does not move roster 656 or camera preview 658 to accommodate movement of content PiP 670. For example, when content PiP 670 is hovering over roster 656 and camera preview 658 as shown in FIG. 6AC, and input 615-11 is terminated (e.g., a finger lift), device 602 repositions content PiP 670 at a location above roster 656 and camera preview 658, and repositions/resizes tiles 660-1 and 660-2, as shown in FIG. 6AE. In FIG. 6AE, device 602 detects input 615-12 and, in response, moves content PiP 670 to the top of video conference interface 650, as shown in FIG. 6AF.

In some embodiments, the devices maintain a location of displayed elements (e.g., tiles) relative to the display when an orientation of the video conference interface is changed. For example, in FIG. 6AG, device 602 is rotated counterclockwise from the portrait orientation in FIG. 6AF. Device 602 maintains the locations of content PiP 670, tiles 660-1 to 660-5, and camera preview 658 with respect to display 602-1, while rotating the respective elements to maintain an upright viewing position. In some embodiments, device 602 optionally resizes content PiP 670, tile 660-1, and/or tile 660-2 to maintain the position of the respective elements on display 602-1.

FIGS. 6AH-6AS illustrate embodiments of video conference interface 650. FIGS. 6AH, 6AJ, 6AL, 6AN, 6AP, and 6AR show video conference interface 650 with the grid pattern disabled (e.g., and the overlapping arrangement enabled); and FIGS. 6AI, 6AK, 6AM, 6AO, 6AQ, and 6AS show the corresponding video conference interface 650 with the grid pattern enabled (e.g., and the overlapping arrangement disabled).

FIG. 6AH illustrates video conference interface 650 when there are two active participants in the video conference (e.g., one remote participant (participant 1 represented by 660-1) and a participant associated with device 602 (represented by camera preview 658)), control region 652 is displayed, and the grid pattern is disabled. Because the number of participants (two participants) is less than a predetermined number of participants (e.g., three participants, four participants (as in FIG. 6AH), or five participants), arrangement-selection option 672 is not displayed in FIG. 6AH. FIG. 6AI illustrates video conference interface 650 under the same conditions as FIG. 6AH, except that the grid pattern is enabled (e.g., the same two participants are active, control region 652 is displayed, and the grid pattern is enabled). Because the number of participants (two participants) is less than a predetermined number of participants (e.g., three participants, four participants (as in FIG. 6AI), or five participants), arrangement-selection option 672 is not displayed in FIG. 6AI. In the embodiment illustrated in FIGS. 6AH and 6AI, when there are two active participants, video conference interface 650 is the same when the grid pattern is disabled as when the grid pattern is enabled.

FIG. 6AJ illustrates video conference interface 650 when there are three active participants in the video conference (e.g., participant 2 represented by 660-2 has joined the video conference compared to FIGS. 6AH and 6AI), control region 652 is displayed, and the grid pattern is disabled. Because the number of participants (three participants) is less than the predetermined number of participants (e.g., three participants, four participants (as in FIG. 6AJ), or five participants), arrangement-selection option 672 is not displayed in FIG. 6AJ. FIG. 6AK illustrates video conference interface 650 under the same conditions as FIG. 6AJ, except that the grid pattern is enabled (e.g., the same three participants are active, control region 652 is displayed, and the grid pattern is enabled). Because the number of participants (three participants) is less than the predetermined number of participants (e.g., three participants, four participants (as in FIG. 6AK), or five participants), arrangement-selection option 672 is not displayed in FIG. 6AK. In the embodiment illustrated in FIGS. 6AJ and 6AK, when there are three active participants, video conference interface 650 is the same when the grid pattern is disabled as when the grid pattern is enabled.

FIG. 6AL illustrates video conference interface 650 when there are four active participants in the video conference (e.g., participant 3 represented by 660-3 has joined the video conference compared to FIGS. 6AJ and 6AK), control region 652 is displayed, and the grid pattern is disabled. Because the number of participants (four participants) meets (e.g., is equal to or greater than) the predetermined number of participants (e.g., three participants, four participants (as in FIG. 6AL), or five participants) and control region 652 is displayed, arrangement-selection option 672 is displayed in FIG. 6AL. Because the grid pattern is not enabled, arrangement-selection option 672 is not emphasized (e.g., not bolded) in FIG. 6AL. FIG. 6AM illustrates video conference interface 650 under the same conditions as FIG. 6AL, except that the grid pattern is enabled (e.g., the same four participants are active, control region 652 is displayed, and the grid pattern is enabled). Because the number of participants (four participants) meets the predetermined number of participants (e.g., three participants, four participants (as in FIG. 6AM), or five participants) and control region 652 is displayed, arrangement-selection option 672 is displayed in FIG. 6AM. In the embodiment illustrated in FIGS. 6AJ and 6AK, when there are three active participants, video conference interface 650 is the same when the grid pattern is disabled as when the grid pattern is enabled. Because the grid pattern is enabled, arrangement-selection option 672 is emphasized (e.g., bolded) in FIG. 6AM. In response to detecting input 615-17 (e.g., a tap) corresponding to selection of arrangement-selection option 672 in FIG. 6AL, device 602 enables the grid pattern, changes video conference interface 650 (e.g., including tiles 660 in main region 654) from the overlapping arrangement in FIG. 6AL to the grid pattern in FIG. 6AM and emphasizes arrangement-selection option 672. In response to detecting input 615-18 (e.g., a tap) corresponding to selection of arrangement-selection option 672 in FIG. 6AM, device 602 disables the grid pattern (e.g., an enables the overlapping arrangement), changes video conference interface 650 (e.g., including tiles 660 in main region 654) from the grid pattern in FIG. 6AM to the overlapping arrangement in FIG. 6AL and un-emphasizes arrangement-selection option 672.

FIG. 6AN illustrates video conference interface 650 when there are four active participants in the video conference (e.g., the same 4 participants as in FIGS. 6AL and 6AM), control region 652 and arrangement-selection option 672 are not displayed, and the grid pattern is disabled. In some embodiments, device 602 ceases to display control region 652 and/or arrangement-selection option 672 in response to a determination that a predetermined amount of time has passed since an input has been received or in response to detecting input 615-22 in FIG. 6AL (e.g., a tap at a location on video conference interface 650 that does not correspond to a location of a participant). In some embodiments, device 602 displays control region 652 and/or arrangement-selection option 672 (e.g., displays video conference interface 650 as shown in FIG. 6AL) in response to detecting input 615-24 in FIG. 6AN (e.g., a tap at a location on video conference interface 650 that does not correspond to a location of a participant). FIG. 6AO illustrates video conference interface 650 under the same conditions as FIG. 6AN, except that the grid pattern is enabled (e.g., the same four participants are active, control region 652 and arrangement-selection option 672 are not displayed, and the grid pattern is enabled). In some embodiments, device 602 ceases to display control region 652 and/or arrangement-selection option 672 in response to a determination that a predetermined amount of time has passed since an input has been received or in response to detecting input 615-23 in FIG. 6AM (e.g., a tap at a location on video conference interface 650 that does not correspond to a location of a participant). In some embodiments, device 602 displays control region 652 and/or arrangement-selection option 672 (e.g., displays video conference interface 650 as shown in FIG. 6AM) in response to detecting input 615-26 in FIG. 6AO (e.g., a tap at a location on video conference interface 650 that does not correspond to a location of a participant). In some embodiments, in response to detecting an input 615-25 (e.g., a de-pinch gesture as described with reference to FIG. 6Z or a pinch gesture as described with reference to FIG. 6X) on display 602-1 in FIG. 6AN, device 602 enables the grid pattern, changes video conference interface 650 (e.g., including tiles 660 in main region 654) from the overlapping arrangement in FIG. 6AN to the grid pattern in FIG. 6AO. In some embodiments, in response to detecting an input 615-27 (e.g., a de-pinch gesture as described with reference to FIG. 6Z or a pinch gesture as described with reference to FIG. 6X) on display 602-1 in FIG. 6AO, device 602 disables the grid pattern (e.g., an enables the overlapping arrangement), changes video conference interface 650 (e.g., including tiles 660 in main region 654) from the grid pattern in FIG. 6AO to the overlapping arrangement in FIG. 6AN.

FIG. 6AP illustrates video conference interface 650 when there are five active participants in the video conference (e.g., participant 4 represented by 660-4 has joined the video conference compared to FIGS. 6AN and 6AO) and the grid pattern is disabled (e.g., the overlapping arrangement is enabled). Since the grid pattern is disabled, tile 660-4 representing participant 4 is displayed in roster 656 next to camera preview 658. In response to the grid pattern being disabled when the number of participants increases to (or above) a predetermined number (e.g., four participants, five participants (as in FIG. 6AP), or six participants), device 602 displays notification 674 indicating that the grid pattern is available (e.g., some or all of tiles 660 can be displayed in a grid pattern instead of the overlapping arrangement shown, for example, in FIG. 6AP). FIG. 6AQ illustrates video conference interface 650 under the same conditions as FIG. 6AP, except that the grid pattern is enabled (e.g., the same five participants are active, control region 652 and arrangement-selection option 672 are not displayed, and the grid pattern is enabled). Since the grid pattern is enabled, tile 660-4 representing participant 4 is displayed in main region 654 (e.g., instead of in roster 656). Because the grid pattern is enabled when the number of participants increases to the predetermined number (e.g., four participants, five participants (as in FIG. 6AQ), or six participants) in FIG. 6AQ, device 602 foregoes display of notification 674 indicating that the grid pattern is available. In response to detecting input 615-19 (e.g., a tap) corresponding to selection of notification 674 in FIG. 6AP, device 602 enables the grid pattern, changes video conference interface 650 (e.g., including tiles 660 in main region 654) from the overlapping arrangement in FIG. 6AP to the grid pattern in FIG. 6AQ (e.g., including moving tile 660-4 from roster 656 to main region 654).

FIG. 6AR illustrates video conference interface 650 when there are seven active participants in the video conference (e.g., participant 5 represented by 660-5 and participant 6 represented by 660-6 have joined the video conference compared to FIGS. 6AP and 6AQ) and the grid pattern is disabled (e.g., the overlapping arrangement is enabled). Since the grid pattern is disabled, tile 660-5 representing participant 5 and tile 660-6 representing participant 6 are displayed in roster 656 (e.g., as shown in FIG. 6AA). In the embodiment illustrated in FIG. 6AR, device 602 has ceased display of notification 674 and does not display (e.g., re-display) notification 674 in response to additional participants (e.g., participant 5 and/or participant 6) joining the video conference.

FIG. 6AS illustrates video conference interface 650 under the same conditions as FIG. 6AR, except that the grid pattern is enabled (e.g., the same seven participants are active, control region 652 and arrangement-selection option 672 are not displayed, and the grid pattern is enabled). Since the grid pattern is enabled, tile 660-5 representing participant 5 and tile 660-6 representing participant 6 are displayed in main region 654 (e.g., instead of in roster 656). In some embodiments, tile 660-5 representing participant 5 and/or tile 660-6 representing participant 6 are displayed in roster 656 (e.g., instead of main region 654).

In some embodiments, the techniques applied to video conference interface 650 described with reference to FIGS. 6AH-6AS are applied to video conference interface 605 (and, optionally, tiles 610 and/or control region 612 therein) and/or the video conference interface in video conference window 630 (and, optionally, tiles 640 and/or control region 632 therein).

FIG. 7 is a flow diagram illustrating a method for managing a video conference session using a computer system (e.g., 600, 601, or 602) in accordance with some embodiments. Method 700 is performed at a computer system (e.g., 100, 300, 500, 600, 601, or 602) that is in communication with one or more display generation components (e.g., 600-1, 601-1, or 602-1) (e.g., a display controller, a touch-sensitive display system, a speaker, a bone conduction audio output device, a tactile output generator, a projector, and/or a holographic display) and one or more input devices (e.g., 600-1, 601-3, or 602-1) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 700 are, optionally, combined, the orders of some operations are, optionally, changed, and some operations are, optionally, omitted.

As described below, method 700 provides an intuitive way for managing a video conference session. The method reduces the cognitive burden on a user for managing a video conference session, thereby creating a more efficient human-machine interface. For battery-operated computing devices, enabling a user to manage a video conference session faster and more efficiently conserves power and increases the time between battery charges.

The computer system displays (702) a user interface (e.g., 605, 630, or 650) (e.g., an interface of an application) of a real-time communication session (e.g., a video communication session, an audio communication session, or an audio/video communication session (e.g., a video chat)), the user interface including a plurality of representations of participants of the real-time communication session (e.g., tiles 610, tiles 640, or tiles 650), the plurality of representations including: a first set of representations of participants displayed in a grid pattern (e.g., a Cartesian grid including one or more rows and one or more columns; a two-dimensional array; a canvas region) in a first region (e.g., 604, 634, or 654) of the user interface of the real-time communication session; and a second set of representations of participants (e.g., the first set and second set are mutually exclusive) displayed in a second region (e.g., 606, 636, or 656) (e.g., a single row (along the top or bottom of the display) or a single column (along a left or right side of the display)) of the user interface that is visually distinct from (e.g., non-overlapping with; separated by a visible boundary from) the first region, wherein the representations of the first set of representations are larger (e.g., physically larger; and/or have a larger display size) than the representations of the second set of representations (e.g., each representation of the first set of representations is larger than each representation of the second set of representations; or the smallest representation of the first set of representations is larger than the largest representation of the second set of representations). In some embodiments, the first set of representations is displayed concurrently with the second set of representations of participant. In some embodiments, the grid pattern includes representations of participants that are more active and/or higher priority (e.g., according to participant-priority criteria) than participants that are represented in the region.

While displaying the user interface of the real-time communication session (e.g., 605, 630, or 650), including the plurality of representations of participants (e.g., 610, 640, or 660) of the real-time communication session, the computer system (e.g., 600, 601, or 602) detects (704) a change in one or more dimensions of the first region (e.g., 604, 634, or 654) (e.g., detecting a change (increase or decrease) in size of the first region and/or a change in aspect ratio of (a change in size of one dimension (height) relative to another dimension (width)) of the first region). In some embodiments, detecting a change in one or more dimensions of the first region includes (e.g., is) detecting a request to change the first region. In some embodiments, detecting a change in one or more dimensions of the first region includes (e.g., is) detecting an input directed to the user interface of the real-time communication session.

In response to detecting the change in the one or more dimensions of the first region (e.g., 604, 634, or 654), the computer system (e.g., 600, 601, or 602) changes (706) a number of representations (e.g., 610, 640, or 660) of participants of the real-time communication session displayed in the first region (e.g., the grid) based on the change in the one or more dimensions of the first region, including ceasing to display a first representation (e.g., 610-19 and/or 610-20 in FIG. 6I) (e.g., 640-3, 640-6, 640-7, 640-8, and/or 640-9 in FIG. 6N) (e.g., 660-3 in FIG. 6AA) of a respective participant in the first region and displaying a second representation (e.g., 610-19 and/or 610-20 in FIG. 6J) (e.g., 640-3, 640-6, and/or 640-9 in FIG. 6O) (e.g., 640-7, 640-8, and/or 640-9 in FIG. 6P) (e.g., 660-3 in FIG. 6AB) of the respective participant in the second region (e.g., 606, 636, or 656). Changing a number of representations of participants of the real-time communication session displayed in the first region based on the change in the one or more dimensions of the first region allows the computer system to automatically and dynamically optimize the arrangement of the representations of participants based on changes in the one or more dimensions of the first region without requiring the user to manually adjust the user interface of the real-time communication session, which provides improved visual feedback and reduces the number of inputs needed to perform an operation.

In some embodiments, changing the number of representations of participants of the real-time communication session displayed in the first region (e.g., 604, 634, or 654) based on the change in the one or more dimensions of the first region includes ceasing to display a first representation of a respective participant (e.g., 610-19 and/or 610-20 in FIG. 6J) (e.g., 640-3, 640-6, and/or 640-9 in FIG. 6O) (e.g., 640-7, 640-8, and/or 640-9 in FIG. 6P) (e.g., 660-3 in FIG. 6AB) in the second region (e.g., 606, 636, or 656) and displaying a second representation (e.g., 610-19 and/or 610-20 in FIG. 6I) (e.g., 640-3, 640-6, 640-7, 640-8, and/or 640-9 in FIG. 6N) (e.g., 660-3 in FIG. 6AA) of the respective participant in the first region. In some embodiments, ceasing to display a first representation of the respective participant in the first region and displaying a second representation of the respective participant in the second region is referred to as moving the respective participant from the first region to the second region. Similarly, ceasing to display a first representation of the respective participant in the second region and displaying a second representation of the respective participant in the first region is referred to as moving the respective participant from the second region to the first region.

In some embodiments, when the size of the first region (e.g., 604, 634, or 654) (e.g., in one or more dimensions) is reduced (e.g., beyond a threshold size), the computer system (e.g., 600, 601, or 602) moves one or more representations (e.g., 610-19 and/or 610-20 in FIG. 6I) (e.g., 640-3, 640-6, 640-7, 640-8, and/or 640-9 in FIG. 6N) (e.g., 660-3 in FIG. 6AA) of the participants of the real-time communication session from the first region to the second region (e.g., 606, 636, or 656) (and, optionally, removes one or more representations of the participants of the real-time communication session from the first region) (e.g., the computer system decreases the number of representations of participants of the real-time communication session displayed in the first region). In some embodiments, when the size of the first region (e.g., in one or more dimensions) is increased (e.g., beyond a threshold size), the computer system moves one or more representations (e.g., 610-19 and/or 610-20 in FIG. 6I) (e.g., 640-3, 640-6, 640-7, 640-8, and/or 640-9 in FIG. 6N) (e.g., 660-3 in FIG. 6AA) of the participants of the real-time communication session from the second region to the first region (and, optionally, removes one or more representations of the participants of the real-time communication session from the second region) (e.g., the computer system increases the number of representations of participants of the real-time communication session displayed in the first region).

In some embodiments, the change in one or more dimensions of the first region (e.g., 604, 634, or 654) includes a change in orientation (e.g., as shown in FIGS. 6H-6J) (e.g., from portrait to landscape or from landscape to portrait) of the first region. In some embodiments, the computer system changes one or more dimensions of the first region in response to detecting a change in orientation (e.g., rotation) of the computer system and/or the display generation component that causes a length and height of the first region to be swapped when the length and height of the first region are different. In some embodiments, the change in one or more dimensions of the first region (e.g., 604, 634, or 654) includes a change in size of one or more dimensions (e.g., height and/or width) of the first region (e.g., as shown in FIGS. 6M-6P).

In some embodiments, detecting the change in one or more dimensions of the first region (e.g., 604, 634, or 654) occurs while the first region is in a first state (e.g., a first size) (e.g., 634 in FIG. 6N). In some embodiments, in response to detecting the change in one or more dimensions of the first region (e.g., 615-3 or 615-4): in accordance with a determination that the change in one or more dimensions of the first region corresponds to a change of the first region (e.g., 615-3) from the first state to a second state (e.g., a first resized state) (e.g., 634 in FIG. 6O), the respective participant is a first participant (e.g., a participant corresponding to tile 640-3, 640-6, or 640-9) of the real-time communication session (e.g., if the first region is changed to a second state, a representation of a first participant is moved from the first region to the second region); and in accordance with a determination that the change in one or more dimensions of the first region corresponds to a change of the first region (e.g., 615-4) from the first state to a third state that is different from the second state (e.g., a second resized state) (e.g., 634 in FIG. 6P), the respective participant is a second participant (e.g., a participant corresponding to tile 640-7, 640-8, or 640-9) of the real-time communication session that is different from the first participant of the real-time communication session (e.g., if the first region is changed to a third state that is different from the second state, a representation of a second (different) participant is moved from the first region to the second region). The respective participant being a first or second participant of the real-time communication session in accordance with a determination that the change in one or more dimensions of the first region corresponds to a change to the second state or the third state allows the computer system to automatically and dynamically optimize the arrangement of the representations of participants based on changes in the one or more dimensions of the first region without requiring the user to manually adjust the user interface of the real-time communication session, which provides improved visual feedback and reduces the number of inputs needed to perform an operation. In some embodiments, the computer system moves a different participant to the second region depending on how the first region is changed.

In some embodiments, in response to detecting the change (e.g., 615-2) in the one or more dimensions of the first region (e.g., 634), and before changing the number of representations (e.g., 640) of participants of the real-time communication session displayed in the first region, the computer system (e.g., 600, 601, or 602) changes (e.g., decreases or increases) a size (e.g., height and/or width) of one or more representations (e.g., 640-1, 640-2, 640-3, 640-4, 640-5, 640-6, 640-7, 640-8, and/or 640-9 in FIG. 6N) (e.g., a subset of representations or all representations) of the first set of representations of participants in the first region (and, optionally, without changing the number of representations of participants of the real-time communication session displayed in the first region). Changing a size of one or more representations of the first set of representations of participants in the first region before changing the number of representations of participants of the real-time communication session displayed in the first region allows the computer system to automatically and dynamically change the displayed size of the first region while maintaining the arrangement of the representations of participants without requiring the user to manually adjust the representations of participants in the user interface of the real-time communication session, which provides improved visual feedback and reduces the number of inputs needed to perform an operation.

In some embodiments, the change in the one or more dimensions of the first region (e.g., 604, 634, or 654) includes a first (e.g., initial) change (e.g., 615-2) (e.g., increase or decrease) in one or more dimensions of the first region (e.g., to a size that does not meet a size threshold), followed by a second (e.g., continued or additional) change (e.g., 615-3 or 615-4) in one or more dimensions of the first region (e.g., to a size that meets the size threshold); in response to detecting the first change, the computer system (e.g., 600, 601, or 602) changes (e.g., increases or decreases, respectively) the size of the representations (e.g., 640-1, 640-2, 640-3, 640-4, 640-5, 640-6, 640-7, 640-8, and/or 640-9 in FIG. 6N) of the participants in the first region, but does not change the number of representations of participants that are displayed in the first region; and in response to detecting the second change, the computer system changes the number of representations of participants of the real-time communication session displayed in the first region (e.g., as shown in FIG. 6O or FIG. 6P).

In some embodiments, the computer system (e.g., 600, 601, or 602) changes the number of representations of participants of the real-time communication session displayed in the first region (e.g., 604, 634, or 654) in accordance with a determination that the change in the one or more dimensions of the first region meets a set of criteria (e.g., that the size of one or more dimensions of the first region have been reduced to or below a threshold size). For example, in response to detecting a decrease in size of the first region, the computer system initially reduces the size of the representations (e.g., in FIG. 6N) until the size of the first region is reduced to a threshold size, at which point the computer system changes (e.g., reduces) the number of representations of participants of the real-time communication session displayed in the first region (e.g., in FIG. 6O or 6P).

In some embodiments, the number of representations of participants (e.g., 610, 640, or 660) of the real-time communication session displayed in the first region (e.g., 604, 634, or 654) is based on a minimum representation size. Displaying the number of representations of participants of the real-time communication session based on a minimum representation size allows the computer system to set a size threshold for automatically and dynamically moving the representations of participants to or from the first region based on the changes in the one or more dimensions of the first region without requiring the user to manually adjust the user interface of the real-time communication session, which provides improved visual feedback and reduces the number of inputs needed to perform an operation. In some embodiments, in accordance with a determination that the size of the first region is within a first range of region sizes, the computer system displays a first number of representations of participants of the real-time communication session in the first region; and in accordance with a determination that the size of the first region is not within the first range of region sizes, the computer system displays a second number of representations of participants of the real-time communication session in the first region, where the second number is different from the first number. In some embodiments, the first range of region sizes includes a first maximum region size, at which the representations of participants have a maximum representation display size, and a first minimum region size, at which the representations of participants have a minimum representation display size. In some embodiments, if the first region is reduced in size below the first minimum region size, the computer system reduces the number of representations of participants of the real-time communication session in the first region and increases the size of the representations (e.g., to the maximum representation display size).

In some embodiments, while displaying the user interface of the real-time communication session (e.g., 605, 630, or 650), the computer system (e.g., 600, 601, or 602) detects a change in a display status of a first set of one or more representations (e.g., 610-6 in FIG. 6L) of participants of the real-time communication session (e.g., one or more participants joining the real-time communication session, one or more participants leaving the real-time communication session, one or more participants having an increased activity level, one or more participants having a decreased activity level, one or more representations of participants being moved from the first region (e.g., to the second region), and/or one or more representations of participants being moved to the first region). In some embodiments, in response to detecting the change in the display status of the first set of one or more representations of participants of the real-time communication session, the computer system updates the first set of representations of participants displayed in the grid pattern (e.g., 604, 634, or 654) based on the change in the display status of the first set of one or more representations of participants of the real-time communication session (e.g., adding and/or removing tiles in the grid) without changing a displayed position of a second set of one or more representations of participants of the real-time communication session that are not included in the first set (e.g., any of 610-1 to 610-5 and 610-7 to 610-18 in FIG. 6L) (e.g., maintaining a displayed position/arrangement of tiles in the grid that do not have a changed status). Updating the first set of representations of participants displayed in the grid pattern based on the change in the display status of the first set of one or more representations of participants of the real-time communication session without changing a displayed position of a second set of one or more representations of participants of that are not included in the first set allows the computer system to automatically and dynamically optimize the arrangement of the representations of participants to avoid rearranging the representations of participants based on the changes in the one or more dimensions of the first region without requiring the user to manually adjust the user interface of the real-time communication session to maintain the displayed arrangement of the representations of participants in the second set, which provides improved visual feedback and reduces the number of inputs needed to perform an operation.

In some embodiments, the computer system (e.g., 600, 601, or 602) updates the grid by adding and/or removing tiles in a manner that minimizes movement of tiles (e.g., 610, 640, or 660) in the grid. For example, the computer system adds or removes entire rows and/or columns at a time to avoid a piecemeal construction or deconstruction of the grid or reordering tiles in the grid by reflowing the grid when one user is added or removed from the grid. As another example, if a participant is removed from the grid (e.g., the corresponding user left the real-time communication session or was moved to the roster) the computer system leaves the location corresponding to the removed participant blank (e.g., 622) or displays, at the location, a representation of a participant that was previously represented in the second region (e.g., the roster), without moving the other tiles in the grid.

In some embodiments, updating the first set of representations of participants displayed in the grid pattern based on the change in the display status of the first set of one or more representations of participants of the real-time communication session without changing a displayed position of the second set of one or more representations of participants of the real-time communication session that are not included in the first set includes adding a complete row (e.g., 610-9, 610-10, 610-11, and 610-12 in FIG. 6E) or column (e.g., 610-7 and 610-8 in FIG. 6D) of representations of participants of the real-time communication session to the first region (e.g., 604, 634, or 654) or removing a complete row (e.g., 640-7, 640-8, and 640-9 in FIG. 6P) or column (e.g., 640-3, 640-6, and 640-9 in FIG. 6O) of representations of participants of the real-time communication session from the first region (e.g., 604, 634, or 654). Adding or removing a complete row or column of representations of participants of the real-time communication session to/from the first region allows the computer system to automatically and dynamically optimize the arrangement of the representations of participants to avoid rearranging the representations of participants based on the changes in the one or more dimensions of the first region without requiring the user to manually adjust the user interface of the real-time communication session (e.g., 605, 630, or 650) to maintain the displayed arrangement of the representations of participants in the second set, which provides improved visual feedback and reduces the number of inputs needed to perform an operation.

In some embodiments, when the first region (e.g., 604, 634, or 654) is resized, an entire row or column of representations of participants are removed from or added to the first region based on the resizing. For example, when the first region is resized horizontally, a column of representations of participants is removed from the first region (e.g., moved to the roster) when reducing the width of the first region, and a column of representations of participants is added to the first region (e.g., moved from the roster) when increasing the width of the first region. As another example, when the first region is resized vertically, a row of representations of participants is removed from the first region (e.g., moved to the roster) when reducing the height of the first region, and a row of representations of participants is added to the first region (e.g., moved from the roster) when increasing the height of the first region.

In some embodiments, updating the first set of representations of participants displayed in the grid pattern based on the change in the display status of the first set of one or more representations of participants of the real-time communication session without changing a displayed position of the second set of one or more representations of participants of the real-time communication session that are not included in the first set includes maintaining a displayed arrangement of the representations of participants in the second set (e.g., 640-1, 640-2, 640-4, 640-5, 640-7, and 640-8 in FIG. 6O) (e.g., 640-1 to 640-6 in FIG. 6P) in response to a change in orientation of the user interface of the real-time communication session (e.g., 605, 630, or 650). Maintaining a displayed arrangement of the representations of participants in the second set in response to a change in orientation of the user interface of the real-time communication session allows the computer system to automatically and dynamically optimize the arrangement of the representations of participants to avoid rearranging the representations of participants based on the changes in the one or more dimensions of the first region without requiring the user to manually adjust the user interface of the real-time communication session to maintain the displayed arrangement of the representations of participants in the second set, which provides improved visual feedback and reduces the number of inputs needed to perform an operation. In some embodiments, when the orientation of the user interface is changed (e.g., rotated) the tiles in the grid maintain a relative location with respect to the other tiles in the grid.

In some embodiments, updating the first set of representations of participants displayed in the grid pattern based on the change in the display status of the first set of one or more representations of participants of the real-time communication session without changing a displayed position of the second set of one or more representations of participants of the real-time communication session that are not included in the first set includes maintaining a location, relative to the display generation component, of the representations of participants in the second set (e.g., 660-1 and/or 660-2 in FIG. 6AG) in response to a change in orientation of the user interface of the real-time communication session (e.g., 605, 630, or 650) while rotating the representations of the participants in accordance with the change in orientation of the user interface of the real-time communication session. Maintaining a location of the representations of participants in the second set in response to a change in orientation of the user interface of the real-time communication session allows the computer system to automatically and dynamically optimize the arrangement of the representations of participants to avoid rearranging the representations of participants based on the changes in the one or more dimensions of the first region without requiring the user to manually adjust the user interface of the real-time communication session to maintain the displayed arrangement of the representations of participants in the second set, which provides improved visual feedback and reduces the number of inputs needed to perform an operation. In some embodiments, when the orientation of the user interface is changed (e.g., rotated) the tiles in the grid maintain an absolute location on the display and the respective tiles are rotated in place to maintain an upright position for the viewer.

In some embodiments, in accordance with a determination that an activity level of a third participant meets a set of activity criteria (e.g., the third participant has the highest activity level of the participants in the real-time communication session), the computer system (e.g., 600, 601, or 602) increases a size of a representation of the third participant (e.g., in the first region) (e.g., 610-3 in FIG. 6C). Increasing a size of a representation of the third participant in accordance with a determination that an activity level of the third participant meets a set of activity criteria provides feedback to a user of the computer system about which participant is meeting the set activity criteria in the real-time communication session, which provides improved visual feedback.

In some embodiments, in accordance with a determination that an activity level of a fourth participant meets a set of activity criteria (e.g., the fourth participant has the highest activity level of the participants in the real-time communication session), the computer system (e.g., 600, 601, or 602) visually distinguishes a representation of the fourth participant (e.g., in the first region) (e.g., 610-9 in FIG. 6E), including changing a depth effect (e.g., 609) associated with the representation of the fourth participant (e.g., increasing a shadow effect to indicate an increased depth; decreasing a shadow effect to indicate a decreased depth). Changing a depth effect associated with the representation of the fourth participant in accordance with a determination that an activity level of the fourth participant meets a set of activity criteria provides feedback to a user of the computer system about which participant is meeting the set activity criteria in the real-time communication session, which provides improved visual feedback.

In some embodiments, the computer system (e.g., 600, 601, or 602) is in communication with one or more cameras (e.g., 600-2, 601-2, or 602-2), and the user interface of the real-time communication session (e.g., 605, 630, or 650) includes a representation (e.g., 608, 638, or 658) of a field-of-view of the one or more cameras (e.g., a camera preview). In some embodiments, while displaying the representation of the field-of-view of the one or more cameras overlaying at least a portion of a first representation of a participant of the real-time communication session (e.g., 660-2 in FIG. 6Q) (e.g., the camera preview is displayed in front of at least a portion of the representation of the participant), the computer system detects an input (e.g., 615-5) corresponding to the first representation of the participant of the real-time communication session. In some embodiments, in response to detecting the input corresponding to the first representation of the participant of the real-time communication session, the computer system displays the first representation of the participant of the real-time communication session overlaying at least a portion of the representation of the field-of-view of the one or more cameras (e.g., the representation of the participant is displayed in front of at least a portion of the camera preview) (e.g., as shown in FIG. 6R). Displaying the first representation of the participant of the real-time communication session overlaying at least a portion of the representation of the field-of-view of the one or more cameras in response to detecting the input corresponding to the first representation of the participant of the real-time communication session provides additional controls for optimizing the arrangement of the representations of participants without requiring display of additional control options, which provides additional control options without cluttering the user interface.

In some embodiments, while displaying a second representation of a participant of the real-time communication session (e.g., 660-2 in FIG. 6Q), the computer system (e.g., 600, 601, or 602) detects a selection (e.g., 615-5) of the second representation of the participant of the real-time communication session. In some embodiments, in response to detecting the selection of the second representation of the participant of the real-time communication session, the computer system displays a capture affordance (e.g., 662) that is selectable to generate an image of the second representation of the participant of the real-time communication session (e.g., without generating an image of other participants of the real-time communication session). Displaying the capture affordance in response to detecting the selection of the second representation of the participant of the real-time communication session provides additional controls for generating an image of the second representation of the participant of the real-time communication session without cluttering the user interface with additional control options until the selection is detected, which provides additional control options without cluttering the user interface. In some embodiments, an external computer system associated with a remote participant of the real-time communication session captures the image of the second representation of the participant of the real-time communication session and sends the image to the computer system (e.g., the computer system obtains the image of the second representation of the participant of the real-time communication session from an external computer system).

In some embodiments, the computer system (e.g., 600, 601, or 602) is in communication with one or more cameras (e.g., 600-2, 601-2, or 602-2); the capture affordance (e.g., 662) is displayed in a first portion of the second representation (e.g., 660-2 in FIG. 6R) of the participant of the real-time communication session; and prior to detecting the selection (e.g., 615-5) of the second representation of the participant of the real-time communication session, the computer system displays a representation (e.g., 608, 638, or 658) of a field-of-view of the one or more cameras (e.g., a camera preview) overlaying the first portion of the second representation of the participant of the real-time communication session (e.g., as shown in FIG. 6Q).

In some embodiments, while displaying the second set of representations of participants displayed in the second region (e.g., 606, 636, or 656) and having a first size, the computer system (e.g., 600, 601, or 602) receives a request to display a first set of one or more controls (e.g., 612, 632, or 652) for the real-time communication session. In some embodiments, in response to receiving the request to display a first set of one or more controls for the real-time communication session, the computer system: displays the first set of one or more controls for the real-time communication session (e.g., a control region or graphical object that includes information associated with the real-time communication session and/or a shared-content session and/or one or more selectable function options that, when selected, cause the computer system to perform a respective function associated with the real-time communication session and/or shared-content session); and displays the second set of representations of participants displayed in the second region and having a second size smaller than the first size (e.g., displaying the roster having a smaller size when the controls are displayed) (e.g., in some embodiments, tiles in roster 656 shrink in FIG. 6X when control region 652 is displayed). Displaying the second set of representations of participants displayed in the second region and having a second size smaller than the first size allows the computer system to automatically and dynamically optimize the sizes of the representations of participants to accommodate the display of the first set of one or more controls for the real-time communication session without requiring the user to manually adjust the user interface of the real-time communication session to arrange the controls and the representations of participants in the second region, which provides improved visual feedback and reduces the number of inputs needed to perform an operation.

In some embodiments, the computer system (e.g., 600, 601, or 602) is in communication with one or more cameras (e.g., 600-2, 601-2, or 602-2); the user interface of the real-time communication session (e.g., 605, 630, or 650) includes a representation (e.g., 608, 638, or 658) of a field-of-view of the one or more cameras (e.g., a camera preview); and the second set of representations of participants displayed in the second region (e.g., 606, 636, or 656) includes one or more representations (e.g., 660-9 in FIG. 6V) (e.g., 660-11 in FIG. 6W) of participants having a shifted position adjacent to (e.g., without an intervening position or representation of a participant) the representation of the field-of-view of the one or more cameras (e.g., one or more of the tiles in the roster are shifted to make room for the camera preview). Displaying the second set of representations of participants in the second region including one or more representations of participants having a shifted position adjacent the representation of the field-of-view of the one or more cameras allows the computer system to automatically and dynamically optimize the arrangement of the representations of participants in the second region to accommodate the display of the representation of the field-of-view of the one or more cameras without requiring the user to manually adjust the user interface of the real-time communication session to arrange the representations of participants in the second region, which provides improved visual feedback and reduces the number of inputs needed to perform an operation.

In some embodiments, while displaying a first subset of the second set of representations of participants displayed in the second region (e.g., 606, 636, or 656), the computer system (e.g., 600, 601, or 602) receives an input (e.g., 615-6 or 615-7) that corresponds to movement in a respective direction in the user interface (e.g., 605, 630, or 650) (e.g., a drag or swipe gesture) (e.g., a request to scroll the second set of representations of participants) (e.g., a request to scroll the first set of representations of participants). In some embodiments, in response to receiving the input that corresponds to movement in the respective direction in the user interface: in accordance with a determination that the input that corresponds to movement in the respective direction in the user interface is directed to a portion of the user interface that includes the second set of representations of participants (e.g., 606, 636, or 656), the computer system scrolls the second set of representations of participants in the respective direction, including displaying one or more representations of participants (e.g., 660-10 and/or 660-11 in FIG. 6W) (e.g., 660-7 and/or 660-8 in FIG. 6X) that are not included in the first subset of the second set of representations of participants (e.g., and ceasing to display one or more representations of participants in the first subset) (e.g., and continuing to display one or more representations of participants in the first subset). Scrolling the second set of representations of participants in accordance with a determination that the input that corresponds to movement in the respective direction in the user interface is directed to a portion of the user interface that includes the second set of representations of participants allows the computer system to display or hide representations of participants in the second region, which provides improved visual feedback and reduces the number of inputs needed to perform an operation.

In some embodiments, in response to receiving the input (e.g., 615-6 or 615-7) that corresponds to movement in the respective direction in the user interface (e.g., 605, 630, or 650), and in accordance with a determination that the input that corresponds to movement in the respective direction in the user interface is directed to a portion of the user interface (e.g., 604, 634, or 656) that includes the first set of representations of participants, the computer system (e.g., 600, 601, or 602) forgoes scrolling the first set of representations of participants. In some embodiments, the first set of representations of participants (e.g., the grid) cannot be scrolled.

In some embodiments, the computer system (e.g., 600, 601, or 602) is in communication with one or more cameras (e.g., 600-2, 601-2, or 602-2); the user interface of the real-time communication session (e.g., 605, 630, or 650) includes a representation (e.g., 608, 638, or 658) of a field-of-view of the one or more cameras (e.g., a camera preview); and scrolling the second set of representations of participants includes scrolling one or more representations (e.g., 660-10 and/or 660-11 in FIG. 6X) of participants in the second set of representations of participants under the representation of the field-of-view of the one or more cameras (e.g., the roster scrolls under the camera preview). Scrolling one or more representations of participants in the second set of representations of participants under the representation of the field-of-view of the one or more cameras allows the computer system to display or hide the representations of participants in the second region while also accommodating the display of the representation of the field-of-view of the one or more cameras, which provides improved visual feedback and reduces the number of inputs needed to perform an operation.

In some embodiments, after changing the number of representations of participants of the real-time communication session displayed in the first region (e.g., 604, 634, or 654) (e.g., based on the change in the one or more dimensions of the first region, based on one or more participants leaving or joining the real-time communication session), the computer system (e.g., 600, 601, or 602) updates display of the user interface of the real-time communication session (e.g., 605, 630, or 650), including: in accordance with a determination that the second set of representations of participants includes more than a threshold number (e.g., zero, one, or two) of representations of participants of the real-time communication session, displaying the second set of representations (e.g., 660-7, 660-8, and/or 660-9 in FIG. 6V) of participants of the real-time communication session; and in accordance with a determination that the second set of representations of participants does not include more than the threshold number of representations of participants of the real-time communication session, ceasing displaying the second set of representations of participants of the real-time communication session (e.g., region 656 in FIG. 6U) (e.g., if all tiles are moved from the roster to the grid, ceasing displaying the roster). Ceasing displaying the second set of representations of participants of the real-time communication session in accordance with a determination that the second set of representations of participants does not include more than the threshold number of representations of participants provides feedback to a user of the computer system that there are less than the threshold number of representations of participants and conserves computational resources by eliminating display of the second set of representations of participants of the real-time communication session, which provides improved visual feedback and conserves computational resources of the computer system.

In some embodiments, while displaying the first set of representations of participants displayed in the first region (e.g., 604, 634, or 654) and having a first arrangement (e.g., size and/or location) (e.g., 660-1, 660-2, and 660-3 in FIG. 6AA), the computer system (e.g., 600, 601, or 602) receives a request to display a second set of one or more controls (e.g., 612, 632, or 652) for the real-time communication session. In some embodiments, in response to receiving the request to display a second set of one or more controls for the real-time communication session, the computer system: displays the second set of one or more controls for the real-time communication session (e.g., a control region or graphical object that includes information associated with the real-time communication session and/or a shared-content session and/or one or more selectable function options that, when selected, cause the computer system to perform a respective function associated with the real-time communication session and/or shared-content session); and displays the first set of representations of participants displayed in the first region and having a second arrangement different than the first arrangement (e.g., having a different location, position, order, and/or size based on the display of the set of controls) (e.g., 660-1, 660-2, and 660-3 in FIG. 6Z). Displaying the first set of representations of participants displayed in the first region and having the second arrangement different than the first arrangement allows the computer system to automatically and dynamically optimize the location of the representations of participants in response to displaying the second set of one or more controls for the real-time communication session without requiring the user to manually adjust the user interface of the real-time communication session, which provides improved visual feedback and reduces the number of inputs needed to perform an operation.

In some embodiments, the user interface of the real-time communication session (e.g., 665) includes an arrangement-selection option (e.g., 668 and/or 672) (e.g., an affordance, button, and/or selectable graphical element) that, when selected, enables (or disables) an overlapping arrangement (e.g., FIG. 6AZ) of a third set of representations (e.g., 660-1, 660-2, and 660-3 in FIG. 6Z) of participants of the real-time communication session (e.g., in the first region (e.g., 604, 634, or 654) of the user interface of the real-time communication session) (or, optionally, disables the grid pattern of the first set of representations of participants in the first region (e.g., 604, 634, or 654) of the user interface of the real-time communication session). Displaying the arrangement-selection option provides additional controls for enabling an overlapping arrangement of the third set of representations of participants without cluttering the user interface with additional displayed controls until an input is detected, which provides additional control options without cluttering the user interface. In some embodiments, the overlapping arrangement includes one or more representations of participants that overlap one or more other representations of participants of the real-time communication session (e.g., FIGS. 6Z, 6AL, 6AN, 6AP, and/or 6AR). In some embodiments, while in the overlapping arrangement, one or more representations of the third set of representations change size and/or position over time (e.g., 660-1 increases in size in FIG. 6Z because participant 1 is the most active participant) and maintain overlap with (e.g., continue to overlap) one or more other representations during and/or after changing size and/or position (e.g., in FIG. 6Z, 660-1 maintains overlap with 660-2 and/or 660-2 maintains overlap with 660-3). In some embodiments, after changing size and/or position, the one or more representations of the third set of representations occupy a position that the one or more representations occupied prior to changing size and/or position (e.g., in FIG. 6Z, 660-1 remains above and to the left of 660-2, and 660-2 remains above and to the right of 660-3). In some embodiments, the third set of representations of participants of the real-time communication session correspond to the same participants as the first set of representations of participants of the real-time communication session (e.g., the first set and the third set include the same number of representations) (e.g., FIGS. 6AL and 6AM). In some embodiments, the third set of representations of participants of the real-time communication session includes a different number of representations (e.g., more representations than or fewer representations than) the first set of representations of participants of the real-time communication session (e.g., the number of representations changes when changing from the grid pattern to the overlapping arrangement, or from the overlapping arrangement to the grid pattern) (e.g., FIGS. 6X and 6Z; FIGS. 6AP and 6AQ; and FIGS. 6AR and 6AS).

In some embodiments, while displaying a representation of content (e.g., 620, or 670) associated with a shared-content session (e.g., a session between the computer system and one or more external computer systems that enables the computer system (e.g., 600, 601, or 602) to output content (e.g., synchronized content (e.g., audio and/or video data for which output is synchronized at the computer system and an external computer system) and/or screen-share content (e.g., image data generated by a device (e.g., the computer system; an external computer system) that provides a real-time representation of an image or video content that is currently displayed at the device)) while the content is being output by the one or more external computer systems) concurrently with the first set of representations of participants in the first region of the user interface of the real-time communication session (e.g., 660-1 and 660-2 in FIG. 6AB), the computer system receives a request (e.g., 615-11 or 615-12) to move the representation of content. In some embodiments, in response to receiving the request to move the representation of content, the computer system moves the representation of content from a first location in the user interface of the real-time communication session (e.g., 620 in FIG. 6K) (e.g., 670 in FIG. 6AB) to a second location in the user interface of the real-time communication session, including: in accordance with a determination that the overlapping arrangement of the first set of representations of participants is enabled, changing a position of (e.g., moving) one or more representations of participants of the first set of representations of participants in the first region based on the movement of (e.g., the moved position of) the representation of content (e.g., to avoid the moved position of the representation of content) (e.g., as shown in FIG. 6AC, 6AD, or 6AE); and in accordance with a determination that the overlapping arrangement of the first set of representations of participants is not enabled, forgoing changing a position of (e.g., moving) one or more representations of participants of the first set of representations of participants in the first region based on the movement of (e.g., the moved position of) the representation of content (e.g., in some embodiments, displaying the representation of content overlaying one or more representations of participants in the first set of representations of participants) (e.g., as shown in FIG. 6K or 6L). Changing the position of one or more representations of participants of the first set of representations of participants in the first region based on the movement of the representation of content allows the computer system to automatically and dynamically optimize the location of the representations based on changes in the position of the content without requiring the user to manually adjust the user interface of the real-time communication session, which provides improved visual feedback and reduces the number of inputs needed to perform an operation. In some embodiments, when the grid arrangement is enabled, the tiles in the grid do not move to avoid the position of the shared content as the shared content is moved. In some embodiments, when the overlapping arrangement is enabled, the tiles move to avoid the position of the shared content as the shared content is moved.

In some embodiments, the arrangement-selection option (e.g., 672) is displayed concurrently with the plurality of representations of participants of the real-time communication session (e.g., FIG. 6X and FIG. 6Z), Displaying the arrangement-selection option concurrently with the plurality of representations of participants of the real-time communication session provides additional control options without cluttering the user interface and reduces the number of inputs needed to perform an operation by providing an option to select an arrangement of the representations of participants of the real-time communication session without further navigating the user interface.

In some embodiments, in response to a predetermined number of participants (e.g., three participants, four participants, or five participants) participating (e.g., concurrently participating) in the real-time communication session (e.g., a participant joining the real-time communication session and causing the number of participants to meet the predetermined number of participants), the computer system displays (e.g., initially displays and/or initiates display of) the arrangement-selection option (e.g., FIGS. 6AL and 6AM). In some embodiments, the arrangement-selection option is not displayed prior to (e.g., immediately prior to) the predetermined number of participants participating in the real-time communication session (e.g., FIGS. 6AH and 6AI). In some embodiments, the arrangement-selection option is not displayed if (e.g., in response to and/or in accordance with a determination that) fewer than the predetermined number of participants are participating (e.g., concurrently participating) in the real-time communication session. Displaying the arrangement-selection option in response to a predetermined number of participants participating in the real-time communication session allows the arrangement-selection option to be displayed when the number of participants reaches a number at which the grid pattern provides a more optimal use of display space over the overlapping arrangement or when there is a significant difference between the grid pattern and the overlapping arrangement, which provides improved visual feedback to the user and performs an operation when a set of conditions has been met without requiring further user input.

In some embodiments, while displaying the arrangement-selection option (e.g., 672), the computer system receives an indication that fewer than the predetermined number of participants are participating (e.g., concurrently participating) in the real-time communication session (e.g., a participant has left the real-time communication session and resulted in the number of participants being less than the predetermined number of participants). In some embodiments, in response to receiving the indication that fewer than the predetermined number of participants are participating in the real-time communication session, the computer system ceases display of the arrangement-selection option (e.g., FIGS. 6AJ and 6AK). Ceasing display of the arrangement-selection option in response to receiving an indication that fewer than the predetermined number of participants are participating allows the computer system to avoid displaying the arrangement-selection option when the number of participants is less than a number where the grid pattern provides a more optimal use of display space over the overlapping arrangement or there is not a significant difference between the grid pattern and the overlapping arrangement, which provides improved visual feedback to the user, performs an operation when a set of conditions has been met without requiring further user input, and avoids cluttering the user interface.

In some embodiments, in response to a participant joining the real-time communication session (e.g., and, optionally, in accordance with a determination that the number of participants, after the participant has joined the real-time communication session, is greater than or equal to the predetermined number of participants), the computer system initiates display of the arrangement-selection option (e.g., 672). Initiating display of the arrangement-selection option in response to a participant joining the real-time communication session allows the arrangement-selection option to be displayed when the number of participants increases such that the grid pattern provides a more optimal use of display space over the overlapping arrangement or there is a significant difference between the grid pattern and the overlapping arrangement, which provides improved visual feedback to the user and performs an operation when a set of conditions has been met without requiring further user input.

In some embodiments, the arrangement-selection option (e.g., 672) is displayed while (e.g., in response to or in accordance with display of) a third set of one or more controls (e.g., 612, 632, and/or 652) for the real-time communication session (e.g., a HUD or graphical object that includes information associated with the real-time communication session and/or a shared-content session and/or one or more selectable function options (e.g., affordances, buttons, and/or selectable graphical elements) that, when selected, cause the computer system to perform a respective function associated with the real-time communication session (e.g., leave call, end call, display video effect options, switch camera, mute/unmute microphone, and/or capture an image) and/or shared-content session) are displayed in the user interface of the real-time communication session. In some embodiments, while the arrangement-selection option is displayed concurrently with the third set of one or more controls for the real-time communication session, the computer system detects the occurrence of a respective condition that corresponds to ceasing to display the third set of one or more controls for the real-time communication session (e.g., a tap input in the user interface or the passage of more than a threshold amount of time without detecting an input directed to the user interface). In some embodiments, in response to detecting the occurrence of the respective condition, the computer system ceases to display the third set of one or more controls (e.g., 612, 632, and/or 652) for the real-time communication session and ceases to display the arrangement-selection option (e.g., 672). In some embodiments, the computer system displays (e.g., initiates display of) the third set of one or more controls (and, optionally, the arrangement-selection option) in response to detecting an input (e.g., 615-24 or 615-26) (e.g., a tap gesture or input that causes a pointer (e.g., cursor) to hover over the user interface of the real-time communication session). In some embodiments, the computer system ceases to display the third set of one or more controls (and, optionally, the arrangement-selection option) in response to detecting an input (e.g., 615-22 or 615-23) (e.g., a tap gesture or input that causes a pointer (e.g., cursor) to not hover over the user interface of the real-time communication session). Ceasing to display the third set of one or more controls for the real-time communication session and ceasing to display the arrangement-selection option in response to detecting the occurrence of the respective condition that corresponds to ceasing to display the third set of one or more controls for the real-time communication session consolidates display of options for the real-time communication session, which provides additional control options without cluttering the user interface with additional displayed controls and performs an operation when a set of conditions has been met without requiring further user input.

In some embodiments, while displaying the first set of representations of participants in the grid pattern in the first region of the user interface of the real-time communication session (e.g., FIG. 6X), the computer system detects a first gesture (e.g., 615-13A and 615-13B, and/or 615-15A and 615-15B) that includes movement through locations corresponding to one or more of the representations (e.g., 660 in FIG. 6X) of participants in the user interface corresponding to a request to change the arrangement of the plurality of representations of participants in the user interface (e.g., a touch gesture that includes one or more contacts on a touch-sensitive surface in communication with the computer system and, optionally, is independent of the location of the touch gesture (e.g., is not directed to a particular graphical element) such as, for example, a de-pinch gesture (e.g., a gesture that includes two or more contacts that become further apart over time) or a pinch gesture (e.g., a gesture that includes two or more contacts that become closer together over time)). In some embodiments, in response to detecting the first gesture, the computer system displays (e.g., in the first region) a fourth set of representations of participants of the real-time communication session in an overlapping arrangement (e.g., FIG. 6Z) (e.g., disables the grid pattern of the first set of representations of participants in the first region of the user interface of the real-time communication session and switches to the overlapping arrangement). Displaying representations of participants of the real-time communication session in the overlapping arrangement in response to a gesture that includes movement through locations corresponding to one or more of the representations of participants in the user interface allows the computer system to change the arrangement of representations of the participants of the real-time communication session regardless of whether or not a selectable graphical element for changing the arrangement of representations of the participants of the real-time communication session is displayed, which reduces the number of inputs needed to perform an operation and provides additional control options without cluttering the user interface with additional displayed controls.

In some embodiments, while displaying, in the user interface of the real-time communication session, a fifth set of representations of participants of the real-time communication session in an overlapping arrangement (e.g., FIG. 6Z), the computer system detects a second gesture (e.g., 615-13A and 615-13B, and/or 615-15A and 615-15B) that includes movement through locations corresponding to one or more of the representations (e.g., 660-2 in FIG. 6Z) of participants in the user interface corresponding to a request to change the arrangement of the plurality of representations of participants in the user interface (e.g., a touch gesture that includes one or more contacts on a touch-sensitive surface in communication with the computer system such as, for example, a pinch gesture (e.g., a gesture that includes two or more contacts that become closer together over time) or a de-pinch gesture (e.g., a gesture that includes two or more contacts that become further apart over time)). In some embodiments, in response to detecting the second gesture, the computer system displays (e.g., in the first region) a sixth set of representations of participants of the real-time communication session in a grid pattern (e.g., FIG. 6X) (e.g., disables the overlapping arrangement of the fifth set of representations of participants). Displaying representations of participants of the real-time communication session in the grid pattern in response to a gesture that includes movement through locations corresponding to one or more of the representations of participants in the user interface allows the computer system to change the arrangement of representations of the participants of the real-time communication session regardless of whether or not a selectable graphical element for changing the arrangement of representations of the participants of the real-time communication session is displayed, which reduces the number of inputs needed to perform an operation and provides additional control options without cluttering the user interface with additional displayed controls.

In some embodiments, while displaying, in the user interface of the real-time communication session, a seventh set of representations of participants of the real-time communication session in an overlapping arrangement, the computer system receives an indication that a predetermined number of participants (e.g., three participants, four participants, five participants, or six participants) are participating (e.g., concurrently participating) in the real-time communication session (e.g., a participant has joined the real-time communication session and caused the number of participants to meet the predetermined number of participants). In some embodiments, in response to receiving the indication that the predetermined number of participants are participating in the real-time communication session, the computer system displays (e.g., initially displays and/or initiates display of) a notification (e.g., 674) that indicates that the plurality of representations of participants of the real-time communication session can be displayed in the grid pattern. In some embodiments, the notification includes (e.g., is) a selectable option (e.g., an affordance) that, when selected (e.g., 615-19), causes the computer system to display representations of participants of the real-time communication session in a grid pattern in the first region (e.g., FIG. 6AQ). Displaying a notification that indicates that the plurality of representations of participants of the real-time communication session can be displayed in the grid pattern in response to receiving an indication that a predetermined number of participants are participating in the real-time communication session notifies the user that a different arrangement, which may provide a more optimal display for larger numbers of participants, is available, which provides improved visual feedback to the user.

In some embodiments, the representations of the set of representations of participants in the second region (e.g., 606, 636, or 656) have a similar height (or the same height) as a representation (e.g., 608, 638, or 658) of a field-of-view of a camera (e.g., 600-2, 601-2, or 602-2) in communication with the computer system (e.g., 600, 601, or 602) (e.g., a camera preview).

In some embodiments, displaying the user interface of the real-time communication session (e.g., 605, 630, or 650) includes displaying a representation (e.g., 608, 638, or 658) of a field-of-view of a camera (e.g., 600-2, 601-2, or 602-2)

in communication with the computer system (e.g., 600, 601, or 602) (e.g., a camera preview) in the second region (e.g., 606, 636, or 656) of the user interface that is visually distinct from the first region (e.g., 604, 634, or 654) (e.g., the second region includes the camera preview and the roster, which are both separate from the tiles in the grid).

In some embodiments, changing a number of representations of participants of the real-time communication session displayed in the first region (e.g., 604, 634, or 654) based on the change in the one or more dimensions of the first region includes displaying a first row (e.g., one of the two bottom rows of tiles 610-13 to 610-20 in FIG. 6I when transitioning to the arrangement in FIG. 6J) of representations of participants fading out (e.g., gradually reducing a visual prominence of the first row of representations of participants by decreasing a brightness, opacity, saturation and/or other visual property of the first row of representations of participants such as, e.g., an animation in which the row gradually disappears) while maintaining display of at least a second row of representations of participants in the first region (e.g., tiles 610-1 to 610-12 in the three top rows in FIG. 6I when transitioning to the arrangement in FIG. 6J) (e.g., one or more rows fade away, while one or more rows remain displayed in the grid). Displaying a first row of representations of participants fading out while maintaining display of at least a second row of representations of participants in the first region allows the computer system to automatically and dynamically optimize the arrangement of the representations of participants to avoid rearranging the representations of participants based on the changes in the one or more dimensions of the first region without requiring the user to manually adjust the user interface of the real-time communication session to maintain the displayed arrangement of the representations of participants in the second set, which provides improved visual feedback and reduces the number of inputs needed to perform an operation. In some embodiments, the representations of participants in the first row are displayed fading into view at the roster in the second region.

In some embodiments, changing a number of representations of participants of the real-time communication session displayed in the first region (e.g., 604, 634, or 654) based on the change in the one or more dimensions of the first region includes displaying a first column of representations of participants fading out (e.g., one of the two rightmost columns of tiles 610-13 to 610-18 in FIG. 6H when transitioning to the arrangement in FIG. 6I) (e.g., gradually reducing a visual prominence of the first row of representations of participants by decreasing a brightness, opacity, saturation and/or other visual property of the first row of representations of participants such as, e.g., an animation in which the column gradually disappears) while maintaining display of at least a second column of representations of participants in the first region (e.g., one of the four leftmost columns of tiles 610-1 to 610-12 in FIG. 6H when transitioning to the arrangement in FIG. 6I) (e.g., one or more columns fade away, while one or more columns remain displayed in the grid). Displaying a first column of representations of participants fading out while maintaining display of at least a second column of representations of participants in the first region allows the computer system to automatically and dynamically optimize the arrangement of the representations of participants to avoid rearranging the representations of participants based on the changes in the one or more dimensions of the first region without requiring the user to manually adjust the user interface of the real-time communication session to maintain the displayed arrangement of the representations of participants in the second set, which provides improved visual feedback and reduces the number of inputs needed to perform an operation. In some embodiments, the representations of participants in the first column are displayed fading into view at the roster in the second region.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, the methods for arranging the tiles depicted in FIGS. 6A-6AS can be applied to the embodiments described with reference to method 900. For brevity, these details are not repeated.

FIGS. 8A-8H illustrate exemplary user interfaces for managing video conference sessions, in accordance with some embodiments. The user interfaces in these figures are used to illustrate the processes described below, including the processes in FIG. 9. In some embodiments, the user interfaces in FIGS. 8A-8H can be used to illustrate the processes described above with respect to FIG. 7.

Figure 8A:
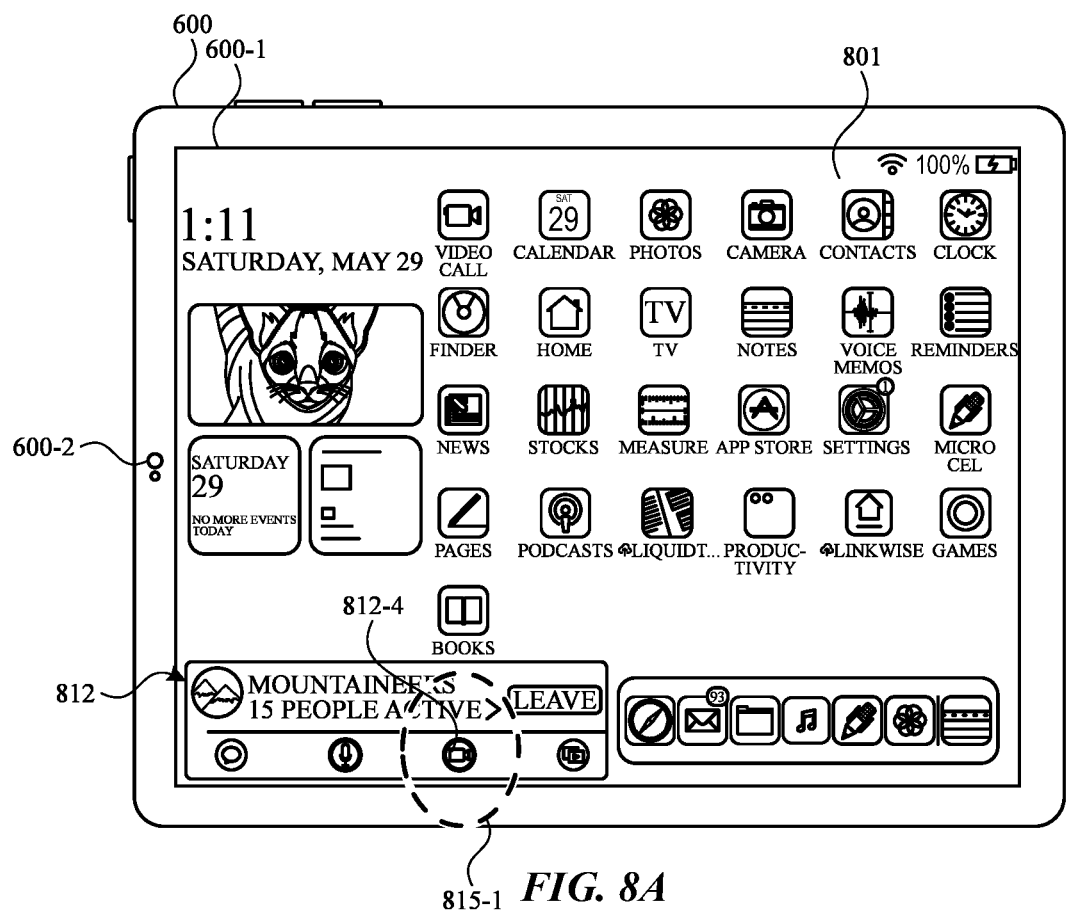
FIGS. 8A-8H illustrate exemplary user interfaces for managing video conference sessions, in accordance with some embodiments.
Figure 8B:
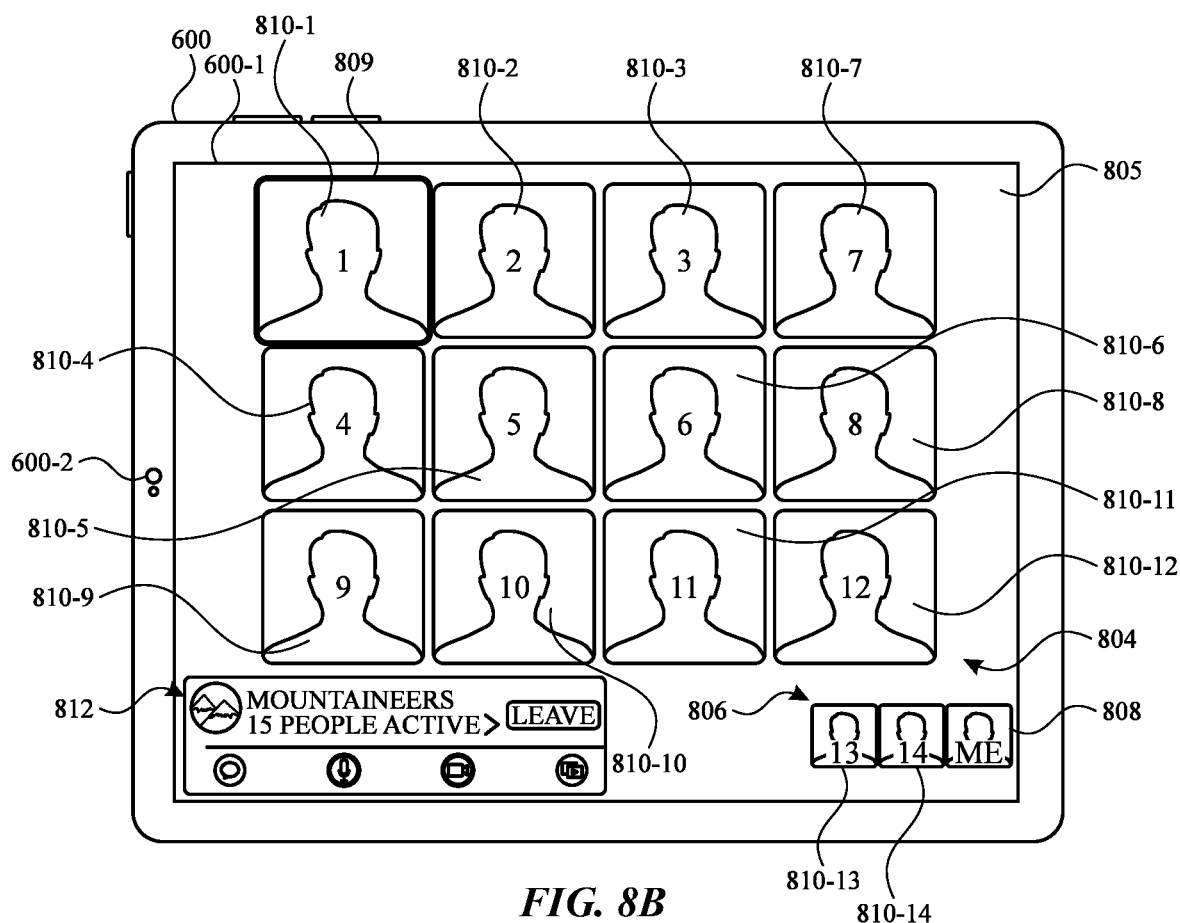
Figure 9:
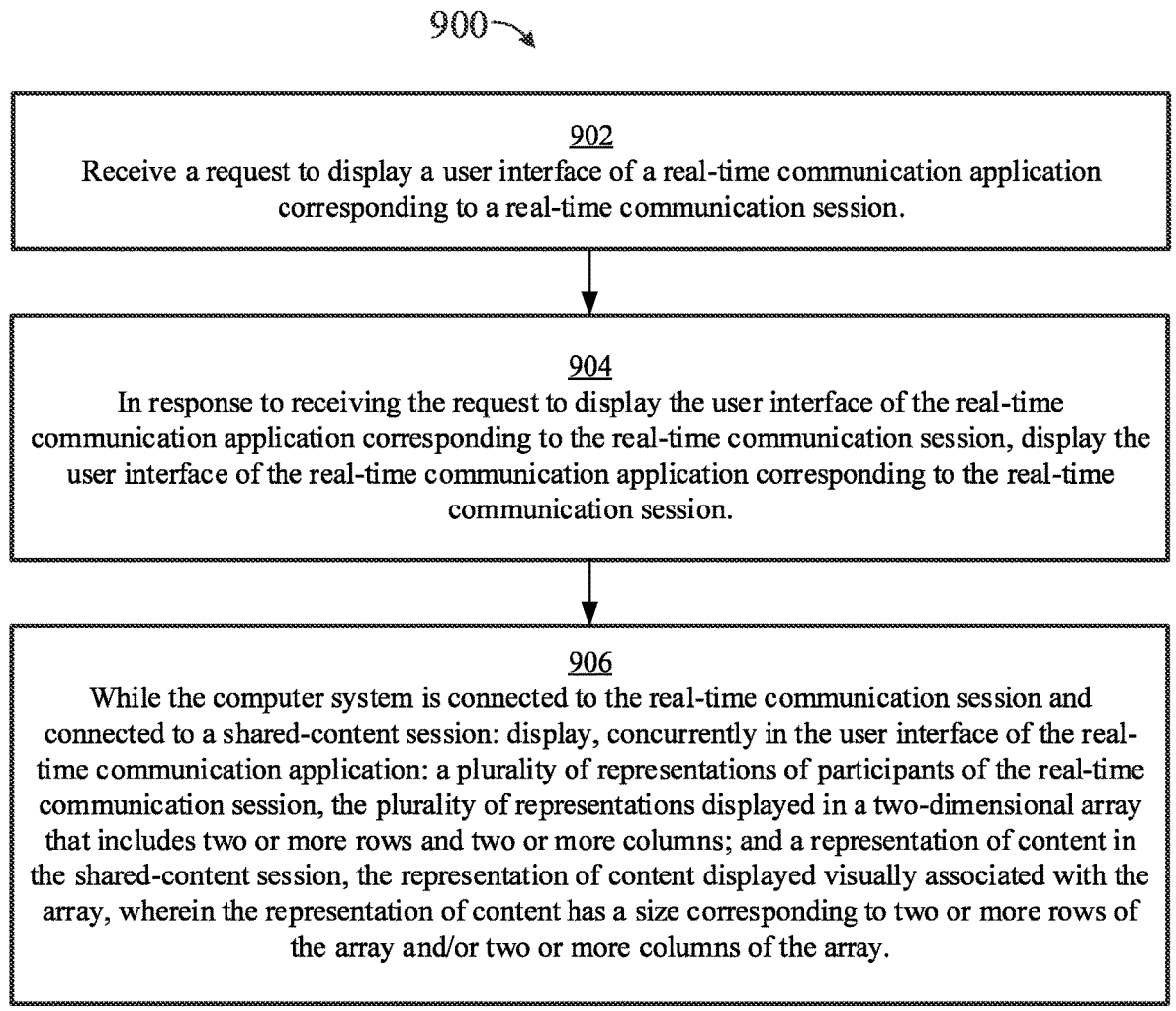
FIG. 9 depicts a flow diagram illustrating a method for managing video conference sessions, in accordance with some embodiments.

In FIG. 8A, device 600 displays home screen 801 while the Mountaineers group is participating in a video conference that is concurrently active with a shared-content session. Device 600 also displays control region 812, which is similar to control region 612. Device 600 detects input 815-1 selecting camera option 812-4 and, in response, displays video conference interface 805, which is similar to video conference interface 605. Video conference interface includes tiles 810-1 to 810-12 displayed in main region 804, tiles 810-13 and 810-14 displayed in roster 806, and camera preview 808. Participant 1 is the most active participant as indicated by the enlarged size of tile 810-1 and shadow 809.

Figure 8C:
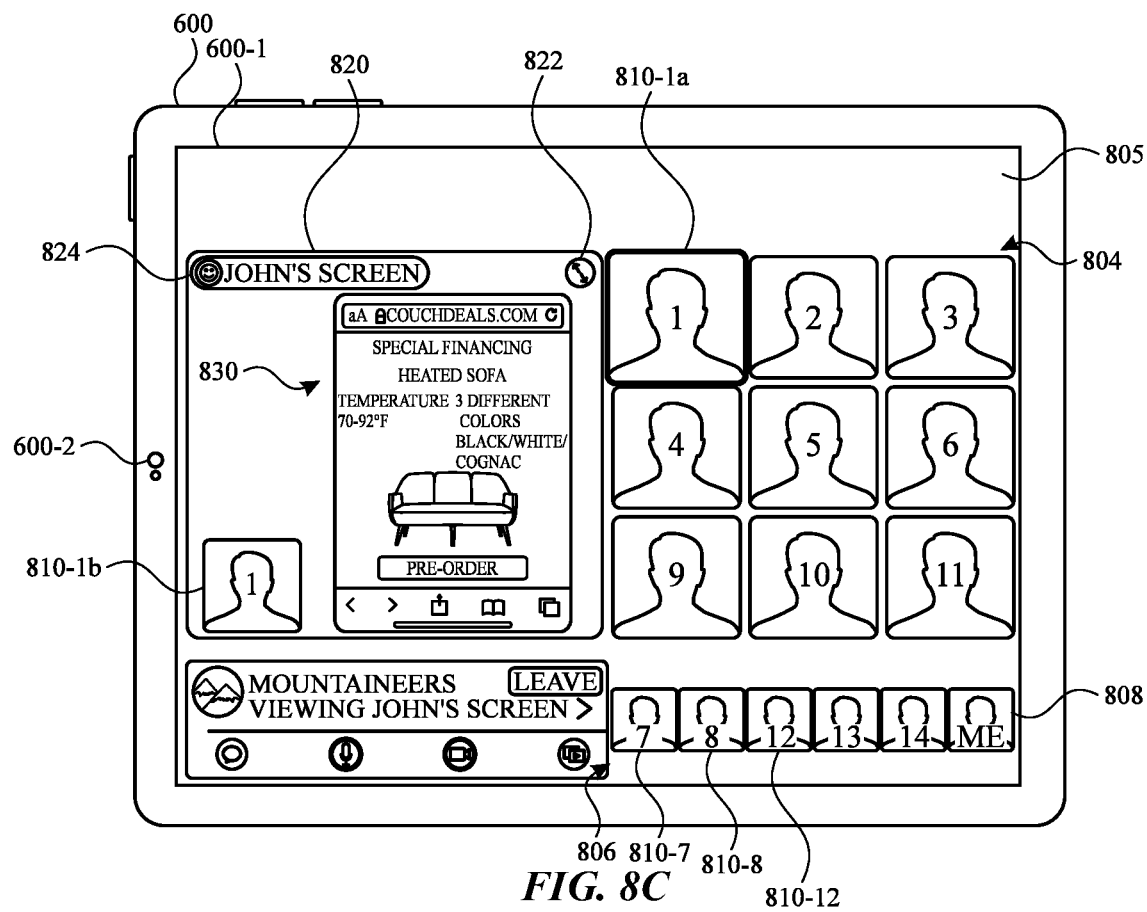

In FIG. 8C, participant 1 begins sharing content with the Mountaineers group. Accordingly, device 600 displays shared content region 820, which includes a representation of the shared content and other elements associated with the shared content. In the embodiment depicted in FIG. 8C, participant 1 (John) is sharing content that is displayed on the screen of his device. Therefore, shared content region 820 includes screen-share content 830, which is a real-time representation of John's screen. Shared content region 820 also includes indicator 824 indicating that the shared content is John's screen, and tile 810-1*b*, which is the video feed from John's device. In some embodiments, John's video feed is displayed in both shared content region 820 and in the grid as indicated by respective tiles 810-1*a* and 810-*b*. In some embodiments, a view of the shared content can be resized, adjusted, zoomed in, zoomed out, panned, or otherwise manipulated. For example, enlarge affordance 822 can be selected to display an enlarged (e.g., full-screen or using all of the screen outside of a portion of the screen designated for system status information and/or system controls) view of screen-share content 830. Tile 810-1*b* and indicator 824 are optionally displayed with the enlarged view of screen-share content 830. In some embodiments, a view of screen-share content 830 can be zoomed in (e.g., in response to a de-pinch gesture), zoomed out (e.g., in response to a pinch gesture), panned (e.g., in response to a one- or two-finger drag gesture), or otherwise manipulated.

When device 600 displays shared content region 820, some of the tiles are moved to roster 806, while continuing to display the remaining tiles in main region 804. In the embodiment depicted in FIGS. 8B and 8C, device 600 moved the tiles in the rightmost column of main region 804

(tiles 810-7, 810-8, and 810-12) to roster 806, while preserving the relative positions of the remaining tiles in their respective 3×3 arrangement.

Figure 8D:
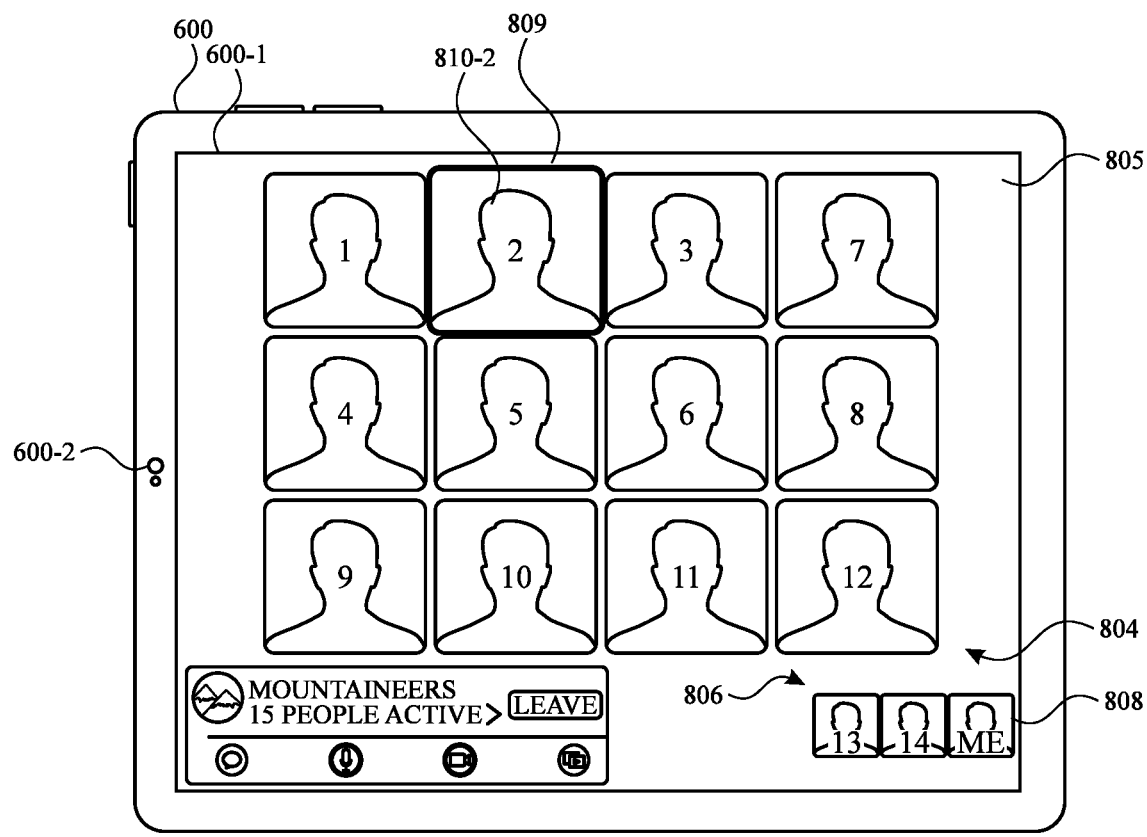
Figure 8E:
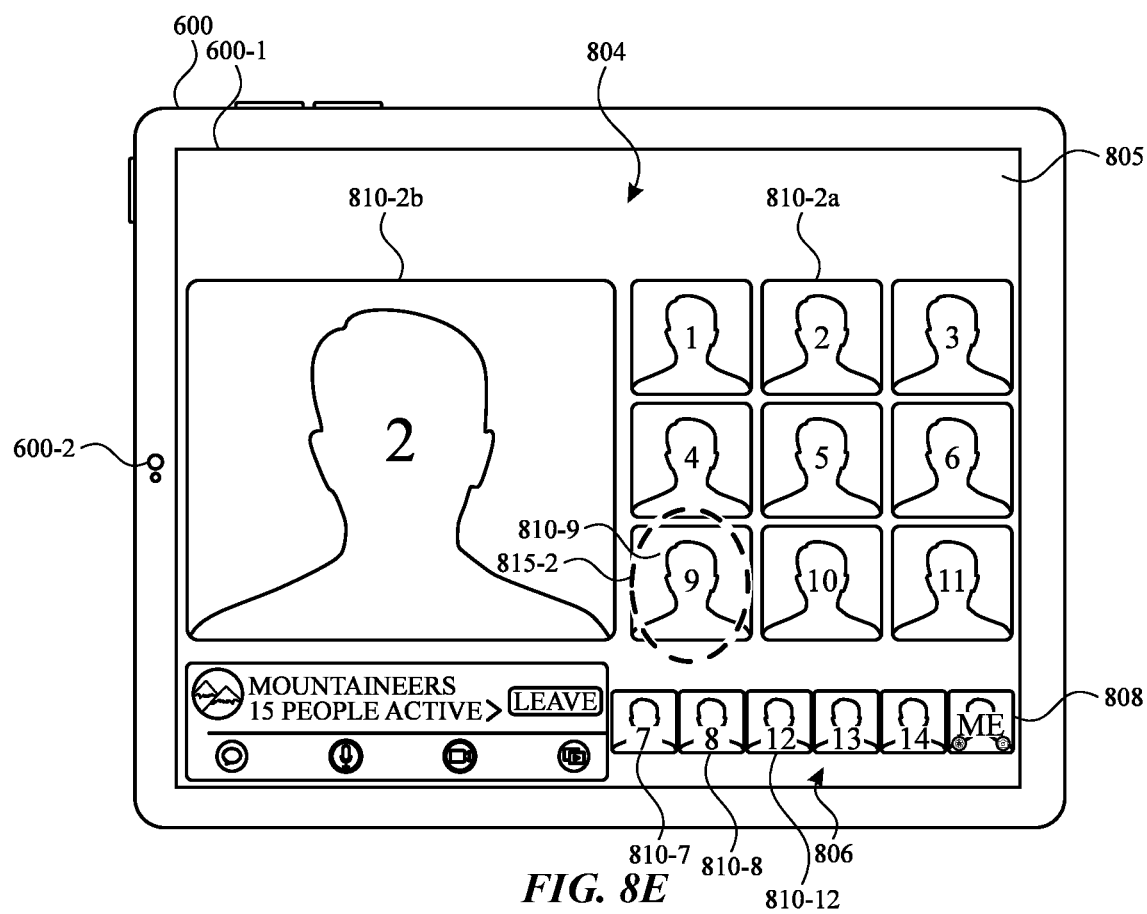

FIGS. 8D-8H illustrate various embodiments where an active participant's tile is enlarged, for example, to indicate that the participant is a presenter. In FIG. 8D, participant 1 stops sharing his screen, and device 600 returns the tiles to the prior arrangement. Tile 810-2 is emphasized as participant 2 begins speaking to the Mountaineers group. In FIG. 8E, as participant 2 continues speaking to the group, device 600 transitions tile 810-2 from the emphasized view in FIG. 8D to an enlarged, presenter state as shown in tile 810-2b. When participant 2 becomes the presenter, their video feed is displayed in enlarged tile 810-2b and in grid tile 810-2a. In some embodiments, shadow 809 is not displayed around tile 810-2a because participant 2 is already being emphasized in enlarged tile 810-2b. When enlarged tile 810-2b is displayed, device 600 moves the tiles in a manner similar to that described above with respect to FIGS. 8B and 8C, including moving some tiles to roster 806 and preserving the relative locations of the remaining tiles in main region 804.

Figure 8F:
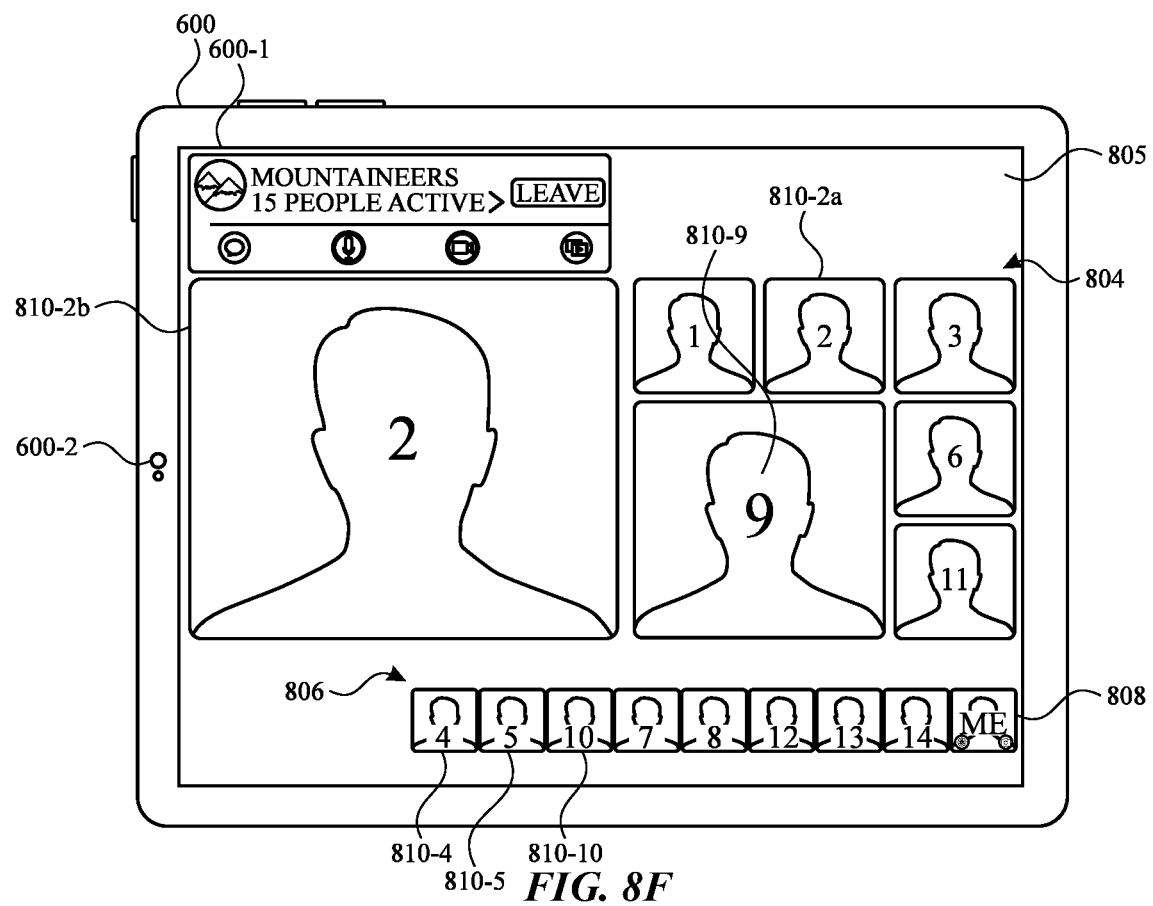

In FIG. 8E, device 600 detects input 815-2 selecting tile 810-9. In response, device 600 enlarges tile 810-9, thereby pinning tile 810-9 in main region 804, as shown in FIG. 8F. When tile 810-9 is enlarged, device 600 moves adjacent tiles 810-4, 810-5, and 810-10 to roster 806, while keeping remaining tiles 810-1, 810-2a, 810-3, 810-6, and 810-11 in main region 804.

Figure 8G:
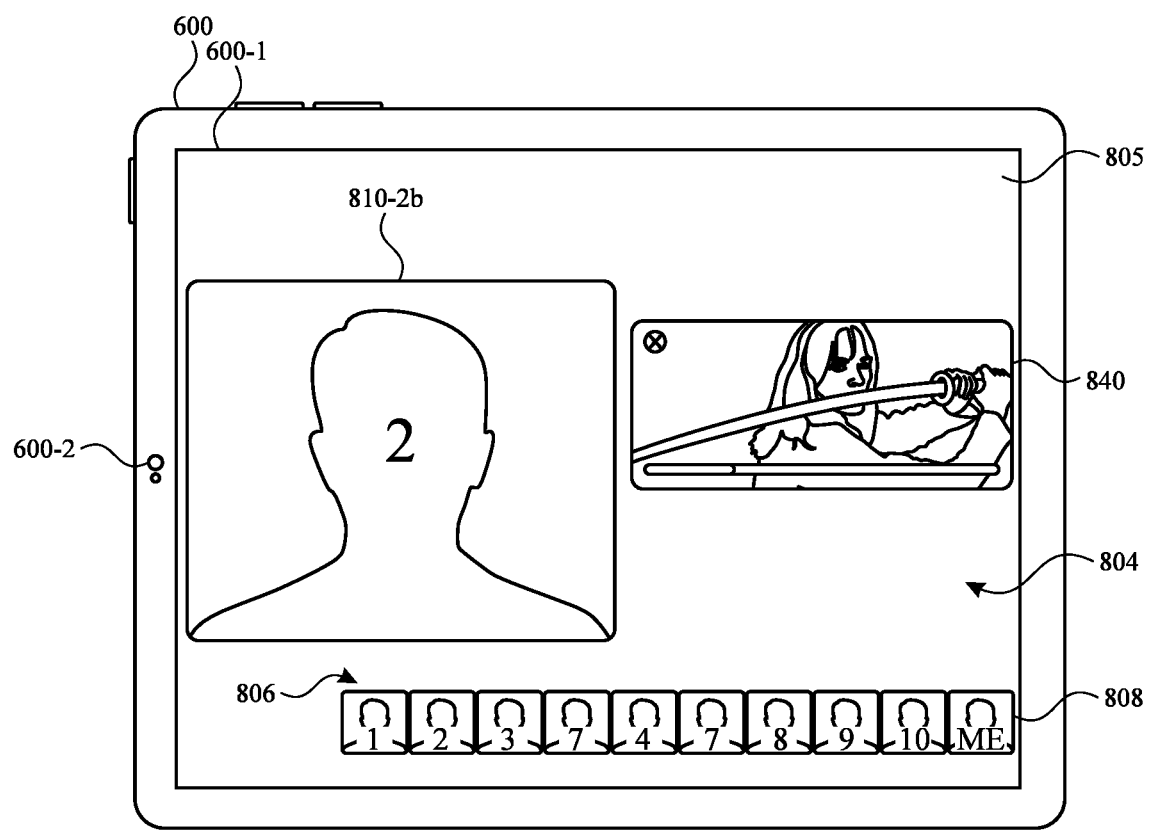

In FIG. 8G, participant 2 begins sharing content with the Mountaineers group. Device 600 displays the shared content in content PiP 840 (similar to content PiP 620). Device 600 continues to display enlarged tile 810-2b in main region 804 with content PiP 840 to indicate that participant 2 is sharing the content in content PiP 840 with the Mountaineers group. To accommodate the display of enlarged tile 810-2b and content PiP 840, device 600 moves the remaining tiles to roster 806, as shown in FIG. 8G.

Figure 8H:
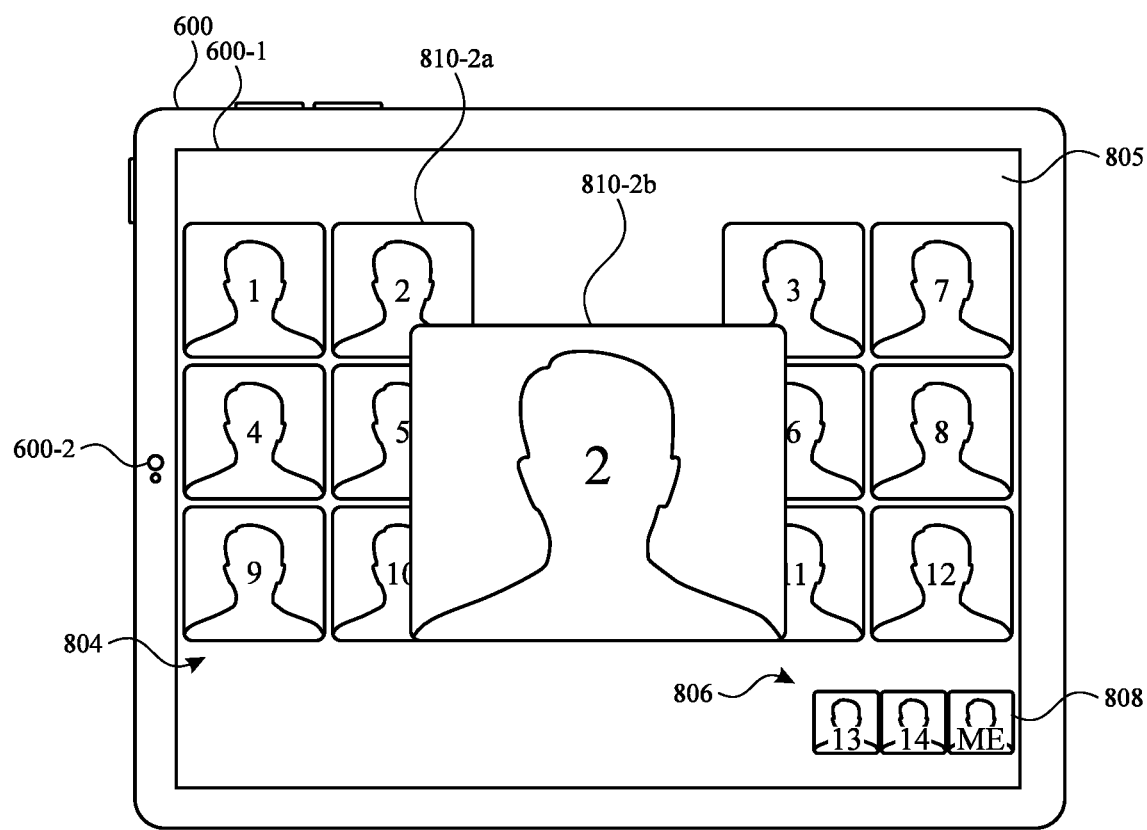

In some embodiments, device 600 can display the tiles in a hybrid arrangement where the tiles are displayed in a grid, with the presenter tile displayed overlapping at least a portion of the grid. An example of such an embodiment is shown in FIG. 8H, where enlarged tile 810-2b is displayed over tiles 810-1 to 810-12 in main region 804. The tiles in the grid are split into two groups, with tiles 810-1, 810-2a, 810-4, 810-5, 810-9, and 810-10 positioned on one side of enlarged tile 810-2b, and tiles 810-3, 810-7, 810-6, 810-8, 810-11, and 810-12 positioned on the other side of enlarged tile 810-2b.

FIG. 9 is a flow diagram illustrating a method for managing a video conference session using a computer system (e.g., 600, 601, or 602) in accordance with some embodiments. Method 900 is performed at a computer system (e.g., 100, 300, 500, 600, 601, or 602) (e.g., a smartphone, a tablet, a desktop or laptop computer) that is in communication with one or more display generation components (e.g., 600-1, 601-1, or 602-1) (e.g., a display controller, a touch-sensitive display system, a speaker, a bone conduction audio output device, a tactile output generator, a projector, and/or a holographic display) and one or more input devices (e.g., 600-1, 601-3, or 602-1) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 900 are, optionally, combined, the orders of some operations are, optionally, changed, and some operations are, optionally, omitted. In some embodiments, method 900 is performed at the computer system while a real-time communication session is available (e.g., to be joined and/or to be initiated). In some embodiments, the real-time communication session is included in (part of) the shared-content session. In some embodiments, the shared-content session is included in (part of) the real-time communication session. In some embodiments, the real-time communication session and the shared-content session are included in (part of) the same communication session.

As described below, method 900 provides an intuitive way for managing a video conference session. The method reduces the cognitive burden on a user for managing a video conference session, thereby creating a more efficient human-machine interface. For battery-operated computing devices, enabling a user to manage a video conference session faster and more efficiently conserves power and increases the time between battery charges.

The computer system receives (902) a request (e.g., 815-1) to display a user interface (e.g., 805) of a real-time communication application corresponding to a real-time communication session. In response to receiving the request to display the user interface of the real-time communication application corresponding to the real-time communication session, the computer system displays (904) the user interface (e.g., 805) of the real-time communication application corresponding to the real-time communication session. While the computer system is connected to the real-time communication session and connected to a shared-content session (e.g., a session between the computer system and one or more external computer systems that enables the computer system to output content (e.g., synchronized content (e.g., audio and/or video data for which output is synchronized at the computer system and an external computer system) and/or screen-share content (e.g., image data generated by a device (e.g., the computer system; an external computer system) that provides a real-time representation of an image or video content that is currently displayed at the device)) while the content is being output by the one or more external computer systems): the computer system displays (906), concurrently in the user interface (e.g., an interface of an application) of the real-time communication application (e.g., a video communication session, an audio communication session, or an audio/video communication session (e.g., a video chat)): a plurality of representations (e.g., 810) of participants of the real-time communication session, where the plurality of representations are displayed in a two-dimensional array (e.g., the arrangement of tiles 810 in main region 804 as shown in FIGS. 8C, 8E, 8F, and/or 8H) that includes two or more rows and two or more columns (e.g., grid; pattern); and a representation (e.g., 820, 830, 810-2b, and/or 840) of content in the shared-content session (e.g., screen-share content and/or synchronized content), where the representation of content is displayed visually associated with the array (e.g., displayed adjacent to the array; displayed grouped together with the array; displayed in the array), wherein the representation of content has a size corresponding to two or more rows of the array and/or two or more columns of the array. In some embodiments, the two-dimensional array includes corresponding locations corresponding to a respective row and a respective column. In some embodiments, there is not a representation at every location in the array (e.g., a location can have no content or content other than a representation of a participant of the real-time communication session). Concurrently displaying, in the user interface of the real-time communication application, the plurality of representations of participants of the real-time communication session and the representation of the content in the shared-content session allows the user to view the content of the shared-content session while maintaining context of an ongoing real-time communication session without requiring the user to navigate between separate user interfaces for the shared content and the real-time communication application, which provides improved visual feedback without cluttering the user interface.

In some embodiments, the plurality of representations of participants (e.g., 810) of the real-time communication session at least partially occupy two or more rows and two or more columns of the array (e.g., the arrangement of tiles 810 in main region 804) (e.g., the plurality of representations are not all in a single row or a single column). In some embodiments, one or more of the plurality of representations of the participants of the real-time communication session (e.g., tile 810-1) (e.g., tile 610-1 in FIG. 6K) occupy a row that is at least partially occupied by the representation of content (e.g., 620, 820, 830, 810-2*b*, and/or 840), and one or more of the plurality of representations of the participants of the real-time communication session (e.g., tiles 610-12, 610-15, and/or 610-18 in FIG. 6K) occupy a column that is at least partially occupied by the representation of content (e.g., 620) (e.g., there are one or more representations of participants of the real-time communication session that are above/below the representation of content (e.g., that occupy the same column but a different row) and one or more representations of participants of the real-time communication session that are beside the representation of content (e.g., that occupy the same row but a different column)). In some embodiments, the representation of content includes a region (e.g., 820) that includes the representation of content (e.g., 830), wherein the region is at least partially defined by a border, and at least one of the region and the representation of content within the region have a size corresponding to two or more rows of the array and/or two or more columns of the array.

In some embodiments, during the shared-content session, the content (e.g., 820, 830, 810-2*b*, and/or 840) is concurrently output at both the computer system (e.g., 600, 601, or 602) and one or more external computer systems associated with the participants of the real-time communication session. In some embodiments, the content is screen-share content from the computer system (e.g., content displayed on the display of the computer system) that is transmitted to the external computer system(s) so that the computer systems are concurrently outputting the screen-share content from the computer system. In some embodiments, the content is screen-share content (e.g., 830) from an external computer system (e.g., content displayed on the display of the external computer system) that is transmitted to the computer system (and, in some embodiments, other external computer systems) so that the computer systems are concurrently outputting the screen-share content from the external computer system. In some embodiments, the content is synchronized content (e.g., 840) that is output at the computer system and the external computer system(s). In some embodiments, the computer system and the external computer system(s) each separately access the content (e.g., a video; a movie; a TV show; a song) from a remote server and are synchronized in their respective output of the content such that the content is output (e.g., via an application local to the respective computer system) at the computer systems while each computer system separately accesses the content from the remote server(s). In some embodiments, the computer system and external computer system(s) separately access the content (e.g., synchronized content) in response to a selection that is received at the computer system or at an external computer system for requesting output of the content.

In some embodiments, the representation of content in the shared-content session includes a representation (e.g., 810-1*b*, 824, and/or 810-2*b*) (e.g., a live video feed, name, picture, and/or avatar) of an active participant (e.g., a participant who is presenting content, sharing content, and/or speaking) of the real-time communication session. In some embodiments, the representation of content in the shared-content session includes a first representation (e.g., 810-1*b* or 810-2*b*) (e.g., a live video feed, name, picture, and/or avatar) of the active participant, and the plurality of representations of participants includes a second representation (e.g., 810-1*a* or 810-2*a*) (e.g., a live video feed, name, picture, and/or avatar) of the active participant. Displaying a first representation of the active participant in the representation of content and a second representation of the active participant in the plurality of representations of participants provides feedback to a user of the computer system that the active participant is associated with the shared content, without adjusting the displayed arrangement of the plurality of representations of participants, which could be distracting to the user of the computer system, thereby providing improved visual feedback.

In some embodiments, displaying a representation of content in the shared-content session includes: in accordance with a determination that the content has a first aspect ratio (e.g., 4:3, 9:16, or a portrait orientation), displaying the representation of content having a first size (e.g., 830 in FIG. 8C, or 810-2*b* in FIG. 8G); and in accordance with a determination that the content has a second aspect ratio different from the first aspect ratio (e.g., 16:9 or a landscape orientation), displaying the representation of content having a second size different from the first size (e.g., 840). In some embodiments, the representation of content in the shared-content session includes a representation (e.g., 810-1*b*, 810-2*b*, and/or 824) (e.g., a live video feed, name, picture, and/or avatar) of a participant who initiated output of the content in the shared-content session. Displaying the representation of content in the shared-content session including a representation of a participant who initiated output of the content in the shared-content session provides feedback to a user of the computer system that the participant initiated output of the shared content, which provides improved visual feedback. In some embodiments, the representation of the participant who initiated output of the content in the shared-content session includes a live video feed of the participant (e.g., 810-1*b* or 810-2*b*). In some embodiments, displaying the representation of content in the shared-content session includes displaying a region (e.g., 820) (e.g., a region within a border) that includes the representation (e.g., 830) of the content (e.g., a screen-share content and/or synchronized content) and a representation (e.g., 810*b* and/or 824) (e.g., name, avatar, picture, and/or live video feed) of a participant who initiated output of the content in the shared-content session, wherein the representation of the participant who initiated output of the content in the shared-content session is displayed separate from (e.g., spaced apart from) the representation of the content. Displaying the representation of content in the shared-content session including a region that includes the representation of the content and a representation of a participant who initiated output of the content in the shared-content session provides feedback to a user of the computer system that the participant initiated output of the shared content, which provides improved visual feedback.

In some embodiments, while displaying the plurality of representations of participants of the real-time communication session in the two-dimensional array, wherein respective representations of participants have a first displayed size, the computer system (e.g., 600, 601, or 602) detects a set of one or more inputs (e.g., 815-2) corresponding to a first representation (e.g., 810-9) of a participant of the real-time communication session having the first displayed size (e.g., a pinned tile). In some embodiments, the set of one or more inputs includes a request to pin the tile. In some embodiments, the set of one or more inputs includes a request to enlarge the tile. In some embodiments, the set of one or more inputs includes a request to shrink the tile (e.g., after the tile has been enlarged). In some embodiments, in response to detecting the set of one or more inputs corresponding to the first representation of the participant of the real-time communication session, the computer system displays the first representation of the participant of the real-time communication session in the two-dimensional array and having a second displayed size different from (e.g., larger than) the first displayed size (e.g., 810-9 in FIG. 8F) while displaying other representations of participants of the real-time communication session having the first displayed size (e.g., 810-1 in FIG. 8F). Displaying the first representation of the participant of the real-time communication session in the two-dimensional array and having a second displayed size different from the first displayed size while displaying other representations of participants of the real-time communication session having the first displayed size provides feedback to a user of the computer system that the representation of the participant has been selected and provides an enlarged view of the representation of the participant, which provides improved visual feedback. In some embodiments, a tile can be pinned so that it does not change position within the gird. In some embodiments, when a pinned tile is enlarged, one or more adjacent tiles are pushed to the roster while the enlarged, pinned tile remains in the grid. In some embodiments, when the enlarged, pinned tile is reduced to its original displayed size, the tiles that were pushed to the grid are removed from the roster and displayed at their original position adjacent the pinned tile.

In some embodiments, the plurality of representations of participants of the real-time communication session displayed in the two-dimensional array include a respective representation (e.g., 810-9 in FIG. 8F) of a participant having a pinned state that prevents the respective representation of a participant from changing locations within the two-dimensional array (e.g., in response to a change in the number of participants represented in the two-dimensional array). Displaying the plurality of representations of participants of the real-time communication session including a respective representation of a participant having a pinned state that prevents the respective representation of a participant from changing locations within the two-dimensional array provides additional controls for maintaining a fixed position of the respective representation of a participant without cluttering the user interface with additional controls for maintaining a fixed position of the respective participant, which provides additional control options without cluttering the user interface.

In some embodiments, displaying the plurality of representations of participants of the real-time communication session includes: displaying a first section of the two-dimensional array (e.g., a section that includes 810-1, 810-2a, 810-4, 810-5, 810-9, and 810-10 in FIG. 8H) (e.g., a section that includes two or more rows and two or more columns of representations of participants of the real-time communication session); displaying a second section of the two-dimensional array different from the first section (e.g., a section that includes 810-3, 810-7, 810-6, 810-8, 810-11, and 810-12 in FIG. 8H) (e.g., separated from the first section) (e.g., a section that includes two or more rows and two or more columns of representations of participants of the real-time communication session); and displaying an enlarged representation (e.g., 810-2b) of a first participant of the real-time communication session, wherein the enlarged representation of the first participant overlaps at least a portion of the first section of the two-dimensional array and at least a portion of the second section of the two-dimensional array. Displaying the plurality of representations of participants of the real-time communication session including displaying an enlarged representation of a first participant of the real-time communication session overlapping at least a portion of the first section of the two-dimensional array and at least a portion of the second section of the two-dimensional array allows the user to view the representation of the first participant while maintaining context of an ongoing real-time communication session with other participants without requiring the user to navigate between separate user interfaces for viewing the representation first participant the representations of the participants in the first and second sections of the two-dimensional array, which provides improved visual feedback without cluttering the user interface.

In some embodiments, while displaying the plurality of representations of participants (e.g., 660 or 810) of the real-time communication session and the representation of content (e.g., 620, 670, 820, 830, 810-2b, and/or 840) in the shared-content session, the computer system (e.g., 600, 601, or 602) receives a request (e.g., 615-11 or 615-12) (e.g., an input) to move the representation of content. In some embodiments, in response to receiving the request to move the representation of content, the computer system: moves the representation of content in accordance with the request to move the representation of content (e.g., moving 670 as shown in FIGS. 6AB-6AF) (e.g., based on a direction and/or magnitude of movement of an input); and changes a position of (e.g., moving) one or more representations of participants (e.g., tiles 660 in region 654 and/or region 656) of the real-time communication session based on the movement of (e.g., the moved position of) the representation of content (e.g., to avoid the moved position of the representation of content). Changing the position of one or more representations of participants of the real-time communication session based on the movement of the representation of content allows the computer system to automatically and dynamically optimize the location of the representations based on changes in the position of the content without requiring the user to manually adjust the user interface of the real-time communication application, which provides improved visual feedback and reduces the number of inputs needed to perform an operation. In some embodiments, the user interface of the real-time communication application includes a subset of representations of participants (e.g., tiles 660 or 810 in region 656 or 806) of the real-time communication session displayed in a first region (e.g., 656 or 806) of the user interface that is visually distinct from the two-dimensional array.

In some embodiments, changing a position of one or more representations of participants of the real-time communication session based on the movement of the representation of content includes moving the subset of representations of participants from the first region to a second region of the user interface based on the movement of the representation of content (e.g., as shown in FIG. 6AD) (e.g., to avoid the moved position of the representation of content). Moving the subset of representations of participants of the real-time communication session from the first region to the second region of the user interface based on the movement of the representation of content allows the computer system to automatically and dynamically optimize the location of the subset of representations of participants based on changes in the position of the content without requiring the user to manually adjust the user interface of the real-time communication application, which provides improved visual feedback and reduces the number of inputs needed to perform an operation.

In some embodiments, while displaying the plurality of representations of participants of the real-time communication session and the representation of content in the shared-content session, the computer system receives a request (e.g., 615-11 or 615-12) (e.g., an input) to select an item (e.g., 610, 620, 640, 670, 660, 810, 820, 830, 810-2*b*, or 840) (e.g., a representation of a participant of the real-time communication session, a set of one or more representations of participants of the real-time communication session, or the representation of content in the shared-content session) for moving in the user interface (e.g., 605, 630, 650, or 805) of the real-time communication application. In some embodiments, in response to receiving the request to select an item for moving: in accordance with a determination that the request corresponds to a selection of the representation of content (e.g., 620, 670, 820, 830, 810-2*b*, or 840) in the shared-content session, the computer system enables movement of the representation of content (e.g., based on a direction and/or magnitude of movement of an input); and in accordance with a determination that the request corresponds to a selection of a set of one or more representations of participants of the real-time communication session (e.g., 610, 660, 640, or 810) (e.g., one or more tiles in the array, one or more tiles in the roster), the computer system forgoes enabling movement of the set of one or more representations of participants of the real-time communication session. Enabling movement of the representation of the content when the request corresponds to a selection of the representation of the content in the shared-content session, and forgoing enabling movement of the set of one or more representations of participants of the real-time communication session when the request corresponds to a selection of the set of one or more representations of participants of the real-time communication session, provides controls for selecting the representation of the content for moving in the user interface without cluttering the user interface with additional controls for moving the representation of the content, which provides additional control options without cluttering the user interface. In some embodiments, the representation of the shared content can be selected to be moved in the user interface, and the tiles in the grid and/or roster cannot be selected to be moved in the user interface.

In some embodiments, while displaying the representation of content (e.g., 670) having a first position relative to the plurality of representations of participants (e.g., 660-1, 660-2, 660-3, 660-4, and/or 660-5) of the real-time communication session (e.g., as shown in FIG. 6AF), the computer system detects a change in orientation of the user interface of the real-time communication application (e.g., as shown in FIG. 6AG) (e.g., a rotation of the computer system from a portrait orientation to a landscape orientation, or a rotation of the computer system from a landscape orientation to a portrait orientation). In some embodiments, in response to detecting the change in orientation of the user interface of the real-time communication application: in accordance with a determination that the change in orientation is a rotation in a first direction (e.g., a clockwise rotation), the computer system rotates a displayed orientation of the representation of the content (e.g., 670) and the plurality of representations of participants (e.g., 660-1, 660-2, 660-3, 660-4, and/or 660-5) in a second direction (e.g., a counter-clockwise rotation) while maintaining the first position of the representation of the content relative to the plurality of representations of participants of the real-time communication session; and in accordance with a determination that the change in orientation is a rotation in a third direction (e.g., as shown in FIG. 6AG) (e.g., a counterclockwise rotation), the computer system rotates a displayed orientation of the representation of the content (e.g., 670) and the plurality of representations of participants (e.g., 660-1, 660-2, 660-3, 660-4, and/or 660-5) in a fourth direction (e.g., a clockwise rotation) while maintaining the first position of the representation of the content relative to the plurality of representations of participants of the real-time communication session (e.g., as shown in FIG. 6AG). Rotating the displayed orientation of the representation of the content and the plurality of representations of participants while maintaining the first position of the representation of the content relative to the plurality of representations of participants of the real-time communication session allows the computer system to optimize a displayed orientation of the representation of content and the plurality of representations of participants without adjusting the displayed arrangement of the representation of content and the plurality of representations of participants, which could be distracting to the user of the computer system, thereby providing improved visual feedback.

Note that details of the processes described above with respect to method 900 (e.g., FIG. 9) are also applicable in an analogous manner to the methods described above. For example, method 700 optionally includes one or more of the characteristics of the various methods described above with reference to method 900. For example, the methods for displaying shared content depicted in FIGS. 8A-8H and described with reference to method 900 can be applied to the embodiments depicted in FIGS. 6A-6AS and described with reference to method 700. For brevity, these details are not repeated.

The various embodiments provided herein are generally described using devices 600, 601, and 602. However, it should be appreciated that other computer systems or devices can be used (in addition to, or in lieu of, devices 600, 601, and/or 602) to participate in a video conference session (with or without a concurrent shared-content session), and that various aspects of a video conference session can be implemented in different manners across the various devices participating in the video conference session. For example, a smart speaker, optionally including a display component, can be used to participate in a video conference session. In some embodiments, inputs at the smart speaker can be provided verbally and, optionally, via a touch input, and outputs can be audio outputs and, optionally, visual outputs provided at a connected display component. As another example, a display component of a head-mounted device (HMD) can be used to display visual aspects of the video conference session (and a speaker used to produce audio), and inputs can be received by detecting gestures, eye gaze, hand movements, audio inputs, touch inputs, or the like. In some embodiments, the user interfaces depicted in the figures can be displayed in an extended reality environment such as augmented reality or virtual reality. For example, video tiles, windows, and/or other display regions shown in the figures can be displayed suspended in a three-dimensional environment. As another example, the representations of users or participants can be displayed as simulated three-dimensional avatars or two-dimensional avatars positioned around a three-dimensional environment rather than video tiles or windows in a video conference application. Additionally, embodiments are described herein using various types of inputs such as taps, drags, clicks, and hover gestures, however, it should be appreciated that the described embodiments can be modified to respond to other forms of input including gestures, eye gaze, hand movements, audio inputs, and the like. Additionally, different devices with different capabilities can be combined in a single video conference session (e.g., with or without a shared-content session), for example a smartphone, tablet, laptop computer, desktop computer, smart speaker, smart TV, headphones or earbuds, HMD, and/or smart watch (or a subset thereof) could participate in the same session with the different devices participating in different manners according to the capabilities of the device (e.g., the HMD presenting content in a simulated three-dimensional environment or an augmented reality environment, the smart speaker providing audio outputs and inputs, the headphones providing spatial audio outputs and audio inputs, the laptop and desktop computers, smartphone and tablet providing audio and visual inputs and outputs, the smart TV providing audio and visual outputs and audio inputs (or audio and visual inputs)).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of content for a video conference session. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in some embodiments, the present technology can be configured to allow users to select to "opt in" or "opt out" of participation in the collection of personal information data during registration for services or anytime thereafter. In another example, the present technology can be configured to allow users to prevent sharing of the personal information that may appear on the user's screen (e.g., such as in a screen-sharing embodiment). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A computer system configured to communicate with one or more display generation components and one or more input devices, comprising:
   one or more processors; and
   memory storing one or more programs configured to be executed by the one or more processors, the one or more programs including instructions for:
      displaying a user interface of a real-time communication session, the user interface including a plurality of representations of participants of the real-time communication session, the plurality of representations including:
         a first set of representations of participants displayed in a first region of the user interface of the real-time communication session; and
         a second set of representations of participants displayed in a second region of the user interface that is visually distinct from the first region, wherein the representations of the first set of representations are a different size than the representations of the second set of representations;
      while displaying the user interface of the real-time communication session, including the plurality of representations of participants of the real-time communication session, detecting a change in one or more dimensions of the first region; and
      in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

2. The computer system of claim 1, wherein the change in one or more dimensions of the first region includes a change in orientation of the first region.

3. The computer system of claim 1, wherein the change in one or more dimensions of the first region includes a change in size of one or more dimensions of the first region.

4. The computer system of claim 1, wherein detecting the change in one or more dimensions of the first region occurs while the first region is in a first state, the one or more programs further including instructions for:
      in response to detecting the change in one or more dimensions of the first region:
         in accordance with a determination that the change in one or more dimensions of the first region corresponds to a change of the first region from the first state to a second state, the respective participant is a first participant of the real-time communication session; and
         in accordance with a determination that the change in one or more dimensions of the first region corresponds to a change of the first region from the first state to a third state that is different from the second state, the respective participant is a second participant of the real-time communication session that is different from the first participant of the real-time communication session.

5. The computer system of claim 1, wherein the first set of representations of participants is displayed in a grid pattern in the first region of the user interface of the real-time communication session, the one or more programs further including instructions for:
      while displaying the user interface of the real-time communication session, detecting a change in a display status of a first set of one or more representations of participants of the real-time communication session; and
      in response to detecting the change in the display status of the first set of one or more representations of participants of the real-time communication session, updating the first set of representations of participants displayed in the grid pattern based on the change in the display status of the first set of one or more representations of participants of the real-time communication session without changing a displayed position of a second set of one or more representations of participants of the real-time communication session that are not included in the first set of one or more representations of participants.

6. The computer system of claim 5, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes adding a complete row or column of representations of participants of the real-time communication session to the first region or removing a complete row or column of representations of participants of the real-time communication session from the first region.

7. The computer system of claim 5, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes maintaining a displayed arrangement of the representations of participants in the second set of one or more representations of participants in response to a change in orientation of the user interface of the real-time communication session.

8. The computer system of claim 5, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes maintaining a location, relative to the one or more display generation components, of the representations of participants in the second set of one or more representations of participants in response to a change in orientation of the user interface of the real-time communication session while rotating the representations of the participants in accordance with the change in orientation of the user interface of the real-time communication session.

9. The computer system of claim 1, the one or more programs further including instructions for:
   in accordance with a determination that an activity level of a third participant meets a set of activity criteria, increasing a size of a representation of the third participant.

10. The computer system of claim 1, the one or more programs further including instructions for:
   in accordance with a determination that an activity level of a fourth participant meets a set of activity criteria, visually distinguishing a representation of the fourth participant, including changing a depth effect associated with the representation of the fourth participant.

11. The computer system of claim 1, wherein the computer system is in communication with one or more cameras, and the user interface of the real-time communication session includes a representation of a field-of-view of the one or more cameras, the one or more programs further including instructions for:
   while displaying the representation of the field-of-view of the one or more cameras overlaying at least a portion of a first representation of a participant of the real-time communication session, detecting an input corresponding to the first representation of the participant of the real-time communication session; and
   in response to detecting the input corresponding to the first representation of the participant of the real-time communication session, displaying the first representation of the participant of the real-time communication session overlaying at least a portion of the representation of the field-of-view of the one or more cameras.

12. The computer system of claim 1, wherein:
   the computer system is in communication with one or more cameras;
   the user interface of the real-time communication session includes a representation of a field-of-view of the one or more cameras; and
   the second set of representations of participants displayed in the second region includes one or more representations of participants having a shifted position adjacent to the representation of the field-of-view of the one or more cameras.

13. The computer system of claim 1, the one or more programs further including instructions for:
   while displaying a first subset of the second set of representations of participants displayed in the second region, receiving an input that corresponds to movement in a respective direction in the user interface; and
   in response to receiving the input that corresponds to movement in the respective direction in the user interface:
      in accordance with a determination that the input that corresponds to movement in the respective direction in the user interface is directed to a portion of the user interface that includes the second set of representations of participants, scrolling the second set of representations of participants in the respective direction, including displaying one or more representations of participants that are not included in the first subset of the second set of representations of participants.

14. The computer system of claim 13, the one or more programs further including instructions for:
   in response to receiving the input that corresponds to movement in the respective direction in the user interface:
      in accordance with a determination that the input that corresponds to movement in the respective direction in the user interface is directed to a portion of the user interface that includes the first set of representations of participants, forgoing scrolling the first set of representations of participants.

15. The computer system of claim 1, the one or more programs further including instructions for:
   while displaying the first set of representations of participants displayed in the first region and having a first arrangement, receiving a request to display a second set of one or more controls for the real-time communication session; and
   in response to receiving the request to display a second set of one or more controls for the real-time communication session:
      displaying the second set of one or more controls for the real-time communication session; and
      displaying the first set of representations of participants displayed in the first region and having a second arrangement different than the first arrangement.

16. The computer system of claim 1, wherein the user interface of the real-time communication session includes an arrangement-selection option that, when selected, enables an overlapping arrangement of a third set of representations of participants of the real-time communication session.

17. The computer system of claim 16, the one or more programs further including instructions for:
   while displaying a representation of content associated with a shared-content session concurrently with the first set of representations of participants in the first region of the user interface of the real-time communication session, receiving a request to move the representation of content; and
   in response to receiving the request to move the representation of content, moving the representation of content from a first location in the user interface of the real-time communication session to a second location in the user interface of the real-time communication session, including:
      in accordance with a determination that the overlapping arrangement of the first set of representations of participants is enabled, changing a position of one or more representations of participants of the first set of representations of participants in the first region based on the movement of the representation of content; and
      in accordance with a determination that the overlapping arrangement of the first set of representations of participants is not enabled, forgoing changing a position of one or more representations of participants of the first set of representations of participants in the first region based on the movement of the representation of content.

18. The computer system of claim 1, the one or more programs further including instructions for:
  while displaying the first set of representations of participants in a grid pattern in the first region of the user interface of the real-time communication session, detecting a first gesture that includes movement through locations corresponding to one or more of the representations of participants in the user interface corresponding to a request to change an arrangement of the plurality of representations of participants in the user interface; and
  in response to detecting the first gesture, displaying a fourth set of representations of participants of the real-time communication session in an overlapping arrangement.

19. The computer system of claim 1, the one or more programs further including instructions for:
  while displaying, in the user interface of the real-time communication session, a fifth set of representations of participants of the real-time communication session in an overlapping arrangement, detecting a second gesture that includes movement through locations corresponding to one or more of the representations of participants in the user interface corresponding to a request to change an arrangement of the plurality of representations of participants in the user interface; and
  in response to detecting the second gesture, displaying a sixth set of representations of participants of the real-time communication session in a grid pattern.

20. The computer system of claim 1, wherein changing a number of representations of participants of the real-time communication session displayed in the first region based on the change in the one or more dimensions of the first region includes displaying a first row of representations of participants fading out while maintaining display of at least a second row of representations of participants in the first region.

21. The computer system of claim 1, wherein changing a number of representations of participants of the real-time communication session displayed in the first region based on the change in the one or more dimensions of the first region includes displaying a first column of representations of participants fading out while maintaining display of at least a second column of representations of participants in the first region.

22. A non-transitory computer-readable storage medium storing one or more programs configured to be executed by one or more processors of a computer system that is in communication with one or more display generation components and one or more input devices, the one or more programs including instructions for:
  displaying a user interface of a real-time communication session, the user interface including a plurality of representations of participants of the real-time communication session, the plurality of representations including:
    a first set of representations of participants displayed in a first region of the user interface of the real-time communication session; and
    a second set of representations of participants displayed in a second region of the user interface that is visually distinct from the first region, wherein the representations of the first set of representations are a different size than the representations of the second set of representations;
  while displaying the user interface of the real-time communication session, including the plurality of representations of participants of the real-time communication session, detecting a change in one or more dimensions of the first region; and
  in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

23. A method, comprising:
  at a computer system that is in communication with one or more display generation components and one or more input devices:
  displaying a user interface of a real-time communication session, the user interface including a plurality of representations of participants of the real-time communication session, the plurality of representations including:
    a first set of representations of participants displayed in a first region of the user interface of the real-time communication session; and
    a second set of representations of participants displayed in a second region of the user interface that is visually distinct from the first region, wherein the representations of the first set of representations are a different size than the representations of the second set of representations;
  while displaying the user interface of the real-time communication session, including the plurality of representations of participants of the real-time communication session, detecting a change in one or more dimensions of the first region; and
  in response to detecting the change in the one or more dimensions of the first region, changing a number of representations of participants of the real-time communication session displayed in the first region based on the change in the one or more dimensions of the first region, including ceasing to display a first representation of a respective participant in the first region and displaying a second representation of the respective participant in the second region.

24. The non-transitory computer-readable storage medium of claim 22, wherein the change in one or more dimensions of the first region includes a change in orientation of the first region.

25. The non-transitory computer-readable storage medium of claim 22, wherein the change in one or more dimensions of the first region includes a change in size of one or more dimensions of the first region.

26. The non-transitory computer-readable storage medium of claim 22, wherein detecting the change in one or more dimensions of the first region occurs while the first region is in a first state, the one or more programs further including instructions for:
  in response to detecting the change in one or more dimensions of the first region:
    in accordance with a determination that the change in one or more dimensions of the first region corresponds to a change of the first region from the first state to a second state, the respective participant is a first participant of the real-time communication session; and
    in accordance with a determination that the change in one or more dimensions of the first region corresponds to a change of the first region from the first state to a third state that is different from the second state, the respective participant is a second participant of the real-time communication session that is different from the first participant of the real-time communication session.

27. The non-transitory computer-readable storage medium of claim 22, wherein the first set of representations of participants is displayed in a grid pattern in the first region of the user interface of the real-time communication session, the one or more programs further including instructions for:
 while displaying the user interface of the real-time communication session, detecting a change in a display status of a first set of one or more representations of participants of the real-time communication session; and
 in response to detecting the change in the display status of the first set of one or more representations of participants of the real-time communication session, updating the first set of representations of participants displayed in the grid pattern based on the change in the display status of the first set of one or more representations of participants of the real-time communication session without changing a displayed position of a second set of one or more representations of participants of the real-time communication session that are not included in the first set of one or more representations of participants.

28. The non-transitory computer-readable storage medium of claim 27, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes adding a complete row or column of representations of participants of the real-time communication session to the first region or removing a complete row or column of representations of participants of the real-time communication session from the first region.

29. The non-transitory computer-readable storage medium of claim 27, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes maintaining a displayed arrangement of the representations of participants in the second set in response to a change in orientation of the user interface of the real-time communication session.

30. The non-transitory computer-readable storage medium of claim 27, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes maintaining a location, relative to the one or more display generation components, of the representations of participants in the second set of one or more representations of participants in response to a change in orientation of the user interface of the real-time communication session while rotating the representations of the participants in accordance with the change in orientation of the user interface of the real-time communication session.

31. The non-transitory computer-readable storage medium of claim 22, the one or more programs further including instructions for:
 in accordance with a determination that an activity level of a third participant meets a set of activity criteria, increasing a size of a representation of the third participant.

32. The non-transitory computer-readable storage medium of claim 22, the one or more programs further including instructions for:
 in accordance with a determination that an activity level of a fourth participant meets a set of activity criteria, visually distinguishing a representation of the fourth participant, including changing a depth effect associated with the representation of the fourth participant.

33. The non-transitory computer-readable storage medium of claim 22, wherein the computer system is in communication with one or more cameras, and the user interface of the real-time communication session includes a representation of a field-of-view of the one or more cameras, the one or more programs further including instructions for:
 while displaying the representation of the field-of-view of the one or more cameras overlaying at least a portion of a first representation of a participant of the real-time communication session, detecting an input corresponding to the first representation of the participant of the real-time communication session; and
 in response to detecting the input corresponding to the first representation of the participant of the real-time communication session, displaying the first representation of the participant of the real-time communication session overlaying at least a portion of the representation of the field-of-view of the one or more cameras.

34. The non-transitory computer-readable storage medium of claim 22, wherein:
 the computer system is in communication with one or more cameras;
 the user interface of the real-time communication session includes a representation of a field-of-view of the one or more cameras; and
 the second set of representations of participants displayed in the second region includes one or more representations of participants having a shifted position adjacent to the representation of the field-of-view of the one or more cameras.

35. The non-transitory computer-readable storage medium of claim 22, the one or more programs further including instructions for:
 while displaying a first subset of the second set of representations of participants displayed in the second region, receiving an input that corresponds to movement in a respective direction in the user interface; and
 in response to receiving the input that corresponds to movement in the respective direction in the user interface:
  in accordance with a determination that the input that corresponds to movement in the respective direction in the user interface is directed to a portion of the user interface that includes the second set of representations of participants, scrolling the second set of representations of participants in the respective direction, including displaying one or more representations of participants that are not included in the first subset of the second set of representations of participants.

36. The non-transitory computer-readable storage medium of claim 35, the one or more programs further including instructions for:
in response to receiving the input that corresponds to movement in the respective direction in the user interface:
in accordance with a determination that the input that corresponds to movement in the respective direction in the user interface is directed to a portion of the user interface that includes the first set of representations of participants, forgoing scrolling the first set of representations of participants.

37. The non-transitory computer-readable storage medium of claim 22, the one or more programs further including instructions for:
while displaying the first set of representations of participants displayed in the first region and having a first arrangement, receiving a request to display a second set of one or more controls for the real-time communication session; and
in response to receiving the request to display a second set of one or more controls for the real-time communication session:
displaying the second set of one or more controls for the real-time communication session; and
displaying the first set of representations of participants displayed in the first region and having a second arrangement different than the first arrangement.

38. The non-transitory computer-readable storage medium of claim 22, wherein the user interface of the real-time communication session includes an arrangement-selection option that, when selected, enables an overlapping arrangement of a third set of representations of participants of the real-time communication session.

39. The non-transitory computer-readable storage medium of claim 38, the one or more programs further including instructions for:
while displaying a representation of content associated with a shared-content session concurrently with the first set of representations of participants in the first region of the user interface of the real-time communication session, receiving a request to move the representation of content; and
in response to receiving the request to move the representation of content, moving the representation of content from a first location in the user interface of the real-time communication session to a second location in the user interface of the real-time communication session, including:
in accordance with a determination that the overlapping arrangement of the first set of representations of participants is enabled, changing a position of one or more representations of participants of the first set of representations of participants in the first region based on the movement of the representation of content; and
in accordance with a determination that the overlapping arrangement of the first set of representations of participants is not enabled, forgoing changing a position of one or more representations of participants of the first set of representations of participants in the first region based on the movement of the representation of content.

40. The non-transitory computer-readable storage medium of claim 22, the one or more programs further including instructions for:
while displaying the first set of representations of participants in a grid pattern in the first region of the user interface of the real-time communication session, detecting a first gesture that includes movement through locations corresponding to one or more of the representations of participants in the user interface corresponding to a request to change an arrangement of the plurality of representations of participants in the user interface; and
in response to detecting the first gesture, displaying a fourth set of representations of participants of the real-time communication session in an overlapping arrangement.

41. The non-transitory computer-readable storage medium of claim 22, the one or more programs further including instructions for:
while displaying, in the user interface of the real-time communication session, a fifth set of representations of participants of the real-time communication session in an overlapping arrangement, detecting a second gesture that includes movement through locations corresponding to one or more of the representations of participants in the user interface corresponding to a request to change an arrangement of the plurality of representations of participants in the user interface; and
in response to detecting the second gesture, displaying a sixth set of representations of participants of the real-time communication session in a grid pattern.

42. The non-transitory computer-readable storage medium of claim 22, wherein changing a number of representations of participants of the real-time communication session displayed in the first region based on the change in the one or more dimensions of the first region includes displaying a first row of representations of participants fading out while maintaining display of at least a second row of representations of participants in the first region.

43. The non-transitory computer-readable storage medium of claim 22, wherein changing a number of representations of participants of the real-time communication session displayed in the first region based on the change in the one or more dimensions of the first region includes displaying a first column of representations of participants fading out while maintaining display of at least a second column of representations of participants in the first region.

44. The method of claim 23, wherein the change in one or more dimensions of the first region includes a change in orientation of the first region.

45. The method of claim 23, wherein the change in one or more dimensions of the first region includes a change in size of one or more dimensions of the first region.

46. The method of claim 23, wherein detecting the change in one or more dimensions of the first region occurs while the first region is in a first state, the method further comprising:
in response to detecting the change in one or more dimensions of the first region:
in accordance with a determination that the change in one or more dimensions of the first region corresponds to a change of the first region from the first state to a second state, the respective participant is a first participant of the real-time communication session; and
in accordance with a determination that the change in one or more dimensions of the first region corresponds to a change of the first region from the first state to a third state that is different from the second state, the respective participant is a second participant of the real-time communication session that is different from the first participant of the real-time communication session.

47. The method of claim 23, wherein the first set of representations of participants is displayed in a grid pattern in the first region of the user interface of the real-time communication session, the method further comprising:
while displaying the user interface of the real-time communication session, detecting a change in a display status of a first set of one or more representations of participants of the real-time communication session; and
in response to detecting the change in the display status of the first set of one or more representations of participants of the real-time communication session, updating the first set of representations of participants displayed in the grid pattern based on the change in the display status of the first set of one or more representations of participants of the real-time communication session without changing a displayed position of a second set of one or more representations of participants of the real-time communication session that are not included in the first set of one or more representations of participants.

48. The method of claim 47, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes adding a complete row or column of representations of participants of the real-time communication session to the first region or removing a complete row or column of representations of participants of the real-time communication session from the first region.

49. The method of claim 47, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes maintaining a displayed arrangement of the representations of participants in the second set in response to a change in orientation of the user interface of the real-time communication session.

50. The method of claim 47, wherein updating the first set of representations of participants displayed in the grid pattern based on the change in the display status of the first set of one or more representations of participants of the real-time communication session without changing a displayed position of the second set of one or more representations of participants of the real-time communication session that are not included in the first set of one or more representations of participants includes maintaining a location, relative to the one or more display generation components, of the representations of participants in the second set of one or more representations of participants in response to a change in orientation of the user interface of the real-time communication session while rotating the representations of the participants in accordance with the change in orientation of the user interface of the real-time communication session.

51. The method of claim 23, further comprising:
in accordance with a determination that an activity level of a third participant meets a set of activity criteria, increasing a size of a representation of the third participant.

52. The method of claim 23, further comprising:
in accordance with a determination that an activity level of a fourth participant meets a set of activity criteria, visually distinguishing a representation of the fourth participant, including changing a depth effect associated with the representation of the fourth participant.

53. The method of claim 23, wherein the computer system is in communication with one or more cameras, and the user interface of the real-time communication session includes a representation of a field-of-view of the one or more cameras, the method further comprising:
while displaying the representation of the field-of-view of the one or more cameras overlaying at least a portion of a first representation of a participant of the real-time communication session, detecting an input corresponding to the first representation of the participant of the real-time communication session; and
in response to detecting the input corresponding to the first representation of the participant of the real-time communication session, displaying the first representation of the participant of the real-time communication session overlaying at least a portion of the representation of the field-of-view of the one or more cameras.

54. The method of claim 23, wherein:
the computer system is in communication with one or more cameras;
the user interface of the real-time communication session includes a representation of a field-of-view of the one or more cameras; and
the second set of representations of participants displayed in the second region includes one or more representations of participants having a shifted position adjacent to the representation of the field-of-view of the one or more cameras.

55. The method of claim 23, further comprising:
while displaying a first subset of the second set of representations of participants displayed in the second region, receiving an input that corresponds to movement in a respective direction in the user interface; and
in response to receiving the input that corresponds to movement in the respective direction in the user interface:
in accordance with a determination that the input that corresponds to movement in the respective direction in the user interface is directed to a portion of the user interface that includes the second set of representations of participants, scrolling the second set of representations of participants in the respective direction, including displaying one or more representations of participants that are not included in the first subset of the second set of representations of participants.

56. The method of claim 55, further comprising:
in response to receiving the input that corresponds to movement in the respective direction in the user interface:
in accordance with a determination that the input that corresponds to movement in the respective direction in the user interface is directed to a portion of the user interface that includes the first set of representations of participants, forgoing scrolling the first set of representations of participants.

57. The method of claim 23, further comprising:
while displaying the first set of representations of participants displayed in the first region and having a first arrangement, receiving a request to display a second set of one or more controls for the real-time communication session; and
in response to receiving the request to display a second set of one or more controls for the real-time communication session:
  displaying the second set of one or more controls for the real-time communication session; and
  displaying the first set of representations of participants displayed in the first region and having a second arrangement different than the first arrangement.

58. The method of claim 23, wherein the user interface of the real-time communication session includes an arrangement-selection option that, when selected, enables an overlapping arrangement of a third set of representations of participants of the real-time communication session.

59. The method of claim 58, further comprising:
while displaying a representation of content associated with a shared-content session concurrently with the first set of representations of participants in the first region of the user interface of the real-time communication session, receiving a request to move the representation of content; and
in response to receiving the request to move the representation of content, moving the representation of content from a first location in the user interface of the real-time communication session to a second location in the user interface of the real-time communication session, including:
  in accordance with a determination that the overlapping arrangement of the first set of representations of participants is enabled, changing a position of one or more representations of participants of the first set of representations of participants in the first region based on the movement of the representation of content; and
  in accordance with a determination that the overlapping arrangement of the first set of representations of participants is not enabled, forgoing changing a position of one or more representations of participants of the first set of representations of participants in the first region based on the movement of the representation of content.

60. The method of claim 23, further comprising:
while displaying the first set of representations of participants in a grid pattern in the first region of the user interface of the real-time communication session, detecting a first gesture that includes movement through locations corresponding to one or more of the representations of participants in the user interface corresponding to a request to change an arrangement of the plurality of representations of participants in the user interface; and
in response to detecting the first gesture, displaying a fourth set of representations of participants of the real-time communication session in an overlapping arrangement.

61. The method of claim 23, further comprising:
while displaying, in the user interface of the real-time communication session, a fifth set of representations of participants of the real-time communication session in an overlapping arrangement, detecting a second gesture that includes movement through locations corresponding to one or more of the representations of participants in the user interface corresponding to a request to change an arrangement of the plurality of representations of participants in the user interface; and
in response to detecting the second gesture, displaying a sixth set of representations of participants of the real-time communication session in a grid pattern.

62. The method of claim 23, wherein changing a number of representations of participants of the real-time communication session displayed in the first region based on the change in the one or more dimensions of the first region includes displaying a first row of representations of participants fading out while maintaining display of at least a second row of representations of participants in the first region.

63. The method of claim 23, wherein changing a number of representations of participants of the real-time communication session displayed in the first region based on the change in the one or more dimensions of the first region includes displaying a first column of representations of participants fading out while maintaining display of at least a second column of representations of participants in the first region.

* * * * *